(12) United States Patent
Watanabe et al.

(10) Patent No.: US 6,392,981 B2
(45) Date of Patent: May 21, 2002

(54) DISC DEVICE

(75) Inventors: Hidetaka Watanabe; Shigehiro Itou; Takashi Matsuda; Yoshisada Ishimoto, all of Tokyo (JP)

(73) Assignees: Mitsubishi Electric Engineering Company Limited; Mitsubishi Denki Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/171,211

(22) PCT Filed: Feb. 27, 1998

(86) PCT No.: PCT/JP98/00807

§ 371 Date: Oct. 15, 1998

§ 102(e) Date: Oct. 15, 1998

(87) PCT Pub. No.: WO98/40888

PCT Pub. Date: Sep. 17, 1998

(30) Foreign Application Priority Data

Mar. 10, 1997 (JP) .............................................. 9-055156

(51) Int. Cl.$^7$ .............................................. G11B 17/22
(52) U.S. Cl. .................. 369/192; 369/30.78; 369/30.82
(58) Field of Search .................... 369/36, 38, 191–194, 369/178, 75.1–77.2, 30.78, 30.82, 30.89; 360/92

(56) References Cited

U.S. PATENT DOCUMENTS

| | | | | |
|---|---|---|---|---|
| 4,616,357 A | * | 10/1986 | Nakayama .................. | 369/194 |
| 5,138,591 A | | 8/1992 | Ogawa et al. ................. | 369/36 |
| 5,481,512 A | * | 1/1996 | Morioka et al. ............... | 369/36 |
| 5,532,985 A | * | 7/1996 | Nakamichi .................... | 369/34 |
| 5,687,145 A | * | 11/1997 | Takashina et al. ............. | 369/38 |
| 5,748,577 A | * | 5/1998 | Sakiyama ..................... | 369/36 |
| 5,970,041 A | * | 10/1999 | Inatani et al. ................ | 369/192 |
| 5,970,042 A | * | 10/1999 | Fujimoto et al. ............. | 369/247 |
| 6,009,069 A | * | 12/1999 | Yamashita et al. ........... | 369/178 |
| 6,058,097 A | * | 5/2000 | Inoue .......................... | 369/192 |
| 6,134,213 A | * | 10/2000 | Suzuki et al. ................ | 369/192 |

FOREIGN PATENT DOCUMENTS

| | | | |
|---|---|---|---|
| JP | 62-047893 | * | 3/1987 |
| JP | 63 200354 | | 8/1988 |
| JP | 3-235255 | | 10/1991 |
| JP | 10-21628 | | 1/1998 |

* cited by examiner

*Primary Examiner*—William Klimowicz

(57) ABSTRACT

A disk system capable of sharing portions at which disks are disposed, thereby miniaturizing the entire structure of the system. The disk system includes a plurality of stockers for containing disks in such a manner as to substantially align rotational axial lines of the disks to each other. The disk system also includes a stocker moving mechanism for moving the stockers to specific positions. The disk system also includes a disk driving mechanism for rotating the disks contained in the stockers. The disk system is arranged so that the stocker moving mechanism moves, on the basis of a command, at least one of a desired stocker and another stocker for providing a first gap between the desired stocker and another stocker, and also moves, on the basis of the command, at least one of the desired stocker and a stocker facing to a specific surface of the desired stocker for further enlarging only the gap provided between the desired stocker and the stocker facing to the specific surface of the desired stocker up to a second gap.

23 Claims, 102 Drawing Sheets d1<d2 d2<d3 d3<d4

451

452    451

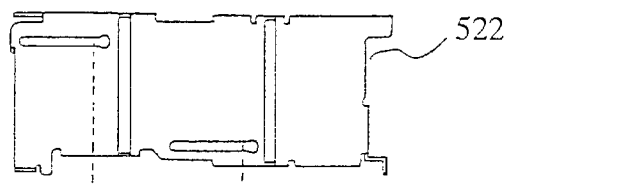
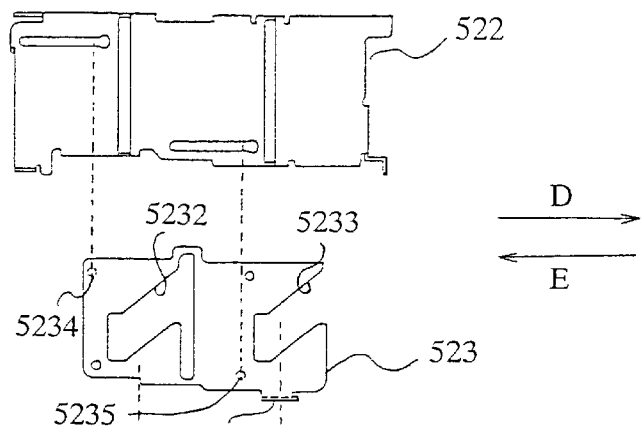
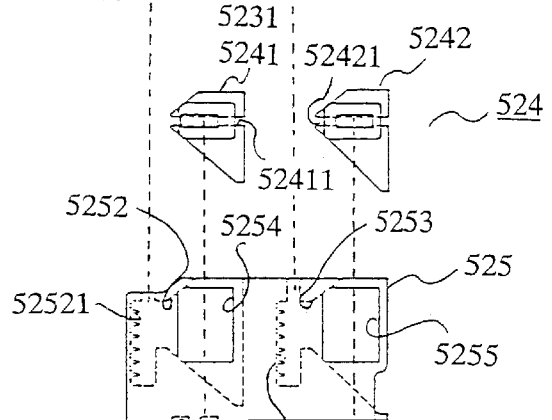
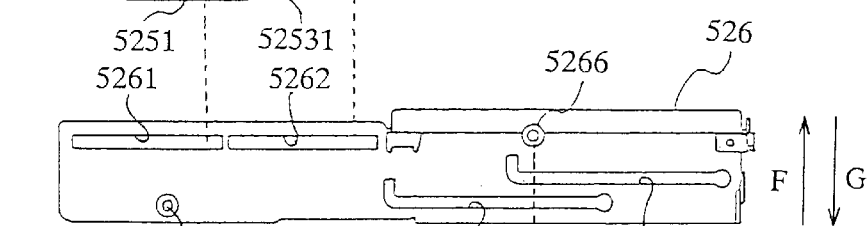
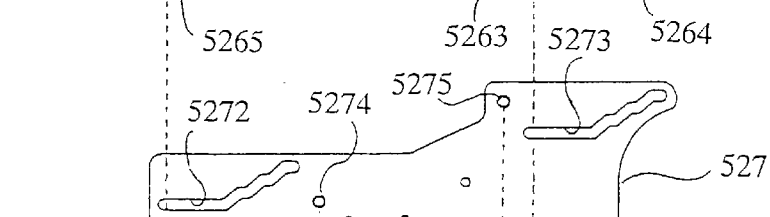
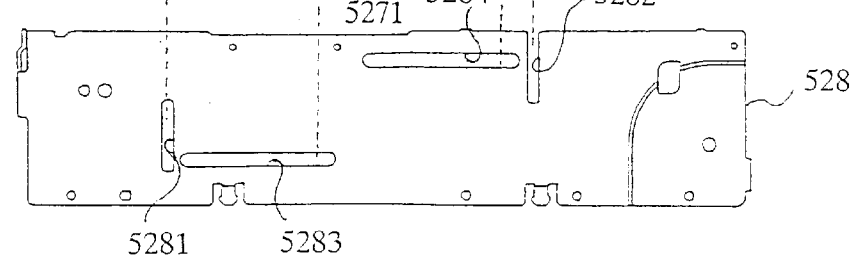

FIG.40

| NO. | MODE | MOVED PART(S) | PURPOSE FOR OPERATION |
|---|---|---|---|
| 1 | DISK R1 LORD/EJ | | |
| 2 | | SECOND CAM PLATE, a→b | RELEASE OF LOCK |
| 3 | | FIRST CAM PLATE, ①→② THIRD CAM PLATE, A→B | ONE STOCKER STAGE, UP |
| 4 | DISK R2 LORD/EJ | SECOND CAM PLATE, b→a | LOCK |
| 5 | | SECOND CAM PLATE, a→b | RELEASE OF LOCK |
| 6 | | FIRST CAM PLATE, ②→③ THIRD CAM PLATE, B→C | ONE STOCKER STAGE, UP |
| 7 | DISK R3 LORD/EJ | | LOCK |
| 8 | | SECOND CAM PLATE, a→b | RELEASE OF LOCK |
| 9 | | FIRST CAM PLATE, ③→④ THIRD CAM PLATE, C→D | ONE STOCKER STAGE, UP |
| 10 | DISK R4 LORD/EJ | SECOND CAM PLATE, b→a | LOCK |
| 11 | | SECOND CAM PLATE, a→b | RELEASE OF LOCK |
| 12 | | SECOND CAM PLATE, b→c THIRD CAM PLATE, D→E | SEPARATION OF STOCKERS STANDBY POSITION |
| 13 | DISK R4 PLAY | SECOND CAM PLATE, c→d | SEPARATION OF STOCKERS |
| 14 | | SECOND CAM PLATE, d→c | CLOSE CONTACT OF STOCKERS |
| 15 | | FIRST CAM PLATE, ⑤→⑥ | EV PORTION, UP |
| 16 | DISK R3 PLAY | SECOND CAM PLATE, c→d | SEPARATION OF STOCKERS |
| 17 | | SECOND CAM PLATE, d→c | CLOSE CONTACT OF STOCKERS |
| 18 | | FIRST CAM PLATE, ⑥→⑦ | EV PORTION, UP |
| 19 | DISK R2 PLAY | SECOND CAM PLATE, c→d | SEPARATION OF STOCKERS |
| 20 | | SECOND CAM PLATE, d→c | CLOSE CONTACT OF STOCKERS |
| 21 | | FIRST CAM PLATE, ⑦→⑧ | EV PORTION, UP |
| 22 | DISK R1 PLAY | SECOND CAM PLATE, c→d | SEPARATION OF STOCKERS |

FIG.41

| NO. | MODE | FIRST CAM PLATE | SECOND CAM PLATE | THIRD CAM PLATE |
|---|---|---|---|---|
| 1 | DISK R1 LORD/EJ | ① | a | A |
| 2 | | ① | b | A |
| 3 | | ② | b | B |
| 4 | DISK R2 LORD/EJ | ② | a | B |
| 5 | | ② | b | B |
| 6 | | ③ | b | C |
| 7 | DISK R3 LORD/EJ | ③ | a | C |
| 8 | | ③ | b | C |
| 9 | | ④ | b | D |
| 10 | DISK R4 LORD/EJ | ④ | a | D |
| 11 | | ④ | b | D |
| 12 | | ⑤ | c | E |
| 13 | DISK R4 PLAY | ⑤ | d | E |
| 14 | | ⑤ | c | E |
| 15 | | ⑥ | c | E |
| 16 | DISK R3 PLAY | ⑥ | d | E |
| 17 | | ⑥ | c | E |
| 18 | | ⑦ | c | E |
| 19 | DISK R2 PLAY | ⑦ | d | E |
| 20 | | ⑦ | c | E |
| 21 | | ⑧ | c | E |
| 22 | DISK R1 PLAY | ⑧ | d | E |

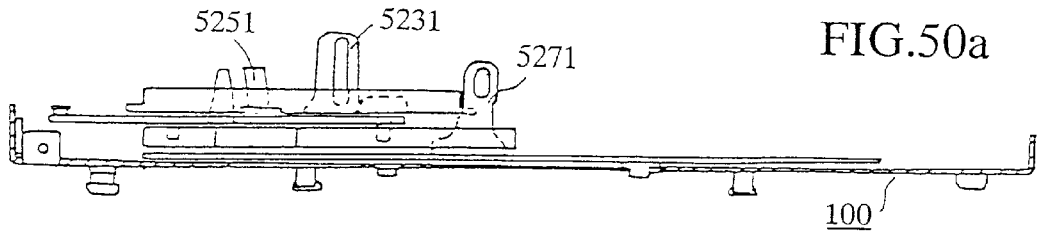
FIG.50a
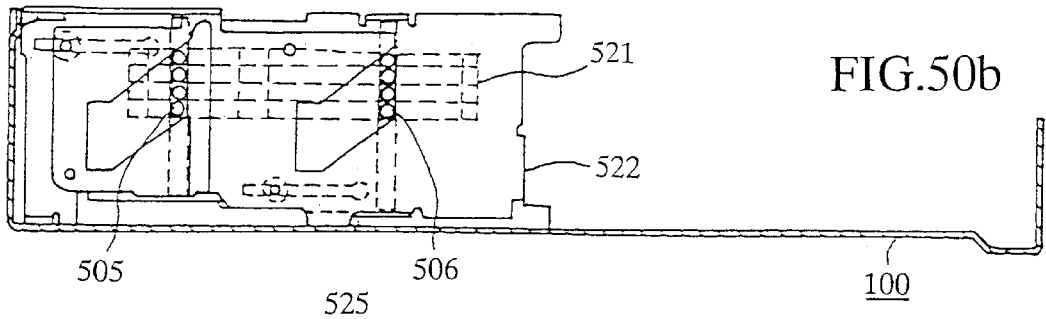
FIG.50b
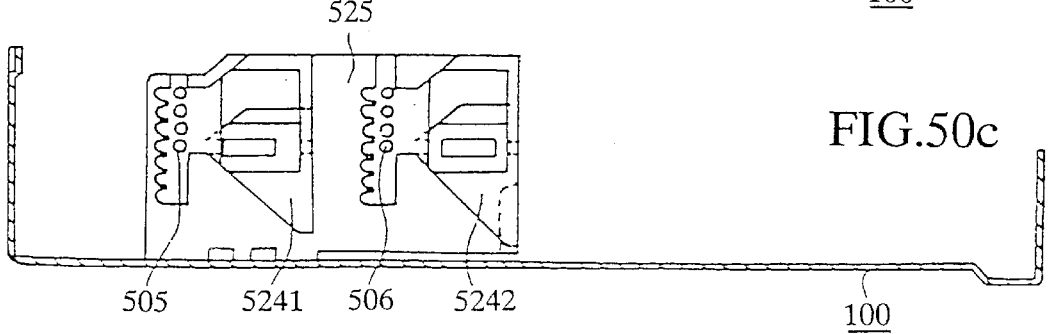
FIG.50c
FIG.50d
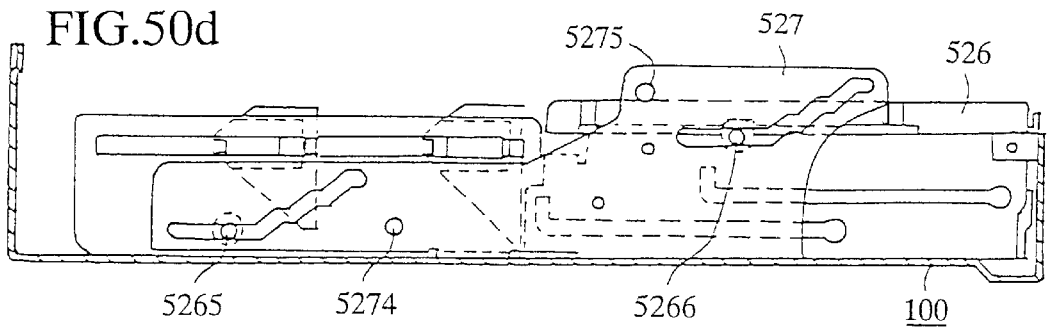
FIG.50e
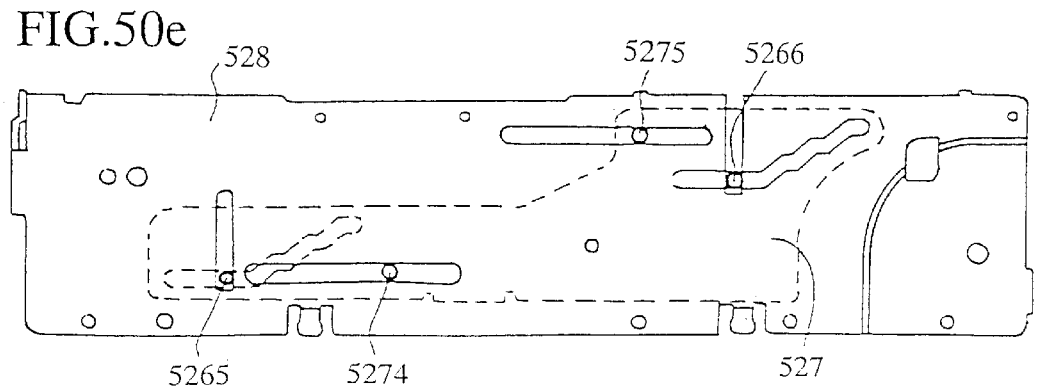

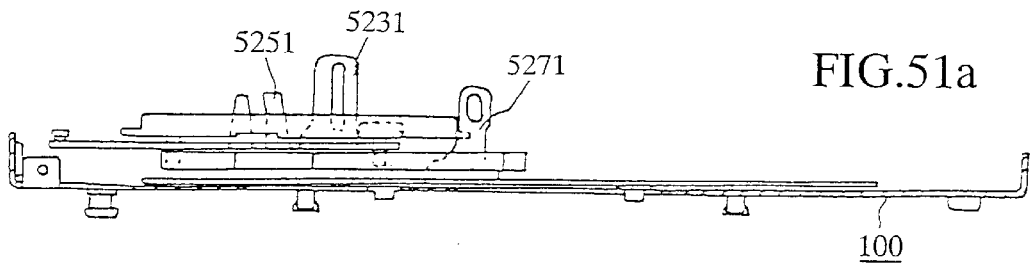
FIG.51a
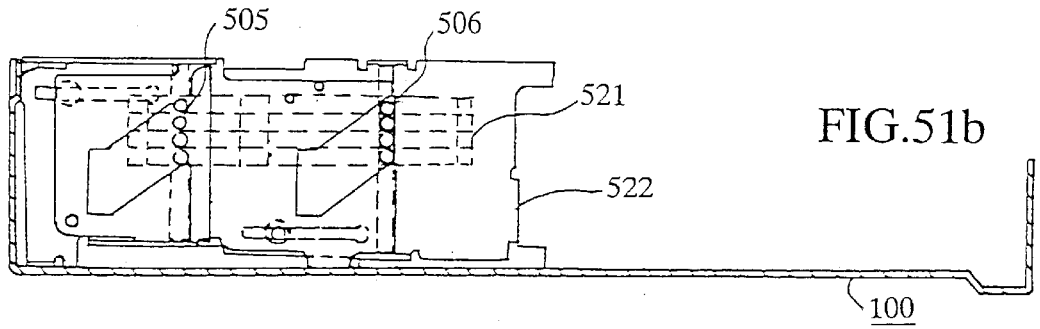
FIG.51b
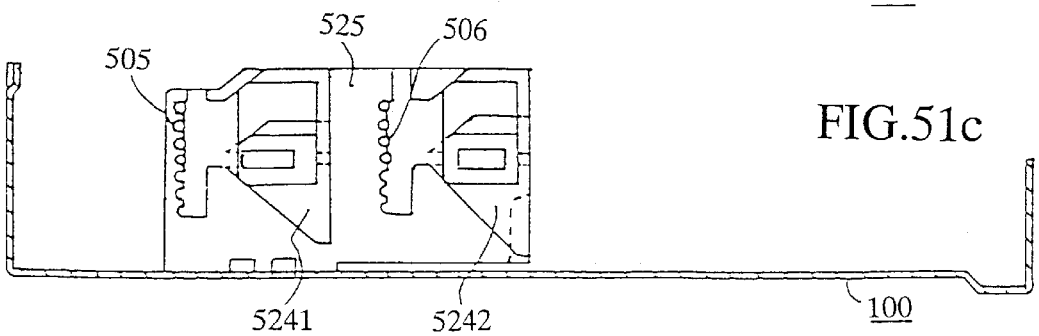
FIG.51c
FIG.51d
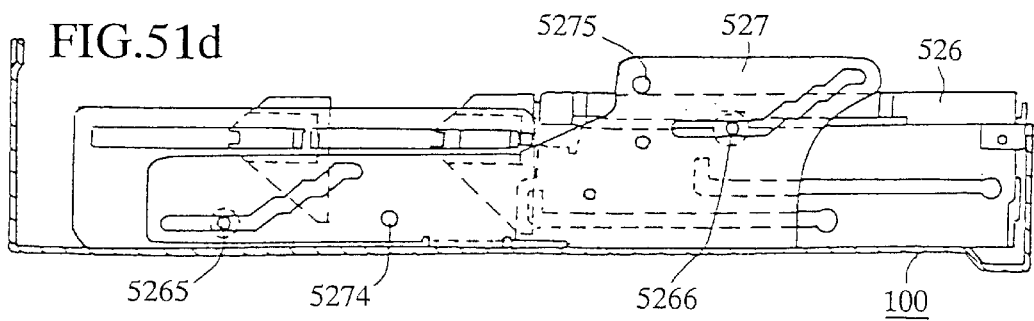
FIG.51e
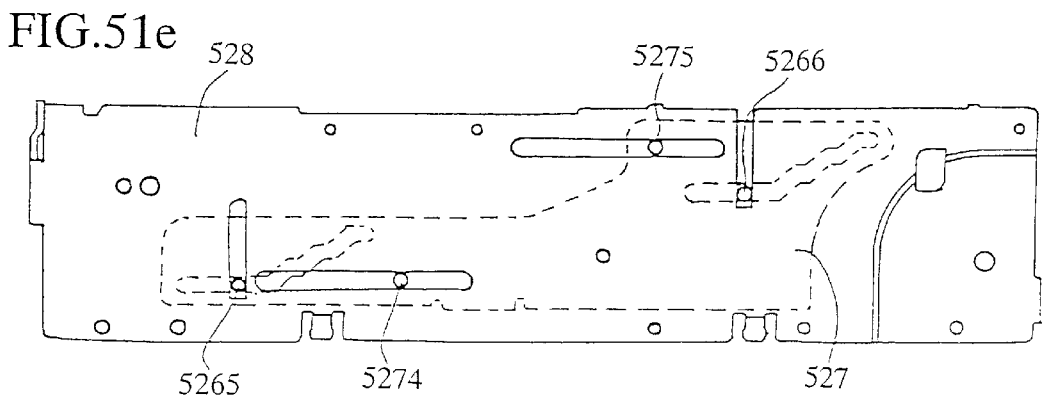

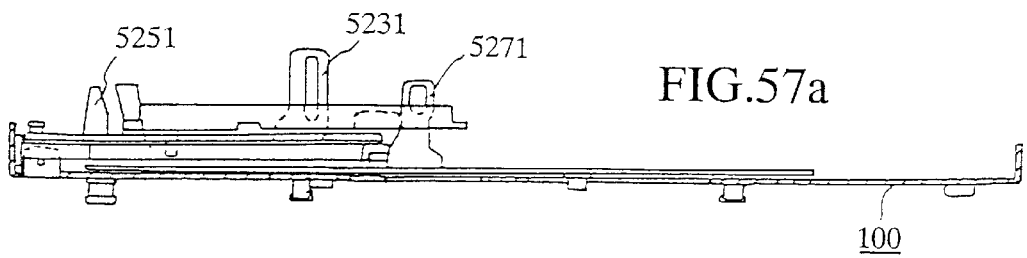
FIG.57a
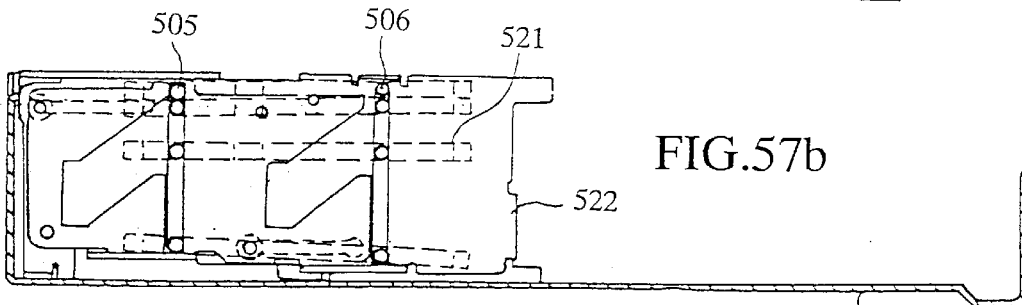
FIG.57b
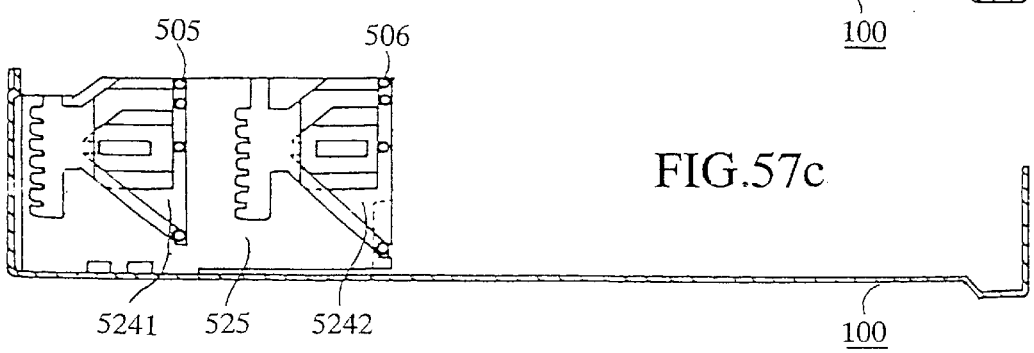
FIG.57c
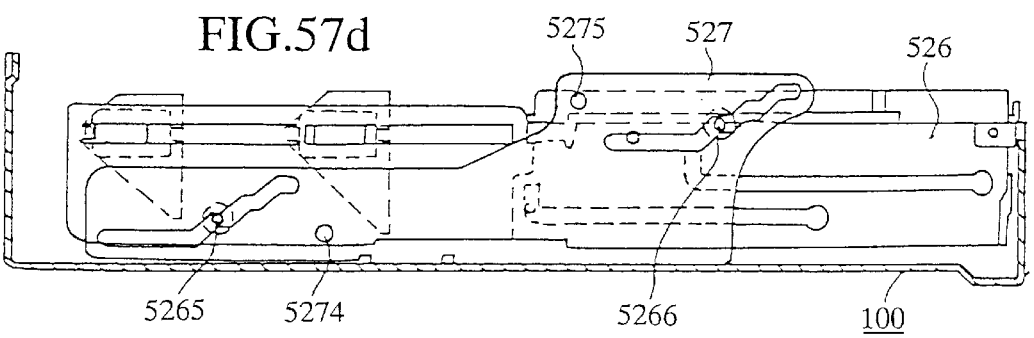
FIG.57d
FIG.57e
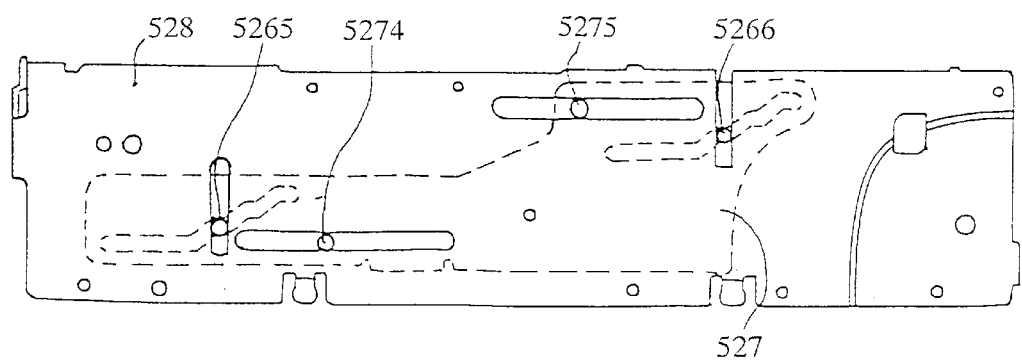

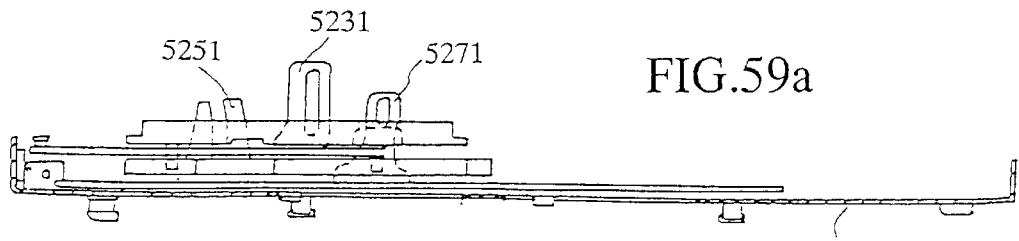
FIG.59a
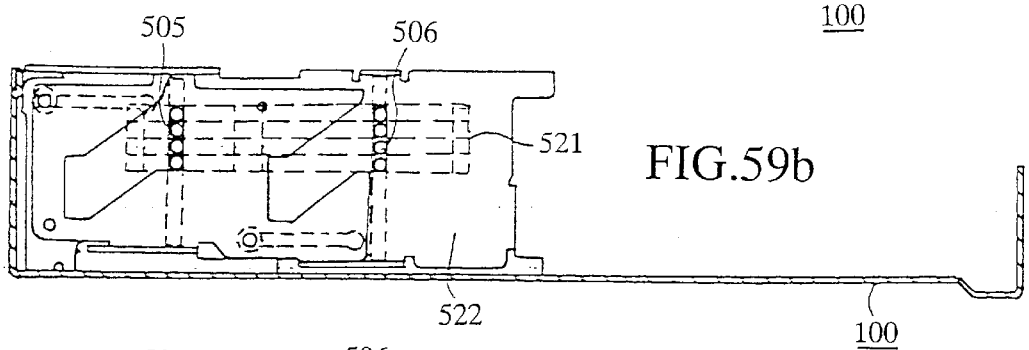
FIG.59b
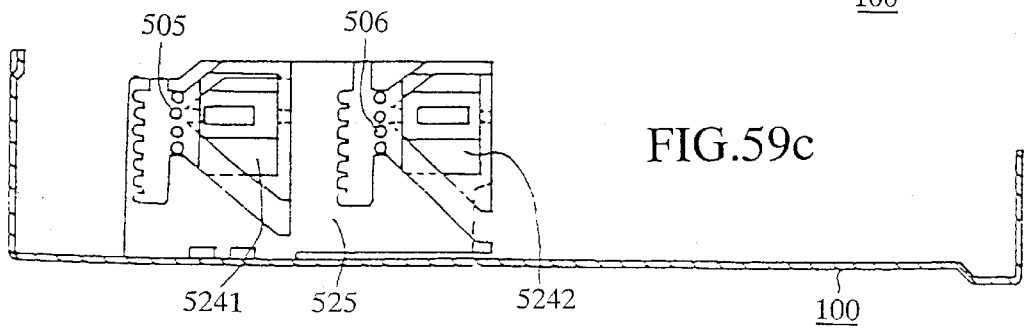
FIG.59c
FIG.59d
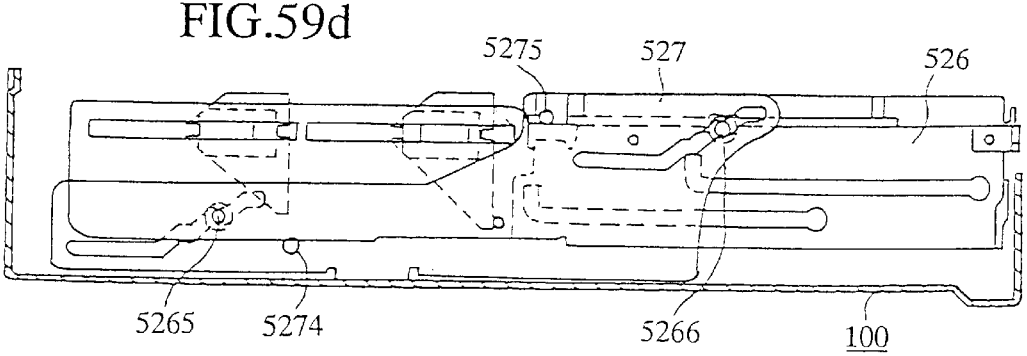
FIG.59e
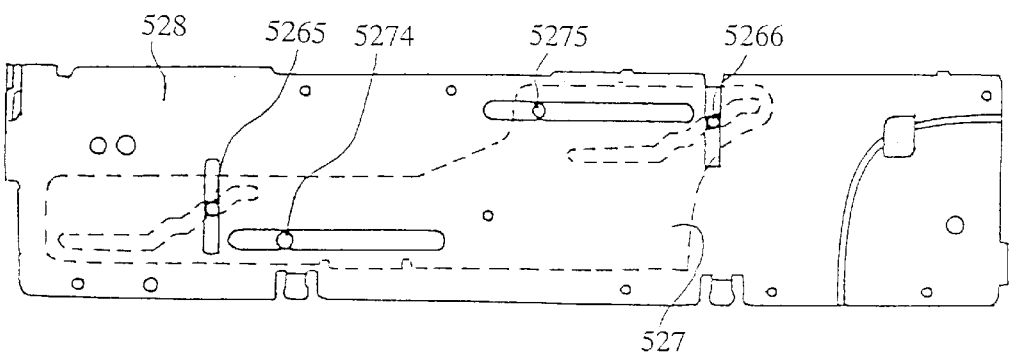

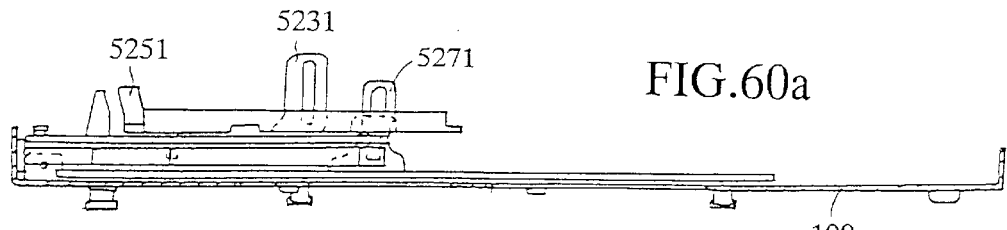
FIG.60a
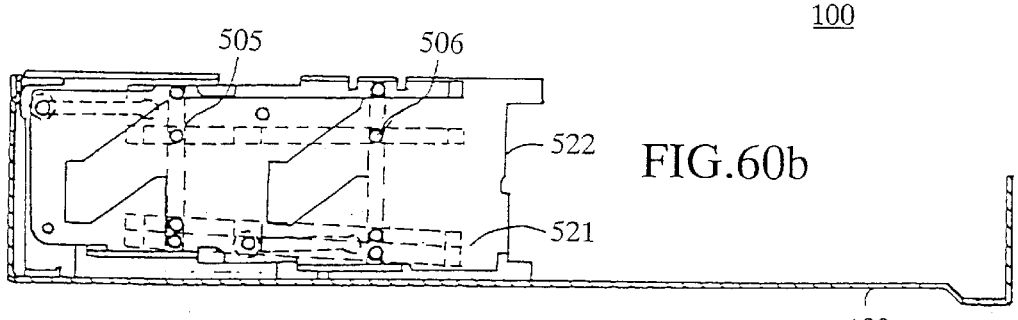
FIG.60b
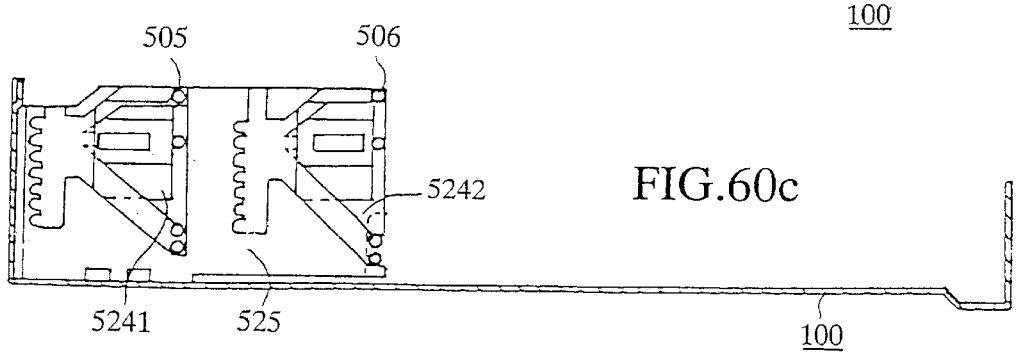
FIG.60c
FIG.60d
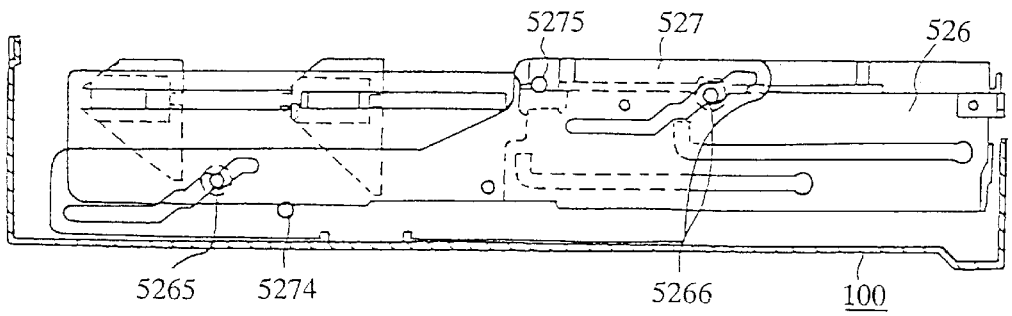
FIG.60e
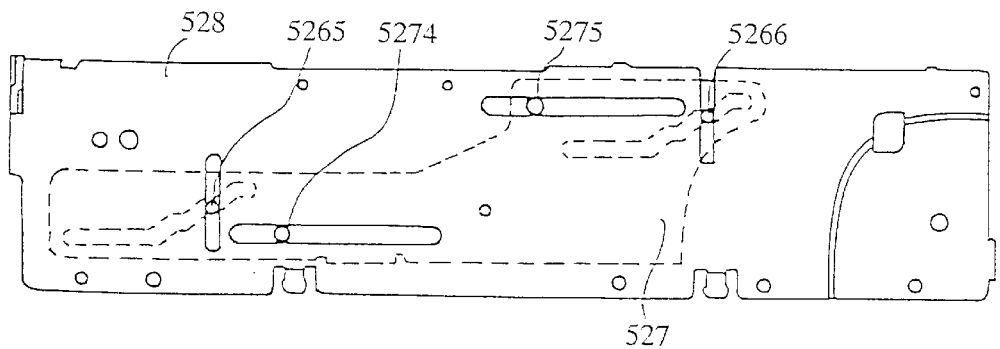

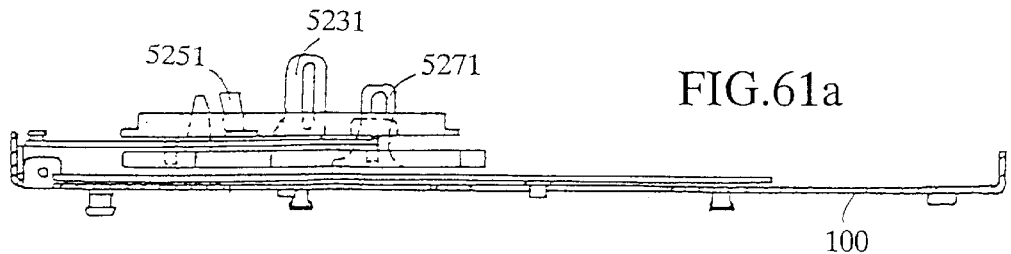
FIG.61a
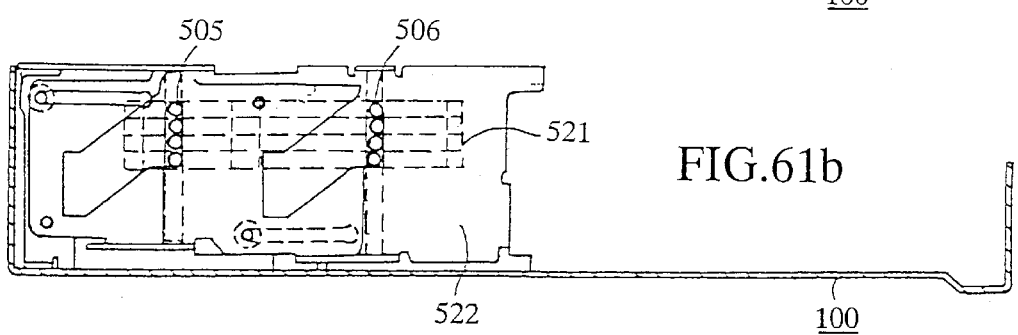
FIG.61b
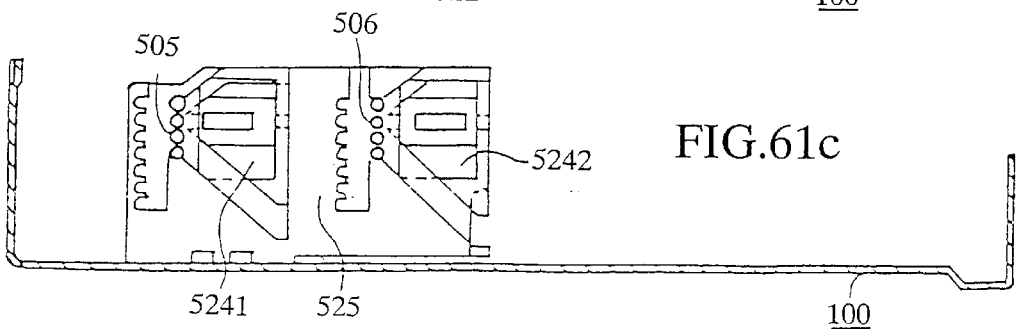
FIG.61c
FIG.61d
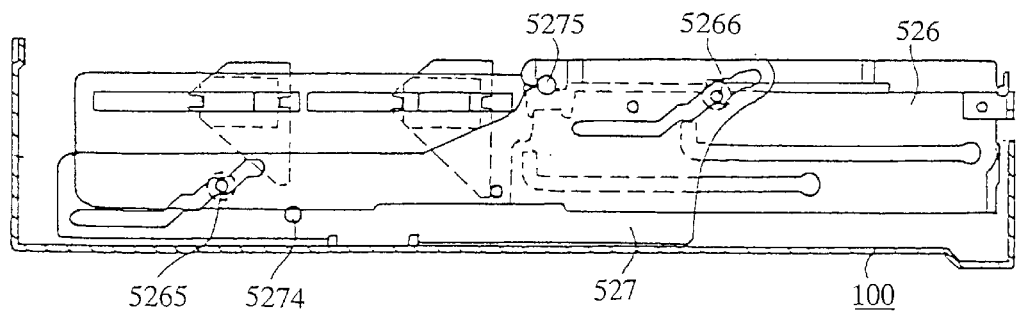
FIG.61e
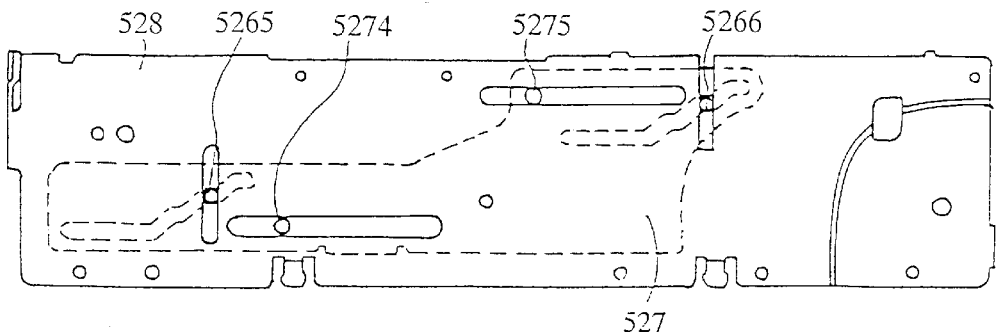

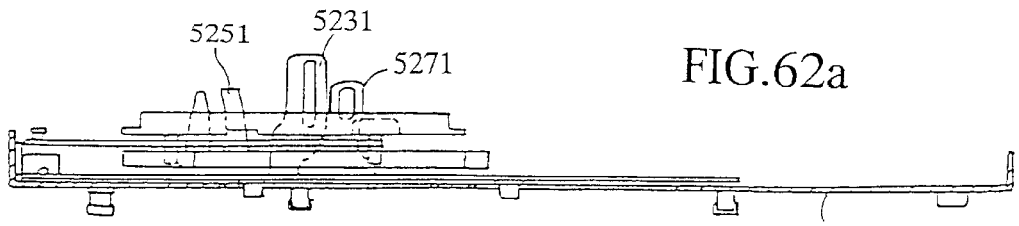
FIG.62a
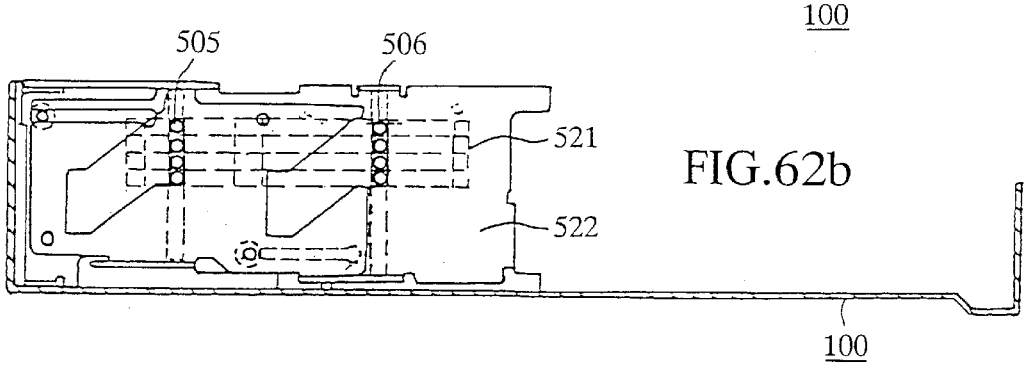
FIG.62b
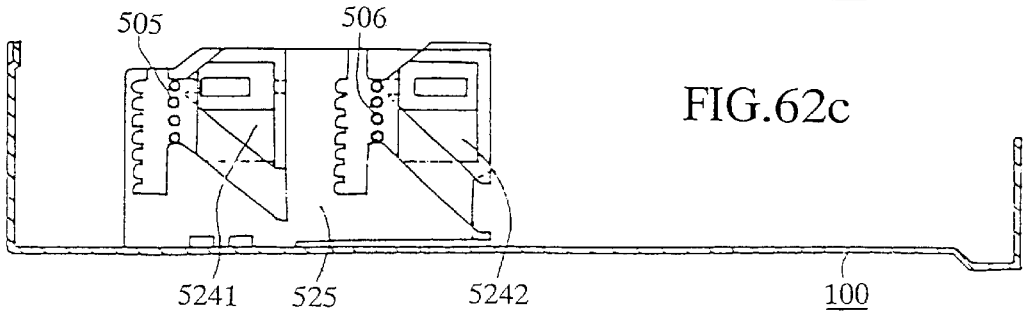
FIG.62c
FIG.62d
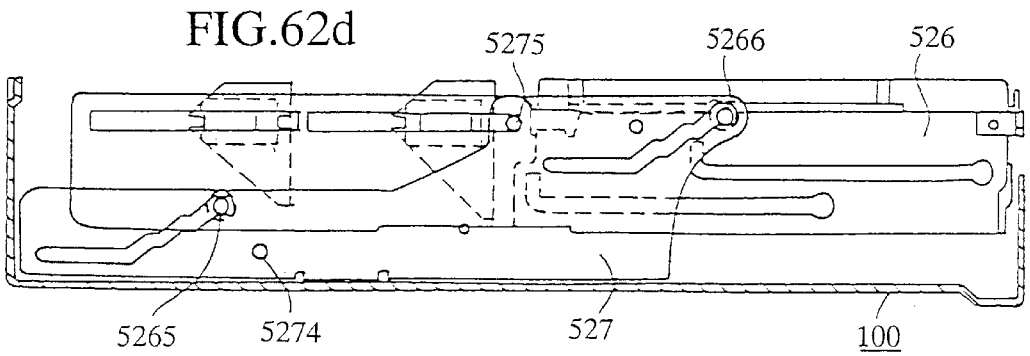
FIG.62e
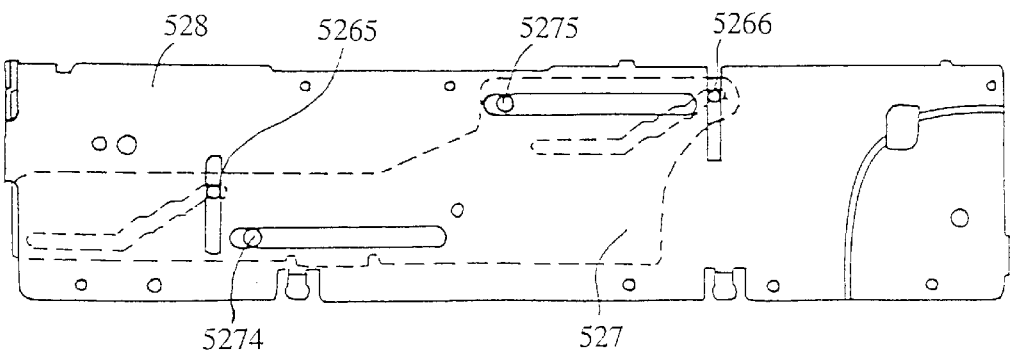

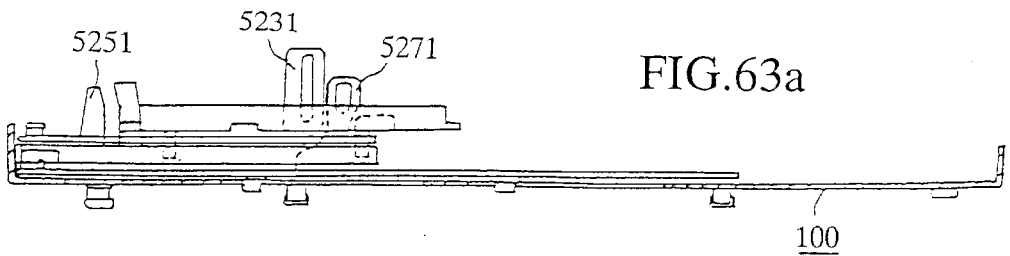
FIG.63a
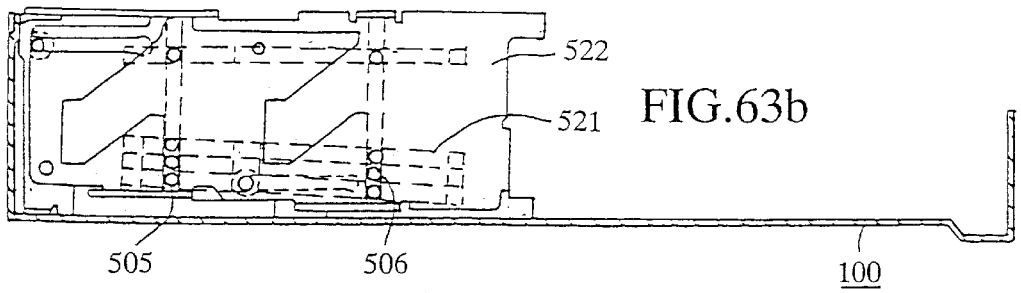
FIG.63b
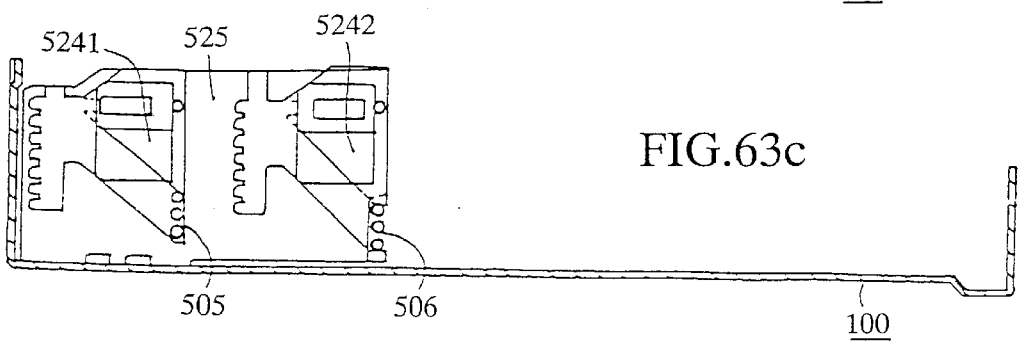
FIG.63c
FIG.63d
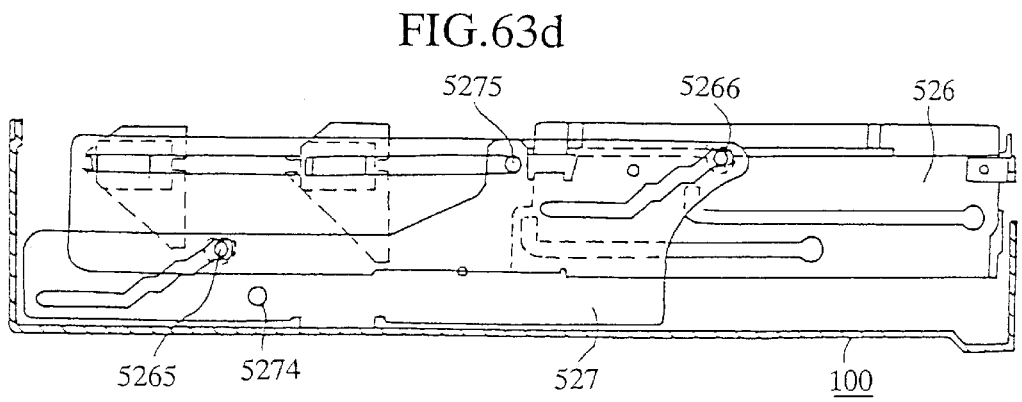
FIG.63e
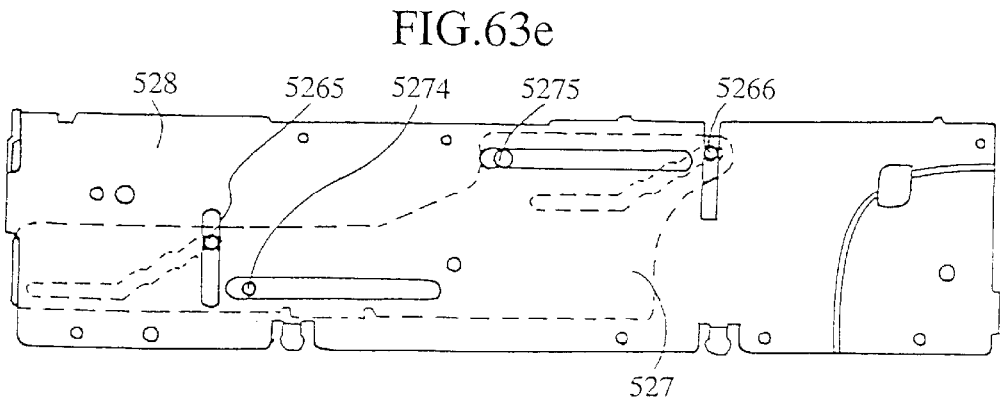

DISC DEVICE

This application is the national phase under 35 U.S.C. §371 of prior PCT International Application No. PCT/JP98/00807 which has an International filing date of Feb. 27, 1998 which designated the United States of America, the entire contents of which are hereby incorporated by reference.

1. Technical Field

The present invention relates to a disk system, and particularly to a disk system capable of selectively operating a plurality of disks without use of a removable magazine.

2. Background Art

FIG. 106 is a sectional side view showing an essential portion of a related art general disk system capable of selectively operating a plurality of disks, and FIG. 107 is a sectional view of the essential portion.

In FIGS. 106 and 107, reference numeral 1 indicates a magazine in which exchange disks are contained, and 2 is a disk rotating portion. The disk rotating portion 2 includes a disk rotating motor 3; a disk clamp hub 13 provided on a shaft of the disk rotating motor 3; a disk clamper 4; a disk roller 6 for feeding, a disk 8 which is fed out by a driving lever 5 provided in the magazine 1 and driven by a driving means (not shown), to the disk rotating portion 2; a driving shaft 9 fixed on a housing 7 for supporting the disk rotating portion 2; and a tilting plate cam 10 and upper and lower guide plates 11 operated in the direction A in the figures.

In this disk system, to take off a plurality of the disks 8 contained in the magazine 1, the disk rotating portion 2 is moved in the direction B in the figures by interlocking of the driving shaft 9, tilting plate cam 10 and upper and lower guide plates 11, to be positioned at a desired disk position in the magazine 1.

In this way, according to the related art disk system, since disks contained in the magazine 1 are perfectly independent from a disk rotated on the disk rotating portion 2 side within a plane region, there occurs a problem that a length, that is, a dimension D of the disk system becomes larger.

To solve the above problem, for example, Japanese Patent Laid-open No. Sho 63-200354 has proposed a disk system. FIG. 108 is a sectional side view of an essential portion of such a disk system, and FIG. 109 is a sectional top view of the essential portion of the disk system.

In FIGS. 108 and 109, reference numeral 19 indicates a magazine for containing exchange disks; 21 is a disk rotating motor; 22 is a disk clamp hub provided on a shaft of the disk rotating motor 21; and 23 is a disk clamper.

Reference numeral 26 indicates a disk roller for feeding a disk 25 fed by a driving lever 24 driven by a driving means (not shown) to a disk rotating portion, and 27 is a driven roller disposed opposite to the disk roller 26.

Reference numeral 32 indicates a pair of tilting plate cams which are engaged with a plurality of trays 31 in the magazine 19. When the disk 25 selected by a magazine moving means (not shown) is moved in the direction of the plane of the disk, the pair of tilting plate cams 32 provide a space E more than at least a plate thickness of the disk in the rotating axis of the disk 25 with respect to the disk rotating portion 20.

Here, the disk rotating portion 20 includes the disk rotating motor 21, disk clamp hub 22, disk clamper 23, driving lever 24, disk 25, disk roller 26, drive roller 27, and tilting plate cams 32.

Next, operation of the above disk system will be described.

To take off one of the plurality of the disks 25 contained in the magazine 19, the magazine 19 is moved in the direction F in the figures by the driving means to be positioned at a desired disk position in the magazine 19.

The disk 25 slides along a disk guide portion 35 in the magazine 19 by operation of the driving lever 24 in the magazine 19, and a leading end of the disk 25 is bitten between the disk roller 26 and the driven roller 27 of the disk rotating portion 20. Then, the disk 25 is carried to the disk clamper 23 and the disk clamp hub 22 provided on the shaft of the disk rotating motor 21 by turning of the disk roller 26. The clamp position of the disk 25 is checked by a disk detecting means (not shown), and the disk clamper 23 and also the disk roller 26 and the driven roller 27 are moved in the direction of the disk clamp hub 22 by the driving means, to clamp the disk 25.

At the same time when the driven roller 27 is moved toward the disk clamp hub 22, a pair of the tilting plate cams 32 provided on the disk rotating portion 20 are moved on the magazine 19 side by the driving means, to tilt the tray 31 to form suitable space E as shown in FIG. 108b.

The related art disk system configured as described above requires a magazine case, and consequently, it presents problems that disks cannot be selectively inserted in or ejected from the disk rotating portion one by one and that it is enlarged in size.

Further, since the related art disk system employs a portable magazine case, it is technically difficult to disassemble racks containing disks from each other in the disk system. As a result, to form a gap between a desired disk to be reproduced and a disk facing to the desired disk, only one-ends of the disks can be opened. In other words, to form a large gap between the disks, a space corresponding to the large gap must be provided in the system, thus causing a problem that the disk system is enlarged in size.

Further, since the related art disk system employs a portable magazine case, it is very difficult to separate racks containing disks from each other in the disk system while tilting each rack.

SUMMARY AND OBJECTS OF THE INVENTION

Additionally, to ensure a space in the disk system, there occurs a problem that the disk system is enlarged in size.

To solve the above-described problems, the present invention has been made, and an object of the present invention is to provide a disk system capable of being miniaturized, even in the case where the disk system is configured so that a plurality of disks are contained without the need of provision of any removable magazine and are each operated, that is, each disk is selectively inserted, ejected, and operated, for example, reproduced.

Another object of the present invention is to provide a disk system capable of achieving space-saving even in the case where the disk system is configured that a disk containing position is different from a disk reproducing position.

A further object of the present invention is to provide a disk system capable of preventing a disk being damaged by holding the disk upon insertion or ejection of the disk and moving both roller portions holding the disk upon reproducing or exchange of the disk.

The present invention provides a disk system including: a plurality of stockers for containing disks in such a manner as to substantially align rotational axial lines of the disks to each other; a stocker moving means for moving the stockers to specific positions; and a disk driving means for rotating the disks contained in the stockers; wherein the stocker moving means moves, on the basis of a command, at least one of a desired stocker and another stocker for providing a gap between the desired stocker and another stocker, and also moves, on the basis of the command, at least one of the desired stocker and a stocker facing to a specific surface of the desired stocker for further enlarging only the gap provided between the desired stocker and the stocker facing to the specific surface of the desired stocker up to a gap. With this configuration, upon operation of disks, the disk driving means can be moved in the gap between the desired disk and a disk adjacent to the desired disk, so that it is possible to share portions at which disks are disposed and hence to miniaturize the disk system.

The stocker moving means, preferably, moves at least one of the desired stocker and another stocker for providing the gap between the desired stocker and another stocker, and moves at least one of the desired stocker and a stocker adjacent to the desired stocker for further enlarging the gap between the desired stocker and the stocker adjacent to the desired stocker up to the gap so as to dispose at least part of the disk driving means in the gap. With this configuration, upon operation of disks, the disk driving means can be moved in the gap between the desired disk and a disk adjacent to the desired disk, so that it is possible to share portions at which disks are disposed and hence to miniaturize the disk system.

The stocker moving means is, preferably, provided with a first adjusting means for adjusting heights of the stockers, and a second adjusting means for adjusting motions of the stockers in the direction substantially parallel to a carrying path of the disk. With this configuration, it is possible to freely move the stockers in the vertical direction and the longitudinal direction, and hence to improve the reliability of the disk system.

According to the present invention, preferably, projecting portions are provided on side portions of the stockers, and the first adjusting means is formed with a plurality of recessed portions which are engaged with the projecting portions provided on the stockers for adjusting the heights of the stockers; and when the heights of the stockers are adjusted, one of the plurality of recessed portions corresponding to a desired height of one stocker is selected and the projecting portion of the stocker is locked in the recessed portion thus selected. With this configuration, it is possible to certainly adjust heights of the stockers, and hence to simplify the structure without reduction in the reliability of the disk system.

According to the present invention, preferably, projecting portions are provided on side portions of the stockers, and the first adjusting means is formed with recessed portions to be engaged with the projecting portions provided on the stockers and also formed with a separating portion for separating only one stocker not engaged with the recessed portion from others of the stockers; and when the heights of the stockers are adjusted, the projecting portion provided on a desired stocker is engaged with the corresponding one of the plurality of recessed portions and the separating portion separates a different stocker not engaged with the recessed portion from the desired stocker. With this configuration, it is possible to certainly enlarge the gap between the adjacent stockers, that is, separate the adjacent stockers from each other with a simple mechanism, and hence to further improve the reliability of the disk system.

The disk system according to the present invention, preferably, further includes an interlocking control means for interlocking the stocker moving means to the disk driving means. With this configuration, it is possible to simultaneously perform operations of the entire disk system and prevent malfunction and the like, and hence to improve the reliability of the disk system.

According to the present invention, preferably, in a state in which there exists a stocker not containing a disk and the disk driving means is not driven, the stocker moving means previously disposes the stocker in the vicinity of a disk insertion port. With this configuration, it is possible to rapidly contain a disk in the disk system and hence to start a specific operation for the disk.

This improves the usability of an operator.

The stocker moving means, preferably, previously disposes a desired stocker in the vicinity of a disk insertion port on the basis of a command. With this configuration, it is possible to eliminate a labor necessary for selecting an empty one from a plurality of stockers for an operator to contain a disk in the disk system, and hence to improve the usability of an operator.

The stocker moving means, preferably, integrally moves the plurality of stockers in the height direction upon carrying of a disk. With this configuration, it is possible to shorten a time required for movement of the stockers, and hence to improve the usability of disk system.

The stocker moving means preferably moves, upon operation of the disk driving means, at least one of a desired stocker and another stocker for providing a gap between the desired stocker and another stocker and also moves at least one of the desired stocker and a stocker facing to a specific surface of the desired stocker for further enlarging only the gap between the desired stocker and the stocker facing to the specific surface of the desired stocker up to a gap. With this configuration, the disk driving means can be inserted in the gap further enlarged, so that it is possible to make smaller a space in the direction of disk displacement and hence to miniaturize the disk system.

The present invention also provides disk system including: a plurality of stockers for containing disks in such a manner as to substantially align rotational axial lines of the disks to each other; a stocker moving means for moving the stockers to specific positions; a disk operating portion for rotating the disk, the disk operating portion being provided in such a manner as to be movable from one end to the other end of a carrying path of the disk substantially in parallel to the disk carrying path; a disk clamper portion for holding the disk, the disk clamper portion being provided in such a manner as to be movable from one end to the other end of the disk carrying path substantially in parallel to the disk carrying path; first and second disk rollers, provided opposite to each other with the disk carrying path put therebetween, for carrying the disk carried within the disk carrying path while holding both surfaces of the disk; a first roller moving means for moving, upon operation of the disk driving means, the first disk roller in the direction substantially perpendicular to a plane of the disk facing to the first disk roller so as to provide a gap between the first disk roller and the plane of the disk; and a second roller moving means for moving, upon operation of the disk driving means, the second disk roller in the direction substantially perpendicular to a plane of the disk facing to the second disk roller so as to provide a gap between the second disk roller and the plane of the disk. With this configuration, the operational range of the disk operating portion is shared with operational ranges of other members, so that it is possible to miniaturize the disk system.

The stocker moving means, preferably, moves at least one of a desired stocker and another stocker for providing a gap between the desired stocker and another stocker on the basis of a command. With this configuration, since at least part of the disk operating portion can be inserted in the gap between the desired stocker and another stocker, the disk system can be miniaturized, and also since the moving distance of a disk to an operating position can be shortened, a time necessary for starting operation of a disk can be shortened, resulting in the improved reliability of the disk system.

According to the present invention, preferably, when the first and second disk rollers are operated, the stocker moving means, the disk clamper portion, and the disk operating portion are interlocked with each other. With this configuration, it is possible to smoothly control a desired operation of a disk and hence to improve the reliability of the disk system.

Preferably, each of the stockers is provided with a locking means for locking the disk, and the locking means adjusts a magnitude of a force for locking the disk in accordance with a position of each of the stockers. With this configuration, when a stocker containing a disk is moved, the disk is prevented from being slipped off from the stocker because the disk is firmly locked by the locking means, so that it is possible to improve the reliability of the disk system.

BRIEF DESCRIPTION OF DRAWINGS

FIGS. 38a to 38g are exploded views each showing an essential portion of the disk containing mechanism shown in FIGS. 37a and 37b;

FIG. 40 is a table illustrating operational states of the essential portions of the disk containing mechanism shown in FIGS. 36 to 38g;

FIG. 41 is a table illustrating operational states of the essential portions of the disk containing mechanism shown in FIGS. 36 to 38g;

FIGS. 50a to 50e are views showing an operational state of the essential portions of the disk containing mechanism shown in FIGS. 36 to 38g;

FIGS. 51a to 51e are views showing an operational state of the essential portions of the disk containing mechanism shown in FIGS. 36 to 38g;

FIGS. 57a to 57e are views showing an operational state of the essential portions of the disk containing mechanism shown in FIGS. 36 to 38g;

FIGS. 59a to 59e are views showing an operational state of the essential portions of the disk containing mechanism shown in FIGS. 36 to 38g;

FIGS. 60a to 60e are views showing an operational state of the essential portions of the disk containing mechanism shown in FIGS. 36 to 38g;

FIGS. 61a to 61e are views showing an operational state of the essential portions of the disk containing mechanism shown in FIGS. 36 to 38g;

FIGS. 62a to 62e are views showing an operational state of the essential portions of the disk containing mechanism shown in FIGS. 36 to 38g;

FIGS. 63a to 63e are views showing an operational state of the essential portions of the disk containing mechanism shown in FIGS. 36 to 38g;

DETAILED DESCRIPTION OF PREFERRED EMBODIMENTS

The present invention will be described in detail with reference to the accompanying drawings.

Figure 1:
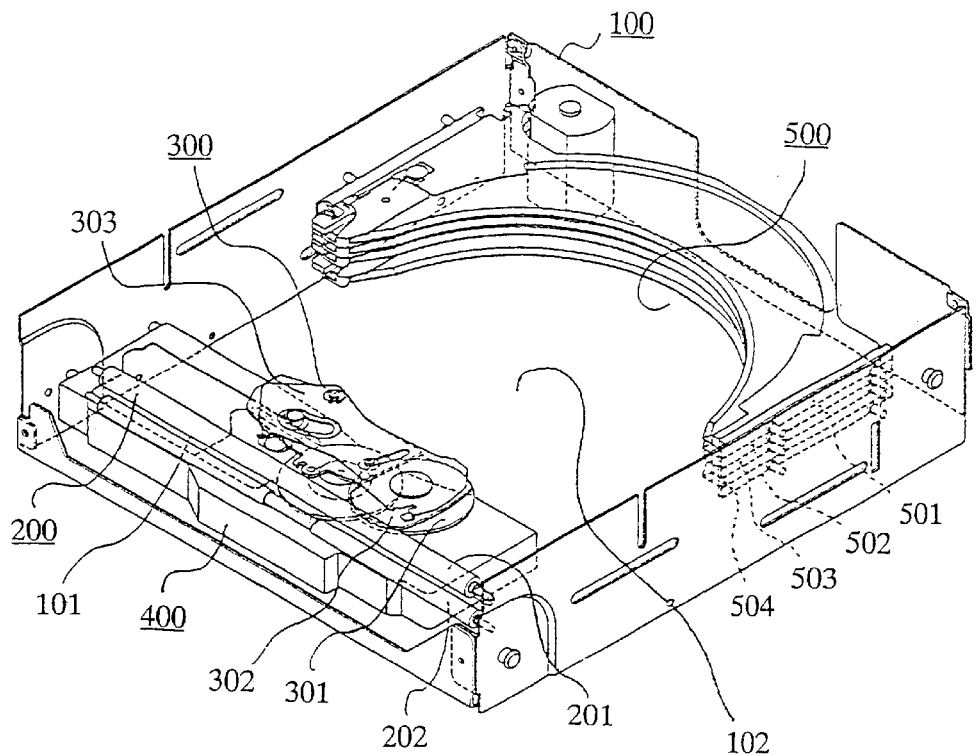
FIG. 1 is a perspective view showing a schematic configuration of a disk system according to Embodiment 1.

FIG. 1 is a perspective view showing a schematic configuration of an interior of a disk system according to Embodiment 1

The disk system is basically divided into the following three mechanism:

The first mechanism is a disk carrying-in/carrying-out mechanism for carrying a disk inserted in the disk system to and from a specific position; a second mechanism is a disk containing mechanism including a plurality of containing portions for containing disks, wherein upon reproducing of a disk or the like, the containing portions are disposed at specific positions with specific gaps put therebetween; and the third mechanism is a disk holding/reproducing mechanism for holding and reproducing a disk at a specific position.

Here, a basic operation of the disk system will be described below.

First, when the disk carrying-in/carrying-out mechanism carries a disk in the system, the disk containing mechanism is operated, automatically or on the basis of a command, to move a disk containing portion to a position adjacent to the disk carrying-in/carrying-out mechanism and disposed it at the position and to contain the disk in the disk containing portion. At this time, since the disk containing portion is adjacent to the disk carrying-in/carrying-out mechanism, the disk is contained in the disk containing portion only by the operational force of the disk carrying-in/carrying-out mechanism.

Next, after the disk is contained in the disk containing mechanism, the disk containing portion is moved to the original position and it waits for supply of an operational command such as a reproducing command or it is automatically shifted to the next operation.

When an operational command such as a reproducing command is supplied to the disk system, the disk holding mechanism and the disk containing mechanism are operated each other, so that the disk containing portion of the disk containing mechanism is moved, while holding the disk, up to a specific operational position, that is, a disk operational position, such as a disk reproducing position, to start the operation of the disk.

Next, when operation of the disk is completed during operation of the disk, the disk holding/reproducing mechanism and the disk containing mechanism move the disk from the disk operational position into the disk containing mechanism while holding the disk, and it waits for supply of an operational command such as a reproducing command or it is automatically shifted to the next operation.

Further, when a disk ejection command is supplied to the disk system, the disk containing mechanism moves an automatically selected or designated disk containing portion up to a position adjacent to the disk carrying-in/carrying-out mechanism, and the disk carrying-in/carrying-out mechanism ejects the disk received from the disk containing portion out of the disk system.

Hereinafter, a general configuration of the disk system carrying out the above-described basic operation will be first described and then the above-described three mechanisms will be described in detail.

[1. General Configuration of Disk system]

In FIG. 1, reference numeral 100 indicates a housing of a disk system; 101 is a disk insertion port through which a disk is inserted in or ejected from the disk system, that is, the housing 100; and 102 is a disk carrying path along which a disk is carried between the disk insertion port 101 and stockers 501 to 504 (which will be described later).

Reference numeral 200 indicates a disk loading portion for inserting or ejecting a disk in or from the housing 100. The disk loading portion 200 includes an upper disk roller 201 provided at a position facing to a label face of a disk; and a lower disk roller 202 provided at a position opposite to the upper disk roller 201 with the disk put therebetween.

Reference numeral 300 indicates a disk clamper portion which functions as follows. A disk R, which is pulled in the disk system by the disk loading portion 200 and is once contained in a disk containing mechanism (which will be described later), is placed at a reproducing position on the basis of a command allowing reproducing supplied from an operating portion (not shown). At this time, the disk clamper portion 300 holds the disk R placed at the reproducing position while pressing the disk R from the upper side to a disk reproducing portion 400 (which will be described later).

The disk clamper portion 300 includes a clamper 301 for press-holding a disk; a clamper arm 302 turnable in the direction C or D to be moved to a disk reproducing position for bringing the clamper 301 in contact with a disk; and a lift arm 303 for holding a knob portion 3012 of the clamper 301 and lifting the clamper 301 upward.

Reference numeral 400 indicates a disk reproducing portion for rotating a disk and reading-out information stored in the disk. The disk reproducing portion 400 includes a disk turn table 401 provided with a portion on which a disk is mounted; a disk driving motor 402 for rotating a disk mounted on the disk turn table 401; and a pick-up portion 403 for reading-out information stored in the disk.

Reference numeral 500 indicates a disk containing mechanism for containing a disk inserted by the disk roller portion 200. The disk containing mechanism 500 is composed of four stockers 501 to 504 (hereinafter, referred to as "first stocker 501, second stocker 502, third stocker 503, and fourth stocker 504) for containing a plurality (four pieces in Embodiment 1) of disks. The stockers 501 to 504 are disposed substantially in parallel to a plane of a disk inserted from the insertion port 101.

Each of the first stocker 501 to fourth stocker 504 is allowed to contain one disk. The stockers also contains disks in a state in which rotational axial lines of the disks are substantially aligned to each other.

Hereinafter, each mechanism of the general configuration of the disk system having been schematically described above will be described in detail.

[2. Disk Carrying-in/Carrying-out Mechanism]

Figure 2:
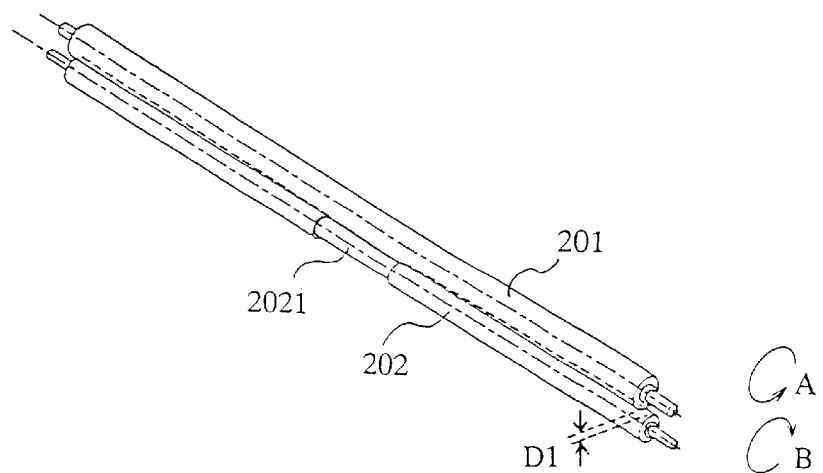
FIG. 2 is a perspective view showing an essential portion of a disk loading mechanism of the disk system shown in FIG. 1.

Referring to FIGS. 1 and 2, the disk carrying-in/carrying-out mechanism including the disk loading portion 200 functions such that when a disk R is inserted from the insertion port 101, the upper disk roller 201 is rotated in the direction A, that is, counterclockwise and the lower disk roller 202 is rotated in the direction B, that is, clockwise, to contain the disk R in a specific stocker adjacent to the disk roller portion 200, for example, in the first stocker 501.

Although in the above description, the upper disk roller 201 and the lower disk roller 202 are both rotated as shown in FIGS. 1 and 2, they may be of course operated such that only one roller is rotated and the other roller is slid in contact with a plane of the disk R, that is, not rotated.

Figure 3:
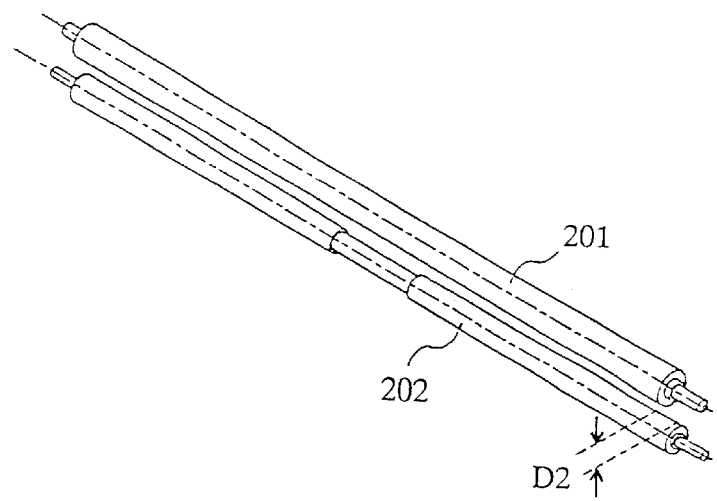
FIG. 3 is a perspective view showing the essential portion of the disk loading mechanism of the disk system shown in FIG. 1.

FIG. 2 is a view illustrating a state in which the upper disk roller 201 and the lower disk roller 202 of the disk system shown in FIG. 1 hold a disk therebetween; and FIG. 3 is a view illustrating a state in which the upper disk roller 201 and the lower disk roller 202 of the disk system shown in FIG. 1 release the holding of a disk.

The disk carrying-in/carrying-out mechanism will be described with reference to FIGS. 2 and 3.

FIG. 2 shows a positional relationship between the upper disk roller 201 and the lower disk roller 202 upon carrying a disk. Here, letting D1 be a gap between both the rollers, the value D1 upon holding of a disk R corresponds to a thickness (1.2 mm) of the disk.

Figure 4:
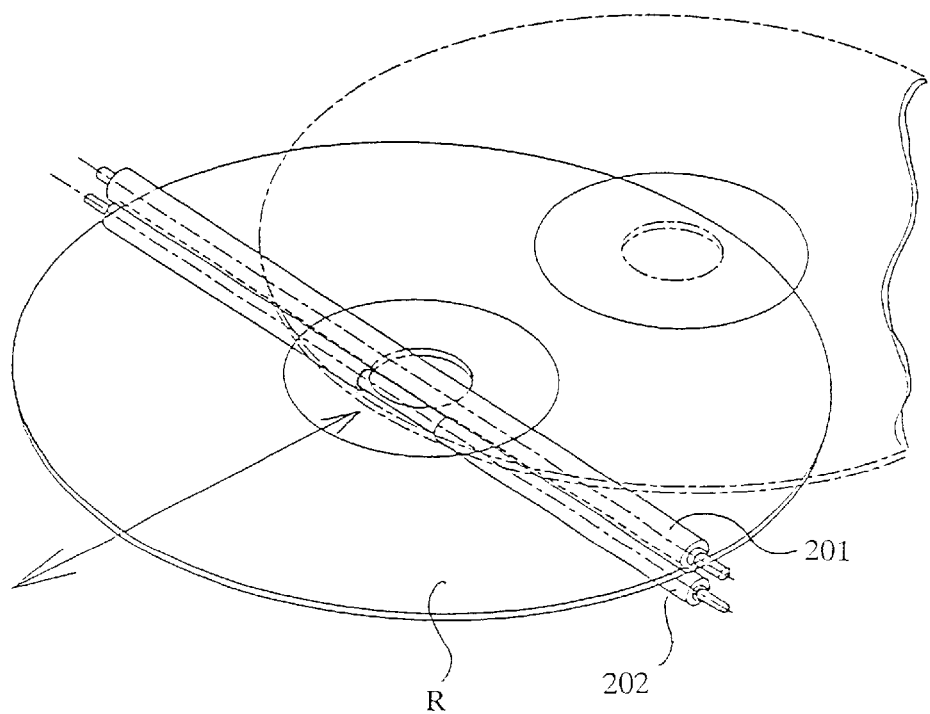
FIG. 4 is a view illustrating a relationship between the disk loading mechanism of the disk system shown in FIG. 1 and a disk inserted using the mechanism.
Figure 5:
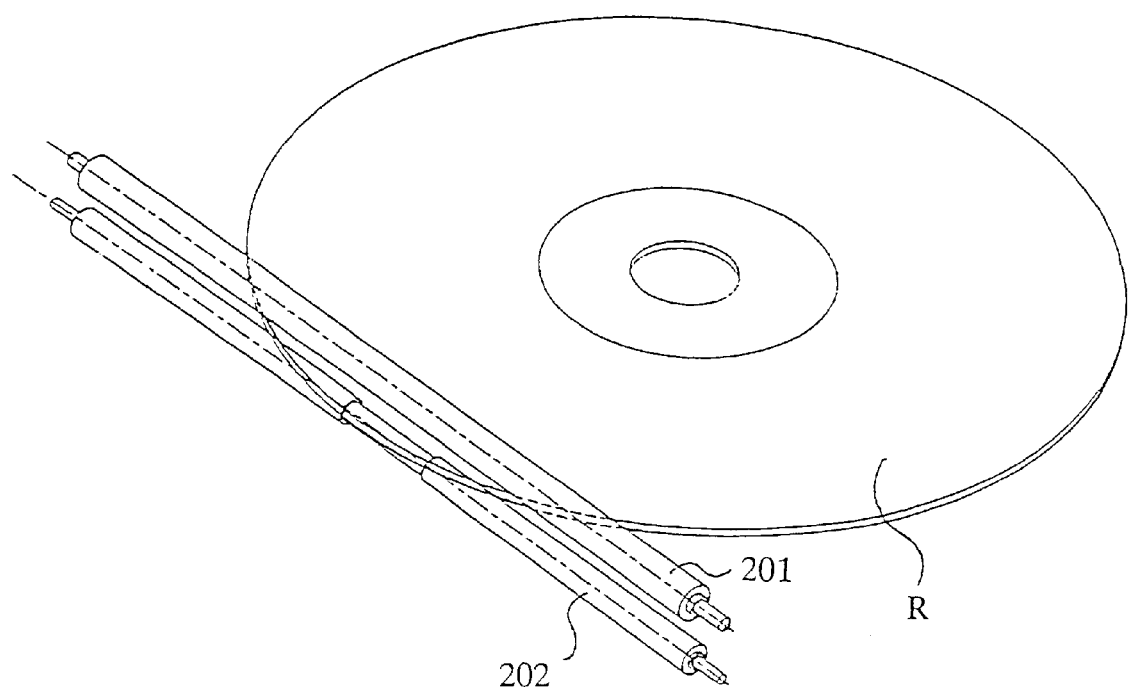
FIG. 5 is a view illustrating a relationship between the disk loading mechanism of the disk system shown in FIG. 1 and a disk inserted using the mechanism.

With respect to the actual positional relationship with the disk R, the state upon holding of the disk R is shown in FIG. 4, and the state upon release of the disk R is shown in FIG. 5.

Next, a configuration of a mechanism of operating the disk roller portion 200, and operation of the upper disk roller 201 and the lower disk roller 202 will be described in detail with reference to FIG. 6a to FIG. 9d.

FIGS. 6a to 6d are front views of essential portions, each showing a configuration and an operational state of a front surface portion of the disk roller portion 200; FIGS. 7a to 7d are top views of essential portions, showing a configuration and an operational state of an upper surface of the disk roller portion 200; FIGS. 8a to 8d are side views of the upper disk roller 201 showing a configuration and an operational state of a side surface of the upper disk roller 201; and FIGS. 9a to 9d are side views of the lower disk roller 202 showing a configuration and an operational state of a side surface of the lower disk roller 202. In addition, FIGS. 8a and 8d and FIGS. 9a to 9d show left side surfaces of the upper and lower disk rollers 201 and 202 in Embodiment 1, respectively.

Each of FIGS. 6a, 7a, 8a and 9a shows a state in which the disk R is not inserted; each of FIGS. 6b, 7b, 8b and 9b shows a state in which the disk R is moved to be inserted and carried, that is, the disk R is held; each of FIGS. 6c, 7c, 8c, and 9c shows a state being in the course of extending a gap between the upper disk roller 201 and the lower disk roller portion 202 at maximum, in which the gap is extended for placing the disk R in the gap so as to move the disk R to a reproducing position; and each of 6d, 7d, 8d and 9d shows a state in which the disk R is placed in the gap extended at maximum and is reproduced. That is, these figures show the process from the state in which the gap between both the rollers is minimized to the state in which the gap is maximized and the process from insertion of the disk R to reproducing of the disk R in the order of the states shown in FIGS. 6a, 7a, 8a and 9a→FIGS. 6b, 7b, 8b and 9b→FIGS. 6c, 7c, 8c and 9c→FIGS. 6d, 7d, 8d and 9d.

Reference numeral 203 indicates a roller open cam plate for adjusting a magnitude of a gap between the upper disk roller 201 and the lower disk roller 202. The roller open cam plate 203 is composed of a main body 2031 and a cam portion 2032.

Here, the main body 2031 of the roller open cam plate 203 has a sliding hole 20311 at one end on the upper disk roller 201 side or the lower disk roller 202 side, and a sliding hole 20312 at the other end. The sliding hole 20311 allows a sliding shaft composed of a base pin (not shown) provided in the housing 100 to slid therein in the direction A or B. The sliding hole 20312 allows a pin 2092 of a link portion 209 (both will be described later) to be slid therein in the direction C or D.

The cam portion 2032 of the roller open cam plate 203 has a tilting sliding hole 20321 and a tilting portion 20322. The sliding hole 20321 allows a pin 2041 provided on part of an upper roller arm 204 (both will be described later) to be slid therein. The tilting portion 20322 allows a pin 2022 formed at a leading end of the lower disk roller 202 to be brought in contact with part of a peripheral edge portion of the cam portion 2032.

Reference numeral 204 is the upper roller arm for holding one end 2011 of the upper disk roller 201. The upper roller arm 204 has the pin 2041 slid in the sliding hole 20321 of the cam portion 2032 of the roller open cam plate 203, and also has a shaft holding hole 2042 in which the base pin (not shown) provided in the housing 100 is fitted.

In this case, the one end 2011 of the upper disk roller 201 is formed separately from the pin 2041; however, the pin 2041 may be substituted for the one end 2011.

Reference numeral 205 indicates a lower roller arm having at its one end a lower roller holding portion 2051 and at the other end a shaft holding hole 2052. The lower roller holding portion 2051 holds part of an extension portion 2022 having a shaft portion formed at a leading end of the lower disk roller 202. In the shaft holding hole 2052 is fitted the base pin (not shown) provided in the housing 100.

Reference numeral 206 indicates an open link having at one end a pin 2061 fitted in the sliding hole 20312, a shaft holding hole 2062 in which the base pin (not shown) provided in the housing 100 is fitted, and at a peripheral edge of part of the other end a sliding contact portion 2063 with which a slider 304 (which will be described later) is brought in contact.

Next, operation of the above-described disk carrying-in/carrying-out mechanism will be described.

First, as shown in FIGS. 6a, 7a, 8a and 9a, when the disk R is not inserted, the slider 304 is positioned on the insertion port 101 side, that is, on the B side, and the pin 2061 of the open link 206 is positioned on the D side.

Figure 8A:
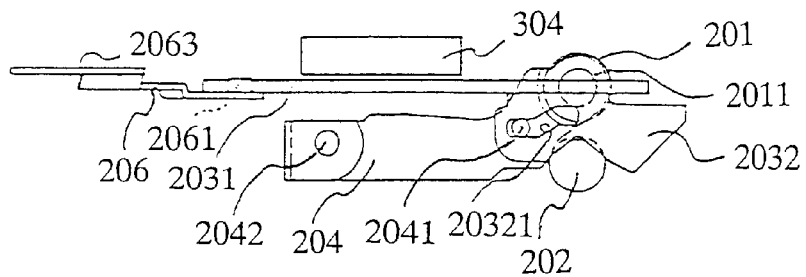
FIGS. 8a to 8d are upper side views of the essential portion of the disk loading mechanism of the disk system shown in FIG. 1, each showing the operational state of the mechanism.
Figure 8B:
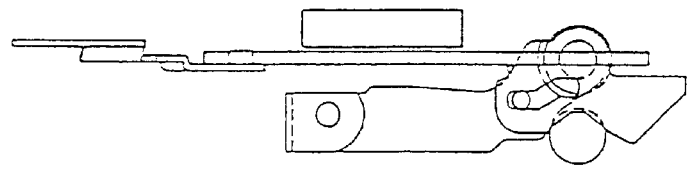

At this time, since the pin 2041 of the upper roller arm 204 is positioned at the left end in the sliding hole 20321 as shown in FIG. 8a, the position of the upper disk roller 201 is not changed and the position of the upper roller arm 204 is not changed.

The extension portion 2022 of the lower disk roller 202 held by the lower roller holding portion 2051 is usually biased on the upper disk roller 201 side by an elastic member (not shown) because the position of the roller open cam plate 203 is not changed. As a result, the extension portion 2022 is brought in contact with the tilting portion 20322 at a position closest to the upper disk roller. That is, the lower disk roller 202 is located at such a position.

In this case, the closest gap between the upper disk roller 201 and the lower disk arm 202 is set to be slightly thinner (for example, 0.5 mm) than a general thickness (for example, 1.2 mm) of the disk R in order to absorb a variation in thickness of disks and to ensure a sufficient disk holding pressure for preventing a disk from being slipped off from the gap between the rollers.

Next, in the case where the disk R is inserted from the insertion port 101 in the above-described operational state, as shown by the operational states in FIGS. 6b, 7b, 8b and 9b, since the closest gap between the upper disk roller 201 and the lower disk roller 202 is set to be thinner than the thickness of the disk as described above, the gap is opened to a value corresponding to the thickness of the disk as the disk is pulled in by rotation of the rollers or the like.

Other operations are similar to those described with reference to FIGS. 6a, 7a, 8a and 9a, and therefore, the explanation thereof is omitted.

The disk R, which is inserted by the operations shown in FIGS. 6b, 7b, 8b and 9b and is contained in a stocker once, is operated as shown by the operating states in FIGS. 6c, 7c, 8c and 9c when a command allowing reproducing of the disk R is supplied by the operating portion (not shown).

FIGS. 6b, 7b, 8b and 9b each show the state being in the course of opening the rollers when the disk producing portion 400 is moved up to the disk reproducing position, particularly, a state being in the course of moving in the direction A the slider 304 connected to move the disk reproducing portion 400.

Figure 7A:
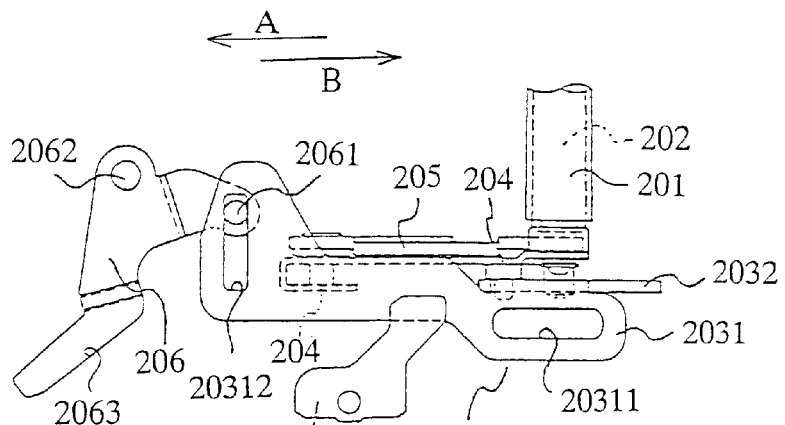
FIGS. 7a to 7d are top views of the essential portion of the disk loading mechanism of the disk system shown in FIG. 1, each showing the operational state of the mechanism.
Figure 7B:
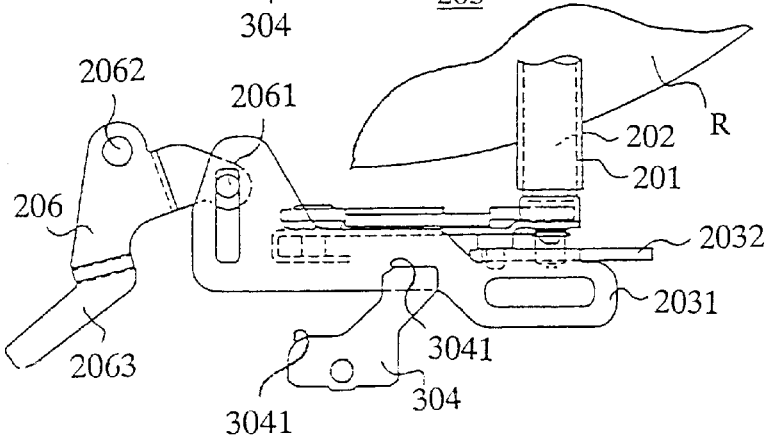
Figure 7C:
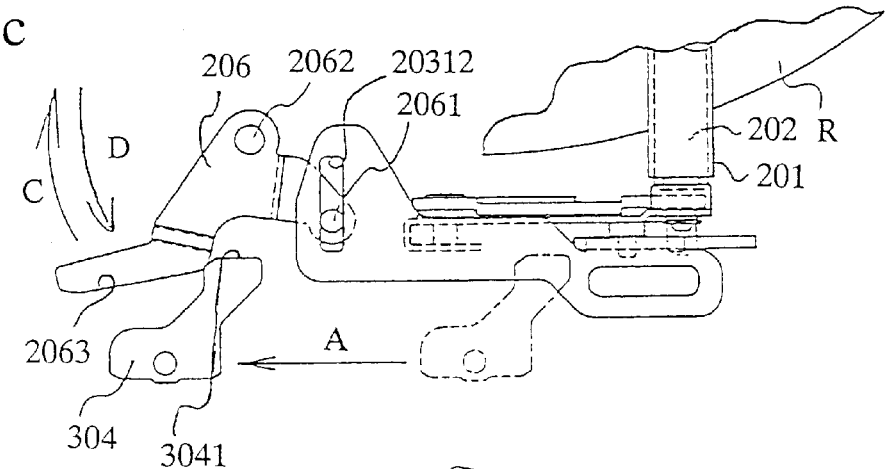

The slider 304 has contact portions 3041 and 3042 to be brought in contact with the contact portion 2063 provided on the open link 206. As shown in FIG. 7c, since the link portion 206 is rotated in the direction C around the shaft (not shown) fitted in the shaft holding hole 2062 along with movement of the slider 304 in the direction A, the pin 2061 of the link portion 206 is slid in the sliding hole 20312 of the roller open cam plate 203 in such a manner as to be rotated in the direction C.

In addition, since the roller open cam plate 203 is moved only in the direction A or B, of the rotating force of the open link 206 in the direction C, only a movement component in the direction A is transmitted to the roller open cam plate 203 to move the roller cam plate 203.

Figure 8C:
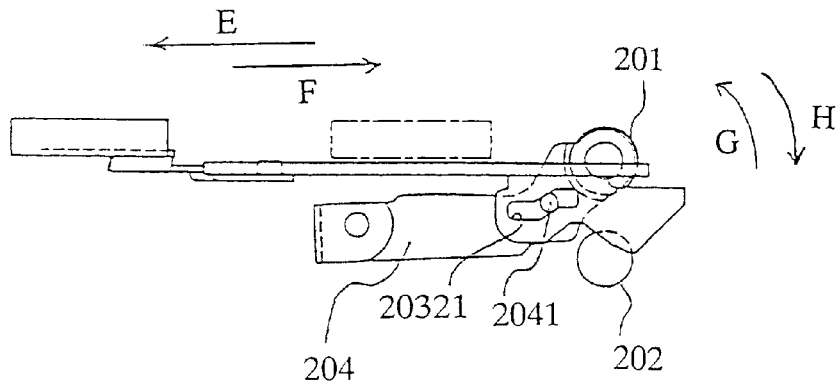

Further, as described above, since the roller open cam plate 203 is moved in the direction A, that is, moved in the direction E as shown in FIG. 8c, the upper roller arm 204, that is, the upper disk roller 201 held by the upper roller arm 204 is moved in the direction G because the pin 2041 is slid in the sliding hole 20321 of the roller open cam plate 203 in the direction F and the sliding hole 20321 moving in the direction F moves the upper roller arm 204 in the direction G.

Figure 9A:
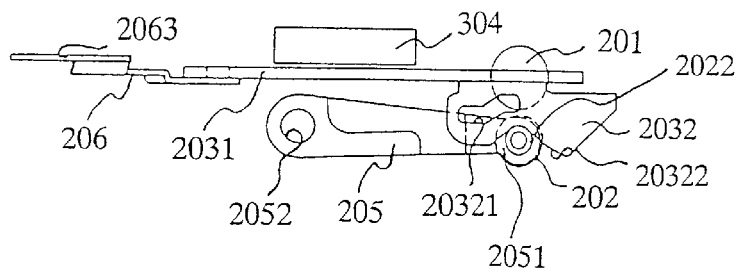
FIGS. 9a to 9d are lower side views of the essential portion of the disk loading mechanism of the disk system shown in FIG. 1, each showing the operational state of the mechanism.
Figure 9B:
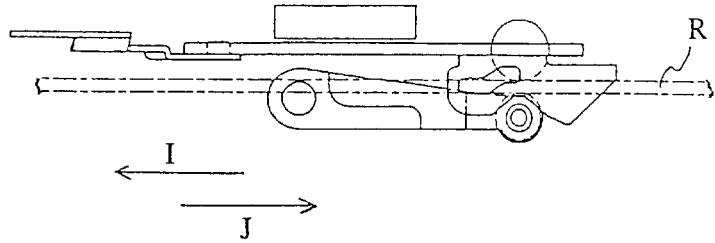
Figure 9C:
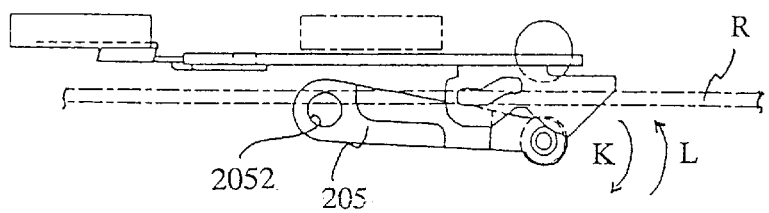

Further, as described above, since the roller open cam plate 203 is moved in the direction A, that is, moved in the direction I as shown in FIG. 9c, the lower roller arm 205 is pressed to the peripheral portion of the extension portion 2022 of the lower disk roller 202 in the direction K, that is, rotated in the direction K around the shaft (not shown) fitted in the shaft holding hole 2052, and accordingly, the lower roller arm 205 is rotated in the direction K along the tilting portion 20322 of the roller open cam plate 203 and thereby the lower disk roller 202 held by the lower roller arm 205 is moved in the direction K.

Figure 6A:
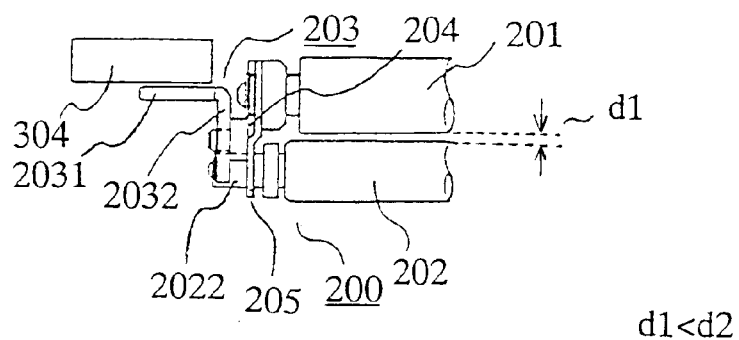
FIGS. 6a to 6d are front views of an essential portion of the disk loading mechanism of the disk system shown in FIG. 1, each showing an operational state of the mechanism.
Figure 6B:
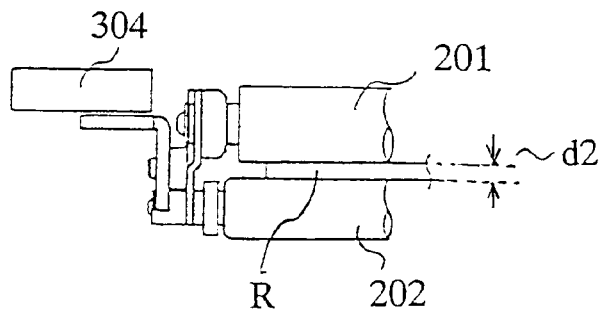
Figure 6C:
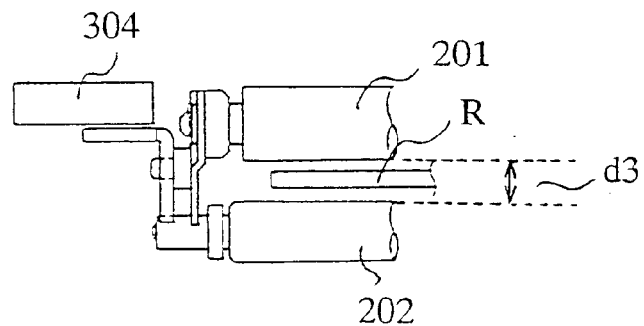

Accordingly, as shown in FIG. 6c, the gap can be set at a value d3 in accordance with operation of the slider 304.

Figure 6D:
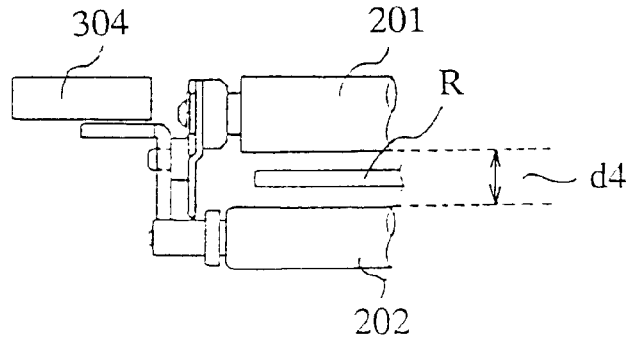
Figure 7D:
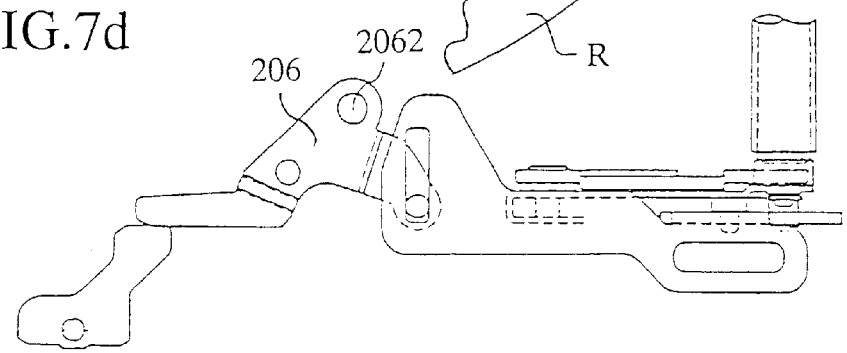

Finally, when the slider 304 is moved, from the operational states shown in FIGS. 6c, 7c, 8c and 9c, in the direction A shown in FIG. 7c, the operational states of the disk R upon reproducing of the disk R become those shown in FIGS. 6d, 7d, 8d and 9d. Since the slider 304 is further moved in the direction A as shown in FIG. 7d, the open link 206 is further rotated in the direction C from the state shown in FIG. 7c to thereby further move the roller open cam plate 203 in the direction A.

Further, during movement of only the slider 304 in the direction A in a state in which the slider contact portion 2063 of the open link 206 is positioned in parallel to the contact portion of the slider 304 as shown in the figures, the open link 206 is no longer moved in the direction C, and even if the open link 206 is applied with a force for returning the opening link 206 in the direction d, the slider 304 is not applied with a force for returning the slider 304 in the direction B.

Accordingly, the roller open cam plate 203 is held at a final position in the direction A.

Figure 8D:
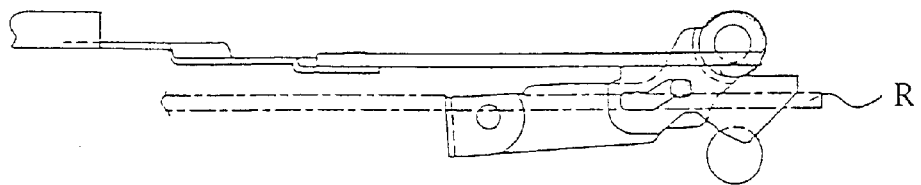

At this time, as shown in FIG. 8d, the pin 2041 of the upper roller arm 204 is slid in the sliding hole 20321 of the roller open cam plate 203 up to a position near the terminal on the F side, and the upper disk roller 201 is further moved in the direction G and is held at such a position.

Figure 9D:
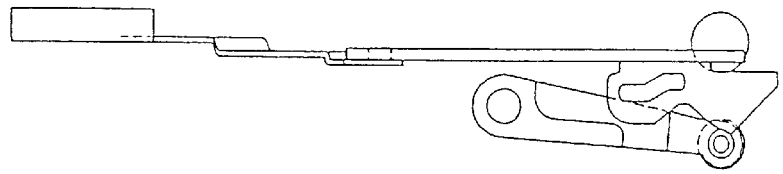

Further, since the slider 304 is further moved in the direction A as shown in FIG. 7d, the tilting portion 20322 of the roller open cam plate 203 presses and moves the extension portion 2022 of the lower disk roller 202 in the direction K up to the terminal portion in the direction J as shown in FIG. 9d, so that the lower disk roller 202 is further moved in the direction K and is held at such a position.

The disk carrying-in/carrying-out mechanism having the above configuration can perform a series of operations shown in FIGS. 6a to 6d.

It is assumed that a gap between the upper disk roller 201 and the lower disk roller 202 upon non-insertion of a disk as shown in FIG. 6a is taken as d1. In this case, when a disk having a thickness d2 is inserted as shown in FIG. 6b, the thickness d2 of the disk becomes the gap. Next, since the roller open cam plate 203 is moved in the direction of carrying the disk R for making preparation of reproducing the disk as shown in FIG. 6c, the upper disk roller 201 is started to be moved upward and the lower disk roller 202 is started to be moved downward for enlarging the gap. The gap in such a state is taken as d3. When the disk is started to be reproduced from the state of making preparation of reproducing of the disk shown in FIG. 6c, the gap is further extended as shown in FIG. 6d. The gap in such a state is taken as d4.

In summary, the change in gap from the state shown in FIG. 6a to the state shown in FIG. 6d is expressed by a relationship of d1<d2<d3 <d4.

In the case of stopping reproducing of the disk R and ejecting the disk R, that is, in the case of performing operations reversed to those described above, the disk carrying-in/carrying-out mechanism is operated in the order of the states shown in FIGS. 6d, 7d, 8d and 9d→FIGS. 6c, 7c, 8c and 9c→FIGS. 6b, 7b, 8b and 9b→FIGS. 6a, 7a, 8a and 9a.

[3. Disk Holding/Reproducing Mechanism]

A disk holding/reproducing mechanism basically includes a disk clamper portion 300 for holding a disk by pressing down the disk; a disk reproducing portion 400 for mounting, rotating and reproducing a disk; and a moving mechanism portion for moving both the disk clamper portion 300 and the disk reproducing portion 400. A disk driving means is mainly constituted of the disk reproducing portion 400.

Hereinafter, the disk clamper portion 300 will be first described in detail, and then the disk reproducing portion 400 will be described in detail.

[3-1. Disk Clamper Portion]

A configuration of the disk clamper portion 300 will be described with reference to FIGS. 10a and 10b, and FIGS. 11a and 11b.

Figure 10A:
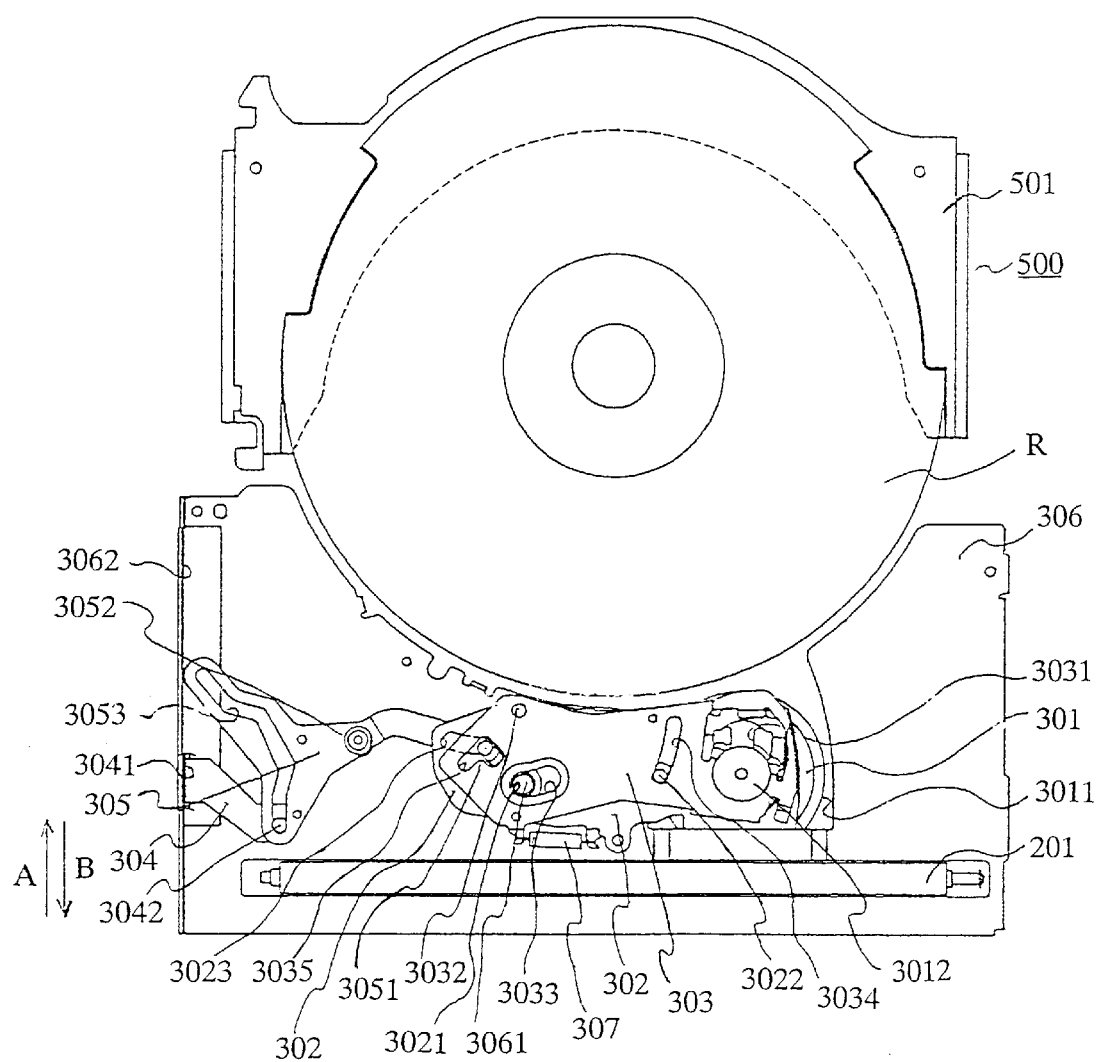
FIGS. 10a and 10b are a top view and a sectional front view respectively, showing a configuration of a disk clamper portion of the disk system shown in FIG. 1.
Figure 10B:
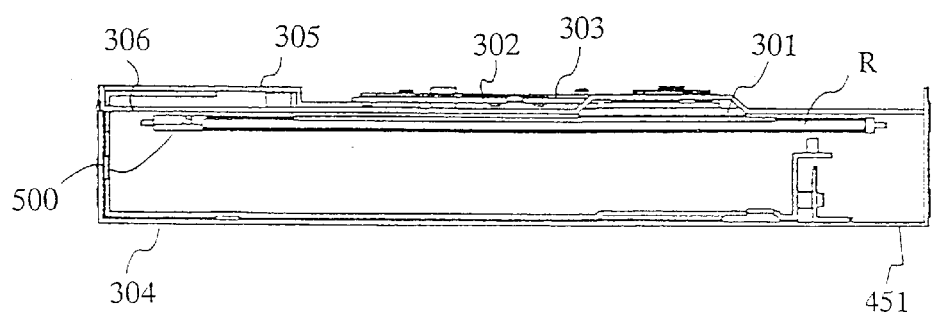

FIGS. 10a and 10b are views showing a configuration of the disk clamper portion 300 and its peripheral members, wherein FIG. 10a is a top view, and FIG. 10b is a sectional front view of FIG. 10a.

Figure 11A:
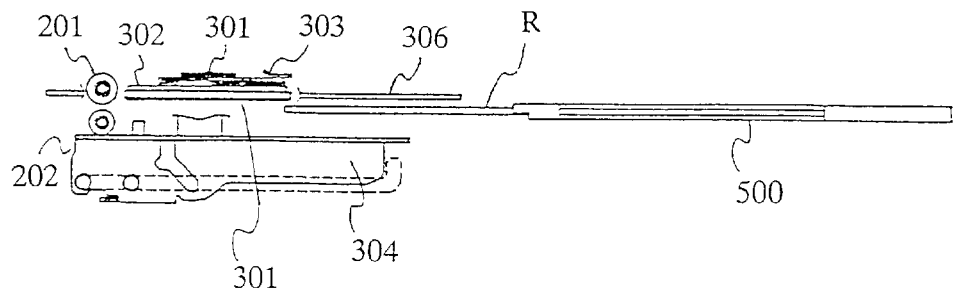
FIGS. 11a and 11b are views showing an operational state of a side surface of an essential portion of the disk clamper portion of the disk system shown in FIGS. 10a and 10b.
Figure 11B:
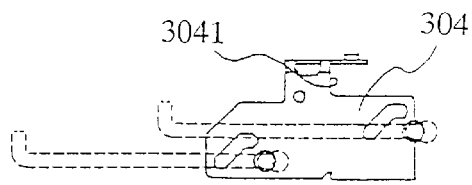

FIGS. 11a and 11b are views showing an essential portion shown in FIGS. 10a and 10b, wherein FIG. 11a is a sectional right side view, and FIG. 11b is a view illustrating a shape of a slider seen from the left side of the slider.

In FIGS. 10a and 10b, and FIGS. 11a and 11b, reference numeral 301 indicates a clamper. The clamper 301 includes at a portion opposite to a disk plane a contact portion 3011 to be brought in contact with a disk; and a knob portion 3012 to be hooked up by a hook portion 3031 (which will be described later) of the lift arm 303.

Reference numeral 302 indicates a clamper arm for supporting the clamper 301. The clamper arm 302 includes a shaft holding hole 3021 in which a shaft portion 3061 (which will be described later) provided on a base portion 306 is rotatably inserted; a pin 3022 slidably inserted in a sliding hole 3034 (which will be described later) formed in the lift arm 303; and a sliding hole 3023 in which a pin 3051 (which will be described later) formed in the link portion 305 is slidably inserted.

Reference numeral 303 indicates the lift arm for supporting the clamper portion 301. The lift arm 303 is usually biased upward by a spring 307 (which will be described later). The lift arm 303 includes the hook portion 3031 for hooking up the knob portion 3012 provided on the clamper 301; a shaft holding portion 3032 for allowing the lift arm 303 to be turned therearound with respect to the clamper arm 302; a sliding hole 3033 in which the shaft portion 3061 (which will be described later) provided on the base portion 306 is turnably inserted; the sliding hole 3034 in which the pin 3022 provided on the clamper arm 302 is slid; and a sliding hole 3035 in which the pin 3051 (which will be described later) formed on the link portion 305 is slidably inserted.

Reference numeral 304 indicates the slider. One end 3041 of the slider 304 is connected to the base portion 306 (which will be described later) so that the slider 304 is moved in the direction A or B. A pin 3042 is provided at the other end of the slider 304, and is slidably inserted in a sliding hole 3053 (which will be described in later) of the link portion 305.

Reference numeral 305 indicates the link portion which includes the pin 3051 slidably inserted in the sliding hole 3023 of the clamper arm 302 and in the sliding hole 3035 of the lift arm 303; a shaft holding hole 3052 for allowing the link portion 305 to be turned therearound with respect to the base portion 306 (which will be described later); and the sliding hole 3053 in which the pin 3042 provided on the slider 304 is slidably inserted.

Reference numeral 306 indicates the base portion provided in the vicinity of the disk roller portion 200 in such a manner as to be approximately parallel to the stoker 501 in a state containing no disk. The base portion 306 includes the shaft 3061 inserted in the shaft holding hole 3021 of the clamper 302 and the sliding hole 3035 of the lift arm 303; and a contact portion 3062 which is brought in contact with the one end 3041 of the slider 304 to move the slider 304.

Reference numeral 307 indicates the biasing portion formed of a spring. One end of the biasing portion 307 is connected to the clamper arm 302, and the other end of the biasing portion 307 is connected to the lift arm 303.

Next, operation of the disk clamper portion 300 will be described with reference to FIGS. 10a to 16c.

Figure 12A:
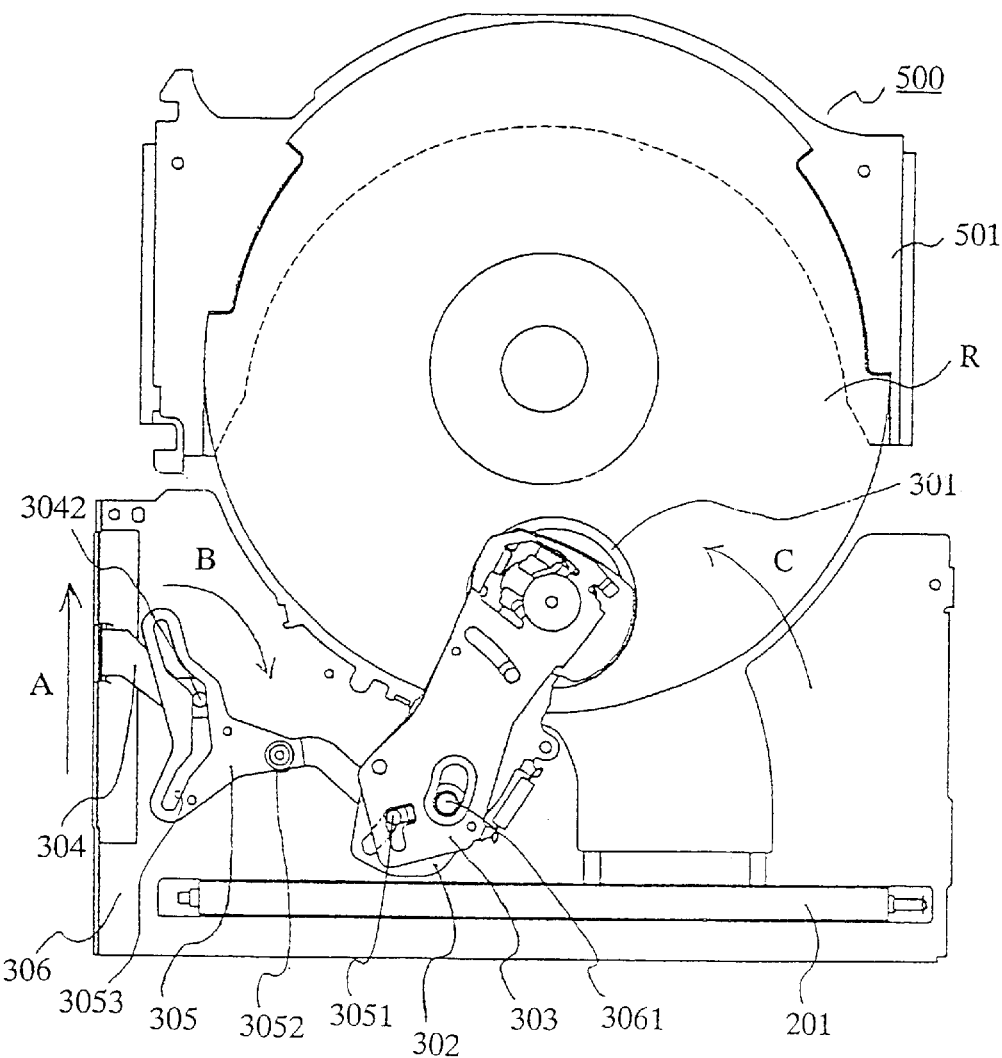
FIGS. 12a and 12b are a view showing an operating state of the disk clamper portion of the disk system shown in FIGS. 10a and 10b, and a view showing an operating state of the side surface of the essential portion of the disk clamper portion, respectively.
Figure 12B:
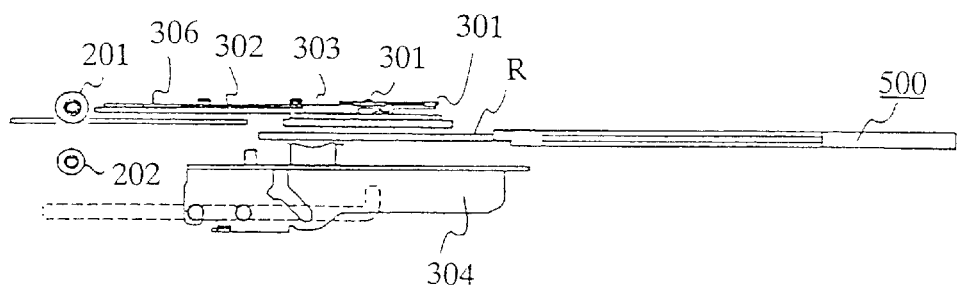
Figure 13A:
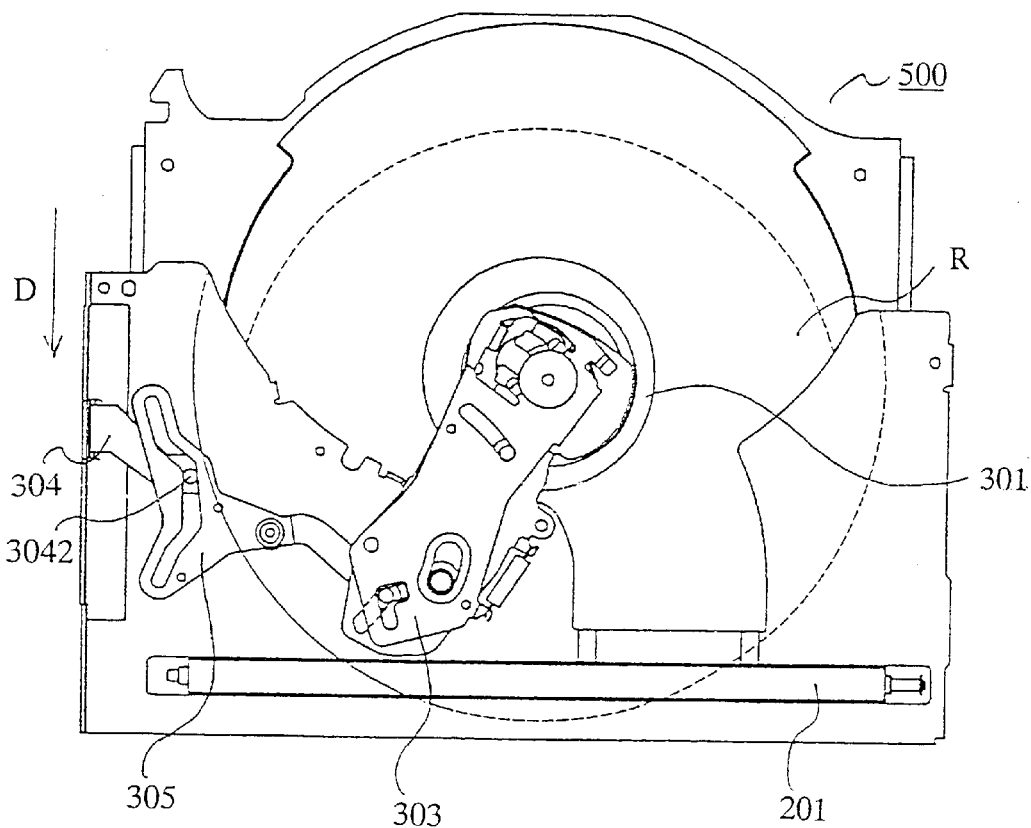
FIGS. 13a and 13b are a view showing an operating state of the disk clamper portion of the disk system shown in FIGS. 10a and 10b, and a view showing an operating state of the side surface of the essential portion of the disk clamper portion, respectively.
Figure 13B:
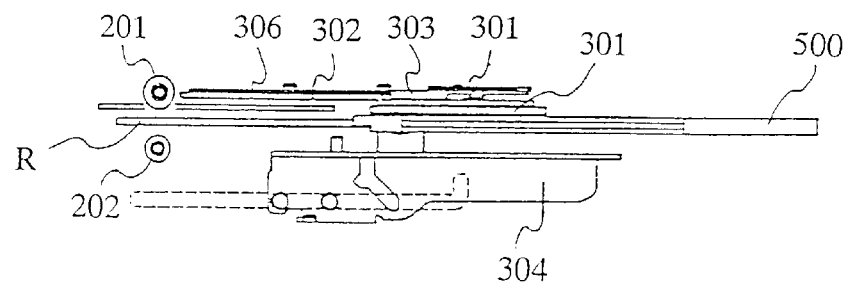
Figure 14A:
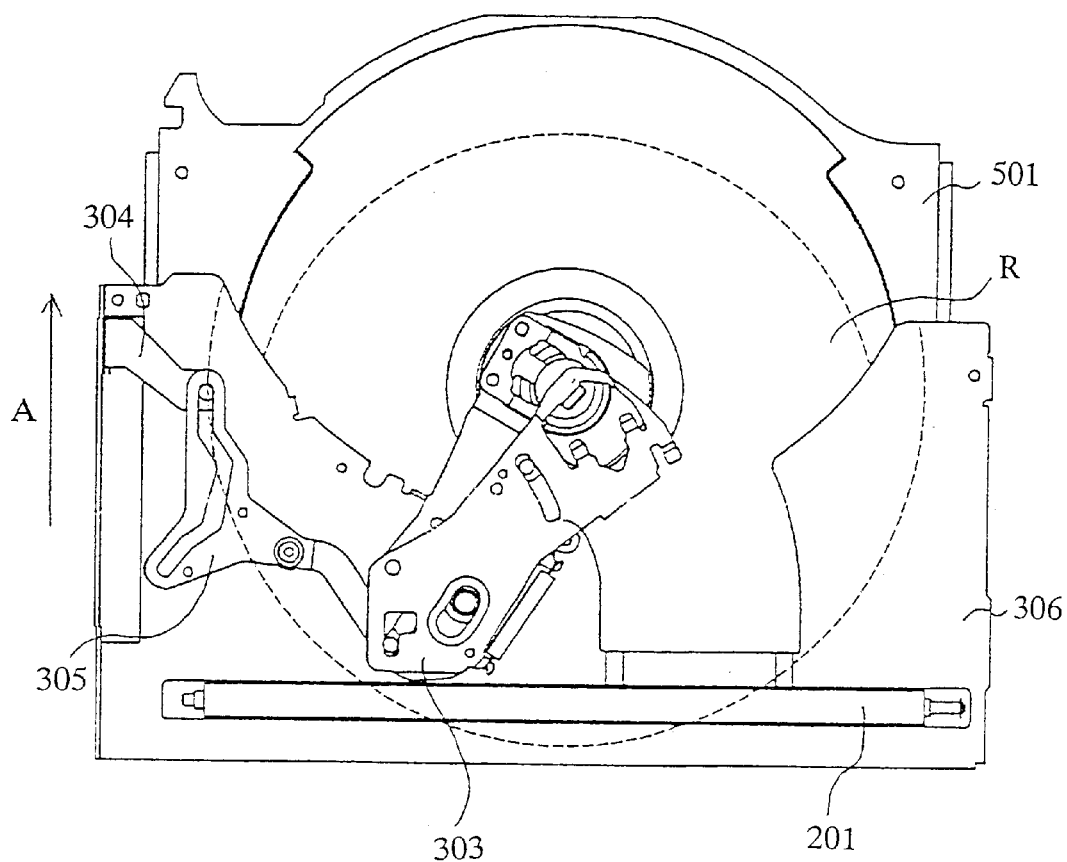
FIGS. 14a and 14b are a view showing an operating state of the disk clamper portion of the disk system shown in FIGS. 10a and 10b, and a view showing an operating state of the side surface of the essential portion of the disk clamper portion, respectively.
Figure 14B:
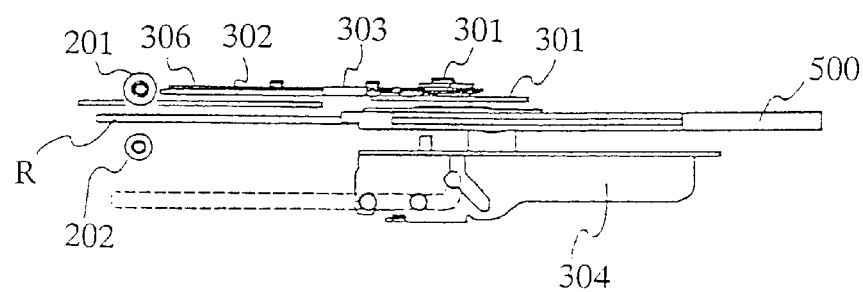
Figure 15A:
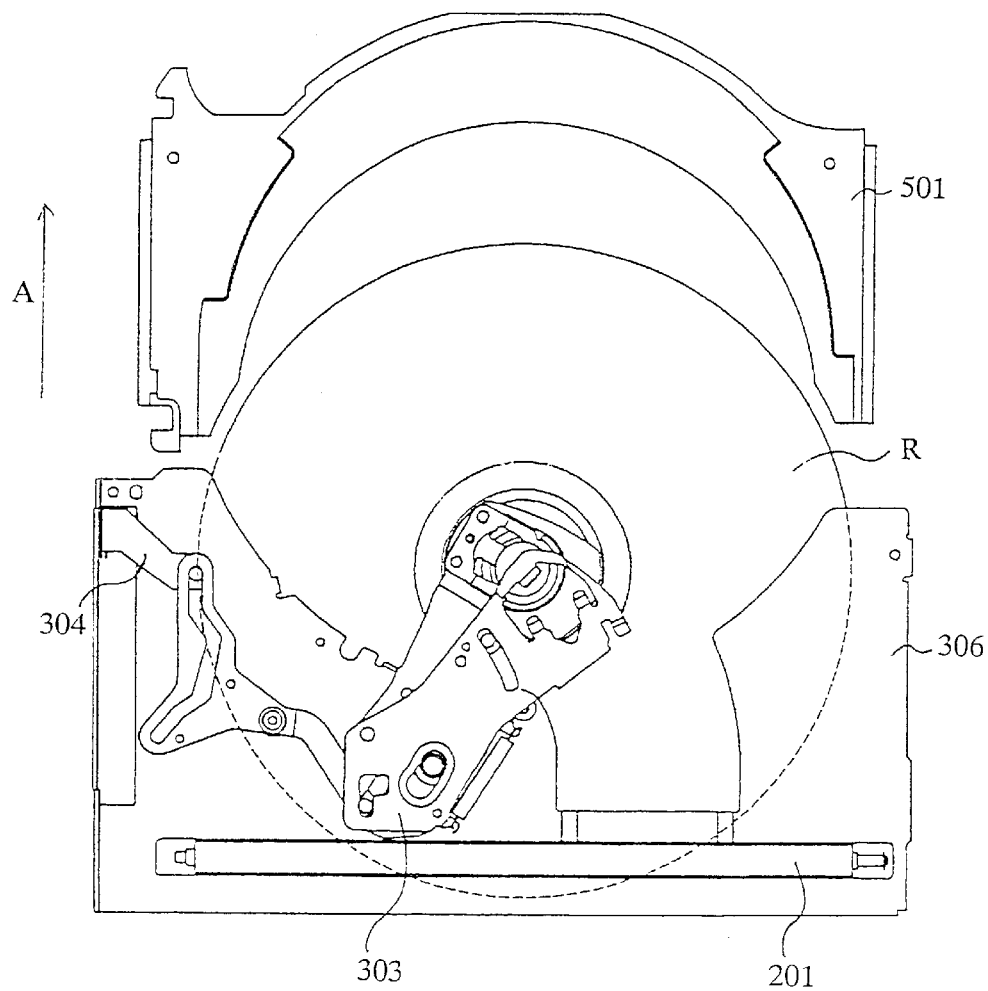
FIGS. 15a and 15b are a view showing an operating state of the disk clamper portion of the disk system shown in FIGS. 10a and 10b, and a view showing an operating state of the side surface of the essential portion of the disk clamper portion, respectively.
Figure 15B:
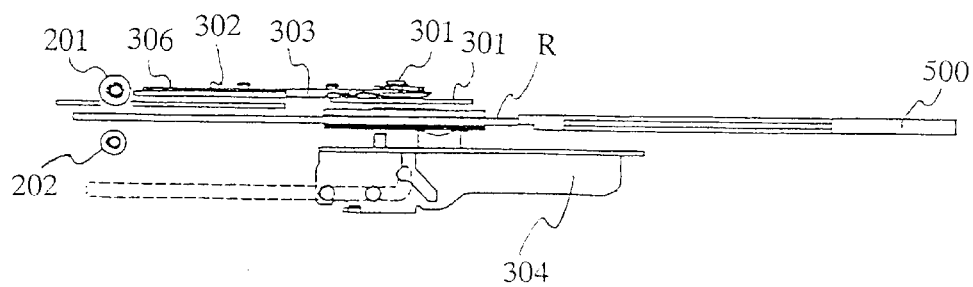

FIGS. 10a and 10b and FIGS. 11a and 11b are views showing a state in which a command allowing reproducing is not supplied from the operating portion; FIGS. 12a and 12b are views showing a state in which a command allowing reproducing is supplied from the operating portion so that the disk mounting portion 400 is started to be moved in the direction A and the disk clamper portion 300 is started to be moved in the direction A along with the movement of the disk mounting portion 400; FIGS. 13a and 13b are views showing a state in which the disk clamper portion 300 is moved from the state shown in FIGS. 12a and 12b up to the vicinity of the reproducing position of a disk; FIGS. 14a and 14b are views showing a state in which the disk clamper portion 300 is brought in contact with the disk R; and FIGS. 15a and 15b are views showing a state in which the disk can be reproduced.

FIG. 10a is a top view showing a configuration, and FIG. 10b is a front view of FIG. 10a; and FIG. 11a is a side view of the configuration shown in FIGS. 10a and 10b, and FIG. 11b is a view showing an essential portion shown in FIGS. 10a and 10b.

FIGS. 12a, 13a, 14a and 15a are top views each showing an operational state; and FIGS. 12b, 13b, 14b and 15b are side views of FIGS. 12a, 13a, 14a and 15a, respectively.

Figure 16A:
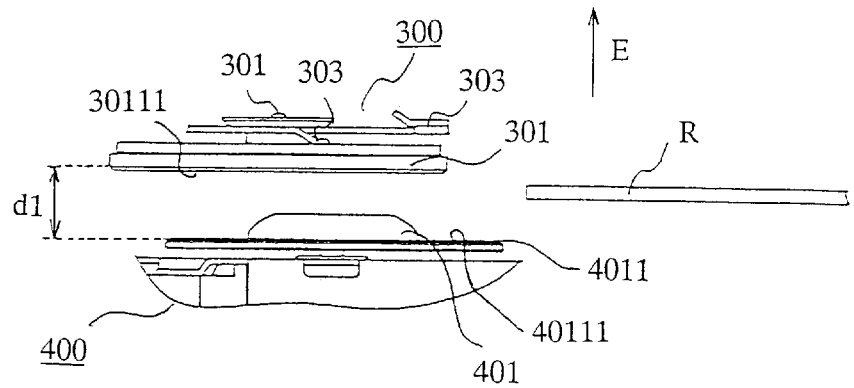
FIGS. 16a to 16c are views each showing an operational state of the essential portion of the disk clamper portion of the disk system shown in FIGS. 10a and 10b.
Figure 16B:
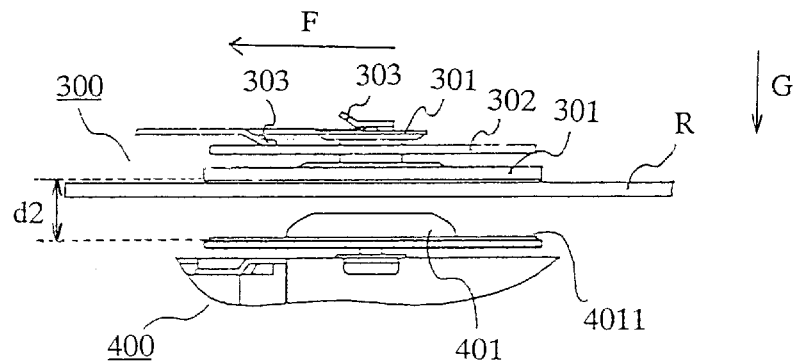
Figure 16C:
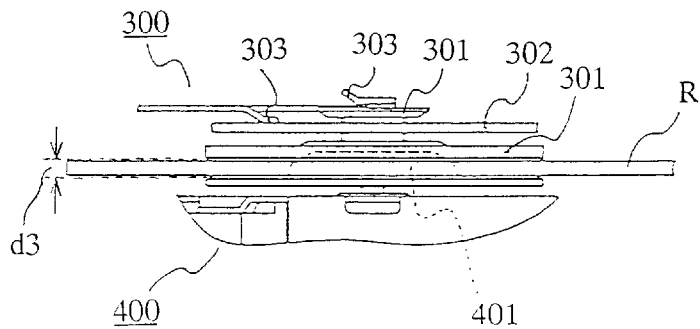

FIGS. 16a to 16c are views showing operational states of an essential portion of the disk clamper portion 300, wherein FIG. 16a shows a state in which no disk is mounted; FIG. 16b shows a state in which the disk clamper portion 300 is brought in contact with a disk; and FIG. 16c shows a state in which the disk is held between the disk clamper portion 300 and the disk mounting portion 400.

First, in a state in which a command allowing reproducing is not supplied from the operating portion (not shown), the disk reproducing portion 400 (operation thereof will be described later) is not moved, so that the clamper arm 302 movable through the slider 304 and the link portion 305 based on the movement of the disk reproducing portion 400 is not moved. As a result, the state shown in FIGS. 10a and 10b and FIGS. 11a and 11b is kept.

Next, when a command allowing reproducing is supplied from the operating portion, the disk reproducing portion is started to be moved in the direction A, and the slider 304 connected to part of the disk mounting portion is also moved in the direction A (which will be described in detail later).

At this time, the pin 3042 provided on one end of the slider 304 is similarly moved in the direction A in the sliding hole 3053 of the link portion 305. As a result, the link portion 305 is rotated in the direction B around the shaft portion 3052 of the link portion 305, so that the clamper arm 302 and the lift arm 303 are rotated in the direction C around the shaft portion 3061 through the pin 3051 of the link portion 305.

After the operation shown in FIGS. 12a and 12b, the stocker 501 containing the disk R is moved in the direction D as shown in FIGS. 13a and 13b, and the stocker 503 waits at the reproducing position of the disk R.

In addition, a configuration and an operation of the stocker will be described in detail later.

Next, as shown in FIGS. 14a and 14b, the disk reproducing portion 400 is moved again in the direction A and the slider 304 is moved up to the A side terminal portion of the contact portion 3062 formed on the base portion 306 along with the movement of the disk reproducing portion 400. As a result, the clamper arm 302 and the lift arm 303 are disposed at the reproducing position of the disk R in association of the above-described operation of the slider 304.

Then, as shown in FIGS. 14a and 14b, the hook portion 3031 of the lift arm 303 is separated from the knob portion 3012 held by the clamper arm 302, and the contact portion 3011 of the clamper 301 is brought in contact with the surface of the disk, to thereby hold the disk in co-operation of the turn table 401 of the disk reproducing portion 400 which supports the back surface of the disk.

Further, after completion of the operation shown in FIGS. 14a and 14b, to reproduce the disk R, the stocker 501 is moved in the direction A to the original position as shown in FIGS. 15a and 15b, to thus reproduce the disk R.

Here, there will be briefly described the state in which the disk R is held between the clamper 301 and the turn table 401 of the disk reproducing portion 400 with reference to FIGS. 16a to 16c.

First, in the case where the disk R is not disposed at the reproducing position as shown in FIG. 16a, the clamper arm 302 is moved to the reproducing position of the disk R and is also pulled up in the direction E by the lift arm 303 for allowing the disk R to be easily inserted in a gap d1 between the clamper 301 and the turn table 401.

Next, when the clamper arm 302 is disposed at the reproducing position of the disk R and the disk R is also disposed at the reproducing position as shown in FIG. 16b, the lift arm 303 is moved in the direction F to release the knob portion 3012 of the clamper 301, so that the contact portion 3011 of the clamper 301 biased in the direction G is brought in contact with the surface of the disk R.

In such a state, the gap (d2) becomes smaller than the gap d1 shown in FIG. 16a.

Further, since an attracting force is generated between a surface 30111 to be magnetized, which is provided on the contact portion 3011 of the clamper 301, and a magnet 40111 provided on a disk mounting portion 4011 of the turn table 401 as shown in FIG. 16c, the clamper 301 is attracted on the turn table 401, to thereby hold the disk R. In such a state, the gap (d3) is nearly equal to the thickness D of the disk R (d3≈D).

In addition, in the case where the reproducing of the disk is completed and the disk R is contained in the disk containing mechanism 500, the disk clamper portion 300 is operated in accordance with operations reversed to those described above, that is, in the order of the states shown in FIGS. 15a and 15b FIGS. 14a and 14b→FIGS. 13a and 13b→FIGS. 12a and 12b→FIGS. 10a, 10b, 11a and 11b.

[3-2. Disk Reproducing Portion]

Next, a configuration of the disk reproducing portion 400 will be described with reference to FIGS. 17a and 17b.

Figure 17A:
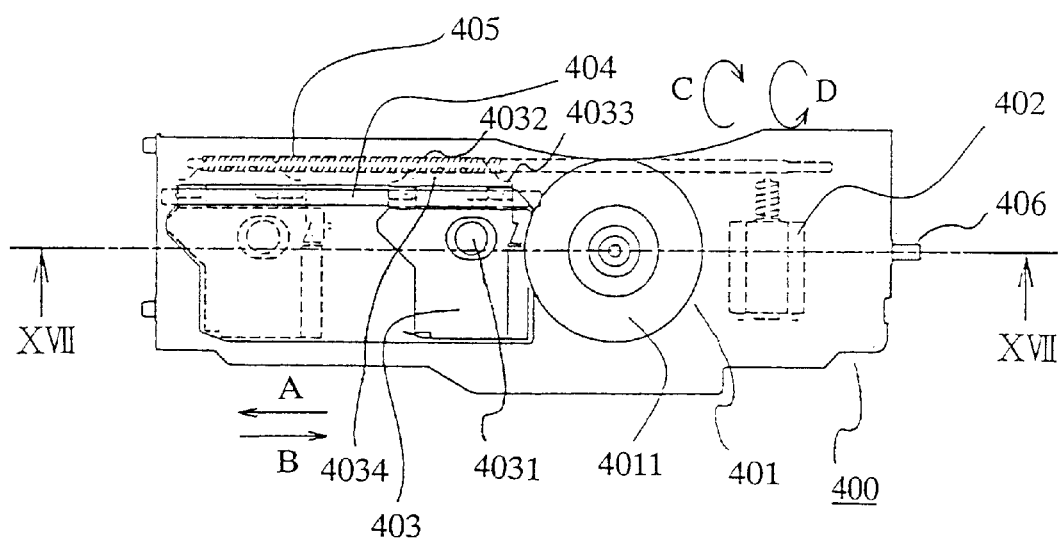
FIGS. 17a and 17b are a top view and a sectional side view respectively, showing a configuration of an essential portion of a disk reproducing portion of the disk system shown in FIG. 1.
Figure 17B:
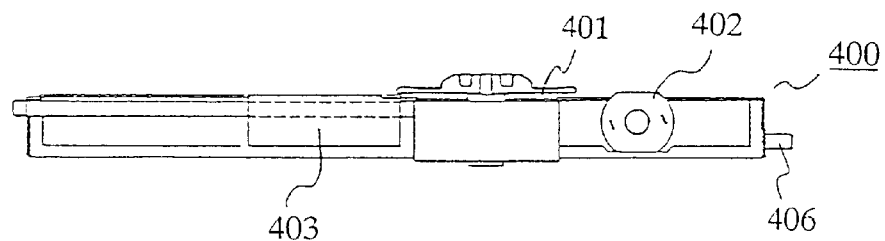

FIGS. 17a and 17b are views showing a configuration of the disk reproducing portion 400, wherein FIG. 17a is a top view and FIG. 17b is a sectional front view taken on line XVII—XVII of FIG. 17a.

In FIGS. 17a and 17b, reference numeral 401 indicates the turn table for rotating a disk. The turn table 401 includes a disk mounting portion 4011 and a projecting portion 4012 to be inserted in a center hole of a disk for holding the disk. The magnet 40111 is provided on the disk mounting portion 4011.

Reference numeral 402 indicates an optical pick-up driving portion for moving in the direction A an optical pick-up portion 403 for reading-out information recorded in a disk; 404 is an optical pick-up guiding portion for guiding the optical pick-up portion 403 in the direction A; and 405 is an optical pick-up feed screw turnable in the direction C or D on the basis of a driving force of the optical pick-up driving portion 402.

The optical pick-up portion 403 includes a pick-up 4031 for emitting a light source to a disk and reading-out information recorded in the disk; supporting portions 4032 and 4033 for supporting the optical pick-up guiding portion 404 in such a manner as to move the optical pick-up portion 403 in the direction A or B; and a screw portion 4034 to be screwed with a threaded portion of the optical pick-up feed screw portion 405.

When the optical pick-up feed screw portion 405 is rotated in the direction C or D on the basis of a rotating force of the optical pick-up driving portion 402, the screw portion 4034 converts the rotating force of the optical pick-up feed screw portion 405 into the movement in the direction A or B, to thereby move the optical pick-up portion 403 in the direction A or B.

Next, there will be described a configuration of an operating mechanism for operating the above-described disk reproducing portion 400 in the disk system with reference to FIGS. 18a and 18b.

Figure 18A:
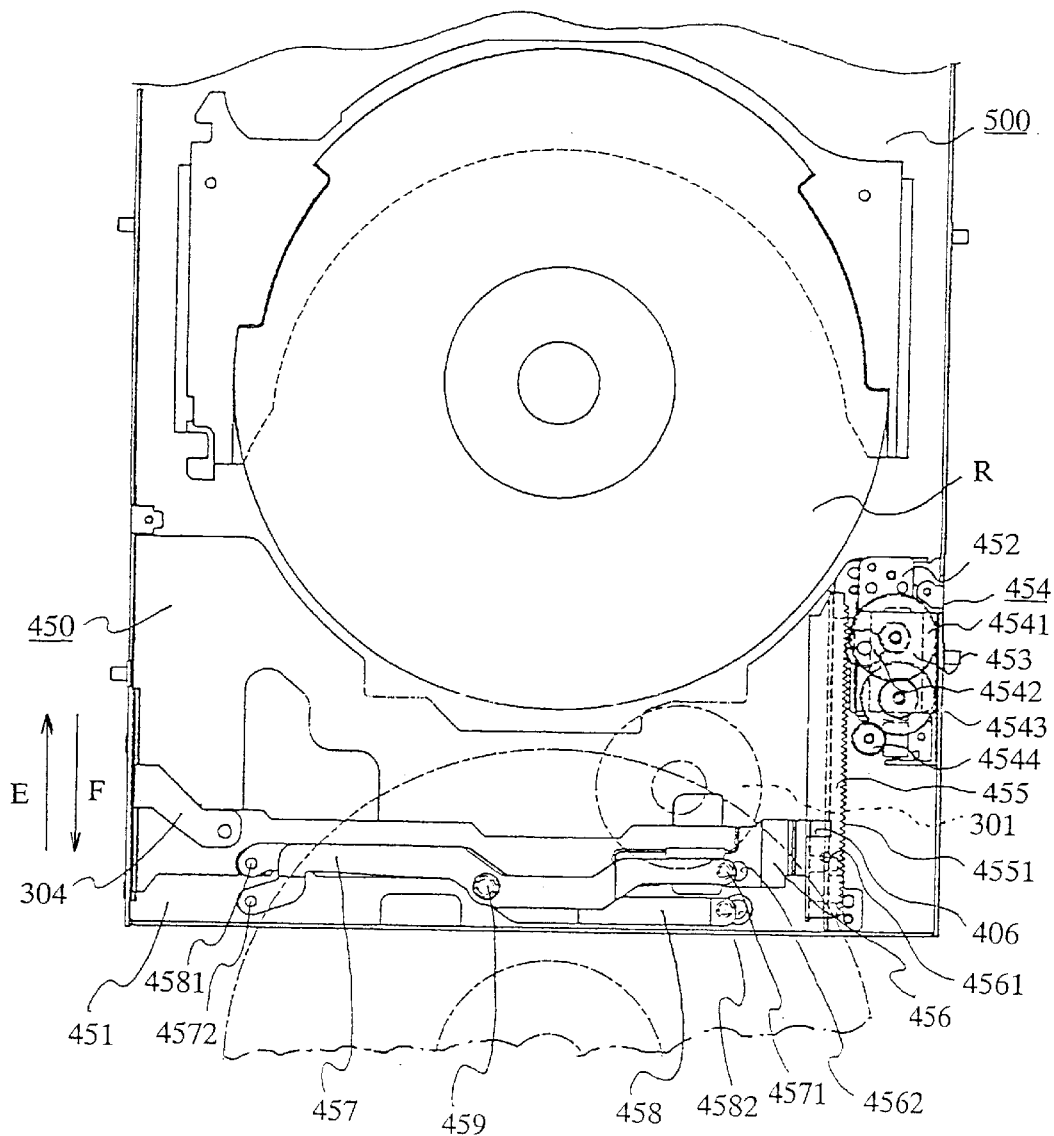
FIGS. 18a and 18b are a top view and a sectional front view respectively, showing a configuration of a mechanism for moving the essential portion of the disk reproducing portion shown in FIGS. 17a and 17b.
Figure 18B:
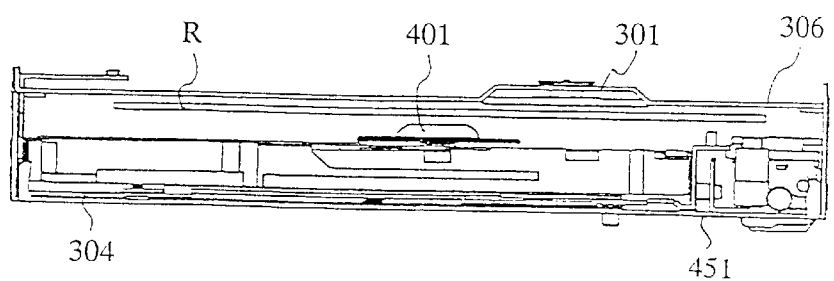

FIGS. 18a and 18b are views showing a configuration of a moving mechanism portion 450 for moving the disk reproducing portion 400 in the direction E or F. In these figures, there is shown a state in which the disk R is contained in the stocker 501.

In addition, FIG. 18a is a top view and FIG. 18b is a sectional front view.

In FIGS. 18a and 18b, reference numeral 450 indicates the moving mechanism portion for moving the disk reproducing portion 400 shown in FIGS. 17a and 17b. The moving mechanism portion 450 includes a base portion 451, a base driving portion 452, a motor 453, a gear portion 454, a plate guide 455, a slider 456, a first link portion 457, a second link portion 458, and a shaft portion 459.

In addition, the slider 304 is connected to the slider 456 to be integrated therewith.

Next, the functions of the above components will be described in detail.

First, reference numeral 451 indicates the base portion which is fixed to the base portion 306 and is connected to the disk reproducing portion 400 for supporting it and which is also movable in the direction E or F; 452 is the base driving portion for moving the slider 456 (which will be described later) in the direction E or F; 453 is the motor for moving the disk roller portion 200, disk clamper portion 300 and disk reproducing portion 400; and 454 is the gear portion for transmitting the rotating force of the motor 453 to the slider 456 (which will be described later).

Reference numeral 455 indicates the plate guide which is fixed on the base 451 and which has a groove for guiding the slider 456 and the disk reproducing portion 400; and 456 is the slider screwed with the gear portion 454 and moved in the direction E or F along with turning of the gear portion 454. The above slider 456 is part of the slider 456 slidably mounted on the plate guide 455 and the base 451.

Reference numeral 457 indicates the first link portion having at one end a pin 4571 slidably inserted in a sliding hole 4562 provided in part of the slider 456 and also having at the other end a shaft portion 4572 turnably fixed on the base portion 451; 458 is the second link portion having at one end a shaft portion 4581 for turnably supporting the slider 456 and also having at the other end a pin 4582 slidably inserted in a sliding hole 4511 formed in part of the base portion 451; and 459 is the shaft portion for connecting the first link portion 457 to the second link portion 458 and turnably supporting the first link portion 457 and the second link portion 458.

Next, operation of the moving mechanism portion 450 will be described with reference to FIGS. 18a to FIG. 28c.

As described above, FIGS. 18a and 18b show the state in which a command allowing reproducing is not supplied from the operating portion and thereby the disk reproducing portion 400 is not operated. As shown in FIGS. 18a and 18b, the slider 456, first link portion 457, and second link portion 458 are disposed at positions closest to the insertion port 101.

Figure 19:
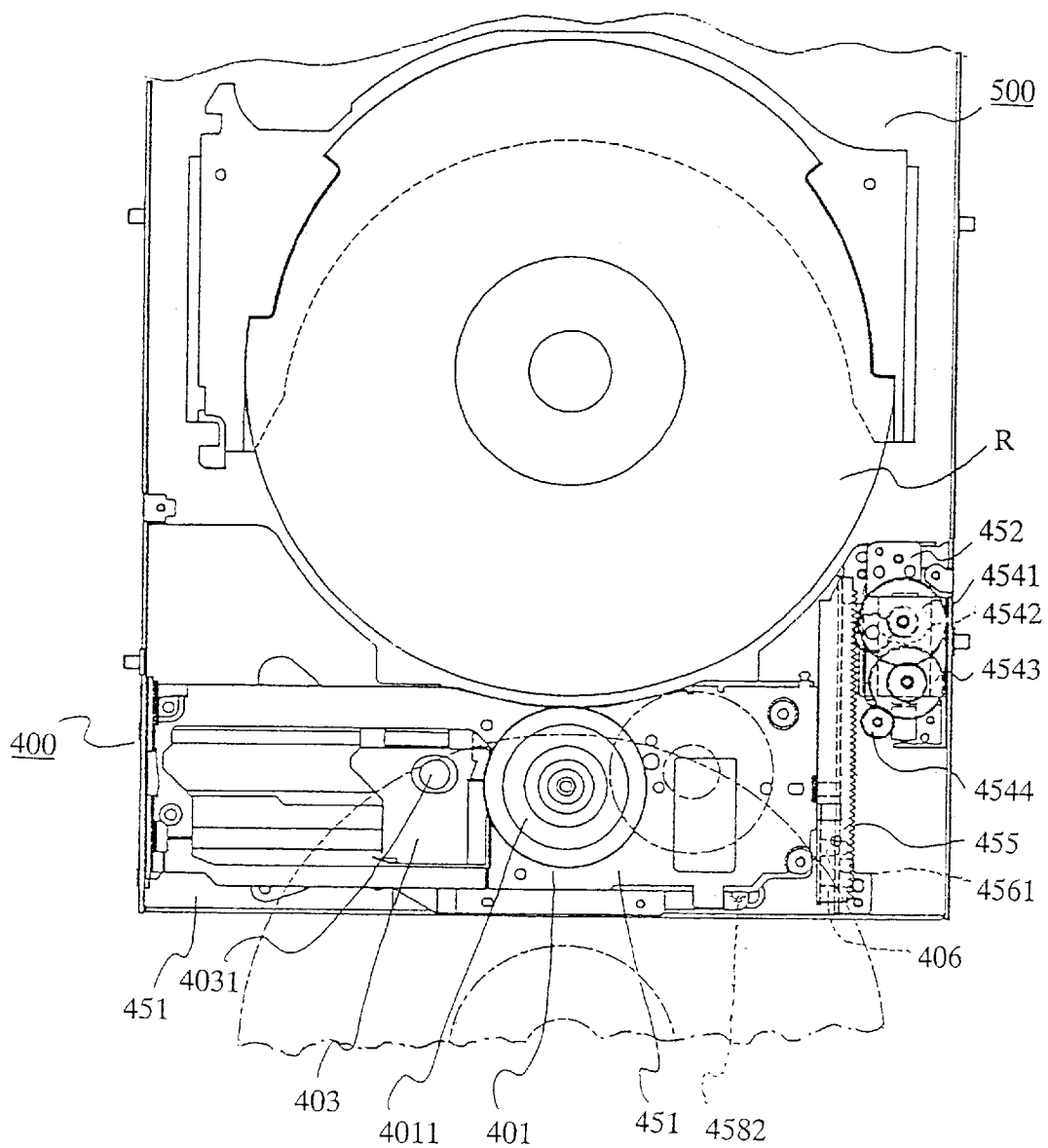
FIG. 19 is a top view and a sectional front view, showing a state in which the essential portion of the disk reproducing portion shown in FIGS. 17a and 17b is mounted as shown in FIGS. 18a and 18b.

Here, FIG. 19 shows a state in which the disk reproducing portion 400 shown in FIGS. 17a and 17b is mounted on the operating mechanism shown in FIGS. 18a and 18b. In such a state, the disk reproducing portion 400 is not superimposed on the disk R contained in the stocker 501.

Figure 20A:
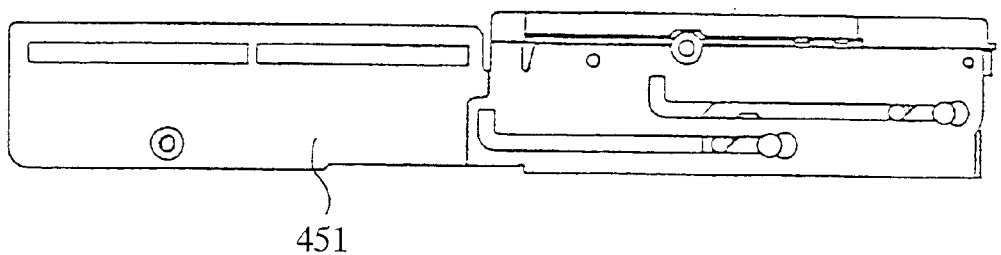
FIGS. 20a and 20b are side views showing an operating state of an essential portion of the disk system shown in FIGS. 19a and 19b.
Figure 20B:
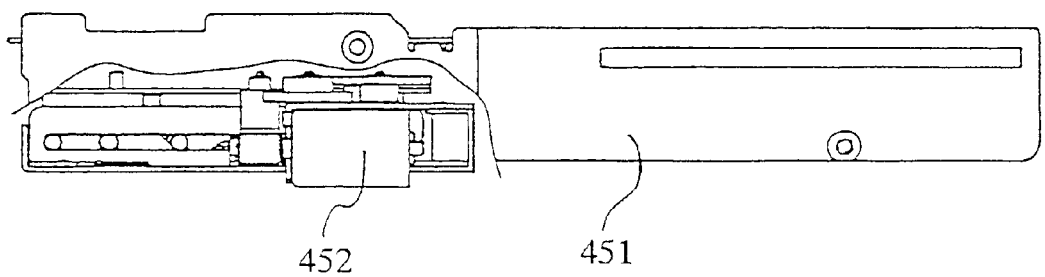

FIGS. 20a and 20b are views showing a left side surface of the mechanism shown in FIGS. 18a and 18b and FIG. 19, wherein FIG. 20a is a side view and FIG. 20b is an illustrative view of FIG. 20a.

Next, when a command allowing reproducing is supplied to the disk system, the motor 453 is driven, and a driving force is transmitted to the slider 456 through the gear to move the slider 456 in the direction F, so that the disk reproducing portion 400 connected to the slider 456 is also moved in the direction F. Such a state is shown in FIG. 21.

In such a state, the disk roller mechanism 200 is opened up and down by the above-described mechanism as shown in FIG. 12b, to allow entrance of the disk R.

Further, the stocker 501 is moved in the direction E and the disk R is moved from a position R1 to a reproducing position R2.

Figure 21:
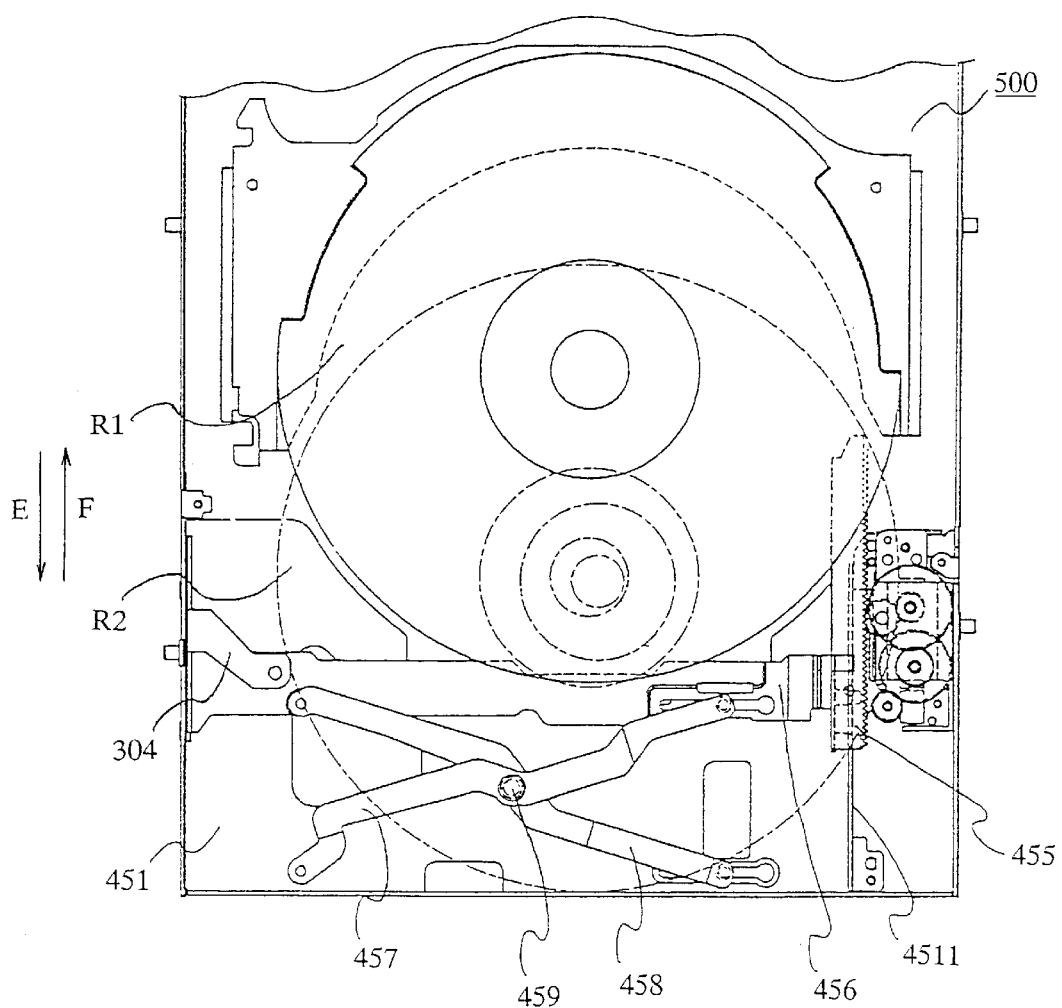
FIG. 21 is a top view and a sectional front view, showing an operational state of a mechanism for moving the essential portion of the disk reproducing portion shown in FIGS. 17a and 17b.
Figure 22:
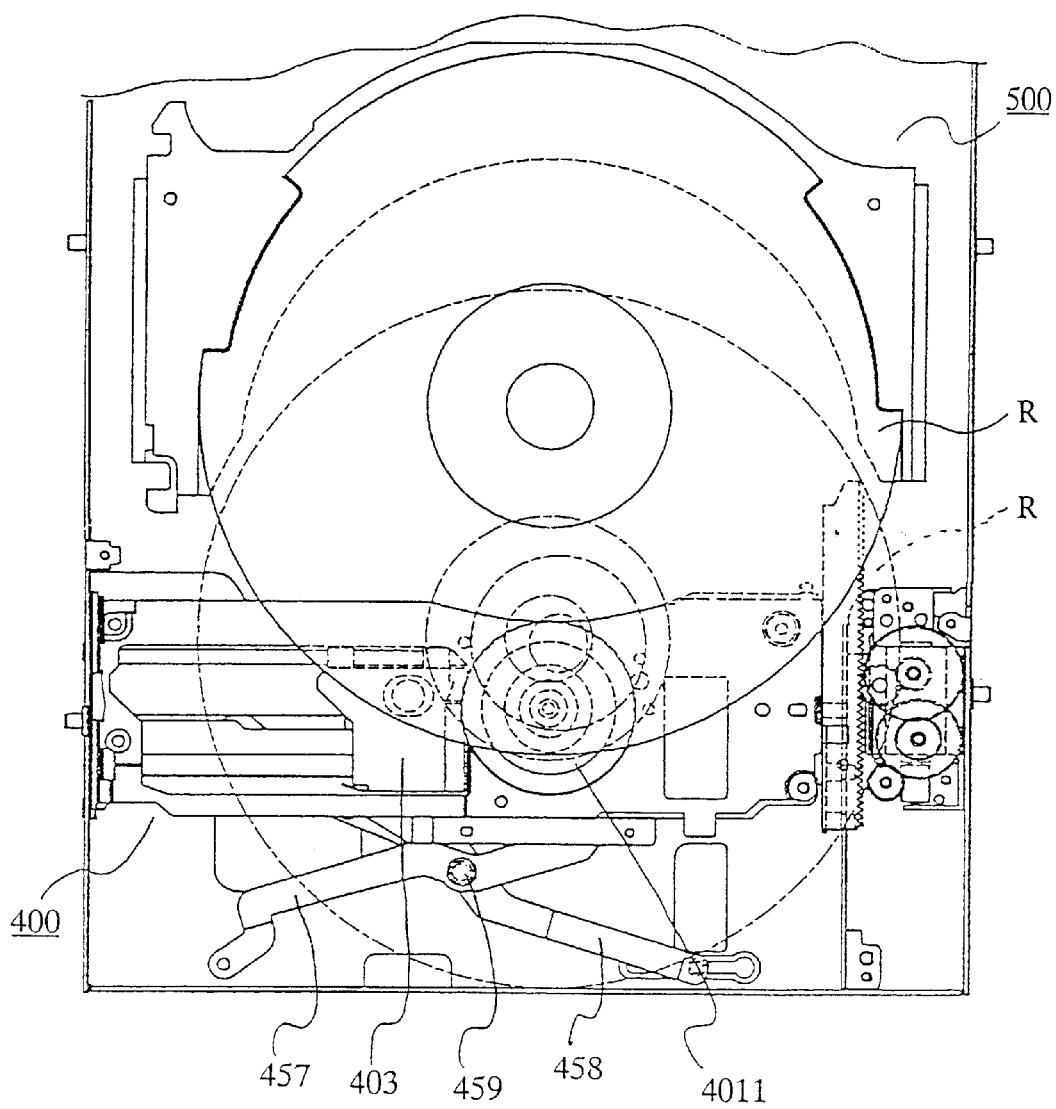
FIG. 22 is a top view and a sectional front view, showing a state in which the essential portion of the disk reproducing portion shown in FIGS. 17a and 17b is mounted on the mechanism having the operational state shown in FIG. 21.

FIG. 22 shows a state in which the disk reproducing portion 400 is mounted on the state shown in FIG. 21.

The movement of the disk reproducing portion 400 is further progressed up to the reproducing position of the disk, and when the movement thereof is completed, the disk is held between the disk clamper portion 300 and the disk reproducing portion 400, to thus start reproducing of the disk R.

Figure 23A:
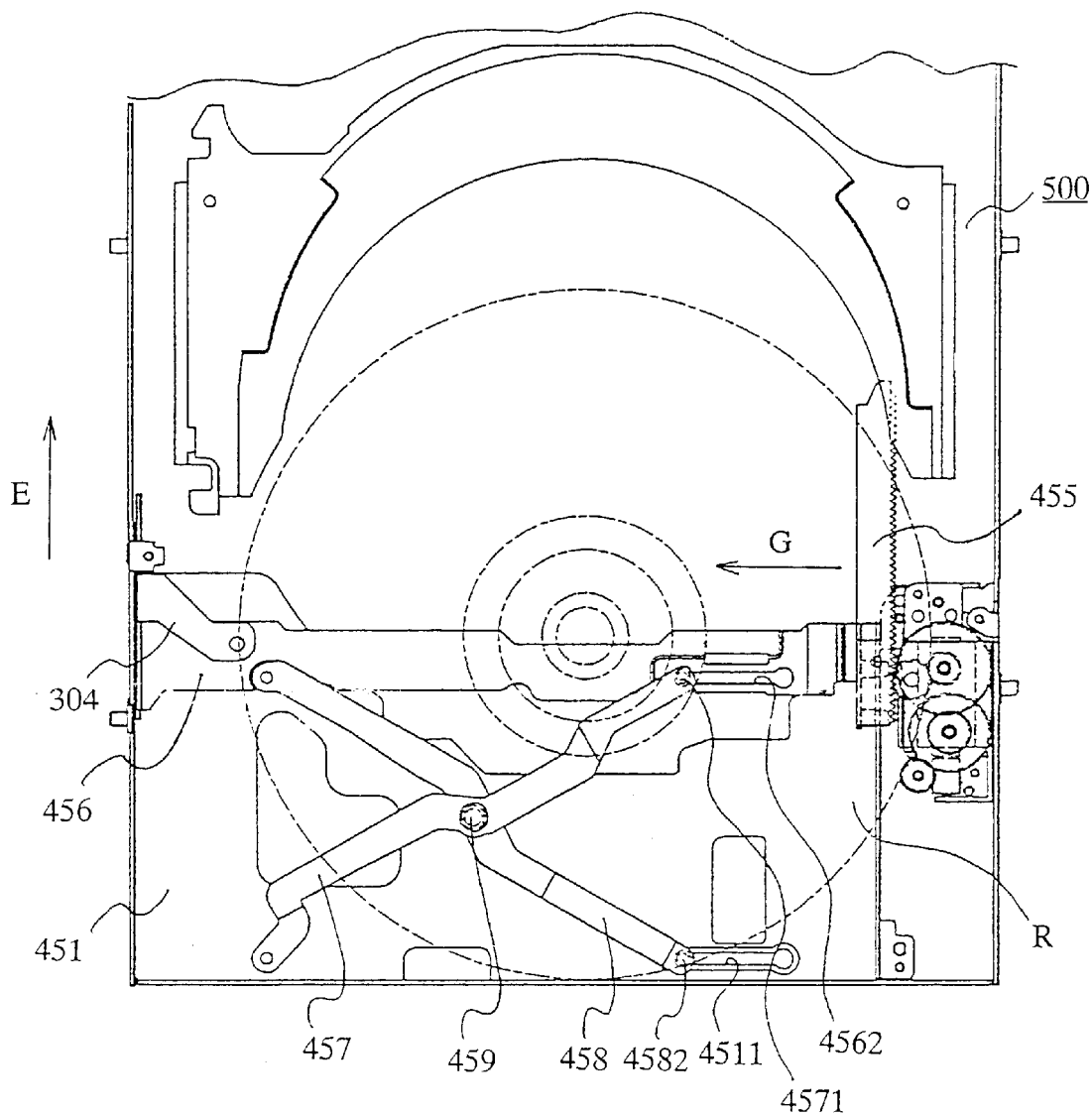
FIGS. 23a and 23b are a top view and a sectional front view respectively, showing an operational state of the mechanism for moving the essential portion of the disk reproducing portion shown in FIGS. 17a and 17b.
Figure 23B:
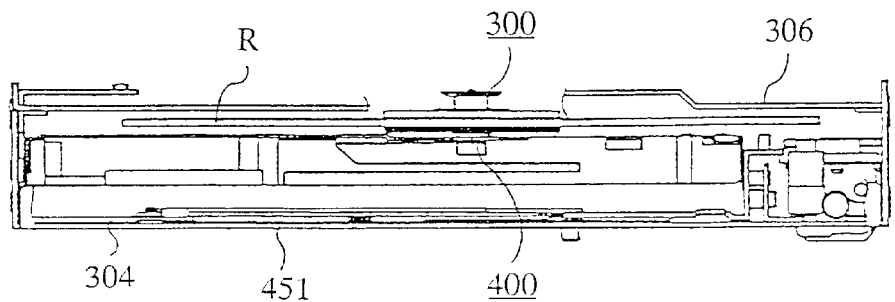

Such a state is shown in FIGS. 23a and 23b. In addition, FIG. 24 shows a state in which the disk reproducing portion 400 is mounted on the state shown in FIGS. 23a and 23b.

Figure 24:
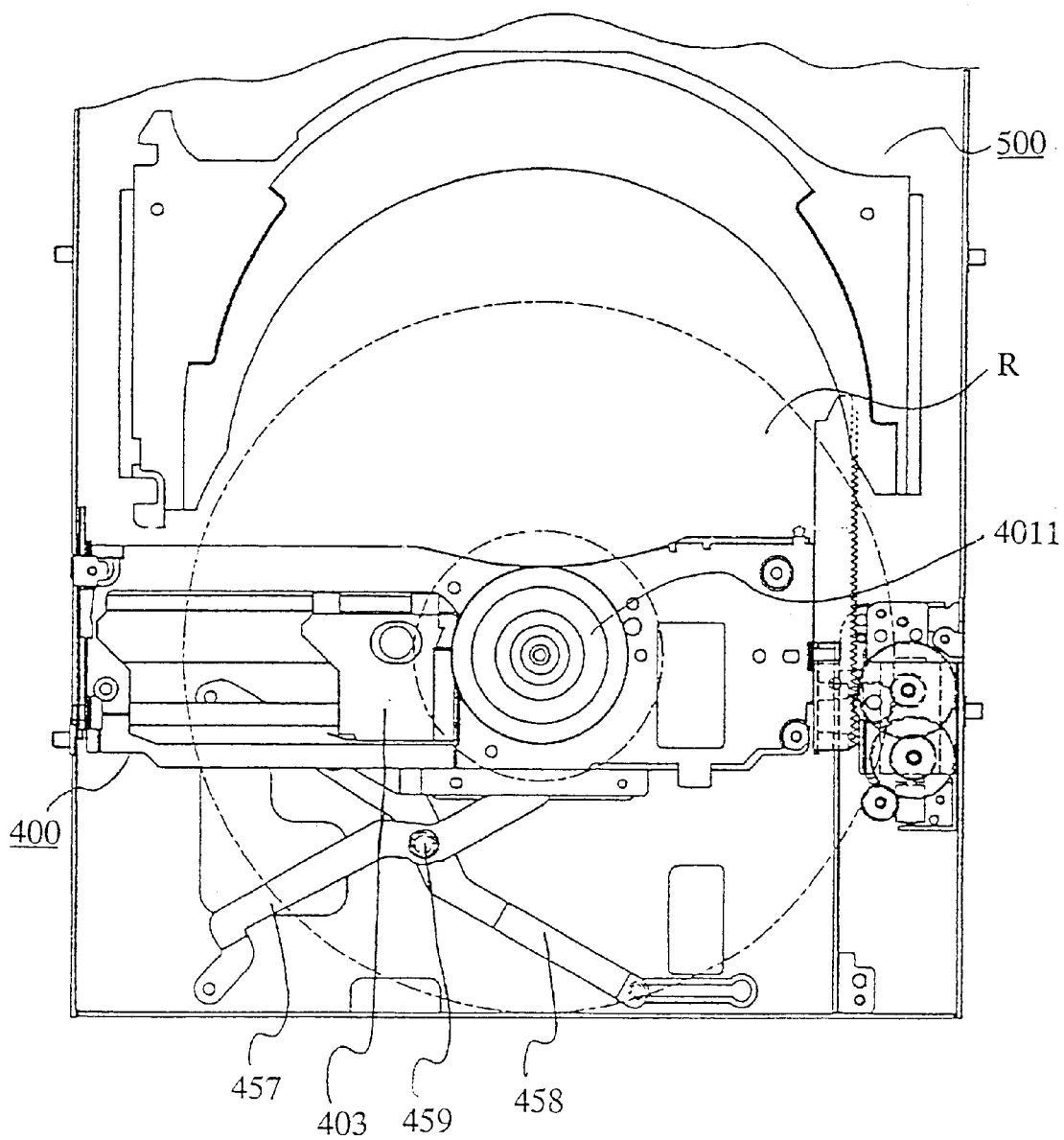
FIG. 24 is a top view and a sectional front view, showing a state in which the essential portion of the disk reproducing portion shown in FIGS. 17a and 17b is mounted on the mechanism having the operational state shown in FIGS. 23a and 23b.

In FIGS. 23a and 23b and FIG. 24, the motor 453 is further driven to move the slider 456 through the gear portion 454 in the direction E.

In this way, the slider 456 is further moved in the direction E, and thereby the pin 4571 of the first link portion 457 is further slid in the sliding hole 4562 of the slider 456 in the direction G; however, when reaching an end portion of the sliding hole 4562 on the slider 304 side, the pin 4571 is prevented from being further moved in the direction G.

Like the pin 4571 of the first link portion 457, the pin 4582 of the second link portion 458 is further slid in the sliding hole 4511 of the base portion 451 in the direction G: however, when reaching an end portion of the sliding hole 4511 on the slider 304 side, the pin 4582 is prevented from being further moved in the direction G.

As a result, the movement of the first link portion 457 and the second link portion 458 are prevented, and the portions at which the movement of the link portions 457 and 458 is stopped are set at positions of reproducing the disk R. Thus, the link portions 457 and 458 can be easily set at the disk reproducing positions.

FIGS. 25a to FIGS. 28c are sectional views of right and left sides of essential portions, showing the above operations.

Figure 25A:
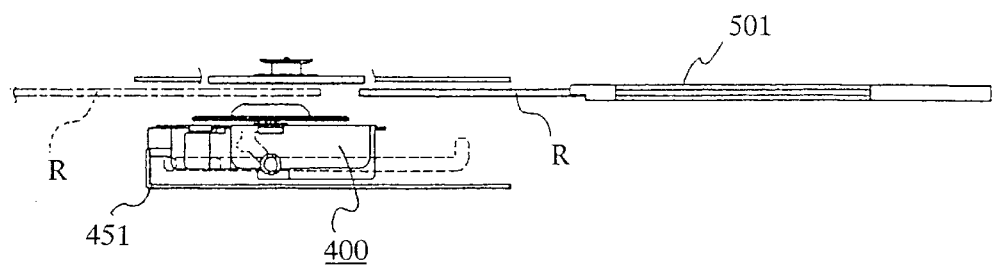
FIGS. 25a to 25c are side views each showing an operational state of an essential portion of the disk system shown in FIG. 19.
Figure 25B:
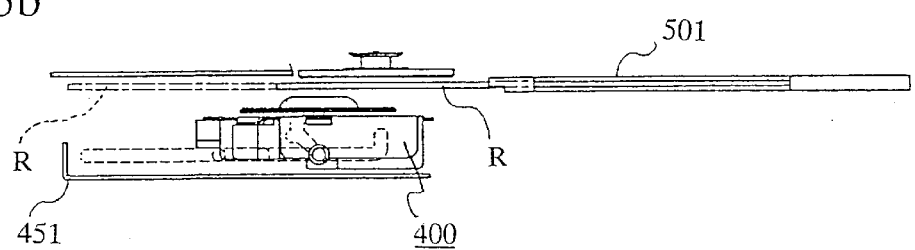
Figure 25C:
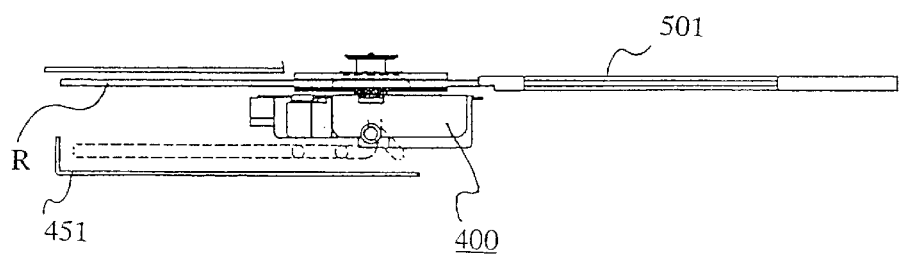

FIGS. 25a to 25c are sectional left side views, wherein FIG. 25a shows a state in which the state shown in FIGS. 10a and 10b is assembled with the state shown in FIG. 19; FIG. 25b shows a state in which the state shown in FIGS. 12a and 12b is assembled with the state shown in FIG. 22; and FIG. 25c shows a state in which the state shown in FIGS. 13a and 13b is assembled with the state shown in FIG. 24.

Figure 26A:
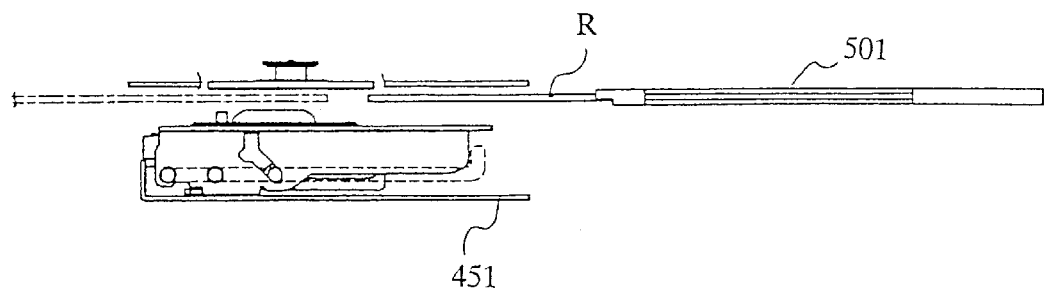
FIGS. 26a to 26c are side views each showing an operational state of the essential portion of the disk system shown in FIG. 19.
Figure 26B:
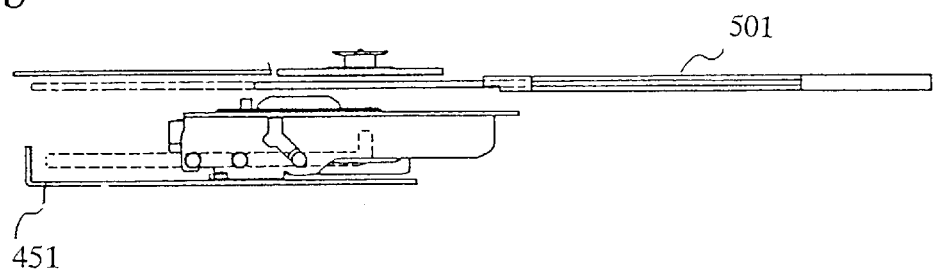
Figure 26C:
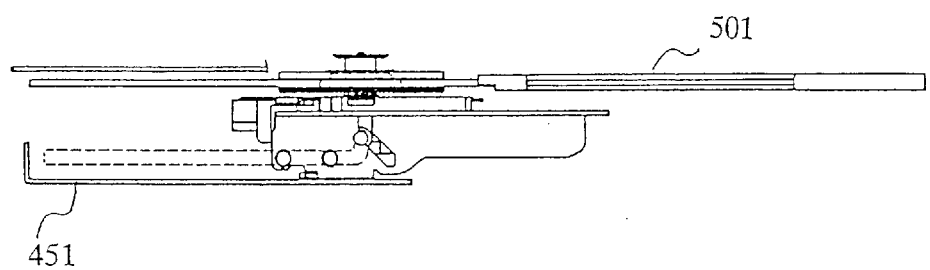

FIGS. 26a to 26c are sectional left side views, wherein like FIGS. 25a to 25c, FIG. 26a shows a state in which the state shown in FIGS. 10a and 10b is assembled with the state shown in FIG. 19; FIG. 26b shows a state in which the state shown in FIGS. 12a and 12b is assembled with the state shown in FIG. 22; and FIG. 26c shows a state in which the state shown in FIGS. 13a and 13b is assembled with the state shown in FIG. 24.

Figure 27A:
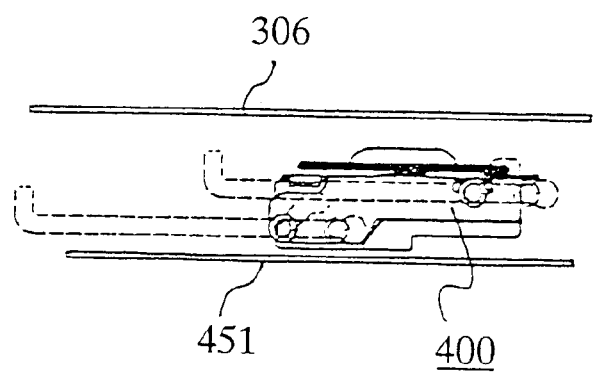
FIGS. 27a to 27c are side views each showing an operational state of the essential portion of the disk system shown in FIG. 19.
Figure 27B:
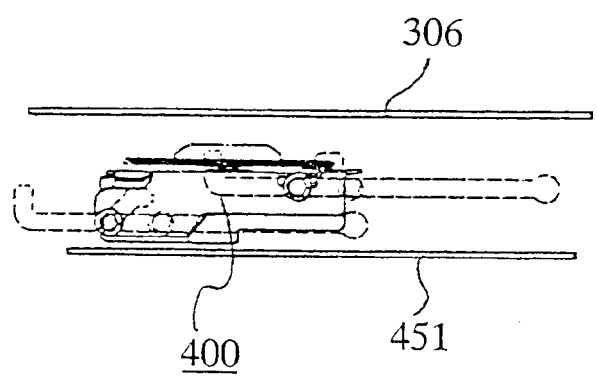
Figure 27C:
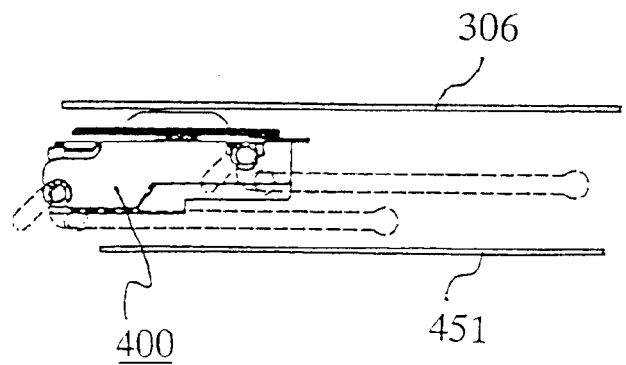

FIGS.. 27a to 27c are sectional right side views, wherein FIG. 27a shows a state in which the state shown in FIGS. 10a and 10b is assembled with the state shown in FIG. 19; FIG. 27b shows a state in which the state shown in FIGS. 12a and 12b is assembled with the state shown in FIG. 22; and FIG. 27c shows a state in which the state shown in FIGS. 13a and 13b is assembled with the state shown in FIG. 24.

Figure 28A:
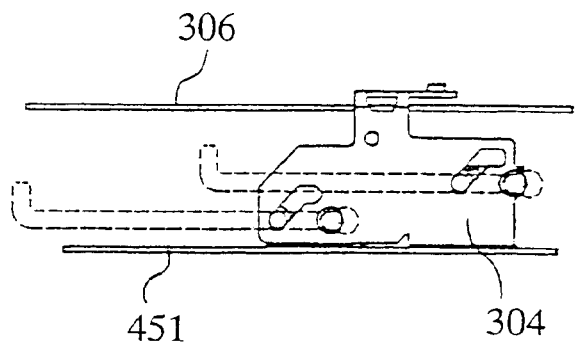
FIGS. 28a to 28c are side views each showing an operational state of the essential portion of the disk system shown in FIG. 19.
Figure 28B:
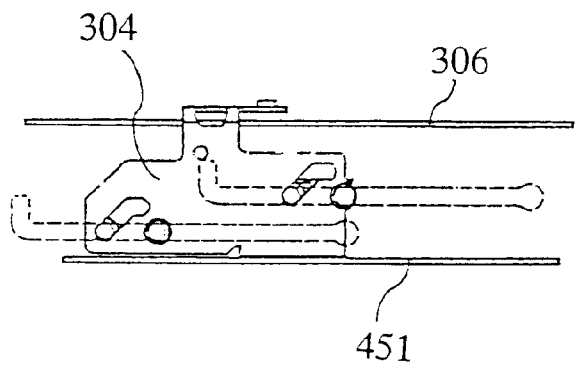
Figure 28C:
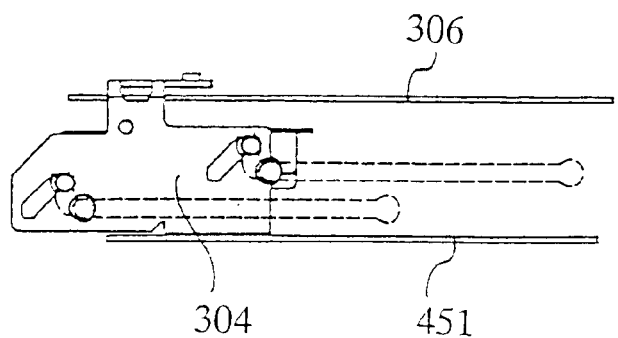

FIGS. 28a to 28c are sectional right side views, wherein like FIGS. 27a to 27c, FIG. 28a shows a state in which the state shown in FIGS. 10a and 10b is assembled with the state shown in FIG. 19; FIG. 28b shows a state in which the state shown in FIGS. 12a and 12b is assembled with the state shown in FIG. 22; and FIG. 28c shows a state in which the state shown in FIGS. 13a and 13b is assembled with the state shown in FIG. 24.

[4. Disk Containing Mechanism]

Next, the disk containing mechanism will be described.

The disk containing mechanism 500 basically includes the stocker portions 501 to 504; a driving mechanism portion 510 driven for moving the stockers 501 to 504; and a moving mechanism portion 520 for giving a specific movement to each of the stockers 501 to 504 at each specific stage on the basis of a driving force of the driving mechanism portion 510.

In addition, a stocker moving means is composed of the driving mechanism portion 510 and the moving mechanism portion 520.

First, a configuration of the first stocker portion will be described with reference to FIGS. 29 and 30.

Figure 29:
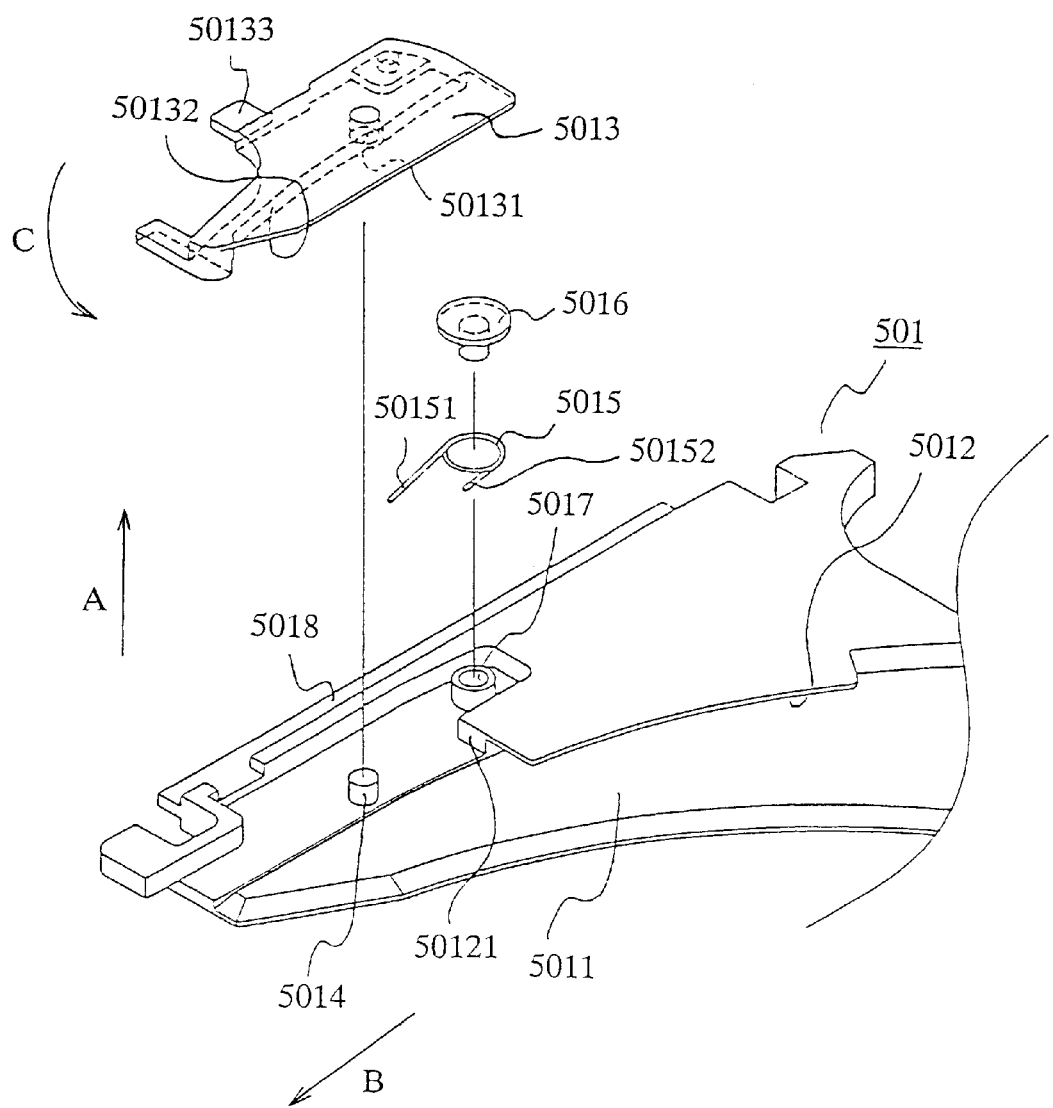
FIG. 29 is an exploded view showing a configuration of an essential portion of the disk containing mechanism of the disk system shown in FIG. 1.
Figure 30:
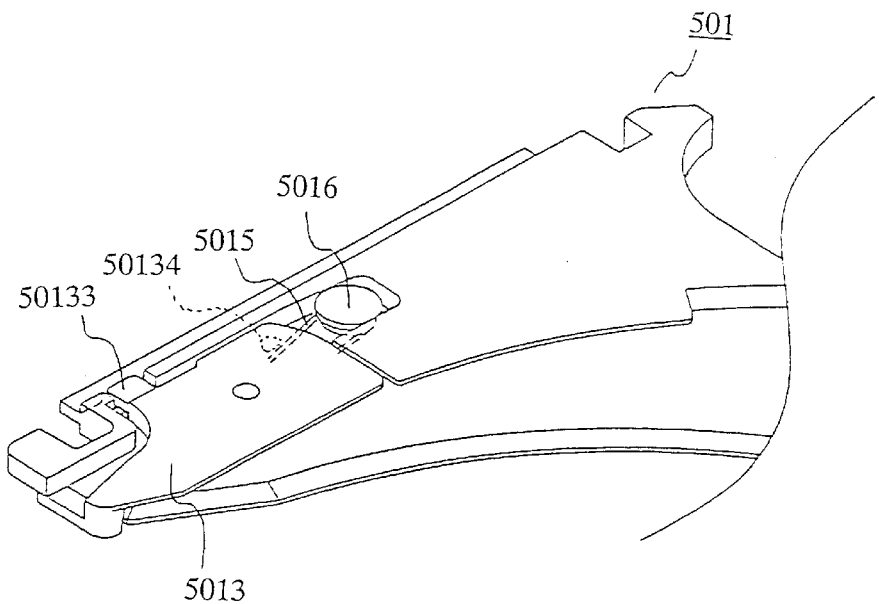
FIG. 30 is a perspective view showing a state in which the essential portion of the disk containing mechanism shown in FIG. 29 is assembled.

FIG. 29 is an exploded view of an essential portion of the disk containing mechanism 500, and FIG. 30 is a view showing a state in which components of the essential portion shown in FIG. 29 are assembled.

In the following description of the stocker portion as the essential portion, the stocker portion is represented by the first stocker 501 positioned at the uppermost stage.

In FIGS. 29 and 30, the first stocker 501 includes a containing portion 5011 for containing a disk; a stopper 5012 for preventing a disk contained in the containing portion 5011 from being moved in the direction A; a locking portion 5013 for locking a peripheral edge of a disk contained in the containing portion 5011, thereby preventing the disk from being moved in the direction B; a projecting portion 5014 formed on the stocker 501 in such a manner as to be fitted in a fitting hole 50131 formed in the locking portion 5013 and turnable around the fitting hole 50131; a biasing portion 5015 engaged with an engaging portion 50134 of the locking portion 5013 for usually biasing the locking portion 5013 in the direction C; and a holding portion 5016 fitted in a fitting hole 5017 formed in the stocker 501 for holding the biasing portion 5015.

Figure 31:
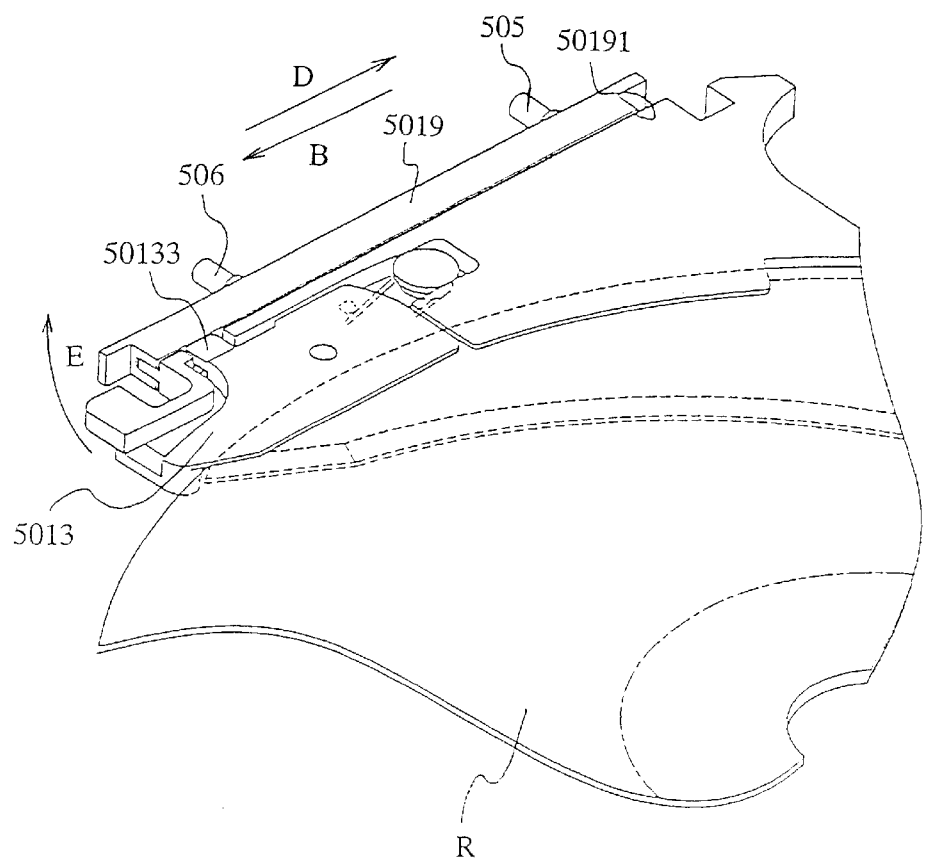
FIG. 31 is a view illustrating an operation of the essential portion of the disk containing mechanism shown in FIG. 30.

Further, a rail sliding portion 5018 is formed on part of a peripheral edge portion of the stocker 501, and as shown in FIG. 31, the rail sliding portion 5018 is slidably inserted in a rail portion 5019.

Next, operation of the first stocker 501 described above will be described with reference to FIGS. 31 and 32.

Figure 32:
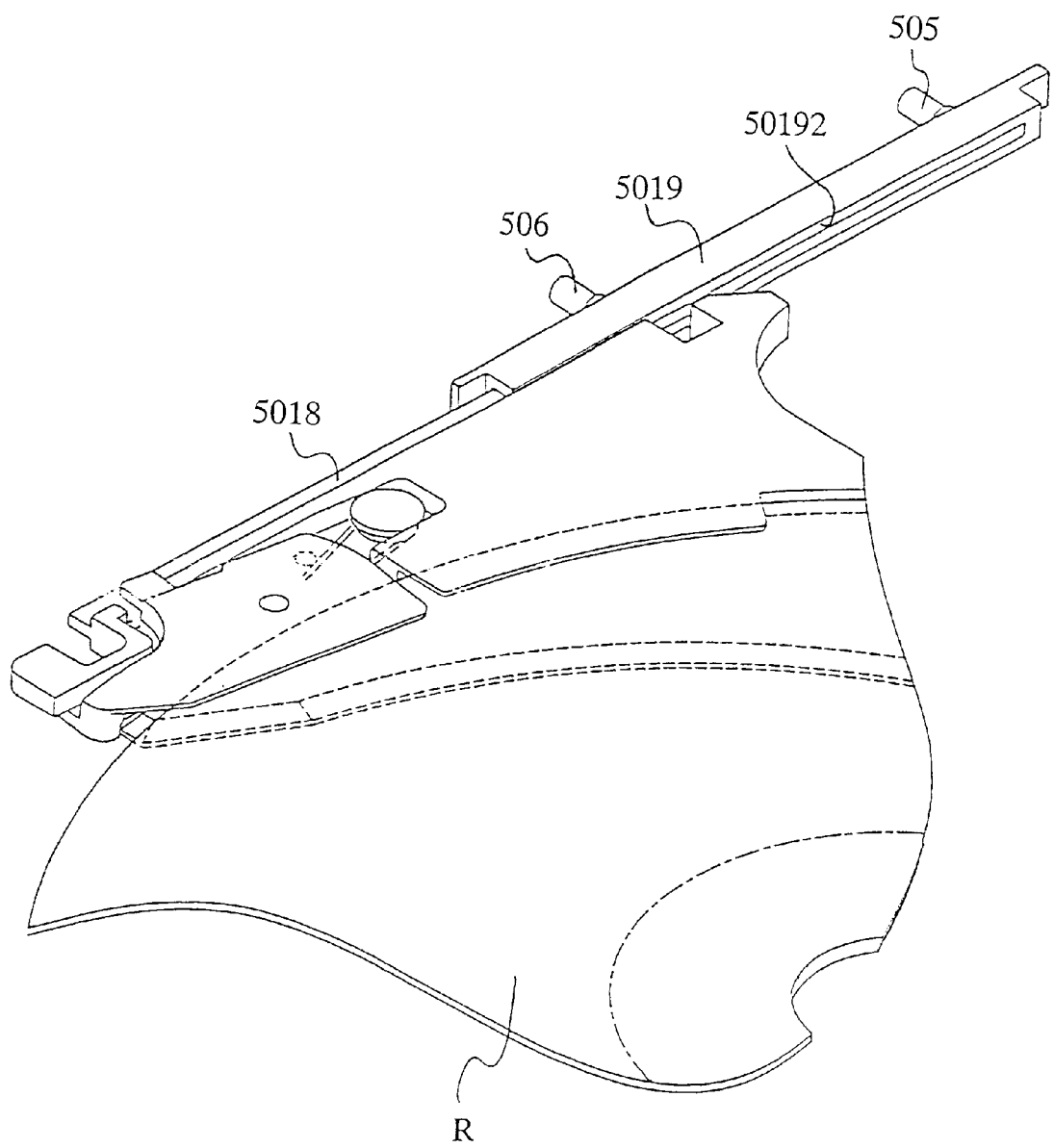
FIG. 32 is a view illustrating an operation of the essential portion of the disk containing mechanism shown in FIG. 30.

Here, FIG. 31 is a view showing a state in which the first stocker 501 contains the disk R, that is, in a state in which the disk R is inserted and is contained in the first stocker 501, and the first stocker 501 is moved to a specific position; and FIG. 32 shows a state in which the first stocker 501 is moved in the direction B, that is, in a state in which the disk R is contained in or ejected from the containing portion 5011 of the first stocker 501.

As shown in FIG. 31, when the stocker 501 containing the disk R is located at a specific position, if an external disturbance for moving the disk R in the direction B and ejecting it from the containing position is applied to the disk R, a rotational force in the direction E is given from the disk R to the locking portion 5013; however, since the rail contact portion 50133 provided on the locking portion 5013 is brought in contact with the rail portion 5019, the rotation of the locking portion 5013 is prevented. As a result, the locking portion 5013 holds the disk R, and prevents movement of the disk R.

Next, when the disk R is carried or reproduced, that is, the disk is delivered to the disk loading portion 100 or delivered to the disk mounting portion 400 for reproducing of the disk R, prevention of the movement of the disk R shown in FIG. 31 must be released.

In this case, as shown in FIG. 32, by moving the first stocker 501 in the direction B, the rail portion 5019 is separated from the rail contact portion 50133 provided on the locking portion 5013, to release prevention of rotation of the locking portion 5013 in the direction E, thereby releasing holding of the disk R by the locking portion 5013.

Here, a relationship between motions of the disk carrying-in/carrying-out mechanism 100, disk mounting portion 400, and disk containing mechanism 500 will be briefly described with reference to FIGS. 33 to 35.

Figure 33:
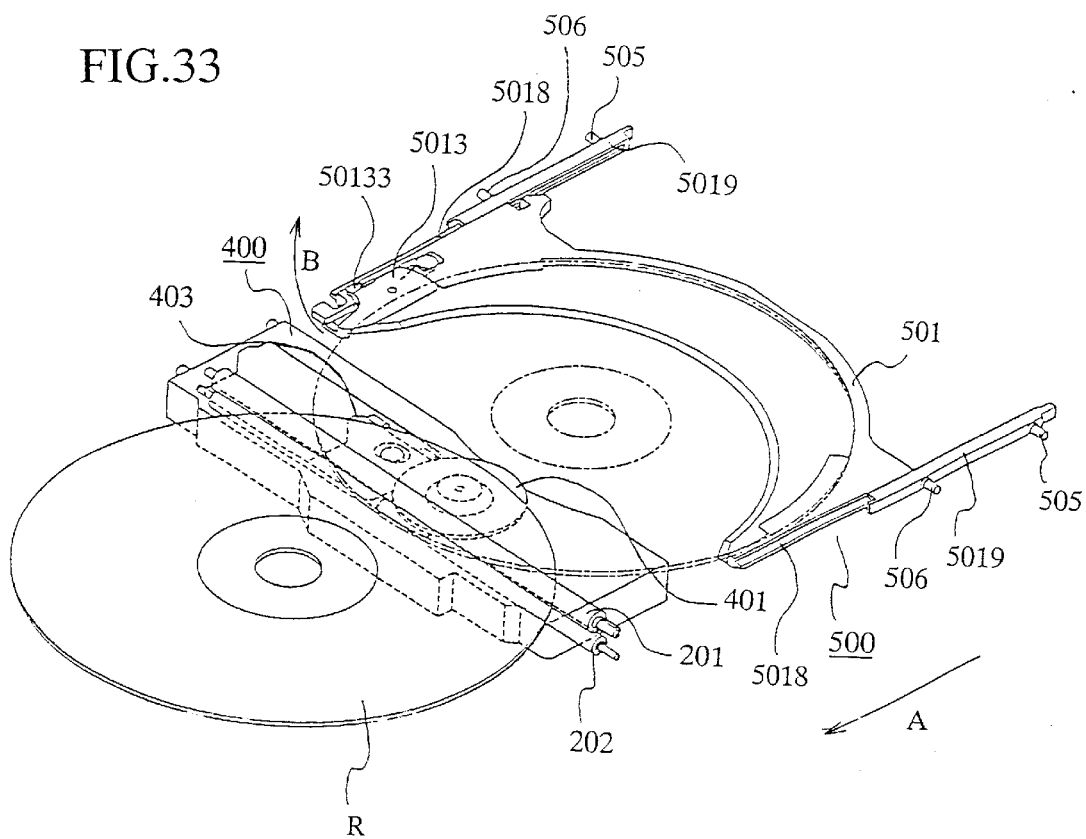
FIG. 33 is a view illustrating a schematic operation of an essential portion of the disk system shown in FIG. 1.

FIG. 33 is a view showing a state in which the disk R is inserted and contained in the first stocker 501 or it is ejected from the first stocker 501; FIG. 34 is a view showing a state in which the disk R contained in the first stocker 501 is moved to a reproducing position and the disk mounting portion 400 is moved to the reproducing position; and FIG. 35 is a view showing a state in which the first stocker 501 is returned to the containing position and the disk R is reproduced.

First, as shown in FIG. 33, when the disk R is inserted from the insertion port (not shown), the rail sliding portion 5018 is slid in the direction A with respect to the rail portion 5019 supported by the housing 100 so that the first stocker 501 projects in the direction A.

At this time, the locking portion 5013 is rotatable in the direction B because the rail portion 5019 is not brought in contact with the rail contact portion 50133.

Accordingly, the disk R rotates the locking portion 5013 in the direction B against a biasing force of the biasing portion 5015 by the rotating force of the upper disk roller 201, to be thus smoothly contained in the containing portion 5011 of the first stocker 501.

Figure 34:
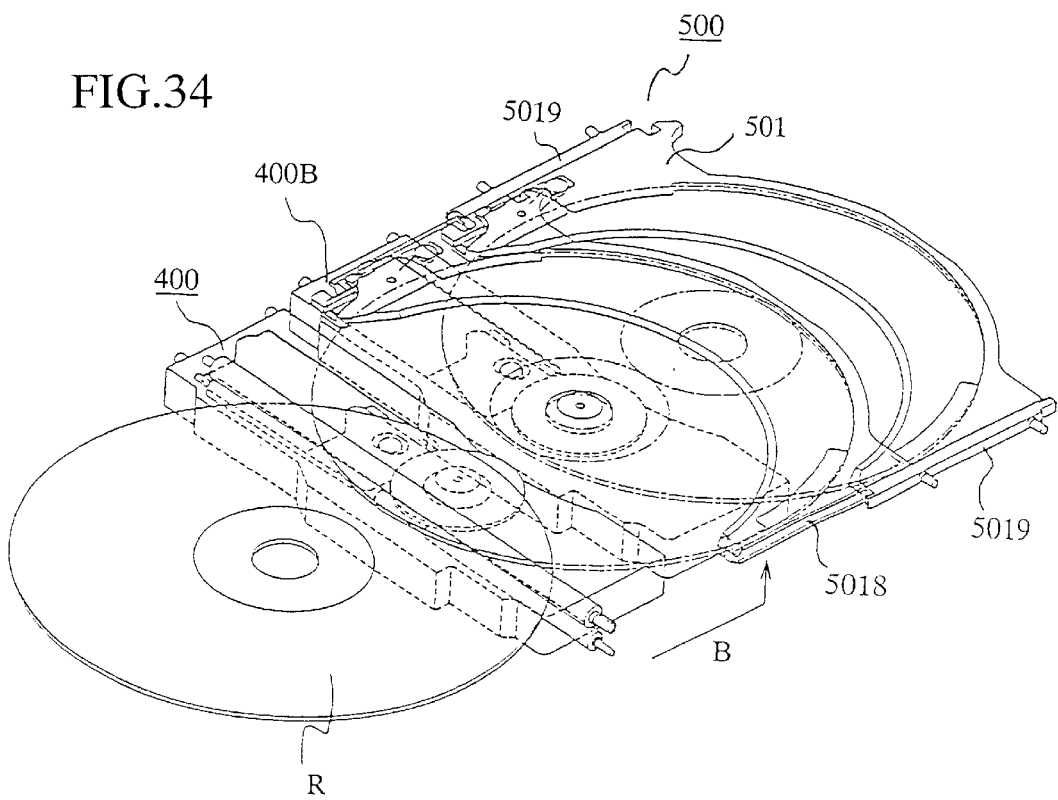
FIG. 34 is a view illustrating a schematic operation of the essential portion of the disk system shown in FIG. 1.

Next, as shown in FIG. 34, when a command allowing reproducing of the disk R is supplied from the operating portion (not shown), the disk mounting portion 400 is moved in the direction B and is set at a position 400B shown by a broken line.

Figure 35:
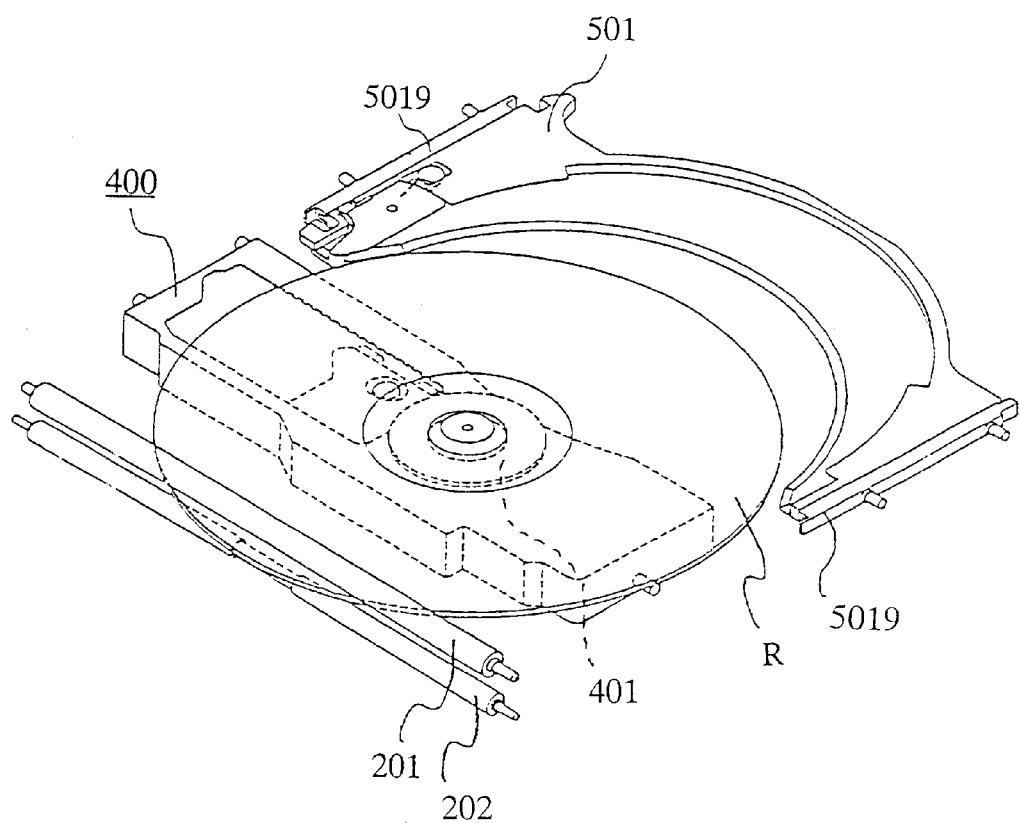
FIG. 35 is a view illustrating a schematic operation of the essential portion of the disk system shown in FIG. 1.

The state in which the above setting is completed is shown in FIG. 35.

Next, the driving mechanism portion 510 will be described with reference to FIG. 36.

Figure 36:
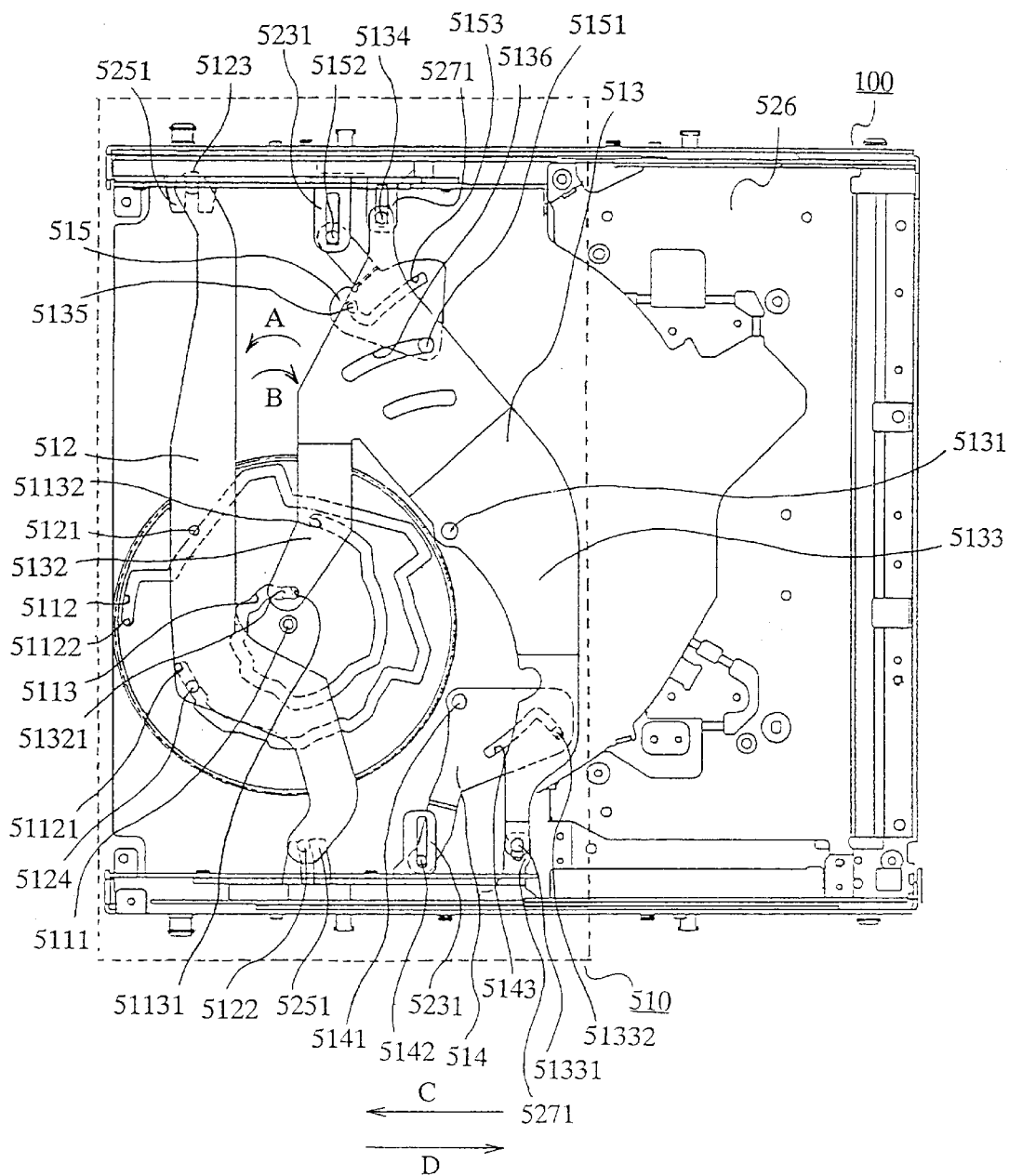
FIG. 36 is a top view showing a configuration of an essential portion of the disk containing mechanism of the disk system shown in FIG. 1.

FIG. 36 is a top view showing the driving mechanism portion and its peripheral configuration.

The driving mechanism portion 510 is a mechanism for moving the stockers 501 to 504 in the vertical direction or the direction C or D by operating each arm portion, and for moving the base portion 451 in the vertical direction.

The mechanism for moving the first stocker 501 to the fourth stocker 504 in the direction C or D may be provided on the base portions 306 and 451.

In FIG. 36, reference numeral 511 is a cam portion which is rotated in the direction A or B around a rotating shaft 5111 on the basis of driving of a driving portion (not shown) provided on the housing 100. An outer peripheral sliding hole 5112 is formed in an outer peripheral surface of the cam portion 511, and an inner peripheral sliding hole 5113 is formed in an inner peripheral surface of the cam portion 511.

Reference numeral 512 indicates a first arm portion which includes a shaft portion 5121 turnably supported by a portion (not shown) of the housing 100 located at a higher position; a pin 5122 connected to one end of a second cam plate (which will be described later); and a pin 5123 connected to the other end of the second cam plate; and a pin 5124 slidably inserted in the outer peripheral sliding hole 5112 of the cam portion 511.

The disk reproducing portion 400 has a mechanism in which the base portion 451 contained in and connected to the disk reproducing portion 400 is moved in the vertical direction.

Reference numeral 513 indicates a second arm portion turnable around a shaft portion 5131. One side of the second arm portion 513 is branched into a cam arm 5132 and a plate arm 5133. At one end of the cam arm 5132 is formed a pin 51321 slidably inserted in the inner peripheral sliding hole 5113 of the cam portion 511. At one end of the plate arm 5133 is formed a pin 51331 connected to one end of the first cam plate (which will be described later). At a portion of the plate arm 5133 is formed a pin 51332 slid in a sliding hole 5143 (which will be described later) of a third arm portion 514.

Further, the other side of the second arm portion 513 has a pin 5134 connected to the other end of the first cam plate; a pin 5135 slid in a sliding hole 5153 (which will be described later) of a fourth arm portion 515; and a hole 5136 for preventing the contact with a turning shaft 5151 (which will be described later) of the fourth arm portion 515.

Reference numeral 514 indicates the third arm portion which is formed in such a manner as to be turnable around a turning shaft 5141. On end of the third arm portion 514 has a pin 5142 connected to one end of the third cam plate (which will be described later) and the sliding hole 5143 in which the pin 51332 of the second arm portion 512 is slid.

Reference numeral 515 indicates the fourth arm portion which is formed in such a manner as to be turnable around a rotating shaft 5151. On end of the fourth arm portion has a pin 5152 connected to one end of the third cam plate (which will be described later) and the sliding hole 5153 in which the pin 5135 of the second arm portion 512 is slid.

The above-described cam portion 511, first arm portion 512, second arm portion 513, third arm portion 514, and fourth arm portion 515 constitute the driving mechanism portion 510.

With the driving mechanism portion 510 having the above configuration, the first arm portion 512 to the fourth arm portion 515 are moved in the direction C or D by a turning force of the cam portion 511, and thereby they can be set at desired positions on the basis of a turning angle of the cam portion 511.

Next, the moving mechanism portion 520 will be described with reference to FIGS. 37a to 38g.

Figure 37A:
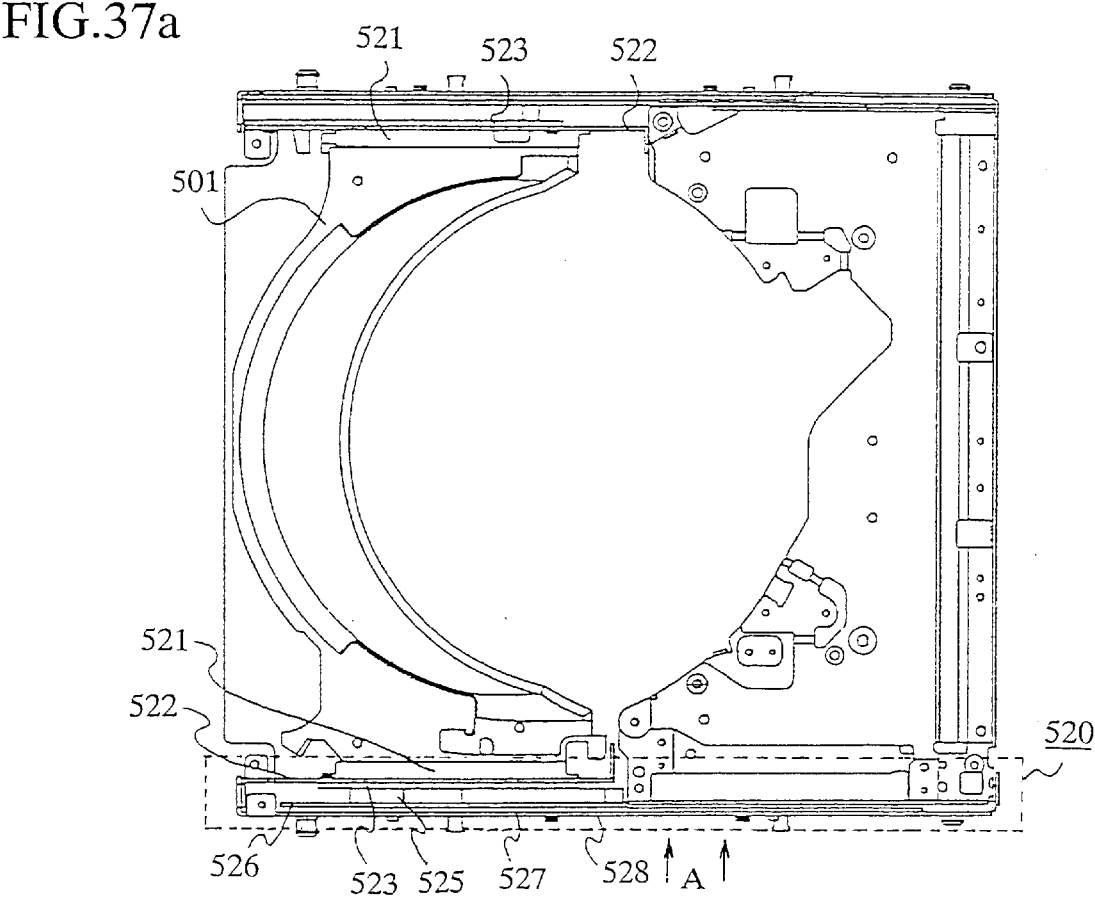
FIGS. 37a–37c are a top view and an exploded view respectively, showing a configuration of the essential portion of the disk containing mechanism of the disk system shown in FIG. 1.
Figure 37B:
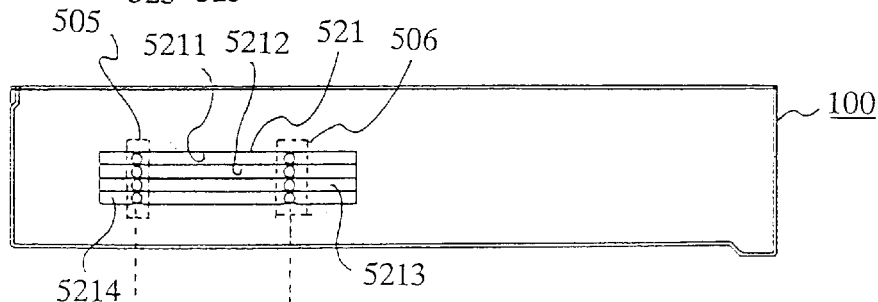
Figure 37C:
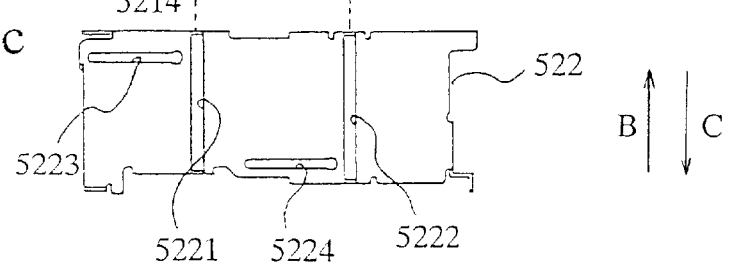

FIGS. 37a is a sectional top view showing an essential portion of the moving mechanism portion 520; and FIG. 37a and FIGS. 38a to 38g are side views seen from the direction A in FIG. 37a showing all of the members of the moving mechanism portion 520.

The moving mechanism portion 520 is a mechanism for adjusting a height of each of the first stocker to the fourth stocker, a gap between the stockers, and the like on the basis of a driving force transmitted from the driving mechanism portion 510.

In FIGS. 37a to 39c, reference numeral 5019 indicates a rail portion, provided in the housing 100, for allowing the first stocker 501 to the fourth stocker 504 to be moved in parallel to a disk carrying passage. The rail portion 5019 has projecting portions 505 and 506.

Reference numeral 522 indicates a stocker base which includes a guide portion 5221 for guiding the projecting portions 505 of a first rail portion to a fourth rail portion in the direction B or C, that is, in the direction of the stocker; a guide portion 5222 for guiding the projecting portions 506 of the first stocker to the fourth stocker in the direction B or C like the guide portion 5221; a guide portion 5223 for guiding a pin 5234 (which will be described later) of the third cam plate 523 in the direction D or E; and a guide portion 5224 for guiding a pin 5235 (which will be described later) of the third cam plate 523 in the direction D or E.

Reference numeral 523 indicates the third cam plate which includes a connecting portion 5231 connected to the pin 5142 of the third arm 514 shown in FIG. 36; a tilting guide portion 5232 in which the projecting portions 505 of the first rail portion to the fourth rail portion are inserted for adjustment of heights of the projecting portions 505; a tilting guide portion 5233 having a tilting portion for guiding the projecting portions 506 of the first stocker to the fourth stocker inserted in the tilting guide portion 5233; a pin 5234 slidably inserted in the guide portion 5223 of the stocker base 522; and a pin 5235 slidably inserted in the guide portion 5224 of the stocker base 522.

Reference numeral 524 indicates a stocker separating portion composed of a stocker separating portion 5241 and a stocker separating portion 5242. The stocker separating portion 5241 is contained in a containing portion 5254 (which will be described later) of a second cam plate 525 and is adapted to separate a desired stocker by movement of the second cam plate 525. Similarly, the stocker separating portion 5242 is contained in a containing portion 5255 of the second cam plate 525 and is adapted to separate a desired stocker by movement of the second cam plate 525.

Reference numeral 525 indicates the second cam plate includes a height adjusting portion 5252, part of which is formed in a comb-shape 52521, into which the projecting portions 505 of the first rail portion to the fourth rail portion are inserted for adjustment of heights of the projecting portions 505; a height adjusting portion 5253, part of which is formed in a comb-shape 52531, into which the projecting portions 506 of the first rail portion to the fourth rail portion are inserted for adjustment of heights of the projecting portions 506; the containing portion 5254 for containing the stocker separating portion 5241; and the containing portion 5255 for containing the stocker separating portion 5242.

Reference numeral 526 indicates a base portion which forms a side wall of the base portion 451. As illustrated in FIGS. 38*a*–38*g* and 39*a*–39*c*, the base portion 526 includes a sliding hole 5261 in which a sliding portion 5245 of the stocker separating portion 5241 is inserted in such a manner as to be slidably moved in the direction D or E; a sliding hole 5262 in which a sliding portion 5246 of the stocker separating portion 5242 is inserted in such a manner as to be slidably moved in the direction D or E; sliding holes 5263 and 5264 in which projecting portions (not shown) formed on the operating mechanism portion 450 shown in FIGS. 18*a* and 18*b* for sliding movement of the operating mechanism portion 450 in the direction D or E of FIG. 38; a pin 5265 inserted both in a sliding hole 5272 (which will be described later) of a first cam plate 527 and a sliding hole 5281 (which will be described later) formed in a side base 528 in such a manner as to be slidably moved in the direction F or G; and a pin 5266 inserted both in a sliding hole 5273 (which will be described later) of the first cam plate 528 and a sliding hole 5282 (which will be described later) formed in the side base 528 in such a manner as to be slidably moved in the direction F or G.

Reference numeral 527 indicates the first cam plate which includes a connecting portion 5271 connected to a pin 51331 formed on the plate arm 5133 shown in FIG. 36 for moving the first cam plate 527 in the direction D or E (FIG. 38*e*) on the basis of the motion of the plate arm 5133; a sliding hole 5272 in which the pin 5265 (which will be described later) formed on the base portion 526 is inserted in such a manner as to be slidably moved in the direction F or G; a sliding hole 5273 in which the pin 5266 (which will be described later) formed on the base portion 526 is inserted in such a manner as to be slidably moved in the direction F or G; a pin 5274 inserted in a sliding hole 5283 (which will be described later) formed in the side base 528 in such a manner as to be slidably moved in the direction D or E; and a pin 5275 inserted in a sliding hole 5284 (which will be described later) formed in the side base portion 528 in such a manner as to be slidably moved in the direction D or E.

Reference numeral 528 indicates the side base portion which forms a side wall of the housing 100. The side base portion 528 includes the sliding hole 5281 in which the pin 5265 formed on the base portion 526 is inserted in such a manner as to be slidably moved in the direction F or G; the sliding hole 5282 in which the pin 5266 formed on the base portion 526 is inserted in such a manner as to be slidably moved in the direction F or G; the sliding hole 5283 in which the pin 5274 formed on the first cam plate 527 is inserted in such a manner as to be slidably moved in the direction D or E; and the sliding hole 5284 in which the pin 5275 formed on the first cam plate 527 is inserted in such a manner as to be slidably moved in the direction D or E.

In addition, the side base portion 528 is mounted on the housing 100.

The components described in the order of the rail portion 521 to the side base 527 are mounted from the inside to the outside of the disk system in the order of the rail portion 521, stocker base 522, third cam plate 523 including the stocker separating portion 524, second cam plate 525, base portion 526, first cam plate 527, and side base 528.

These rail portion 521, stocker base 522, third cam plate 523, stocker separating portion 524, second cam plate 525, base portion 526, first cam plate 527, and side base 528 constitute the moving mechanism portion 520.

With this moving mechanism portion 520 having the above configuration, the height of each stocker can be adjusted and also a desired stocker can be certainly separated by a plurality of the cam plates on the basis of the motion of the driving mechanism portion 510.

Next, there will be described an operational mode of the moving mechanism portion 520 on the basis of a relationship between the sliding holes formed in the first cam plate 527, second cam plate 525, and third cam plate 523, and the projecting portions formed on the rail portions, with reference to FIGS. 39*a* to 63*e*.

Figure 39A:
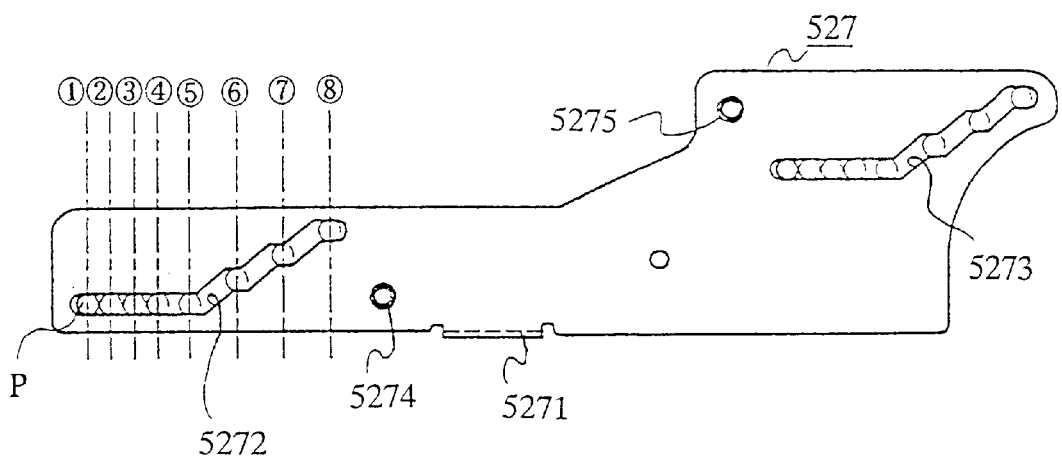
FIGS. 39a to 39c are views each illustrating an operation of the essential portion of the disk containing mechanism shown in FIGS. 38a to 38g.
Figure 39B:
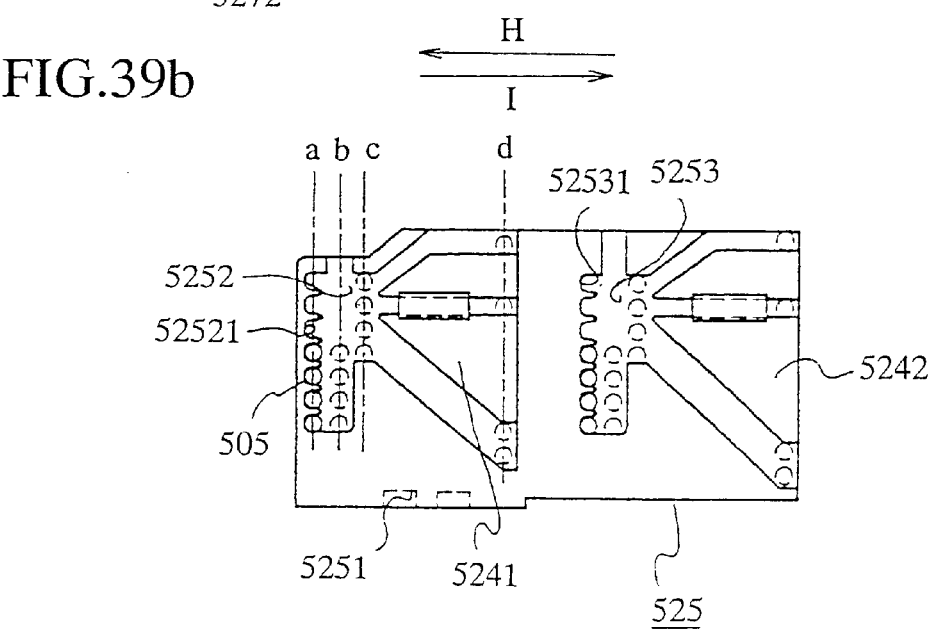
Figure 39C:
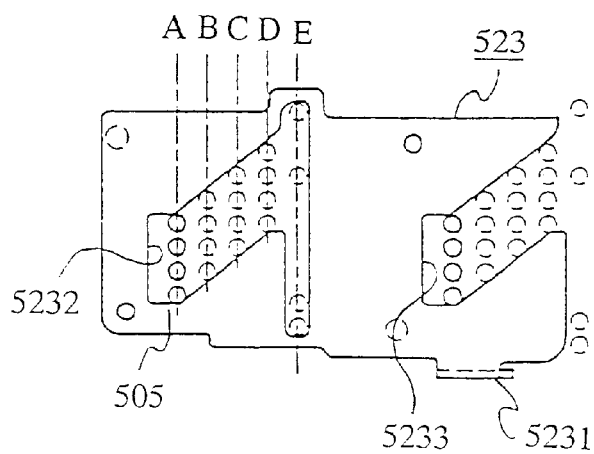

FIG. 39*a* is a detail view illustrating the first cam plate 527; FIG. 39*b* is a detail view illustrating the second cam plate 525 provided with the stocker separating portion 524; and FIG. 39*c* is a detail view illustrating the third cam plate 523.

FIG. 40 is a table showing operational states of the first cam plate 527, second cam plate 525 and the third cam plate 523 on the basis of the motion of the cam portion 511 of the driving mechanism portion 510; and FIG. 41 is a table showing positions of the projecting portions of the rail portions 521 at the first cam plate 527, second cam plate 525 and the third cam plate 523, in accordance with the operations shown in FIG. 40, respectively.

FIG. 42*a* to FIG. 63*e* are views showing positional relationships between the first cam plate 527, second cam plate 525 and third cam plate 523, and the projecting portions of the rail portions shown in FIG. 41.

Figure 42A:
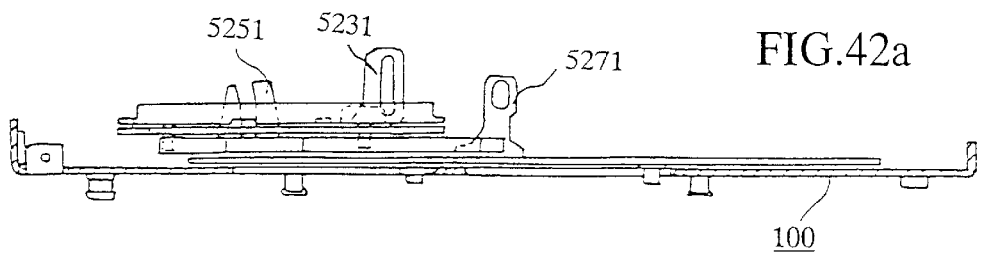
FIGS. 42a to 42e are views showing an operational state of the essential portions of the disk containing mechanism shown in FIGS. 36 to 38g.
Figure 42B:
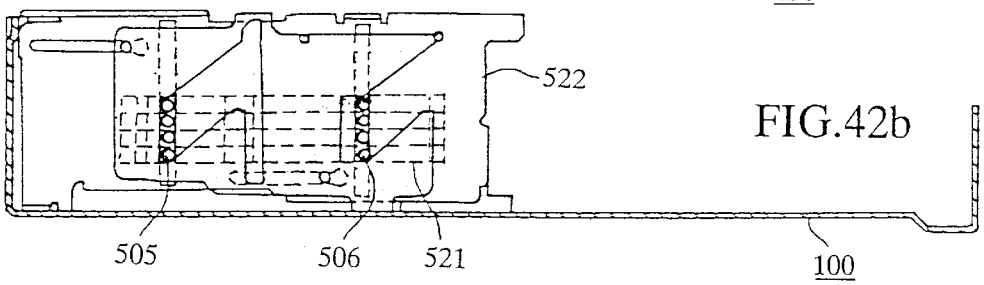
Figure 42C:
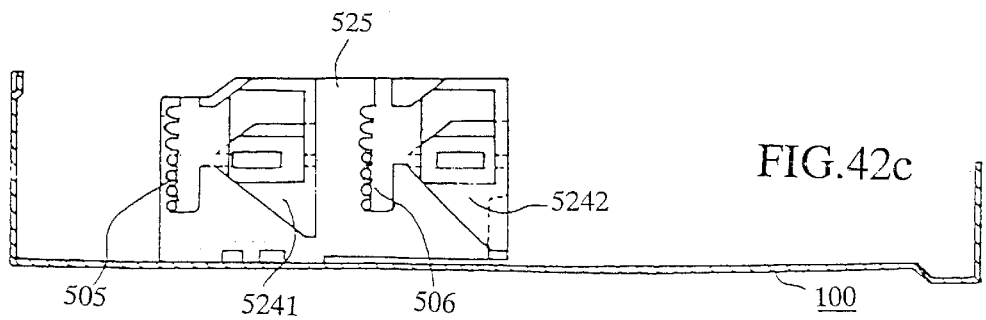
Figure 42D:
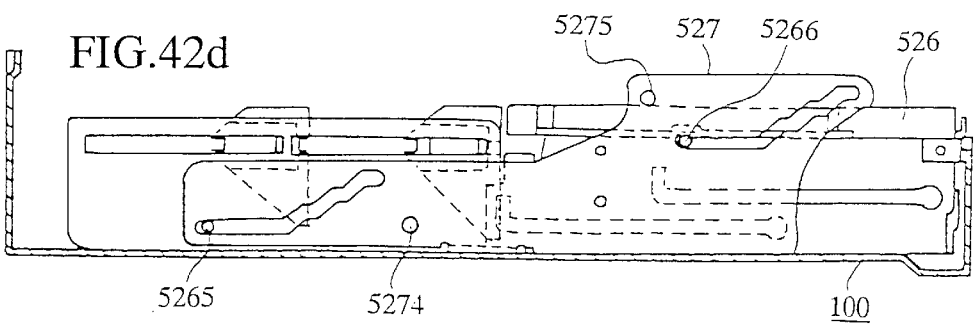
Figure 42E:
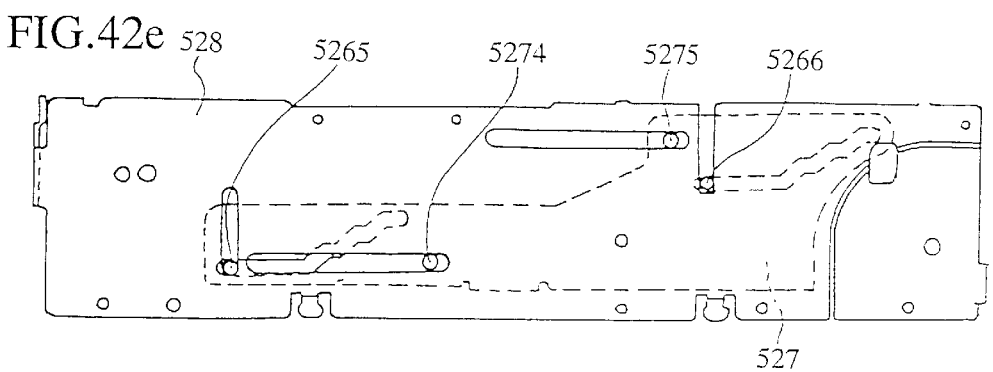
Figure 43A:
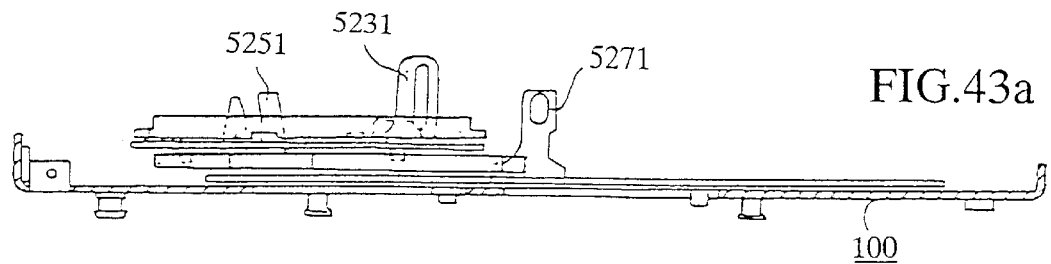
FIGS. 43a to 43e are views showing an operational state of the essential portions of the disk containing mechanism shown in FIGS. 36 to 38g.
Figure 43B:
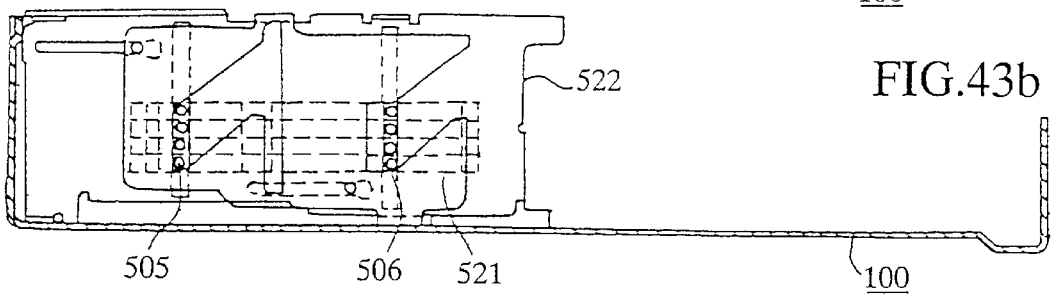
Figure 43C:
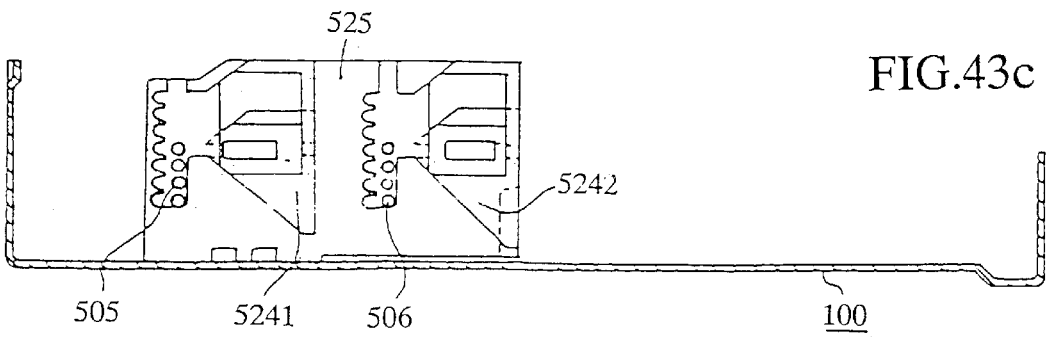
Figure 43D:
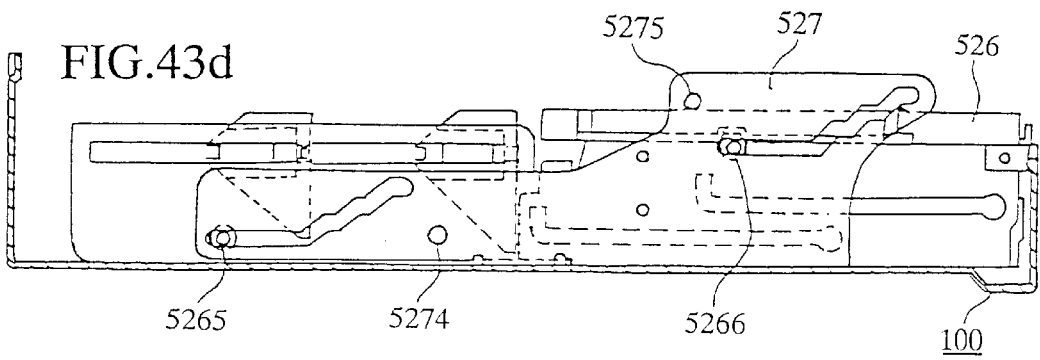
Figure 43E:
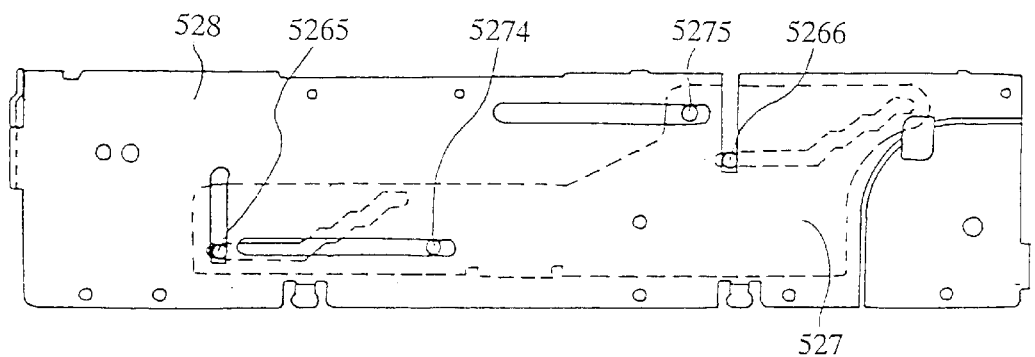
Figure 44A:
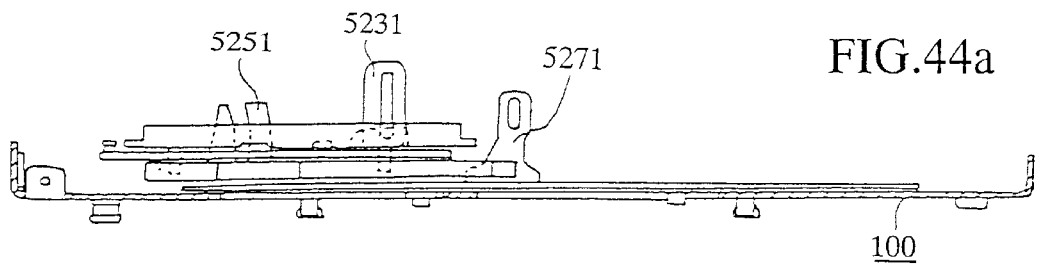
FIGS. 44a to 44e are views showing an operational state of the essential portions of the disk containing mechanism shown in FIGS. 36 to 38g.
Figure 44B:
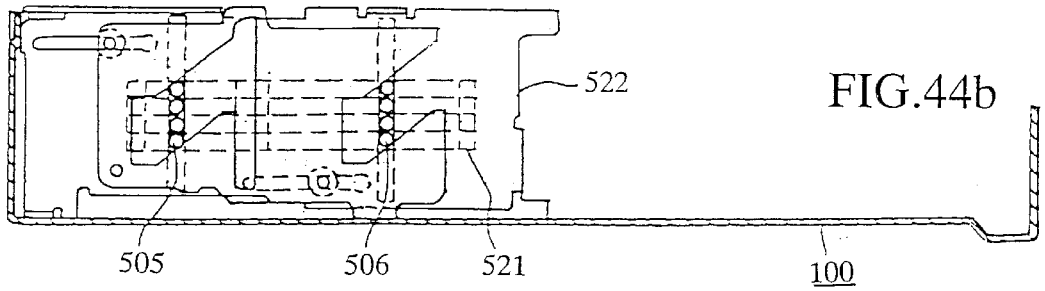
Figure 44C:
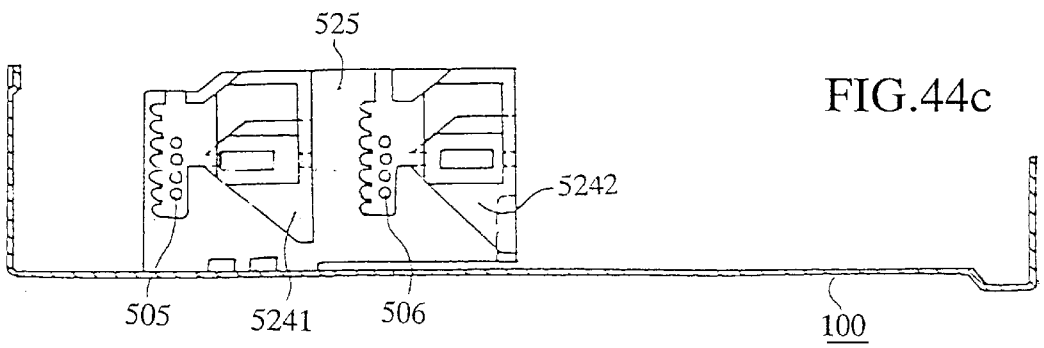
Figure 44D:
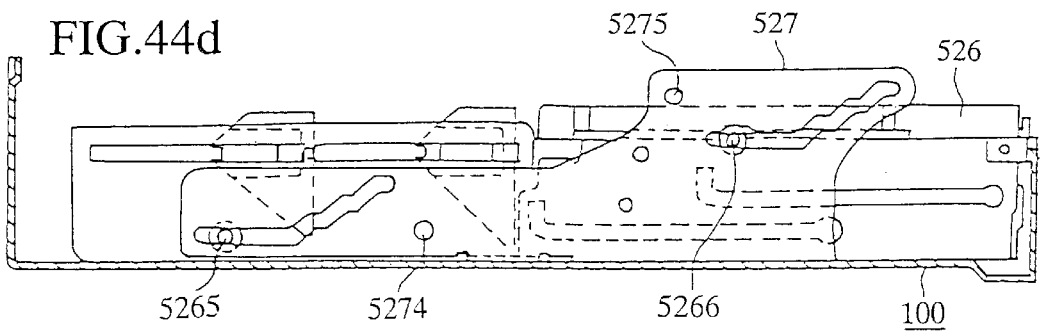
Figure 44E:
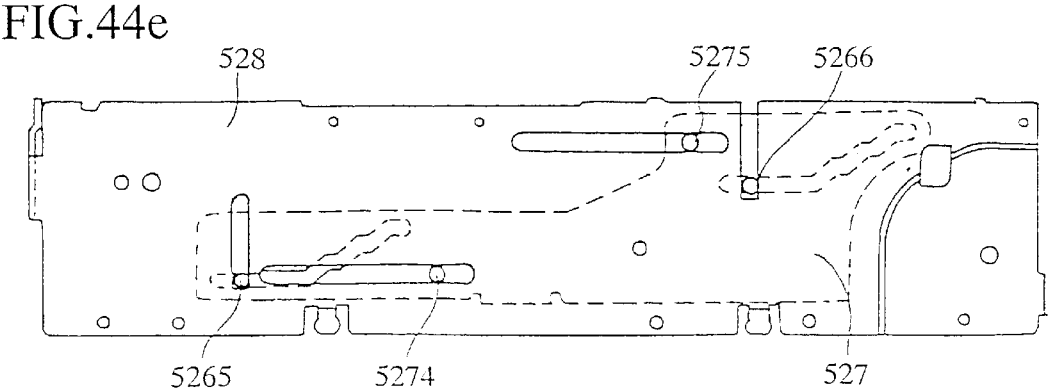
Figure 45A:
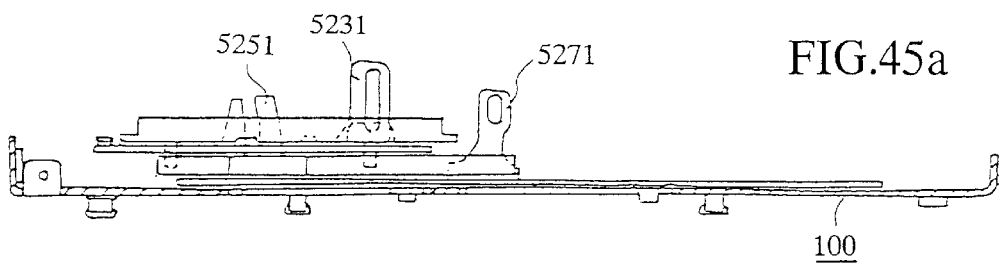
FIGS. 45a to 45e are views showing an operational state of the essential portions of the disk containing mechanism shown in FIGS. 36 to 38g.
Figure 45B:
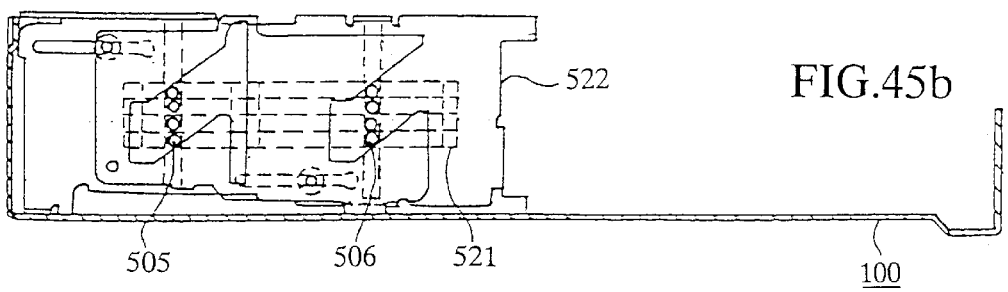
Figure 45C:
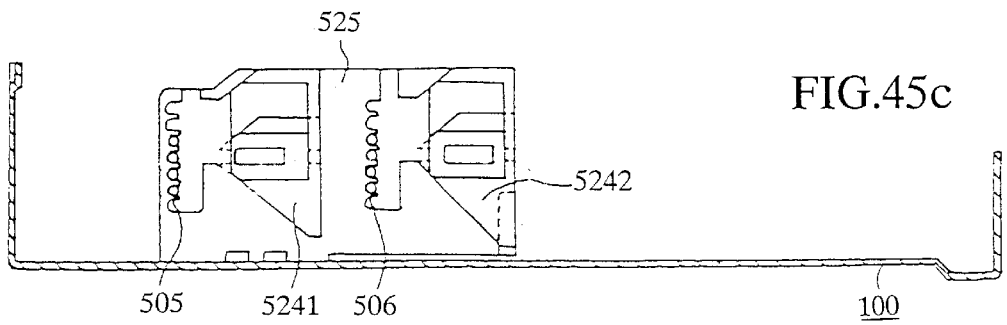
Figure 45D:
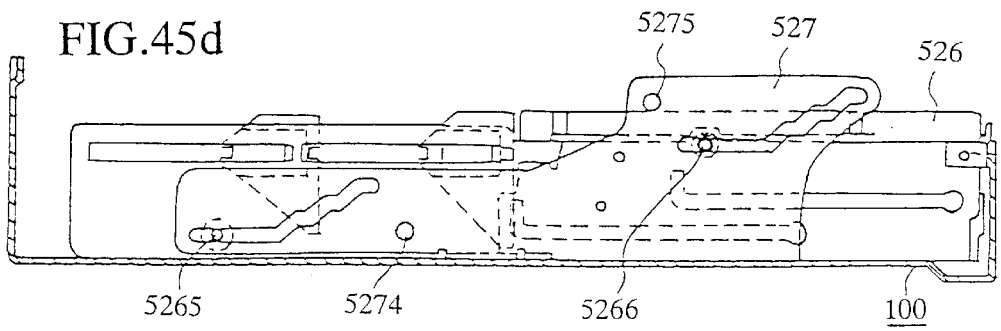
Figure 45E:
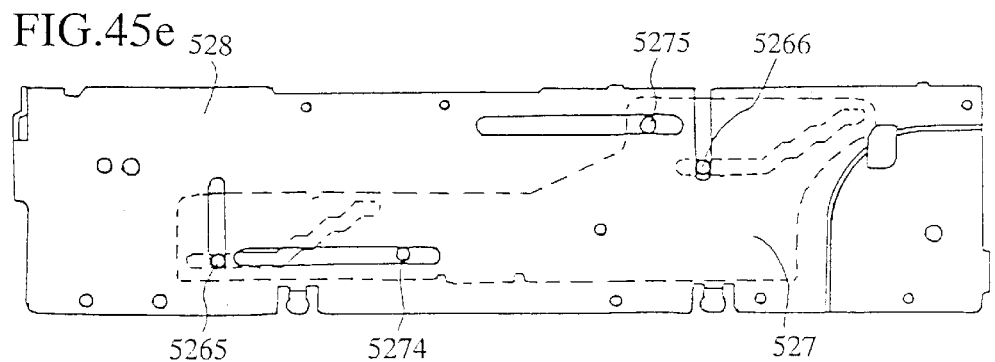
Figure 46A:
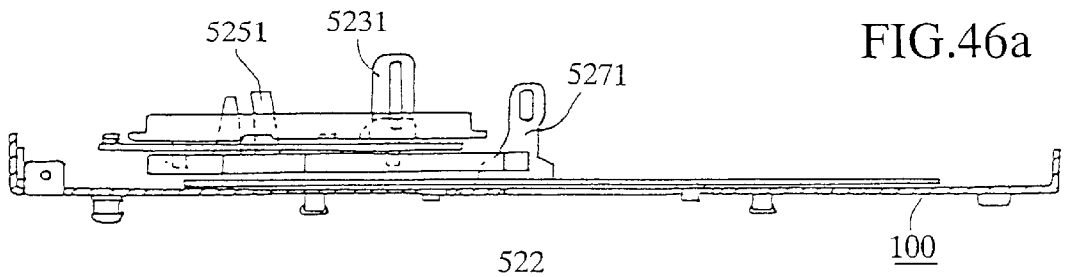
FIGS. 46a to 46e are views showing an operational state of the essential portions of the disk containing mechanism shown in FIGS. 36 to 38g.
Figure 46B:
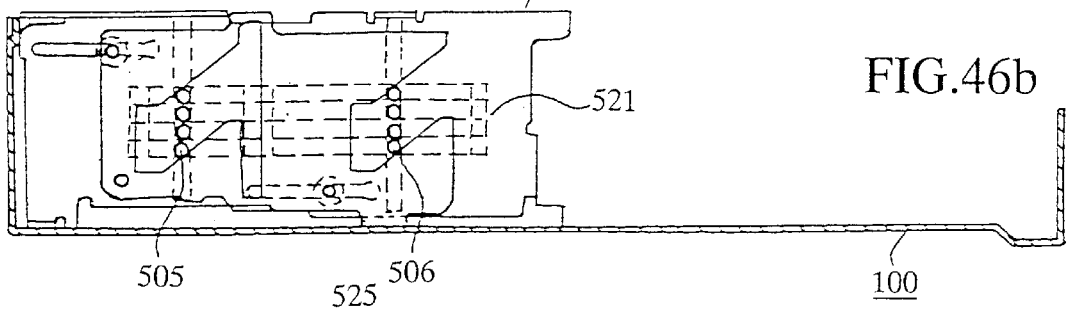
Figure 46C:
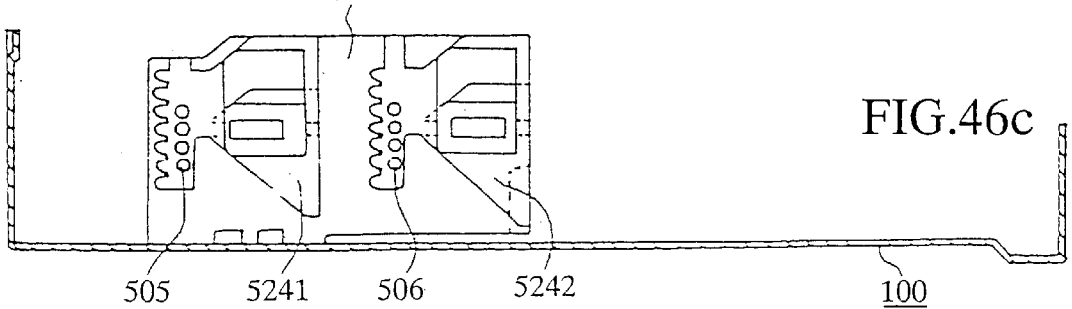
Figure 46D:
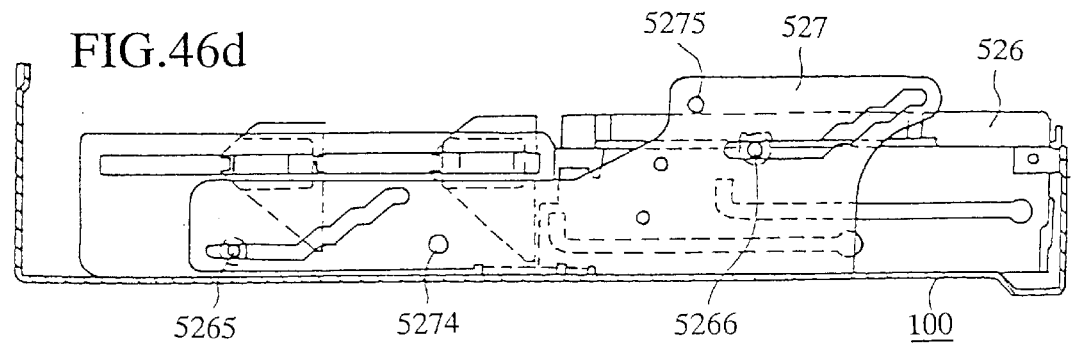
Figure 46E:
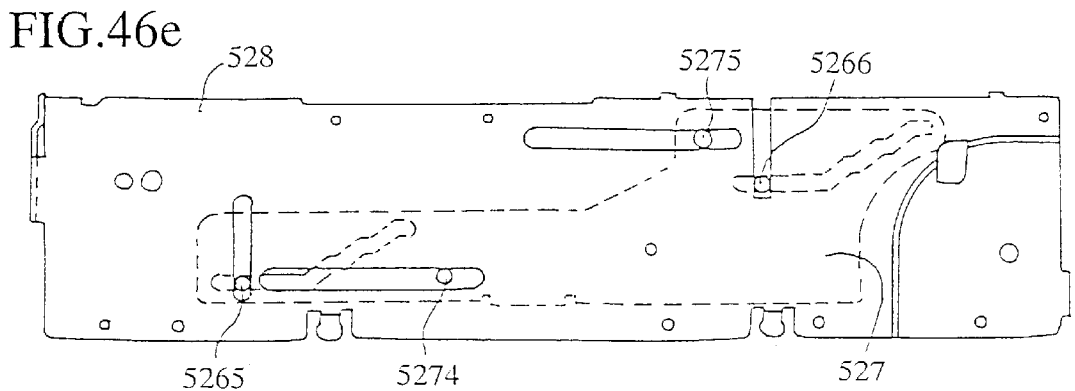
Figure 47A:
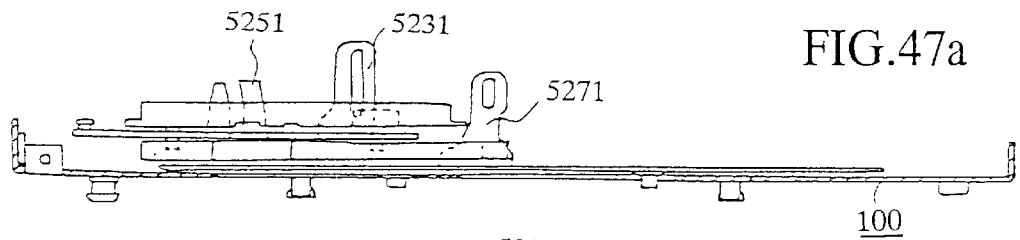
FIGS. 47a to 47e are views showing an operational state of the essential portions of the disk containing mechanism shown in FIGS. 36 to 38g.
Figure 47B:
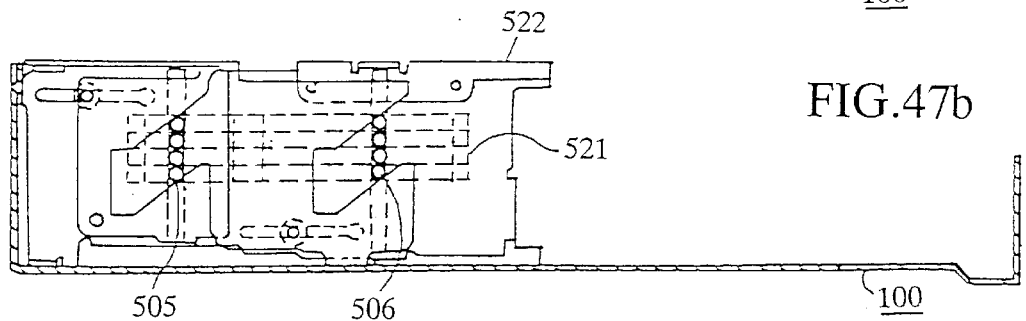
Figure 47C:
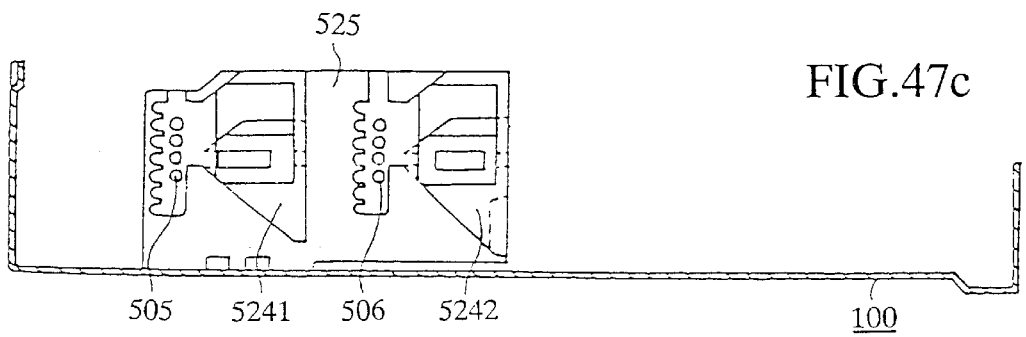
Figure 47D:
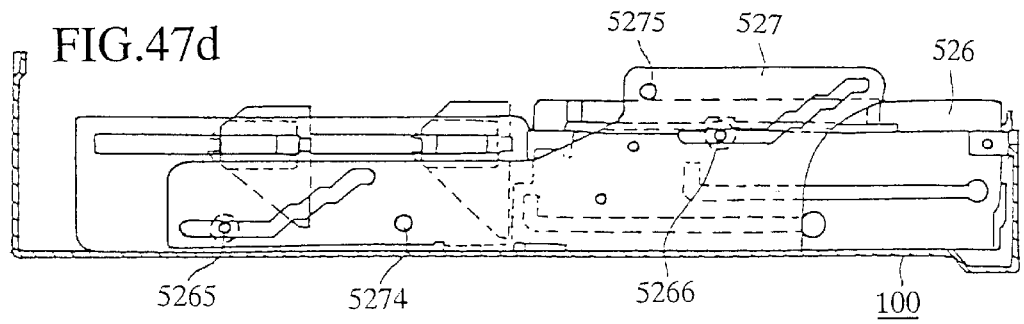
Figure 47E:
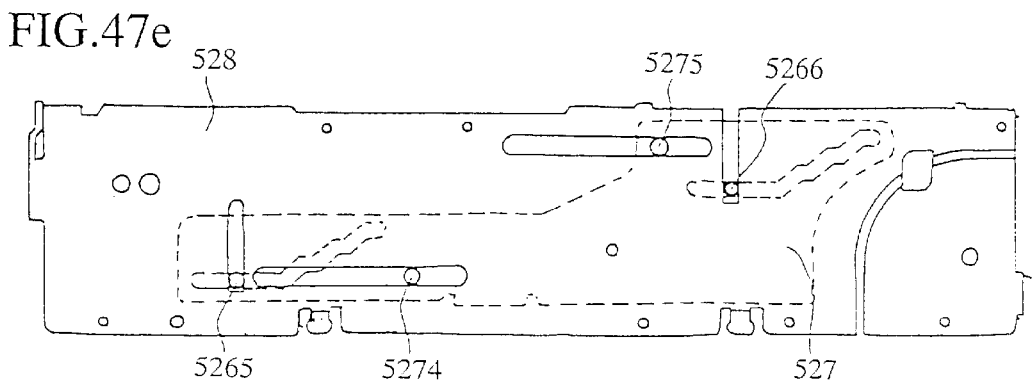
Figure 48A:
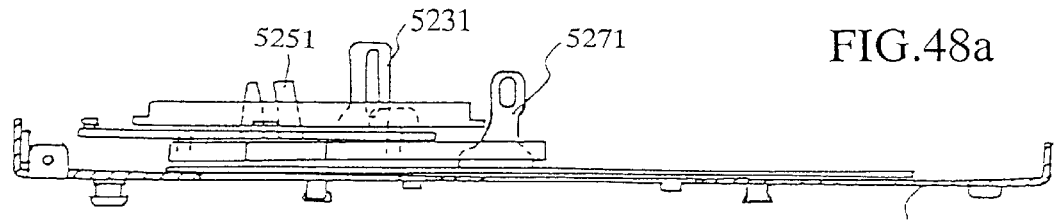
FIGS. 48a to 48e are views showing an operational state of the essential portions of the disk containing mechanism shown in FIGS. 36 to 38g.
Figure 48B:
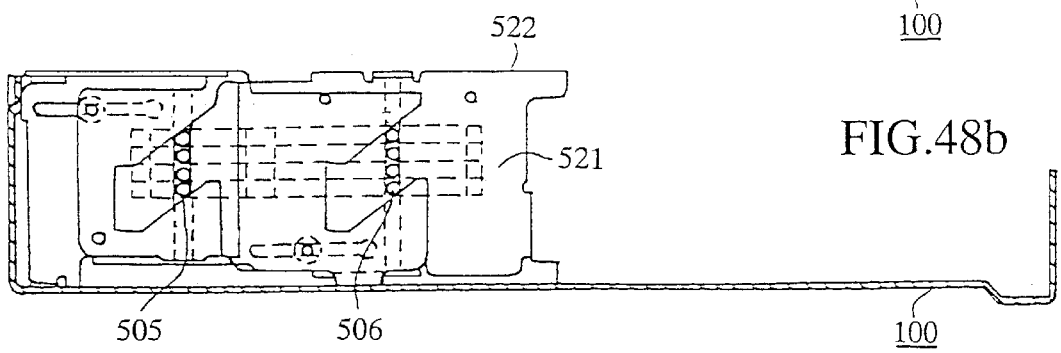
Figure 48C:
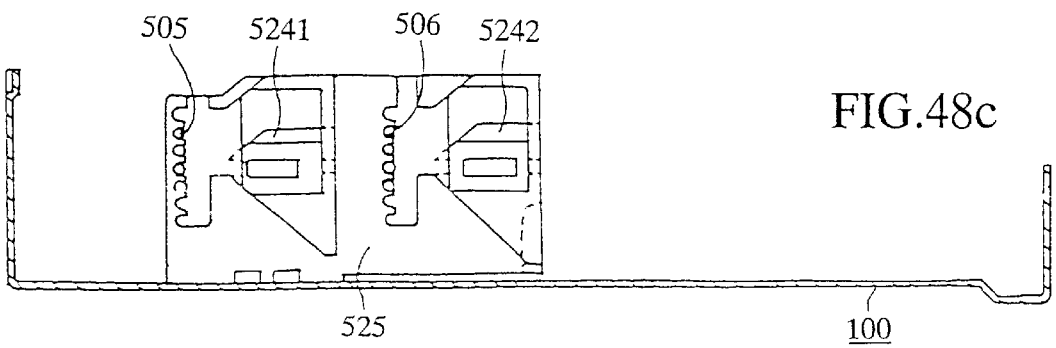
Figure 48D:
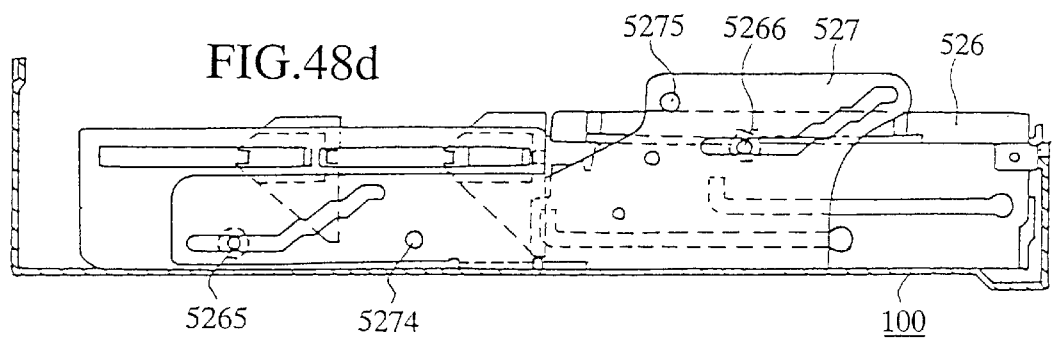
Figure 48E:
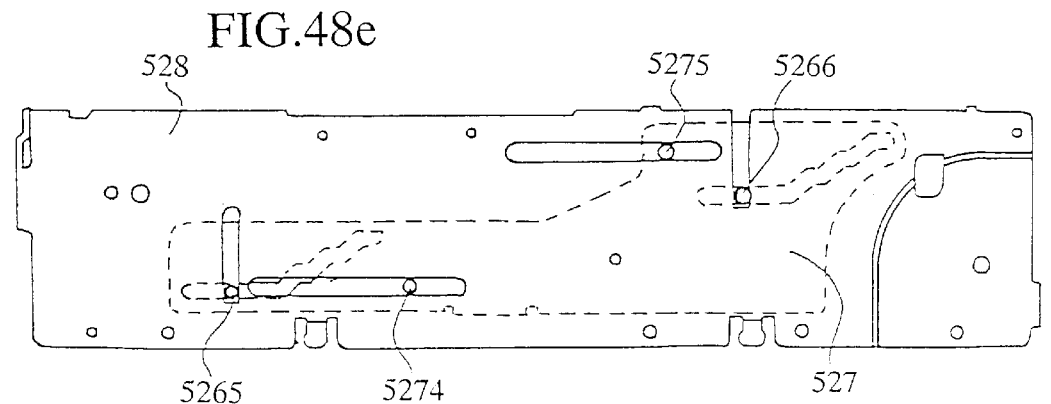
Figure 49A:
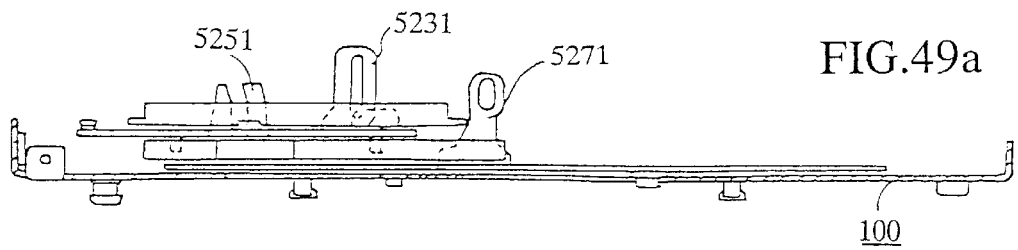
FIGS. 49a to 49e are views showing an operational state of the essential portions of the disk containing mechanism shown in FIGS. 36 to 38g.
Figure 49B:
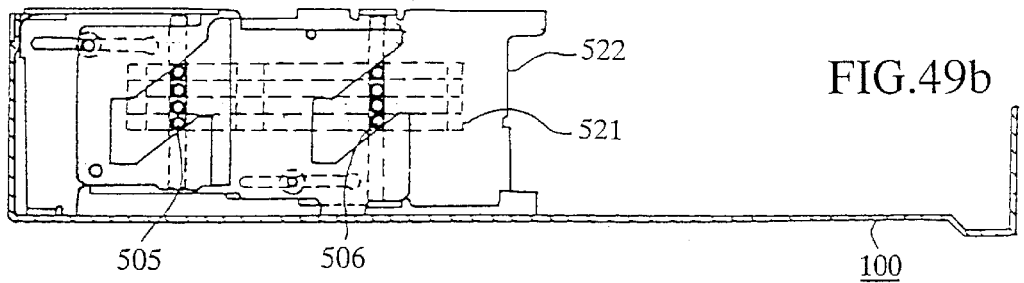
Figure 49C:
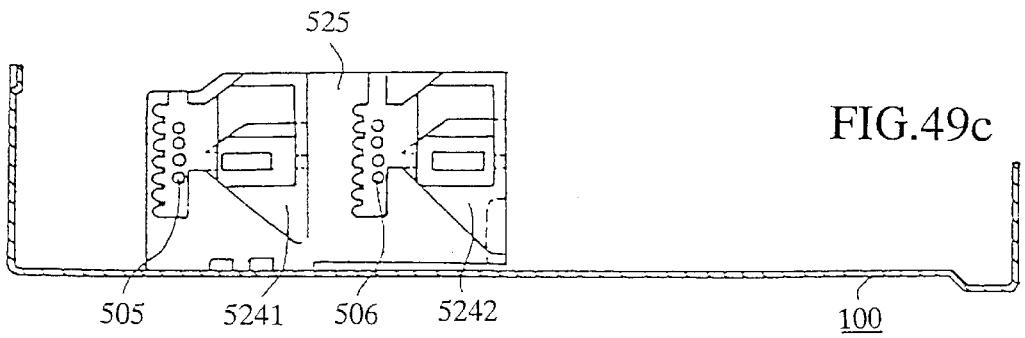
Figure 49D:
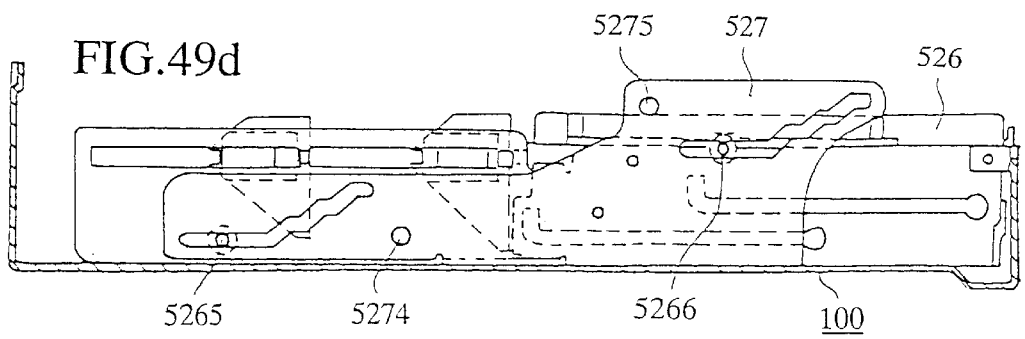
Figure 49E:
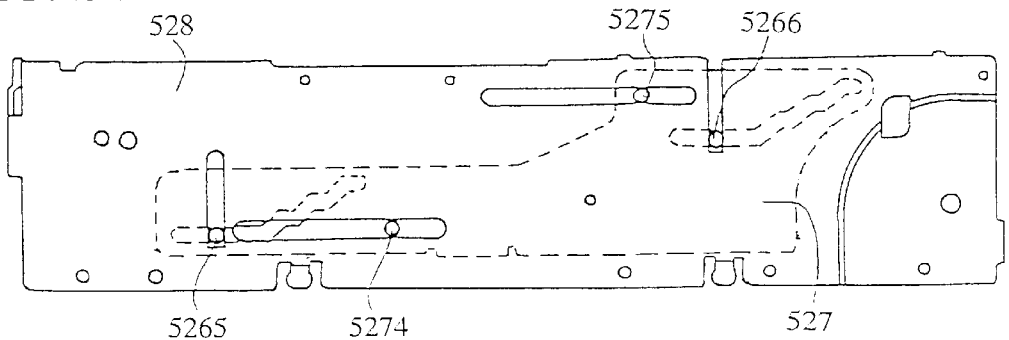
Figure 52A:
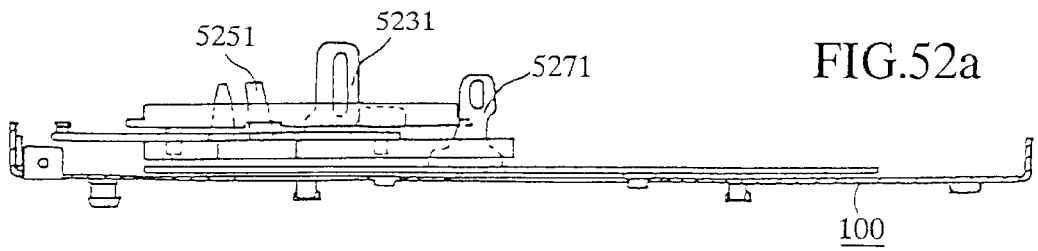
FIGS. 52a to 52e are views showing an operational state of the essential portions of the disk containing mechanism shown in FIGS. 36 to 38g.
Figure 52B:
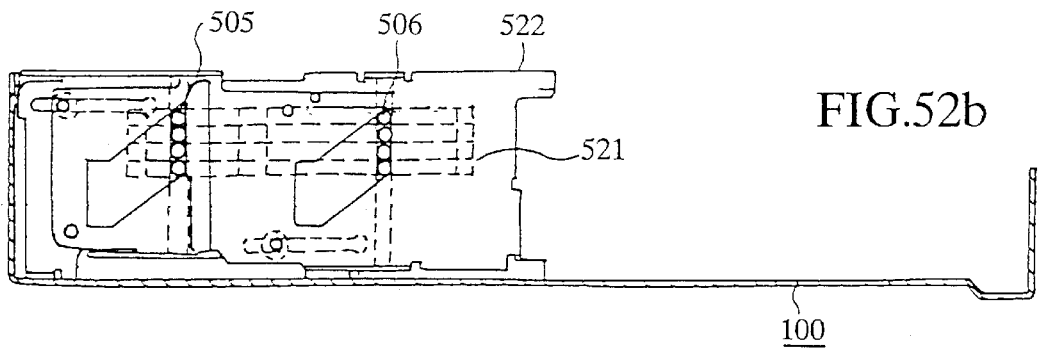
Figure 52C:
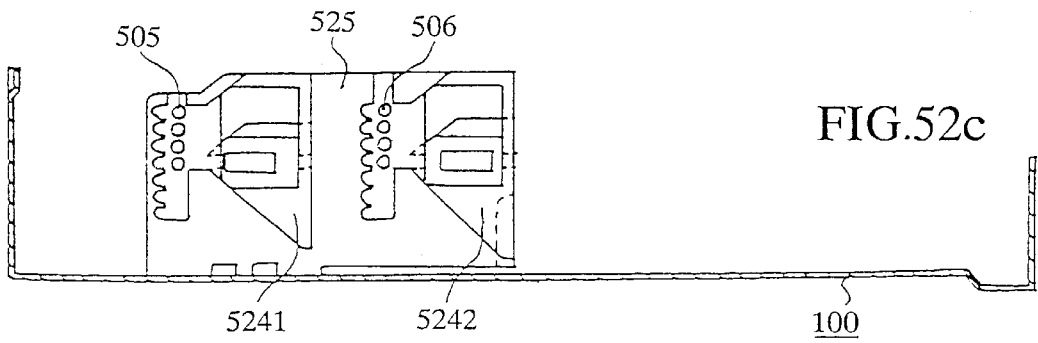
Figure 52D:
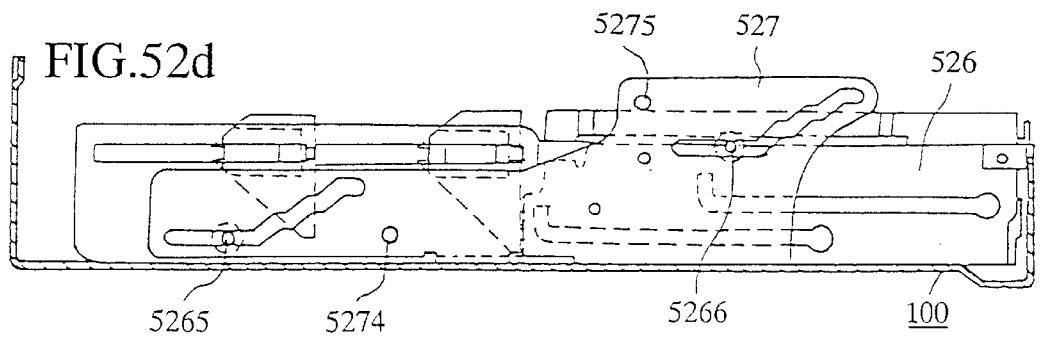
Figure 52E:
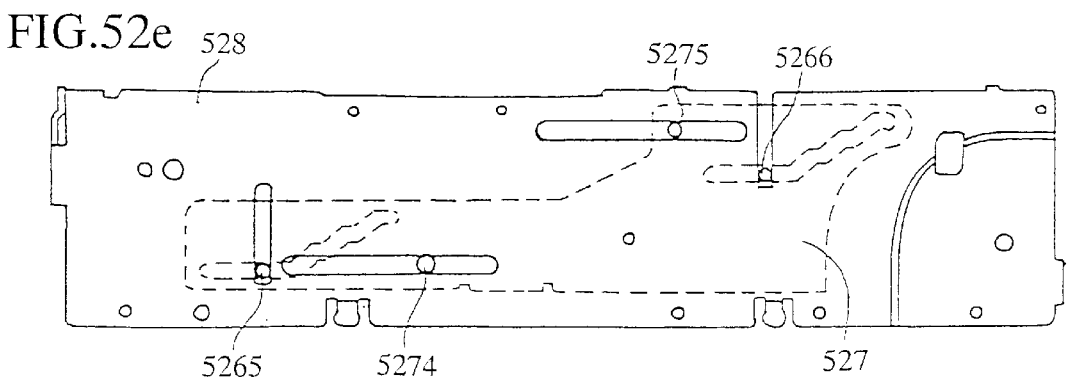
Figure 53A:
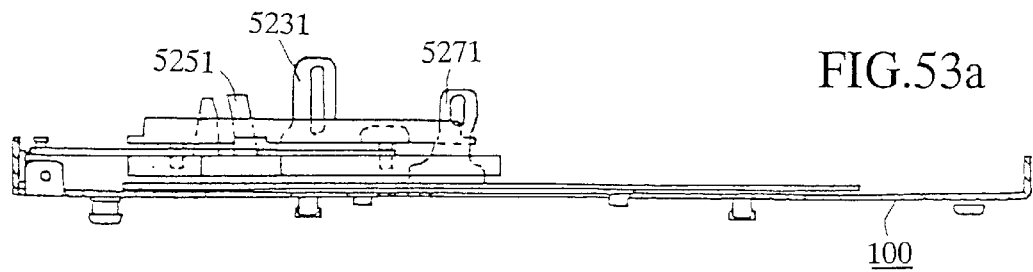
FIGS. 53a to 53e are views showing an operational state of the essential portions of the disk containing mechanism shown in FIGS. 36 to 38g.
Figure 53B:
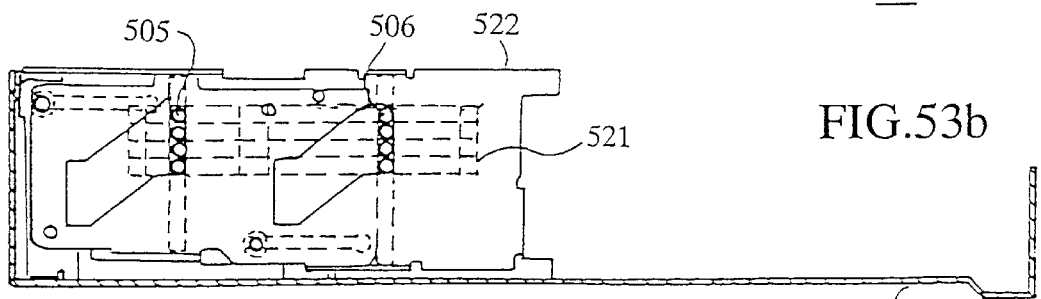
Figure 53C:
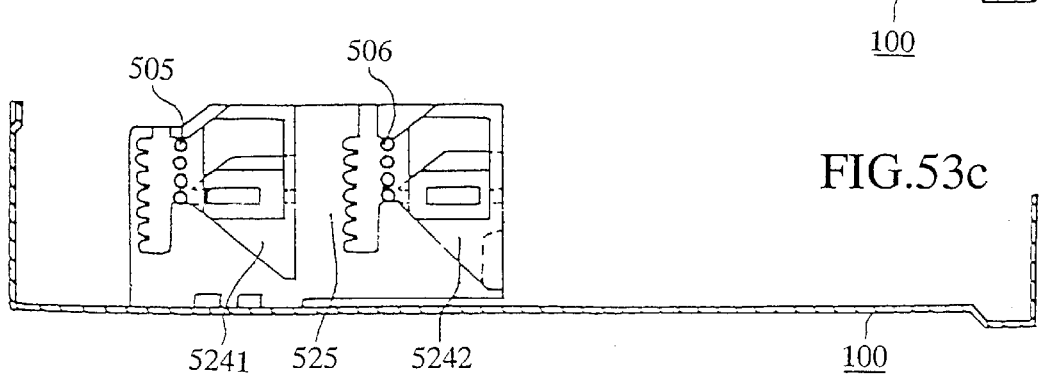
Figure 53D:
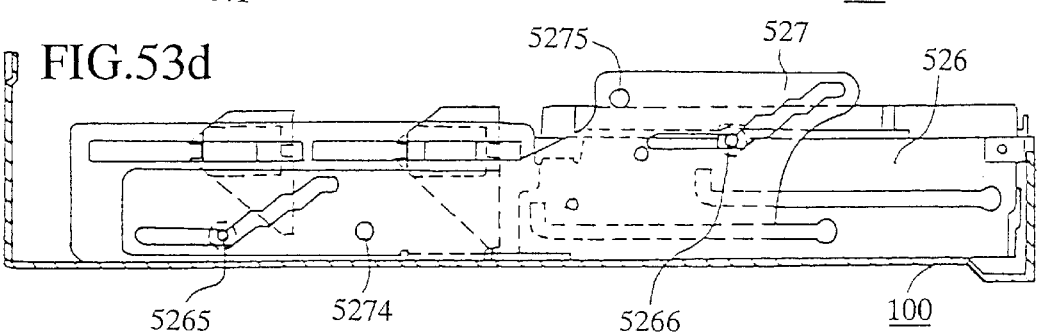
Figure 53E:
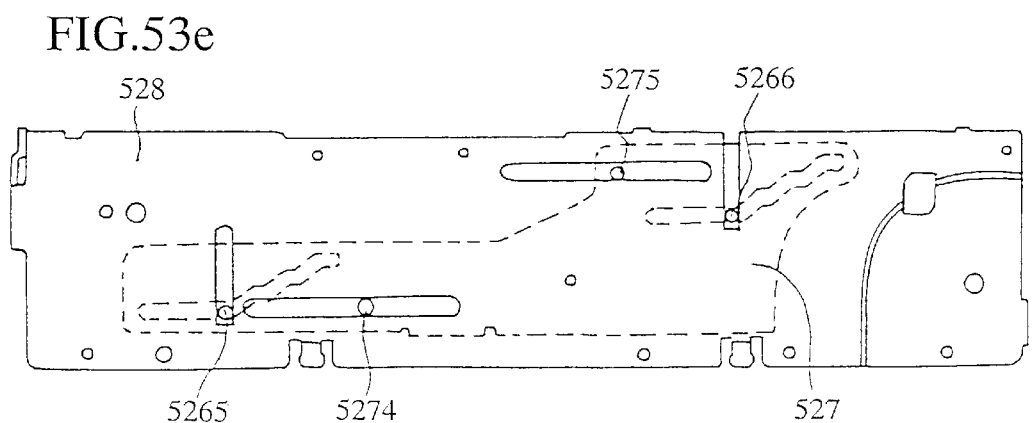

Each of FIGS. 42*a*, 43*a*, . . . , 63*a* shows a positional relationship between part of the driving mechanism portion 510 and positions of the respective connecting portions; each of FIGS. 42*b*, 43*b*, . . . , 63*b* shows a positional relationship between the guide portion 521 and the stocker base 522, and the projecting portions formed on the rail portions; each of FIGS. 42*c*, 43*c*, . . . , 63*c* shows a positional relationship between the second cam plate 525 provided with the stocker separating portion 524, and the projecting portions formed on the stocker; each of FIGS. 42*d*, 43*d*, . . . , 63*d* shows a positional relationship between the base portion 526 and the first cam plate 527, and the projecting portions formed on the stocker; and each of FIGS. 42*f*, 43*f*, . . . , 63*f* shows a positional relationship between the first cam plate 527 and the side portion 528, and the projecting portions formed on the rail portions 521.

The operation of the moving mechanism portion 520 will be described with reference to FIGS. 39*a* to 63*e*.

FIG. 39*a* shows setting positions for allowing specific operations of the disk system. As shown in this figure, eight setting positions "1" to "8" are formed by slidable movement of the pin 5265 provided on the base portion 526 in the sliding hole 5272 of the first cam plate 527.

FIG. 39b shows a setting position at which the disk system performs a specific operation. The height setting portion 5252 of the second cam plate 525 slidably moves a setting position of the projecting portion 505 of the rail portion 521 on the basis of the motion of the cam portion 511 of the driving mechanism portion 510, to determine the setting position "a", "b", "c" or "d". The setting position "a" is set at the comb-shaped portion 52521; the setting position "d" is set at a separating hole 52411 of the stocker separating portion; and the setting position "b" or "c" is set in the height adjusting portion 5252.

FIG. 39c shows a setting position at which the disk system performs a specific operation. The tilting guide portion 5232 of the third cam plate 523 slidably moves the projecting portion 505 of the rail portion 521 on the basis of the motion of the cam portion 511 of the driving mechanism portion 510, to thereby determine either of five setting positions.

With respect to the table of FIG. 40, the process in which the projecting portion of the stocker is slidably moved from one end 51121 to the other end 51122 of the outer peripheral sliding hole 5112 formed in the driving mechanism portion 510 and the projecting portion of the stocker is slidably moved from one end 51131 to the other end 51132 of the inner peripheral sliding hole 5113, is divided into 22 steps. The table of FIG. 40 shows, for each of the 22 steps thus divided from the process, a positional relationship between the first cam plate 527, second cam plate 525 and third cam plate 523 and the projecting portion of the stocker, and an operational mode of the disk system.

FIG. 41 shows, for each of the 22 steps divided from the operational process shown in FIG. 40, a positional relationship between the first cam plate 527, second cam plate 525, and the third cam plate 523, and the projecting portion of the stocker.

FIGS. 42a to 63e show the first step (hereinafter, referred to as a "NO1") to the 22th step (hereinafter, referred to as a "NO22") shown in FIGS. 40 and 41, respectively. To be more specific, FIGS. 42a to 42e show the step NO1 shown in FIGS. 40 and 41; FIGS. 63a to 63e show the step NO22; and FIGS. 43a–43e to FIGS. 62a–62e show the steps NO2 to NO21, respectively.

Hereinafter, operation of the moving mechanism portion 520 will be described in order for each step with reference to FIGS. 39a to 39c, and FIGS. 40 and 41.

First, the step NO1 shows an operational mode for carrying a disk R1 into the first stocker 501. In third mode, as shown in FIG. 40, the first cam plate is set at a position "1", the second cam plate is set a position "a", and the third cam plate is set at a position "A".

Accordingly, as shown in FIG. 42c, the projecting portion 505 of the rail portion 521 is meshed with a comb-like portion formed on the third cam plate 527, to thus lock the height of the stocker.

When the cam portion 511 of the driving mechanism portion 510 is rotated an angle corresponding to one step in the direction B in FIG. 36, the operating state at the step NO1 is shifted to the operating state at the step NO2 in which the locking of the stocker is released.

The operating state at the step NO2 is shown in FIGS. 43a to 43e, in which the first cam plate 527 is left at the position "1" and the third cam plate 523 is also left at the position "A", and the second cam plate 525 is set at a position "b".

When the cam portion 511 of the driving mechanism portion 510 is rotated, from the operating state at the step NO2, an angle corresponding to one step in the direction B in FIG. 36, the operating state at the step NO2 is shifted to the operating state at the step NO3, in which the first stocker to the fourth stocker are lifted one stage from the original positions.

The operating state at the step NO3 is shown in FIGS. 44a to 44e, in which the second cam plate 525 is left at the position "b", and the first cam plate 527 is set at a position "2" and the third cam plate 523 is set at a position "B".

When the cam portion 511 of the driving mechanism portion 510 is rotated, from the operating state at the step NO3, an angle corresponding to one step in the direction B in FIG. 36, the operating state at the step NO3 is shifted to the operating state at the step NO4, in which the first stocker to the fourth stocker are locked and the disk R is carried into the second stocker 502.

The operating state at the step NO4 is shown in FIGS. 45a to 45e, in which the first cam plate 527 is left at the position "2" and the third cam plate 523 is also left at the position "B", and the second cam plate 525 is set at the position "a".

When the cam portion 511 of the driving mechanism portion 510 is rotated, from the operating state at the step NO4, an angle corresponding to one step in the direction B in FIG. 36, the operating state at the step NO4 is shifted to the operating state at the step NO5.

The operating state at the step NO5 is shown in FIGS. 46a to 46e, in which the locking at the step NO4 is released, and the first cam plate 527 is left at the position "2" and the third cam plate 523 is also left at the position "B", and the second cam plate 525 is set at the position "b".

When the cam portion 511 of the driving mechanism portion 510 is rotated, from the operating state at the step NO5, an angle corresponding to one step in the direction B in FIG. 36, the operating state at the step NO5 is shifted to the operating state at the step NO6.

The operating state at the step NO6 is shown in FIGS. 47a to 47e, in which the first stocker to the fourth stocker are lifted one stage from the original positions.

In this operating state, the second cam plate 525 is left at the position "b", and the first cam plate 527 is set at a position "3" and the third cam plate 523 is set at a position "C".

When the cam portion 511 of the driving mechanism portion 510 is rotated, from the operating state at the step NO6, an angle corresponding to one step in the direction B in FIG. 36, the operating state at the step NO6 is shifted to the operating state at the step NO7, in which the first stocker to the fourth stocker are locked, and the disk R is carried into the third stocker 503.

The operating state at the step NO7 is shown in FIGS. 48a to 48e, in which the first cam plate 527 is left at the position "3" and also the third cam plate 523 is left at the position "C", and the second cam plate 525 is set at the position "a".

When the cam portion 511 of the driving mechanism portion 510 is rotated, from the operating state at the step NO7, an angle corresponding to one step in the direction B in FIG. 36, the operating state at the step NO7 is shifted to the operating state at the step NO8.

The operating state at the step NO8 is shown in FIGS. 49a to 49e, in which the locking at the step NO7 is released, and the first cam plate 527 is left at the position "3" and also the third cam plate 523 is left at the position "C", and the second cam plate 525 is set at the position "b".

When the cam portion 511 of the driving mechanism portion 510 is rotated, from the operating state at the step NO8, an angle corresponding to one step in the direction B in FIG. 36, the operating state at the step NO8 is shifted to the operating state at the step NO9.

The operating state at the step NO9 is shown in FIGS. 50*a* to 50*e*, in which the first stocker to the fourth stocker are lifted from the original positions.

In this operating state, the second cam plate 525 is left at the position "b", and the first cam plate 527 is set at a position "4" and the third cam plate 523 is set at a position "D".

When the cam portion 511 of the driving mechanism portion 510 is rotated, from the operating state at the step NO9, an angle corresponding to one step in the direction B in FIG. 36, the operating state at the step NO9 is shifted to the operating state at the step NO10, in which the first stocker to the fourth stocker are locked and the disk R is carried into the fourth stocker 504.

The operating state at the step NO10 is shown in FIGS. 51*a* to 51*e*, in which the first cam plate 527 is left at the position "4" and also the third cam plate 523 is left at the position "D", and the second cam plate 525 is set at the position "a".

When the cam portion 511 of the driving mechanism portion 510 is rotated, from the operating state at the step NO10, an angle corresponding to one step in the direction B in FIG. 36, the operating state at the step NO10 is shifted to the operating state at the step NO11.

The operating state at the step NO11 is shown in FIGS. 52*a* to 52*e*, in which the locking at the step NO10 is released, and the first cam plate 527 is left at the position "4" and also the third cam plate 523 is left at the position "D", and the second cam plate 525 is set at the position "b".

When the cam portion 511 of the driving mechanism portion 510 is rotated, from the operating state at the step NO11, an angle corresponding to one step in the direction B in FIG. 36, the operating state at the step NO11 is shifted to the operating state at the step NO12.

The operating state at the step NO12 is shown in FIGS. 53*a* to 53*e*, in which the first cam plate 527 is set at a position "5", the second cam plate 525 is set at a position "c", and the third cam plate 523 is set at a position "E". In this operating state, the fourth stocker 504 is set at a standby position for separating the fourth stocker 504 from the other stockers 501 to 503.

When the cam portion 511 of the driving mechanism portion 510 is rotated, from the operating state at the step NO12, an angle corresponding to one step in the direction B in FIG. 36, the operating state at the step NO12 is shifted to the operating state at the step NO13, in which the fourth stocker is separated from the first stocker to the third stocker for reproducing the disk R contained in the fourth stocker.

The operating state at the step NO13 is shown in FIGS. 54*a* to 54*e*, in which the first cam plate 527 is left at the position "5" and also the third cam plate 523 is left at the position "E", and the second cam plate 525 is set at a position "d".

Figure 54A:
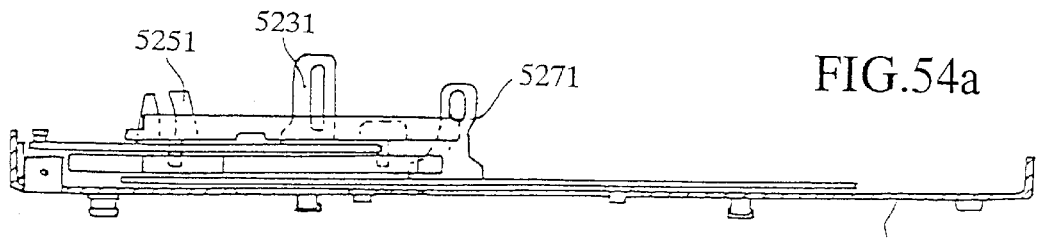
FIGS. 54a to 54e are views showing an operational state of the essential portions of the disk containing mechanism shown in FIGS. 36 to 38g.
Figure 54B:
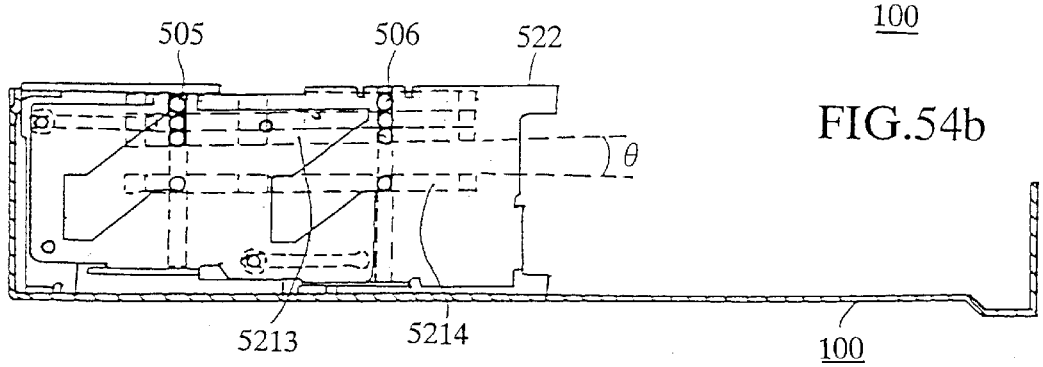
Figure 54C:
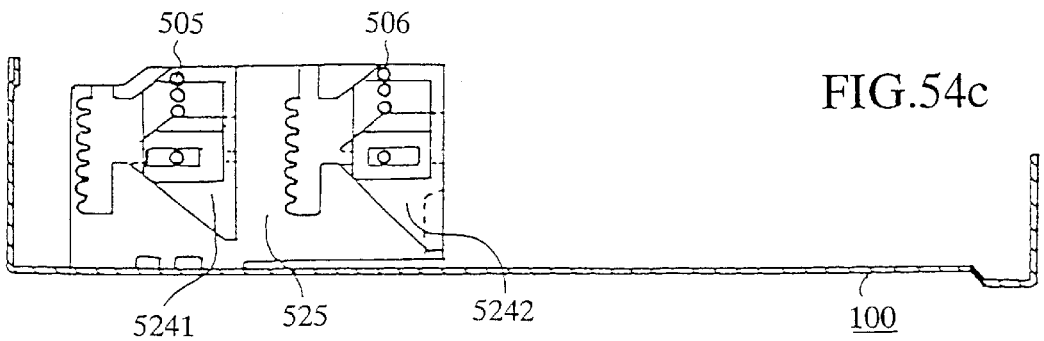
Figure 54D:
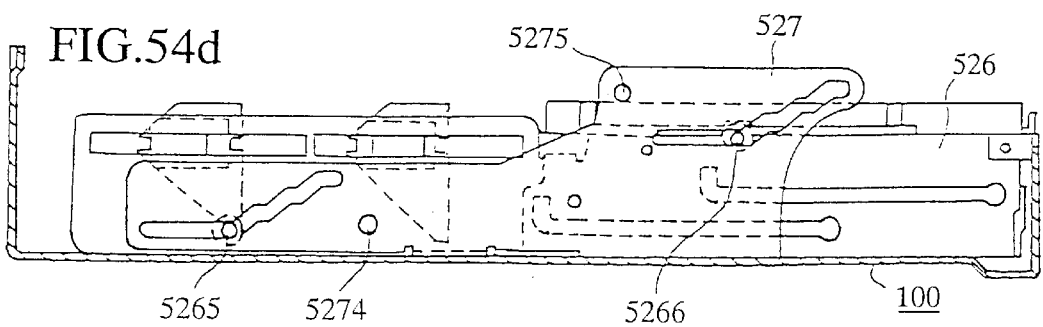
Figure 54E:
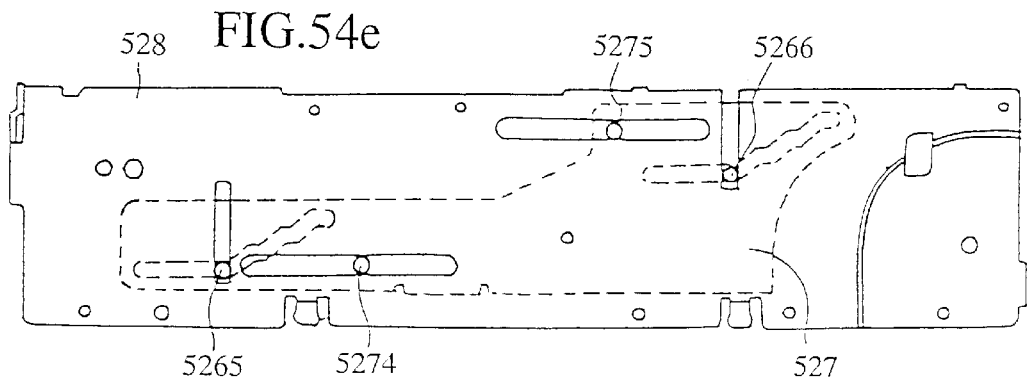
Figure 55A:
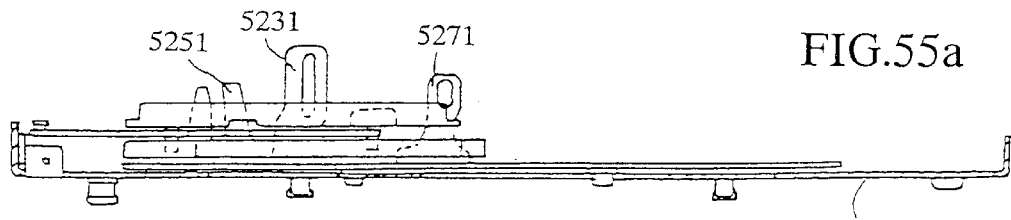
FIGS. 55a to 55e are views showing an operational state of the essential portions of the disk containing mechanism shown in FIGS. 36 to 38g.
Figure 55B:
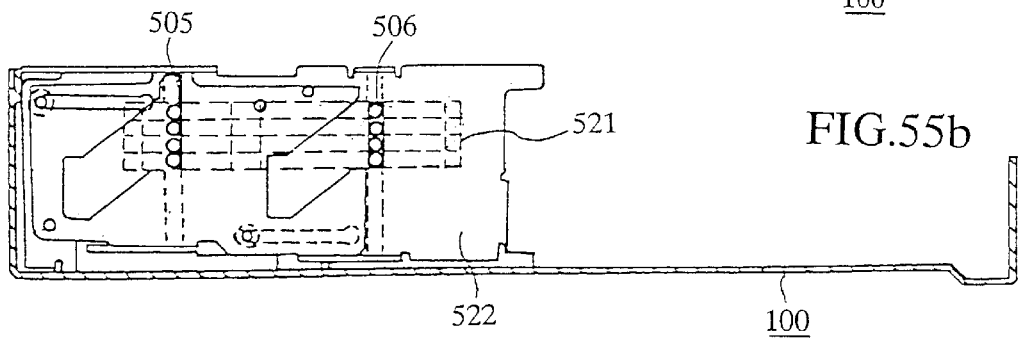
Figure 55C:
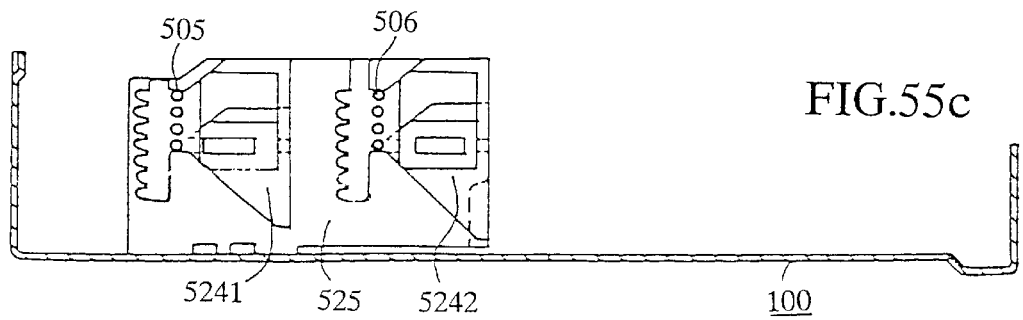
Figure 55D:
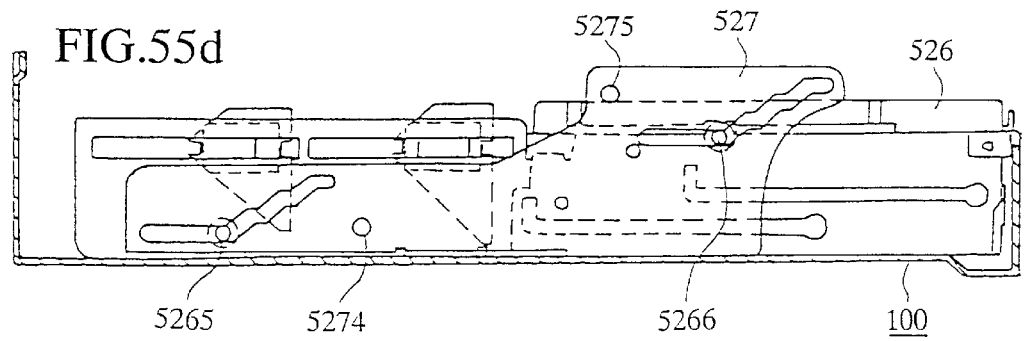
Figure 55E:
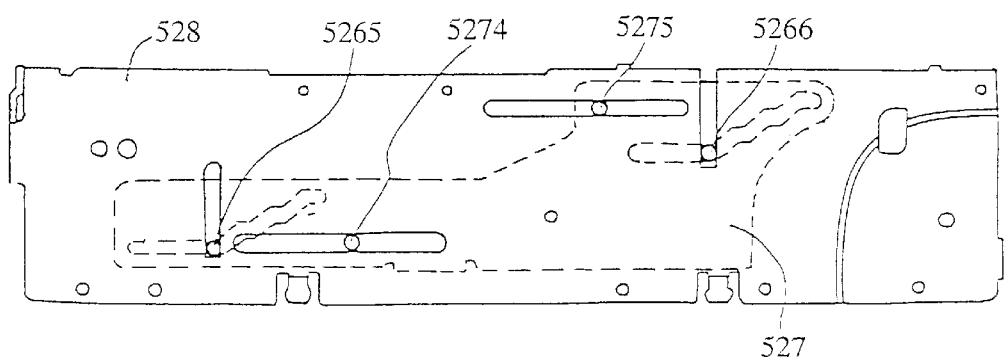
Figure 56A:
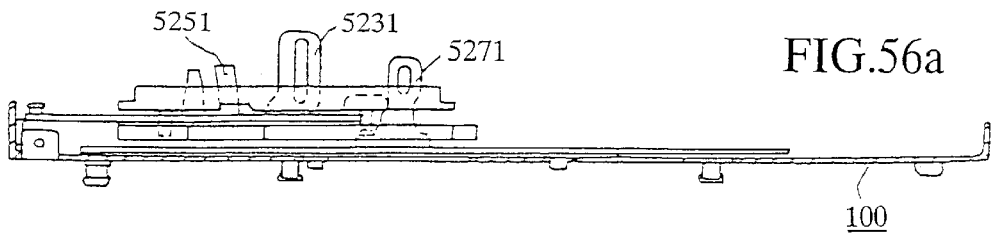
FIGS. 56a to 56e are views showing an operational state of the essential portions of the disk containing mechanism shown in FIGS. 36 to 38g.
Figure 56B:
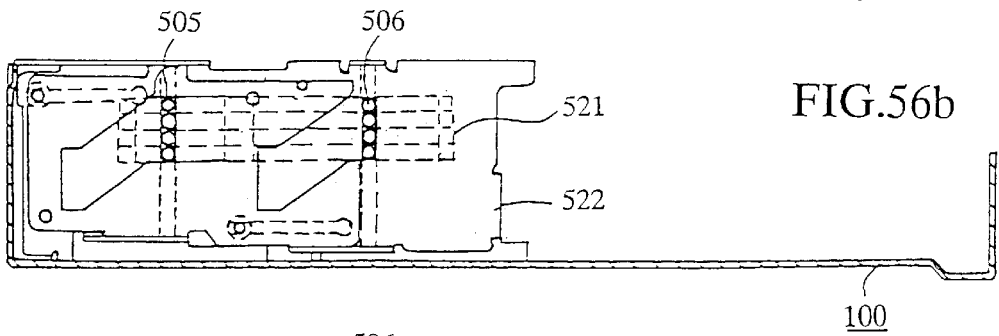
Figure 56C:
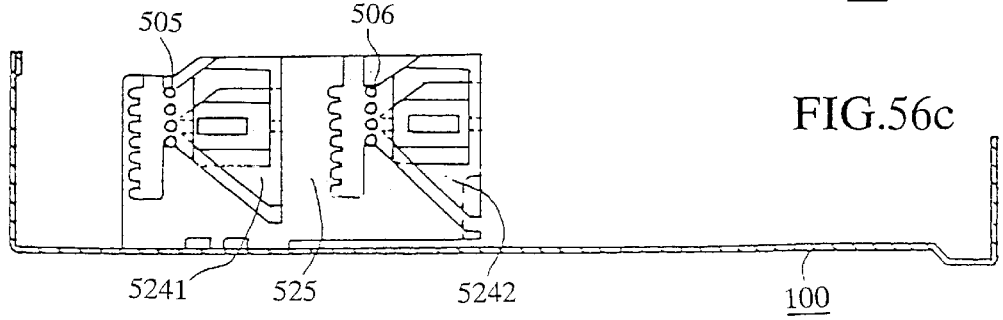
Figure 56D:
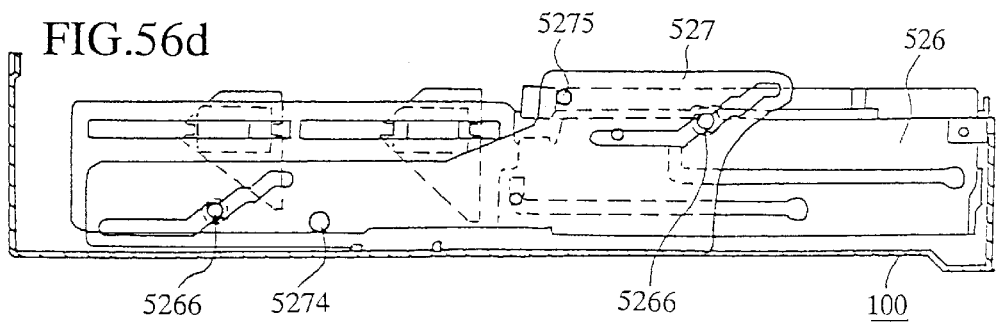
Figure 56E:
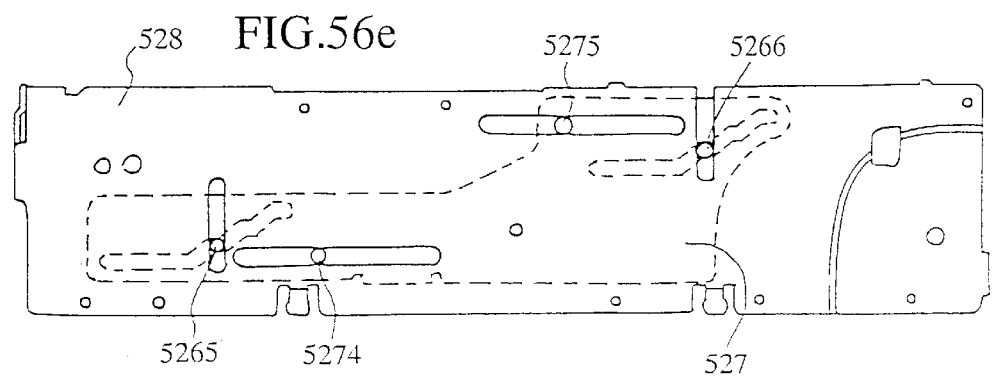
Figure 58A:
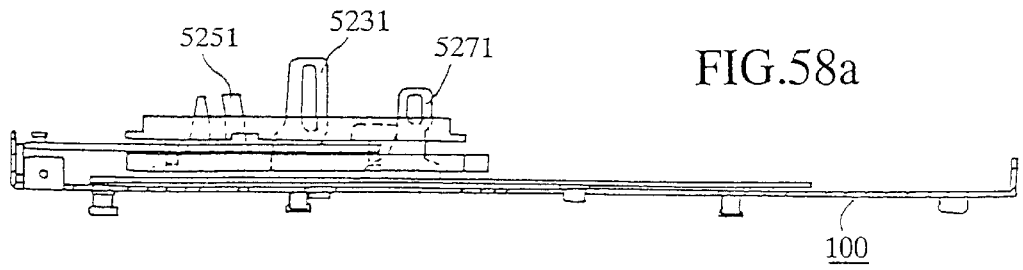
FIGS. 58a to 58e are views showing an operational state of the essential portions of the disk containing mechanism shown in FIGS. 36 to 38g.
Figure 58B:
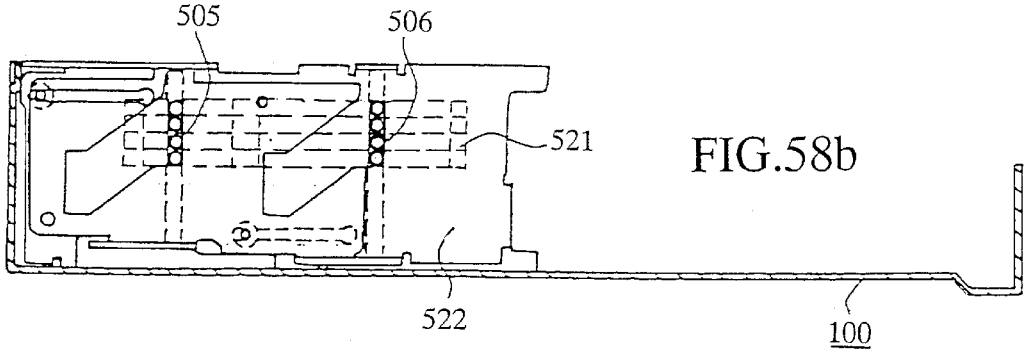
Figure 58C:
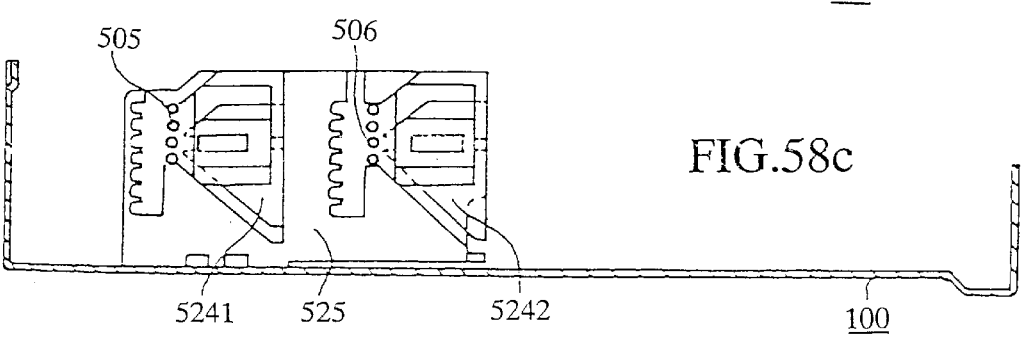
Figure 58D:
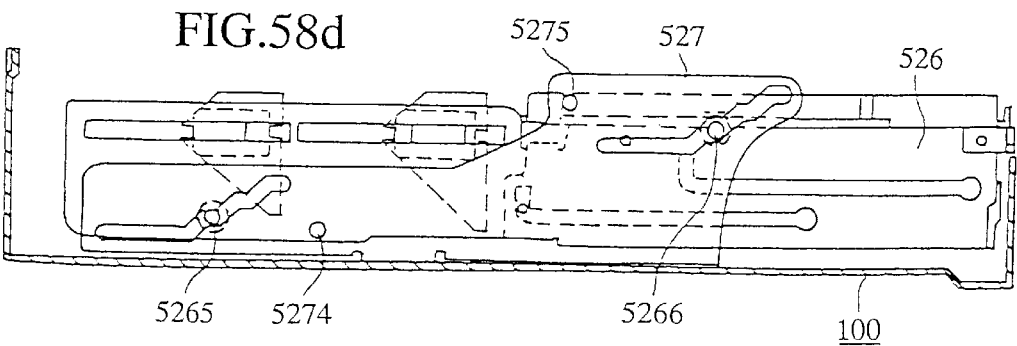
Figure 58E:
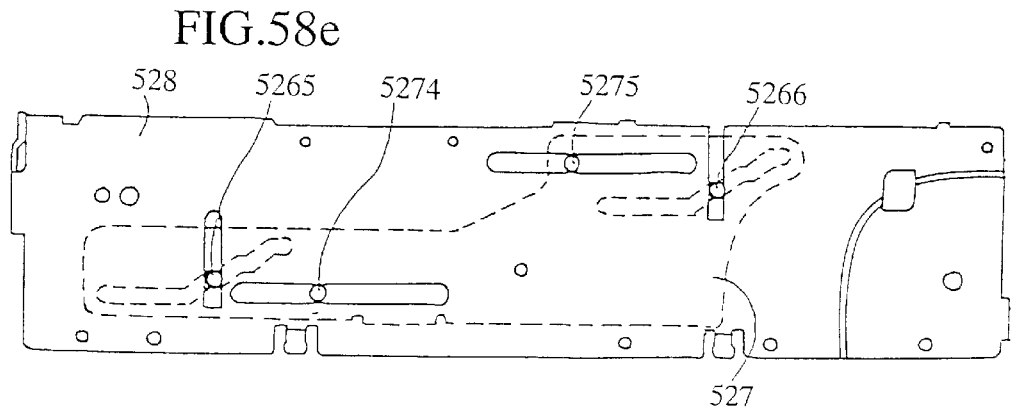

Here, as shown in FIG. 54*b*, to separate a stocker, each of both gaps between the stocker to be separated and the other stockers is tilted at a specific angle θ.

In addition, tilting angles of both gaps between the stocker to be separated and the other stockers may be identical to or different from each other irrespective of the position of the stocker to be separated. For example, when the second stocker is separated from the other stockers, a tilting angle of a gap between the first stocker 501 and the second stocker 502 may be identical to or different from a tilting angle of a gap between the second stocker 502 and the third and fourth stockers 503 and 504.

When the cam portion 511 of the driving mechanism portion 510 is rotated, from the operating state at the step NO13, an angle corresponding to one step in the direction B in FIG. 36, the operating state at the step NO13 is shifted to the operating state at the step NO14.

The operating state at the step NO14 is shown in FIGS. 55*a* to 55*e*, in which the first cam plate 527 is left at the position "5" and also the third cam plate 523 is left at the position "E", and the second cam plate 525 is set at the position "c". In this operating state, the gaps between the projecting portions of the stockers become narrow again.

When the cam portion 511 of the driving mechanism portion 510 is rotated, from the operating state at the step NO14, an angle corresponding to one step in the direction B in FIG. 36, the operating state at the step NO14 is shifted to the operating state at the step NO15.

The operating state at the step NO15 is shown in FIGS. 56*a* to 56*e*, in which the second cam plate 525 is left at the position "c" and also the third cam plate 523 is left at the position "E", and the first cam plate 527 is set at a position "6". In this operating state, the base portion 526 is lifted.

When the cam portion 511 of the driving mechanism portion 510 is rotated, from the operating state at the step NO15, an angle corresponding to one step in the direction B in FIG. 36, the operating state at the step NO15 is shifted to the operating state at the step NO16, in which the first, second and fourth stockers are separated from the third stocker for reproducing the disk R contained in the third stocker.

The operating state at the step NO16 is shown in FIGS. 57*a* to 57*e*, in which the first cam plate 527 is left at the position "6" and also the third cam plate 523 is left at the position "E", and the second cam plate 525 is set at a position "d".

When the cam portion 511 of the driving mechanism portion 510 is rotated, from the operating state at the step NO16, an angle corresponding to one step in the direction B in FIG. 36, the operating state at the step NO16 is shifted to the operating state at the step NO17.

The operating state at the step NO17 is shown in FIGS. 58*a* to 58*e*, in which the first cam plate 527 is left at the position "6" and also the third cam plate 523 is left at the position "E", and the second cam plate 525 is set at the position "c".

In the operating state thus set, the gaps between the projecting portions of the first stocker 501 to the fourth stocker 504 become narrow again.

When the cam portion 511 of the driving mechanism portion 510 is rotated, from the operating state at the step NO17, an angle corresponding to one step in the direction B in FIG. 36, the operating state at the step NO17 is shifted to the operating state at the step NO18.

The operating state at the step NO18 is shown in FIGS. 59*a* to 59*e*, in which the second cam plate 525 is left at the position "c" and also the third cam plate 523 is left at the position "E, and the first cam plate 527 is set at a position "7". In this operating state, the base portion 526 is lifted.

When the cam portion 511 of the driving mechanism portion 510 is rotated, from the operating state at the step NO18, an angle corresponding to one step in the direction B in FIG. 36, the operating state at the step NO18 is shifted to the operating state at the step NO19, in which the first, third and fourth stockers are separated from the second stocker for reproducing the disk R contained in the second stocker.

The operating state at the step NO19 is shown in FIGS. 60*a* to 60*e*, in which the first cam plate 527 is lest at the position "7" and also the third cam plate 523 is left at the position "E", and the second cam plate 525 is set at the position "d".

When the cam portion 511 of the driving mechanism portion 510 is rotated, from the operating state at the step NO19, an angle corresponding to one step in the direction B in FIG. 36, the operating state at the step NO19 is shifted to the operating state at the step NO20.

The operating state at the step NO20 is shown in FIGS. 61*a* to 61*e*, in which the first cam plate 527 is left at the position "7" and also the third cam plate 523 is left at the position "E", and the second cam plate 525 is set at the position "c".

In the operating thus set, the gaps between the projecting portions of the first stocker 501 to the fourth stocker 504 become narrow again.

When the cam portion 511 of the driving mechanism portion 510 is rotated, from the operating state at the step NO20, an angle corresponding to one step in the direction B in FIG. 36, the operating state at the step NO20 is shifted to the operating state at the step NO21.

The operating state at the step NO21 is shown in FIGS. 62*a* to 62*e*, in which the second cam plate 525 is left at the position "c" and also the third cam plate is left at the position "E", and the first cam plate 527 is set at a position "8". In this operating state, the base portion 526 is lifted.

Finally, when the cam portion 511 of the driving mechanism portion 510 is rotated, from the operating state at the step NO21, an angle corresponding to one step in the direction B in FIG. 36, that is, the pin 5124 of the first arm 512 shown in FIG. 36 is set at the other end 51122 of the outer peripheral sliding hole 5112 of the cam portion 511 and the pin 51321 of the cam arm 5132 is set at the other end 51132 of the inner peripheral sliding hole 5113 of the cam portion 511, the operating state at the step NO21 is shifted to the operating state at the step NO22.

The operating state at the step NO22 is shown in FIGS. 63*a* to 63*e*, in which the first cam plate 527 is left at the position "8" and also the third cam plate 523 is left at the position "E", and the second cam plate 525 is set the position "d".

After completion of the operating step NO22, the next operating process is performed in the direction reversed to that described above, that is, in the order of the steps N22→NO21→NO20 . . . →NO1.

Figure 64A:
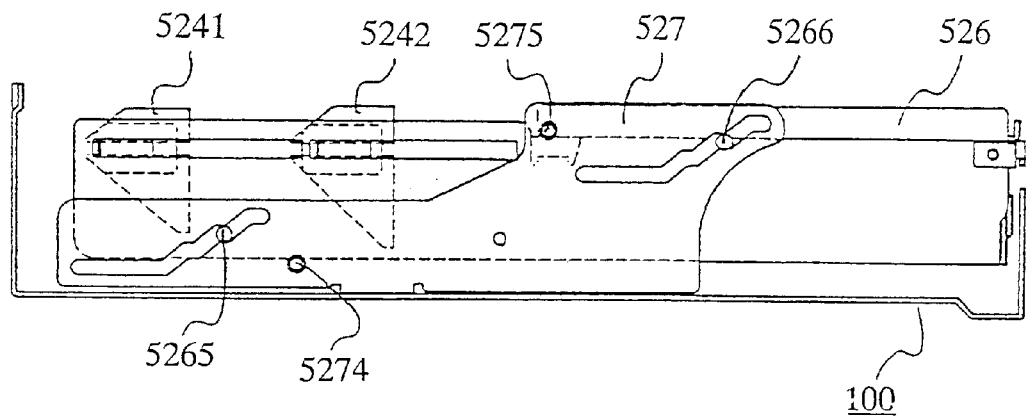
FIGS. 64a and 64b are views showing an operational state of the essential portions of the disk containing mechanism shown in FIGS. 36 to 38g.
Figure 64B:
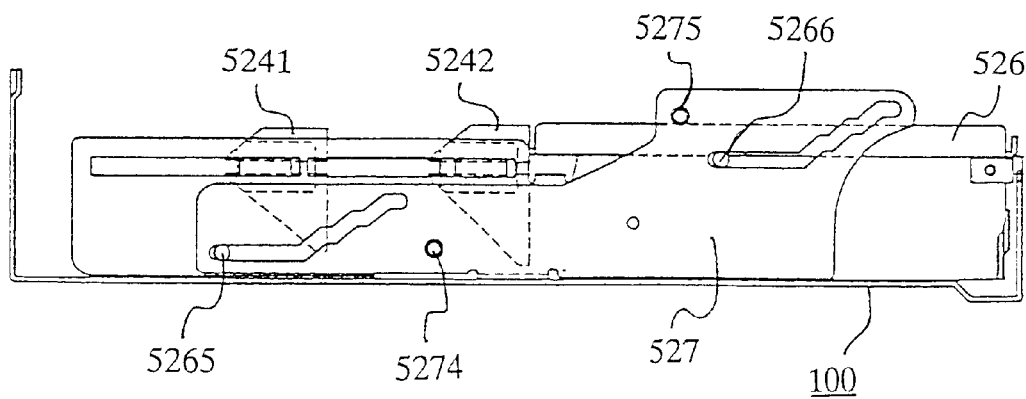

FIGS. 64*a* and 64*b* show the first cam plate 527; FIGS. 65*a* to 65*d* show the second cam plate 525; and FIGS. 66*a* to 66*c* show the third cam plate 523. To be more specific, FIG. 64*a* shows a state in which the projecting portion of the rail portion 521 is set at the position "7" shown in FIG. 39*a*, and FIG. 64*b* shows a state in which the projecting portion of the rail portion 521 is set at the position "1" shown in FIG. 39*a*.

Figure 65A:
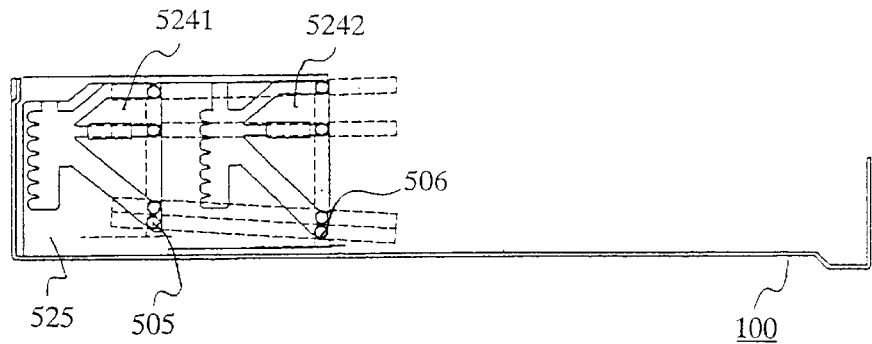
FIGS. 65a to 65d are views showing an operational state of the essential portions of the disk containing mechanism shown in FIGS. 36 to 38g.
Figure 65B:
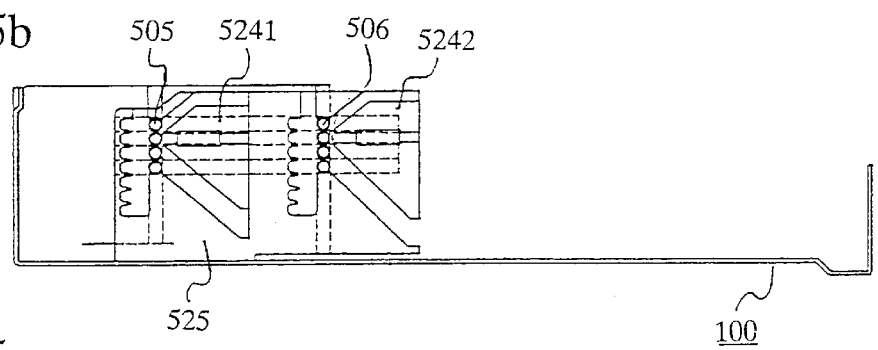
Figure 65C:
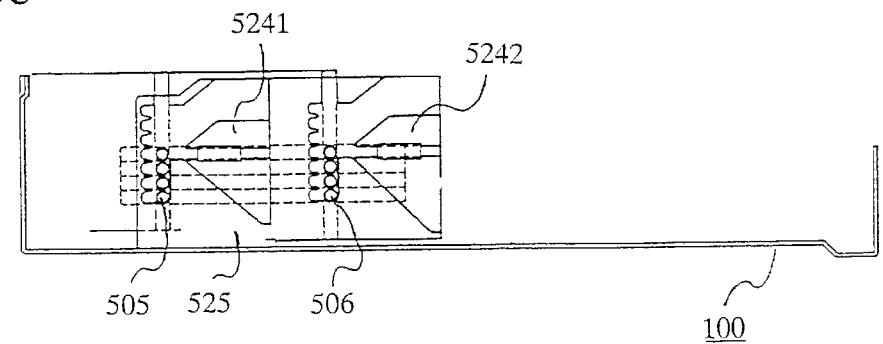
Figure 65D:
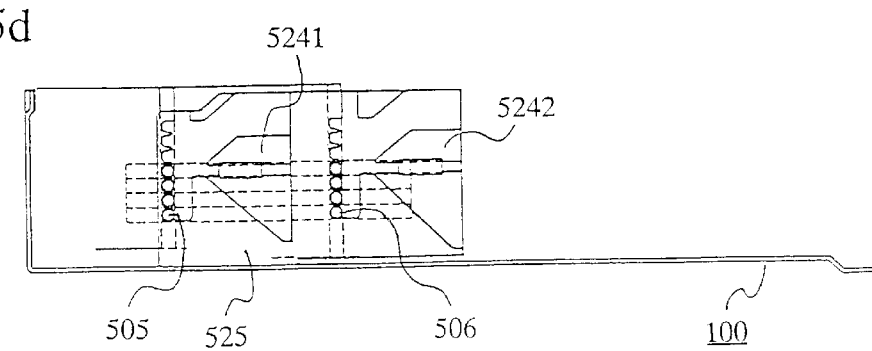
Figure 66A:
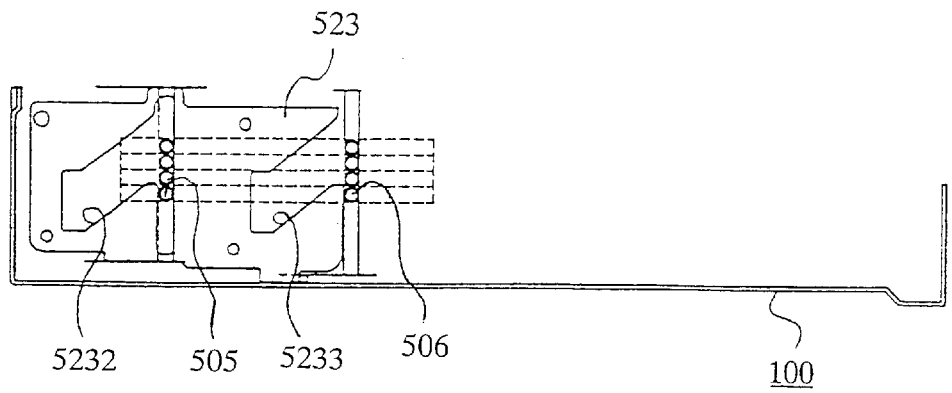
FIGS. 66a to 66c are views showing an operational state of the essential portions of the disk containing mechanism shown in FIGS. 36 to 38g.
Figure 66B:
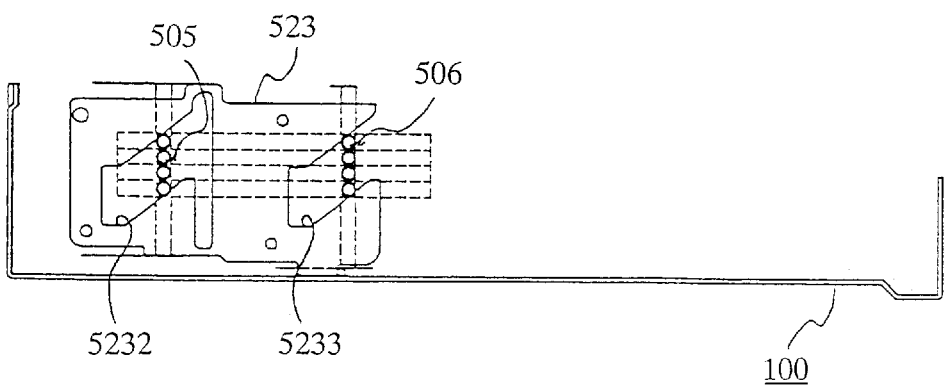
Figure 66C:
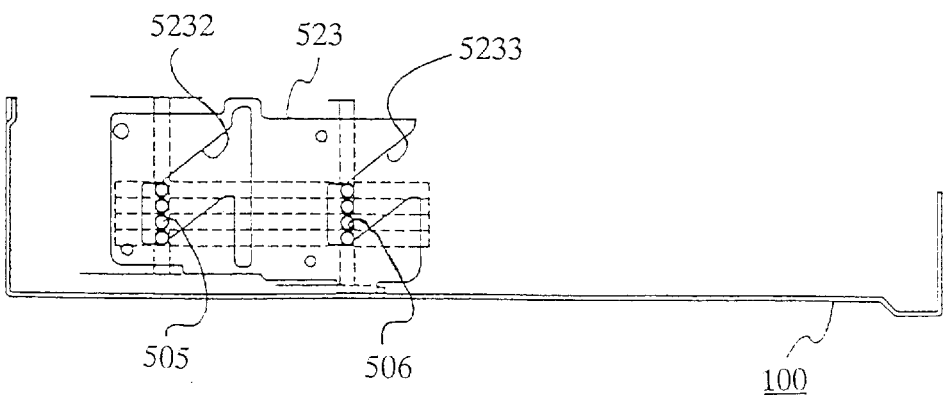

FIG. 65*a* shows a state in which the projecting portion of the rail portion 521 is set at the position "d" shown in FIG. 39*b*; FIG. 65*b* shows a state in which the projecting portion of the rail portion 521 is set at the position "c" shown in FIG. 39*b*; FIG. 65*c* shows a state in which the projecting portion of the rail portion 521 is set at the position "b" shown in FIG. 39*b*; and FIG. 65*d* shows a state in which the projecting portion of the rail portion 521 is set at the position "a" shown in FIG. 39*b*.

FIG. 66*a* shows a state in which the projecting portion of the rail portion 521 is set at the position "E" shown in FIG. 39*c*; FIG. 66*b* shows a state in which the projecting portion of the rail portion 521 is set at the position C shown in FIG. 39*c*; and FIG. 66*c* shows a state in which the projecting portion of the rail portion 521 is set at the position "A" shown in FIG. 39*c*.

With the moving mechanism portion 520 having the above configuration, operation of each stocker can be certainly controlled by controlling a rotational angle of the cam portion 511 of the driving mechanism portion 510.

In accordance with operation of the stockers described above, each stocker is set at a desired setting position by way of the sequential operating steps. For example, to obtain the step NO10 from the step NO19, the step NO19 is shifted to the step NO10 in the order of NO19→NO18→NO17→ . . . →NO10.

[5. Description of Operation of Entire Disk System]

Hereinafter, there will be described three basic operations of the entire disk system shown in the Embodiment 1 described above with reference to FIGS. 67*a* to 95*b*. The three basic operations are: (1) an operation in which disks are contained in all stockers from a disk non-containing state and a specific disk is reproduced; (2) an operation in which during reproducing of a specific disk, such reproducing is switched into reproducing of another disk; and (3) an operation in which reproducing of a specific disk is stopped and the specific disk is ejected.

Referring first to FIGS. 67*a* to 82*b*, there will be described the operation (1), that is, the operational step of the entire disk system from a state in which disks are contained in the first stocker 501 to the fourth stocker 504 in this order from the state with no disks contained in the disk system to a state in which a disk R2 contained in the second stocker is reproduced.

Figure 67A:
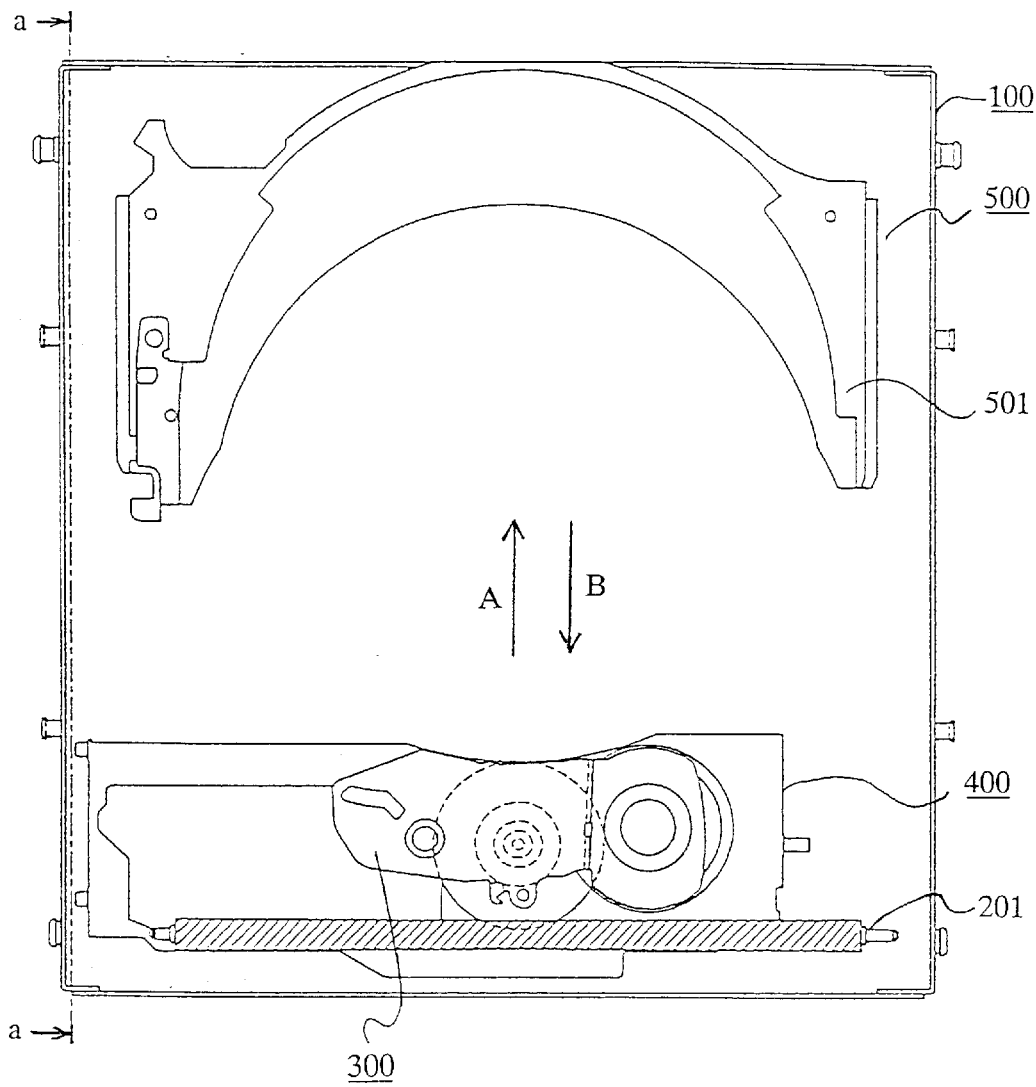
FIGS. 67a and 67b are a top view and a sectional side view respectively, showing a basic operation of the entire disk system shown in FIG. 1.
Figure 67B:
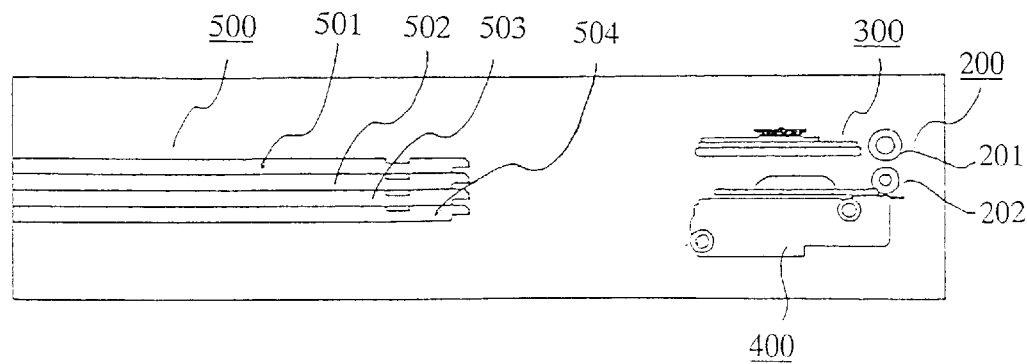
Figure 68A:
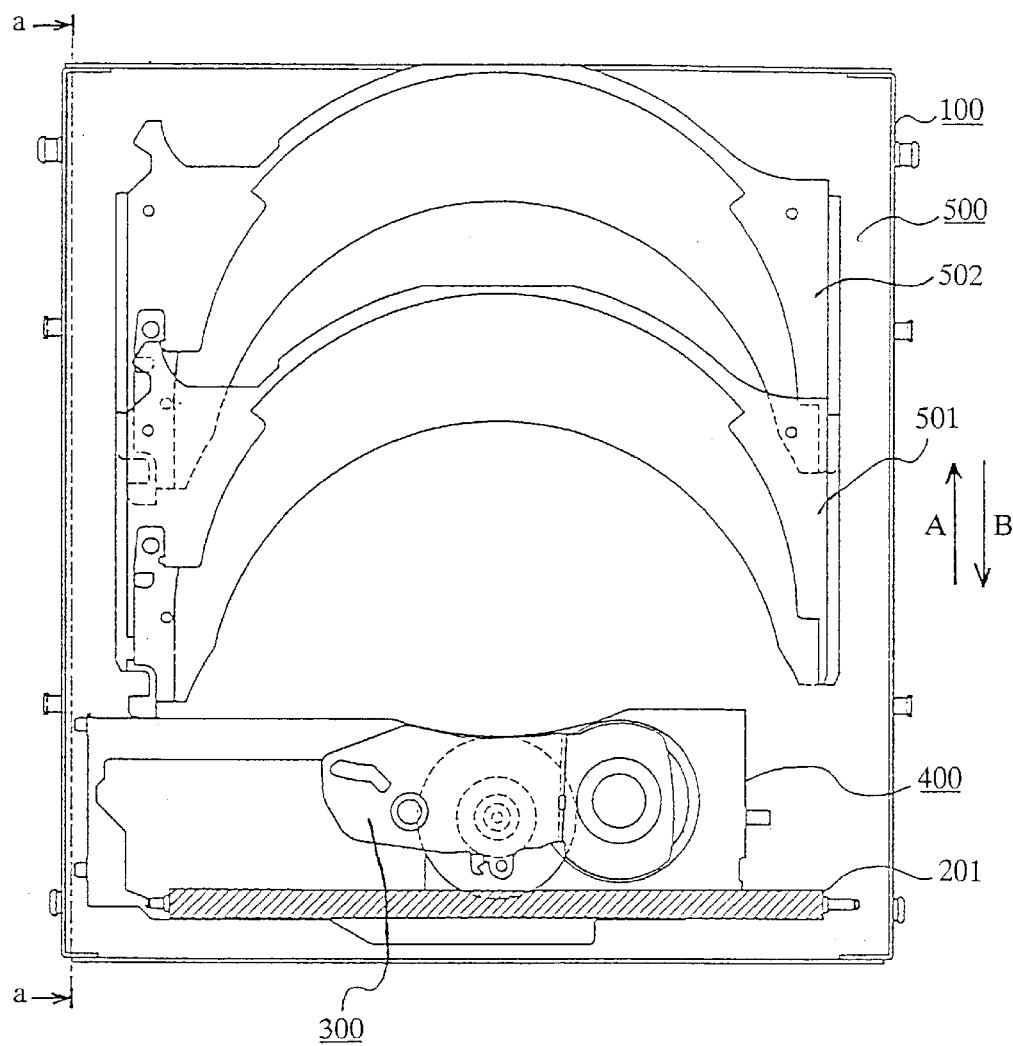
FIGS. 68a and 68b are a top view and a sectional side view respectively, showing a basic operation of the entire disk system shown in FIG. 1.
Figure 68B:
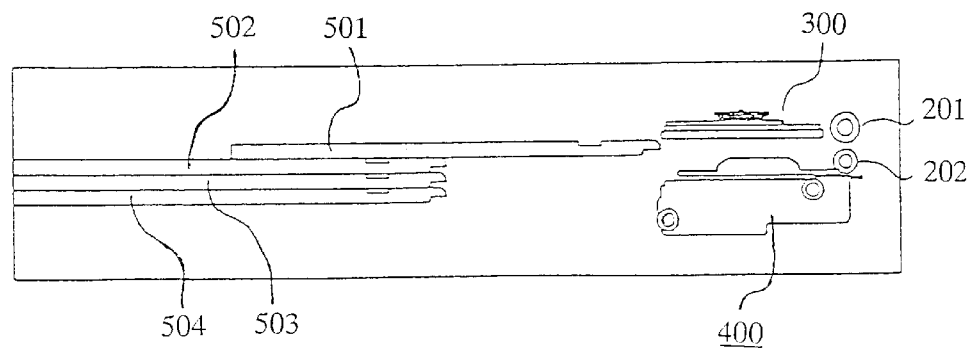
Figure 69A:
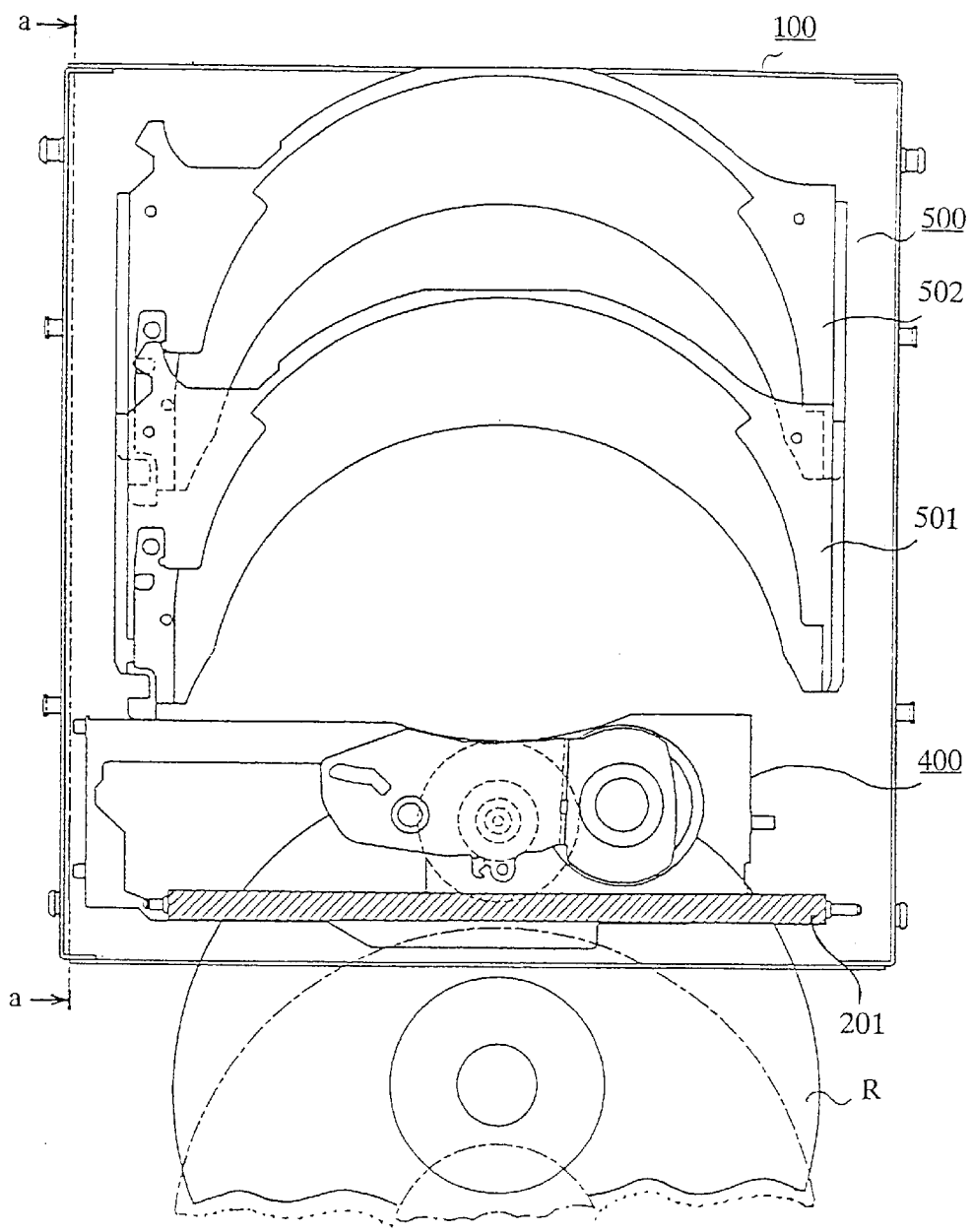
FIGS. 69a and 69b are a top view and a sectional side view respectively, showing a basic operation of the entire disk system shown in FIG. 1.
Figure 69B:
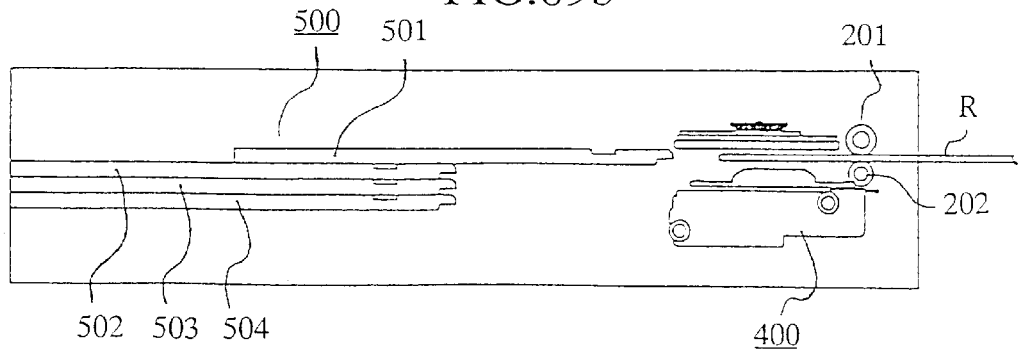
Figure 70A:
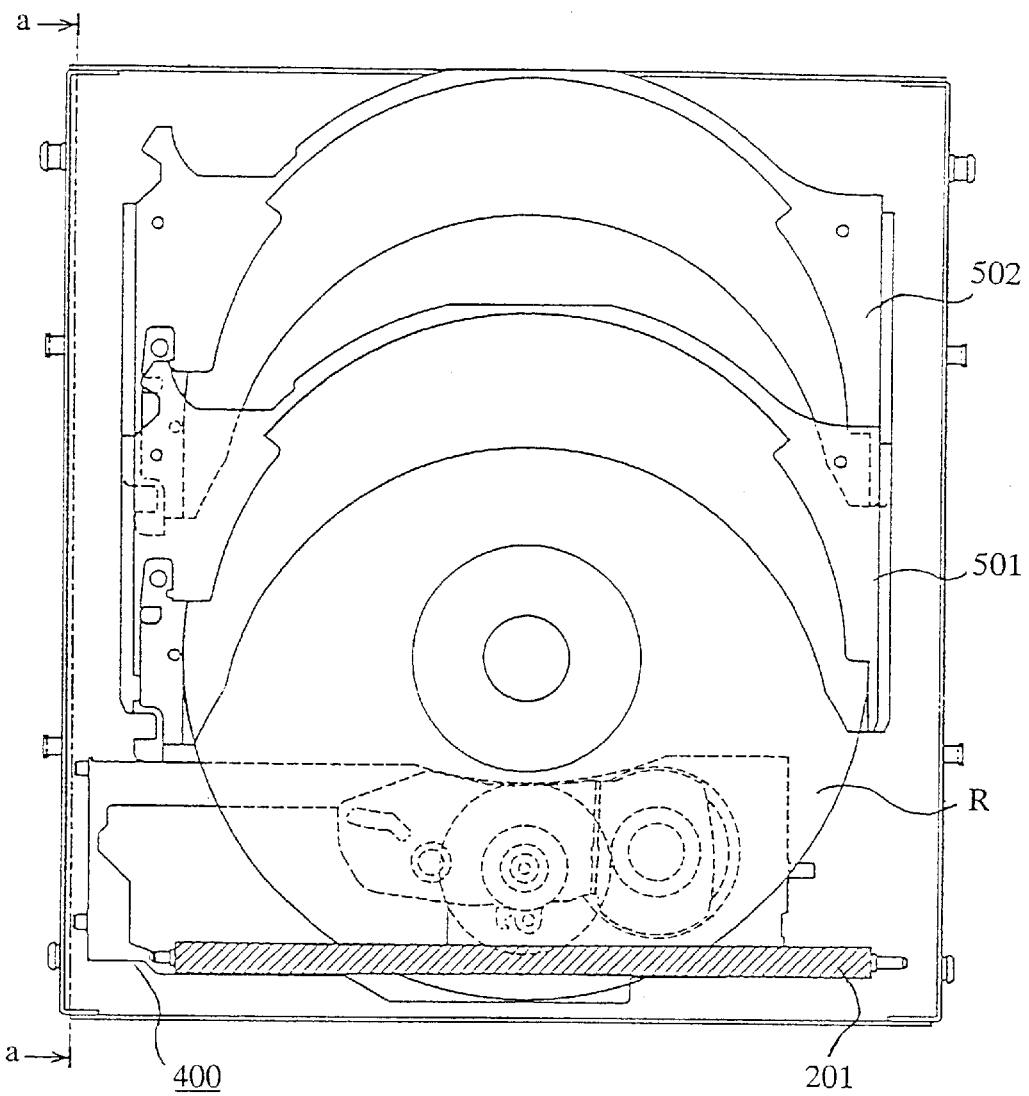
FIGS. 70a and 70b are a top view and a sectional side view respectively, showing a basic operation of the entire disk system shown in FIG. 1.
Figure 70B:
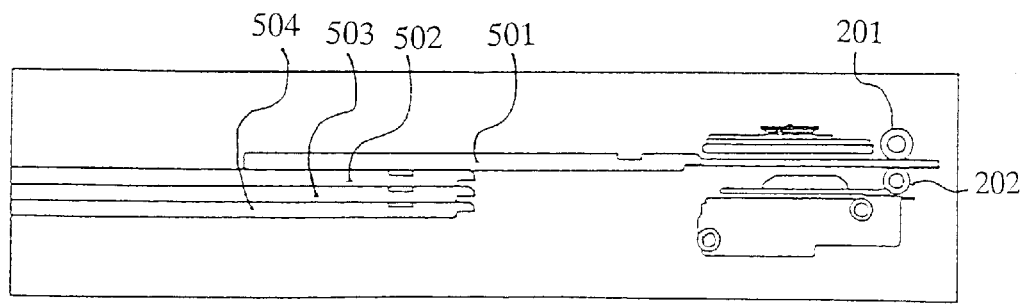
Figure 71A:
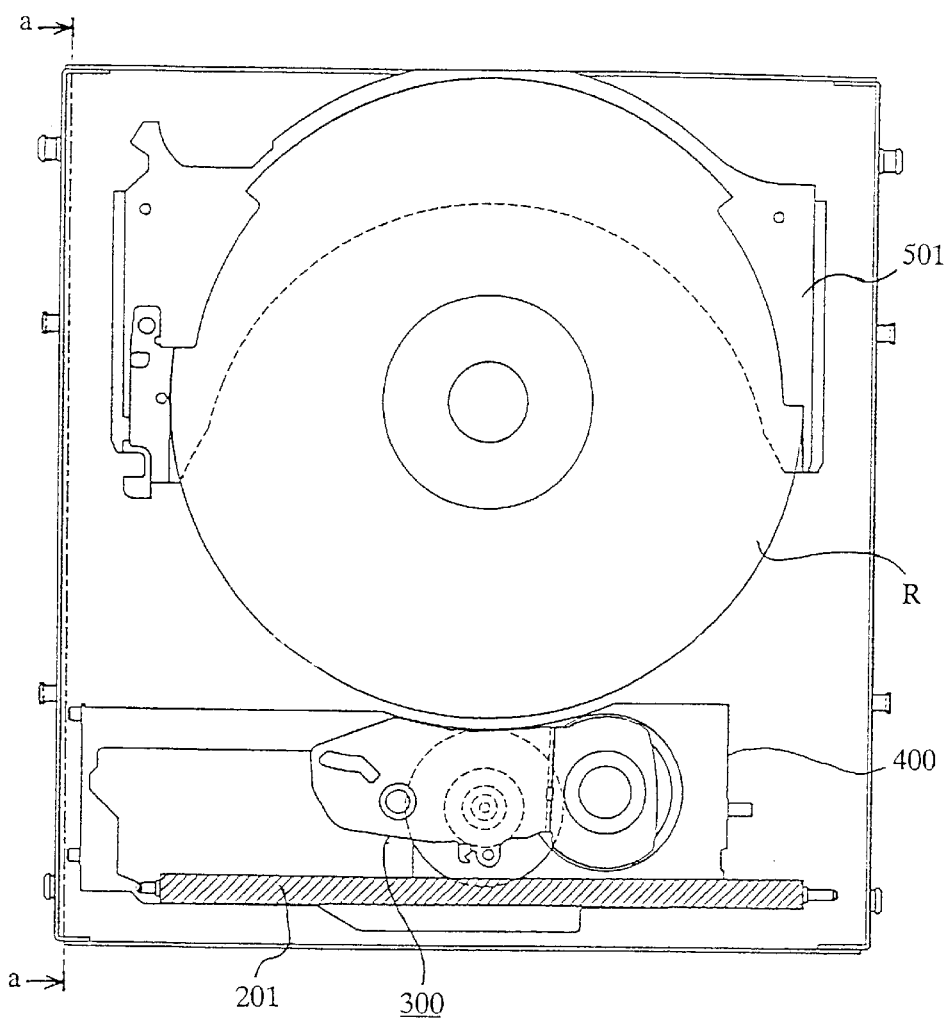
FIGS. 71a and 71b are a top view and a sectional side view respectively, showing a basic operation of the entire disk system shown in FIG. 1.
Figure 71B:
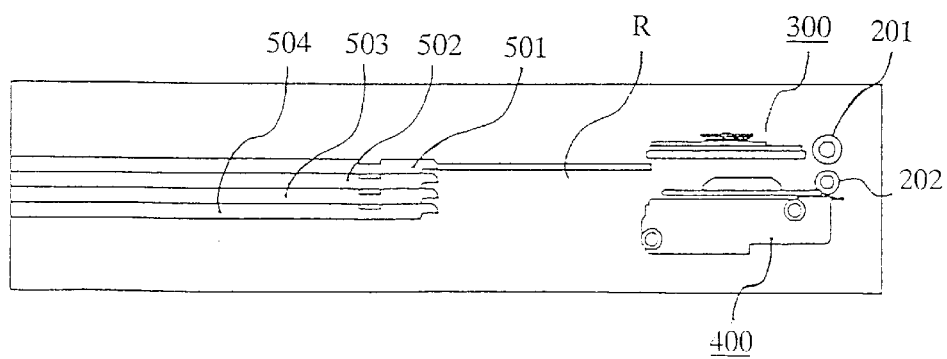

FIGS. 67*a* and 67*b* are views showing a state in which no disk is contained in the disk system; FIGS. 68*a* and 68*b* are views showing a state in which a command allowing a disk R1 to be inserted into the first stocker 501 is supplied from the operating portion (not shown) or the like and the first stocker is moved toward the insertion port; FIGS. 69*a* and 69*b* are views showing a state in which the disk R1 is inserted from the insertion port 101; FIGS. 70*a* and 70*b* are views showing a state in which the disk R1 is contained in the disk containing portion of the first stocker 501; and FIGS. 71*a* and 71*b* are views showing a state in which the first stocker 501 containing the disk R1 is moved to the original position, that is, the position shown in FIGS. 67*a* and 67*b*.

Figure 72A:
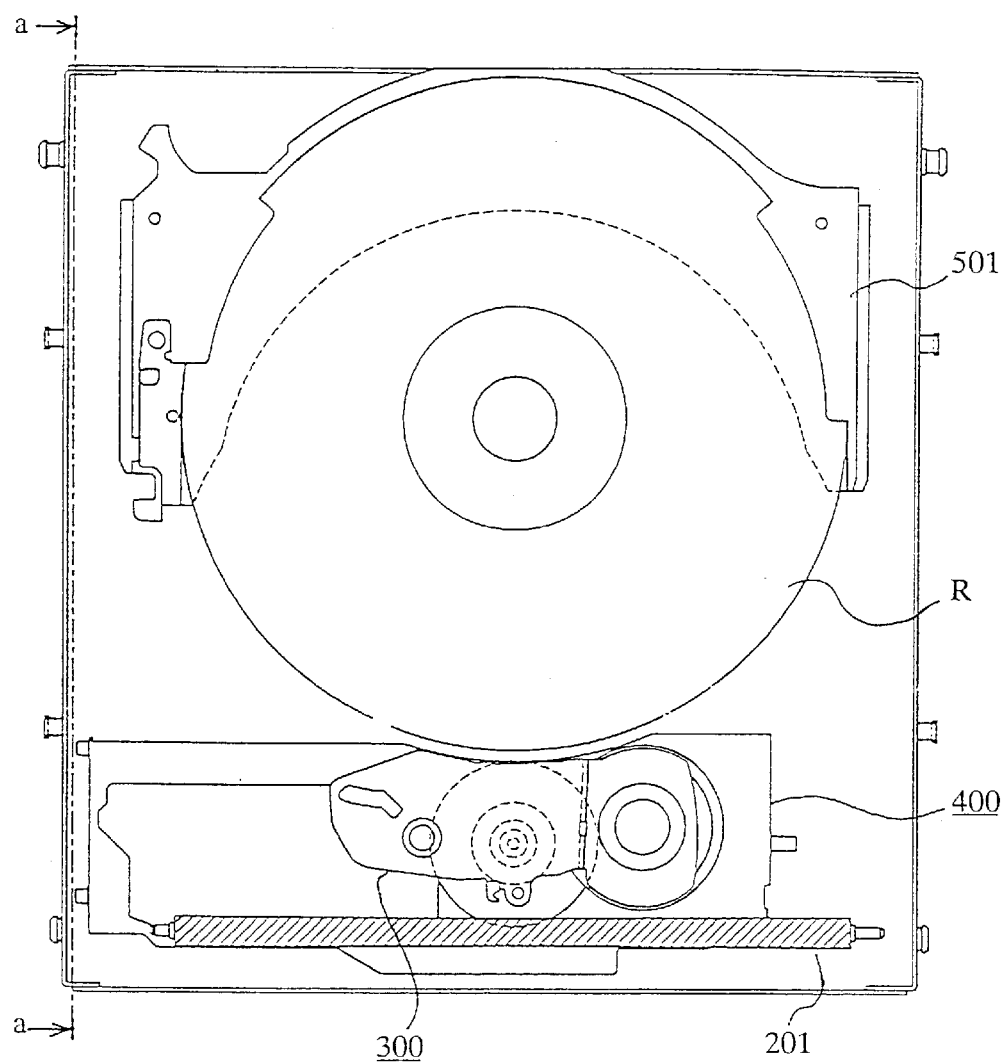
FIGS. 72a and 72b are a top view and a sectional side view respectively, showing a basic operation of the entire disk system shown in FIG. 1.
Figure 72B:
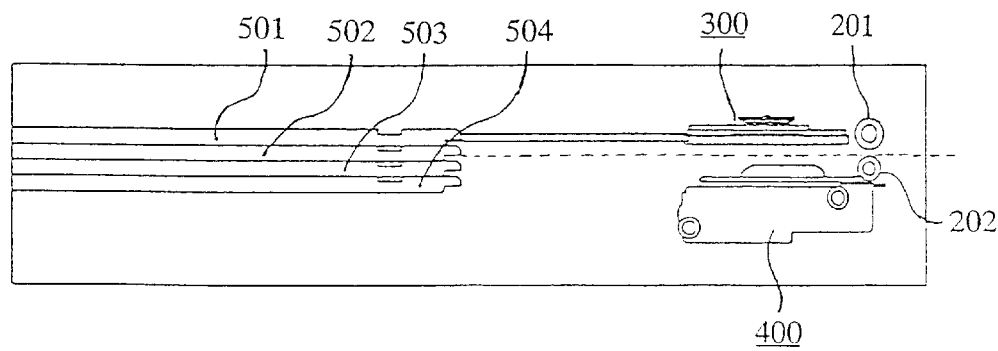
Figure 73A:
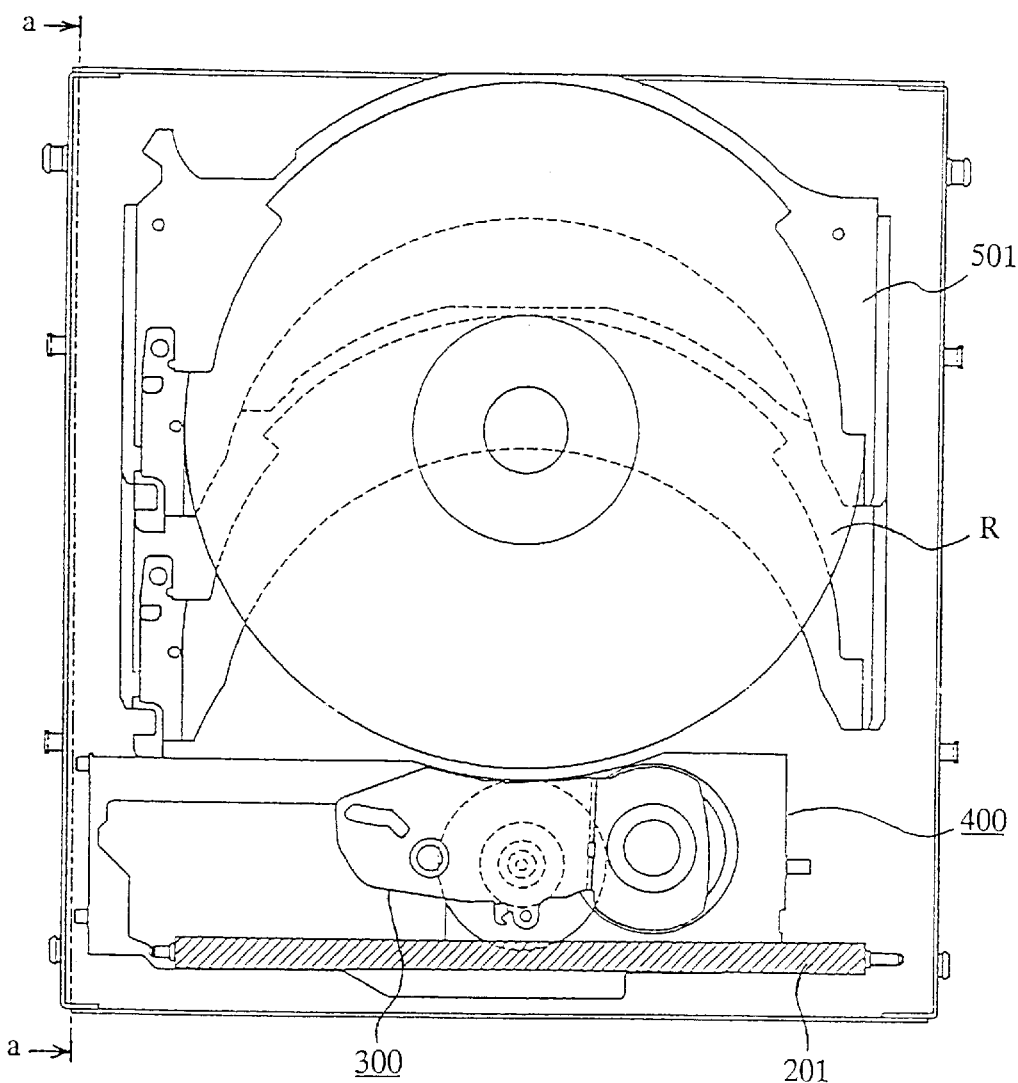
FIGS. 73a and 73b are a top view and a sectional side view respectively, showing a basic operation of the entire disk system shown in FIG. 1.
Figure 73B:
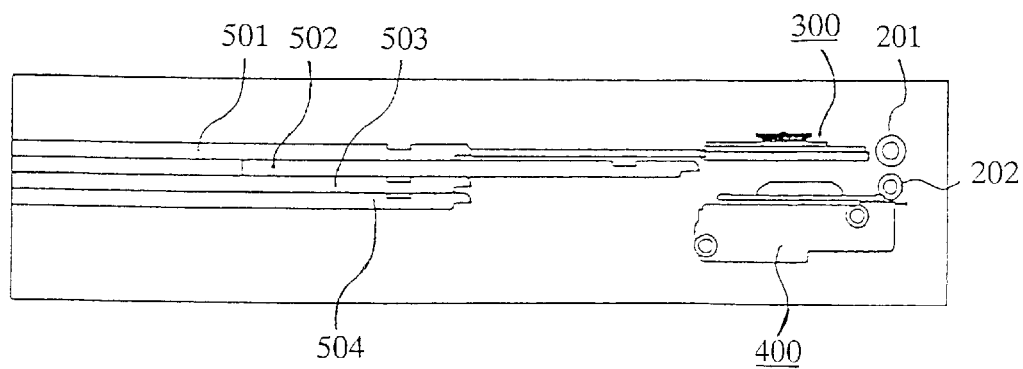
Figure 74A:
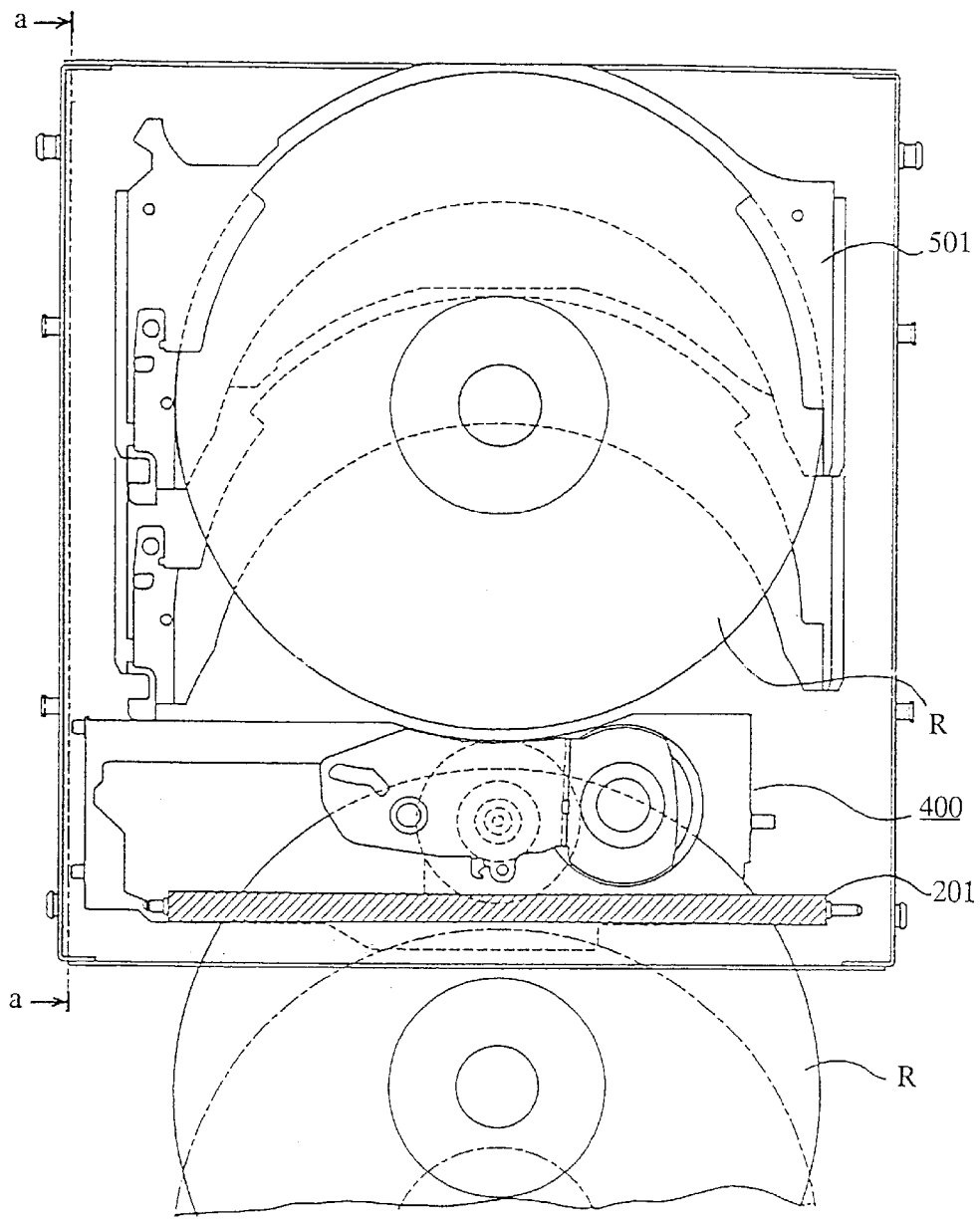
FIGS. 74a and 74b are a top view and a sectional side view respectively, showing a basic operation of the entire disk system shown in FIG. 1.
Figure 74B:
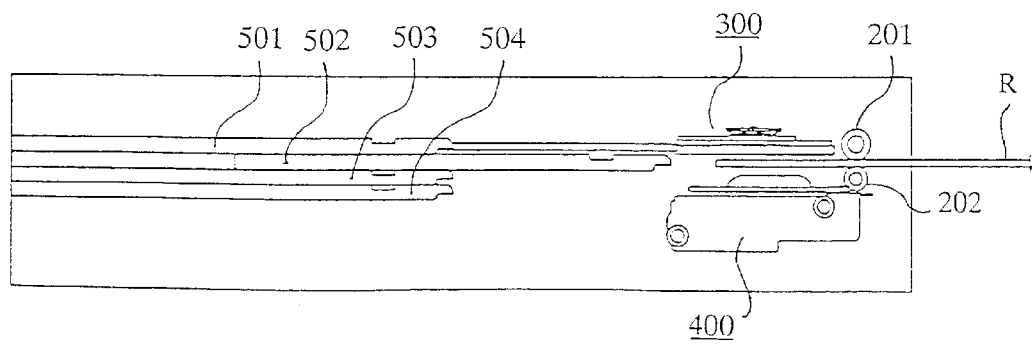
Figure 75A:
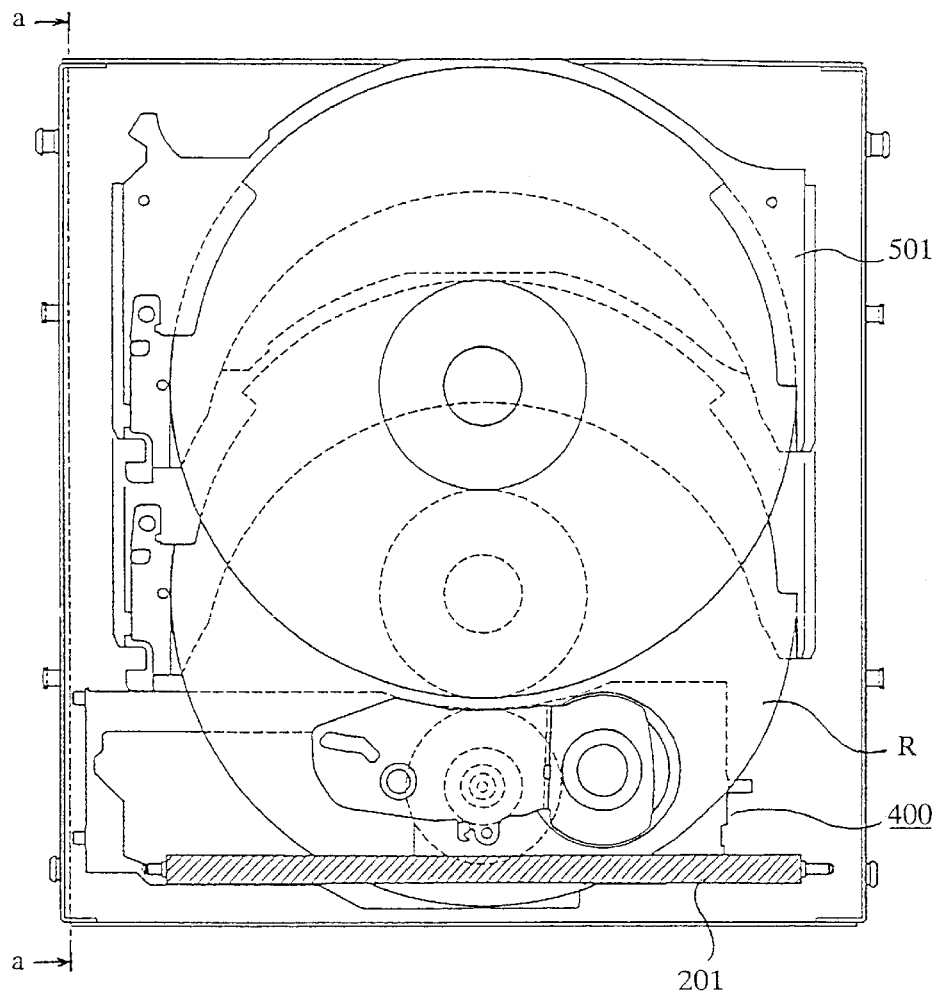
FIGS. 75a and 75b are a top view and a sectional side view respectively, showing a basic operation of the entire disk system shown in FIG. 1.
Figure 75B:
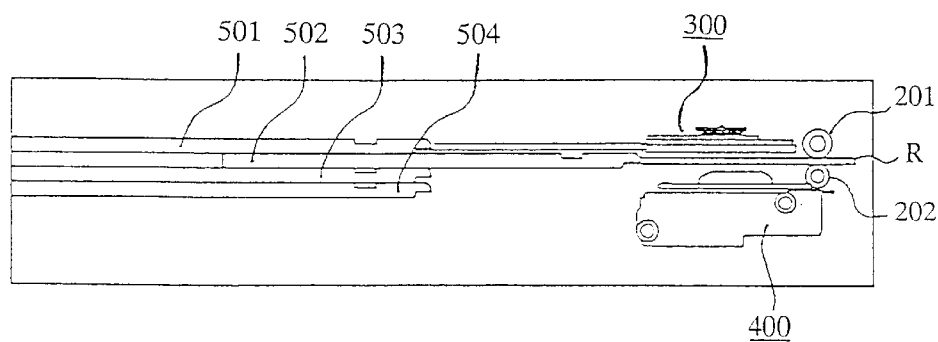
Figure 76A:
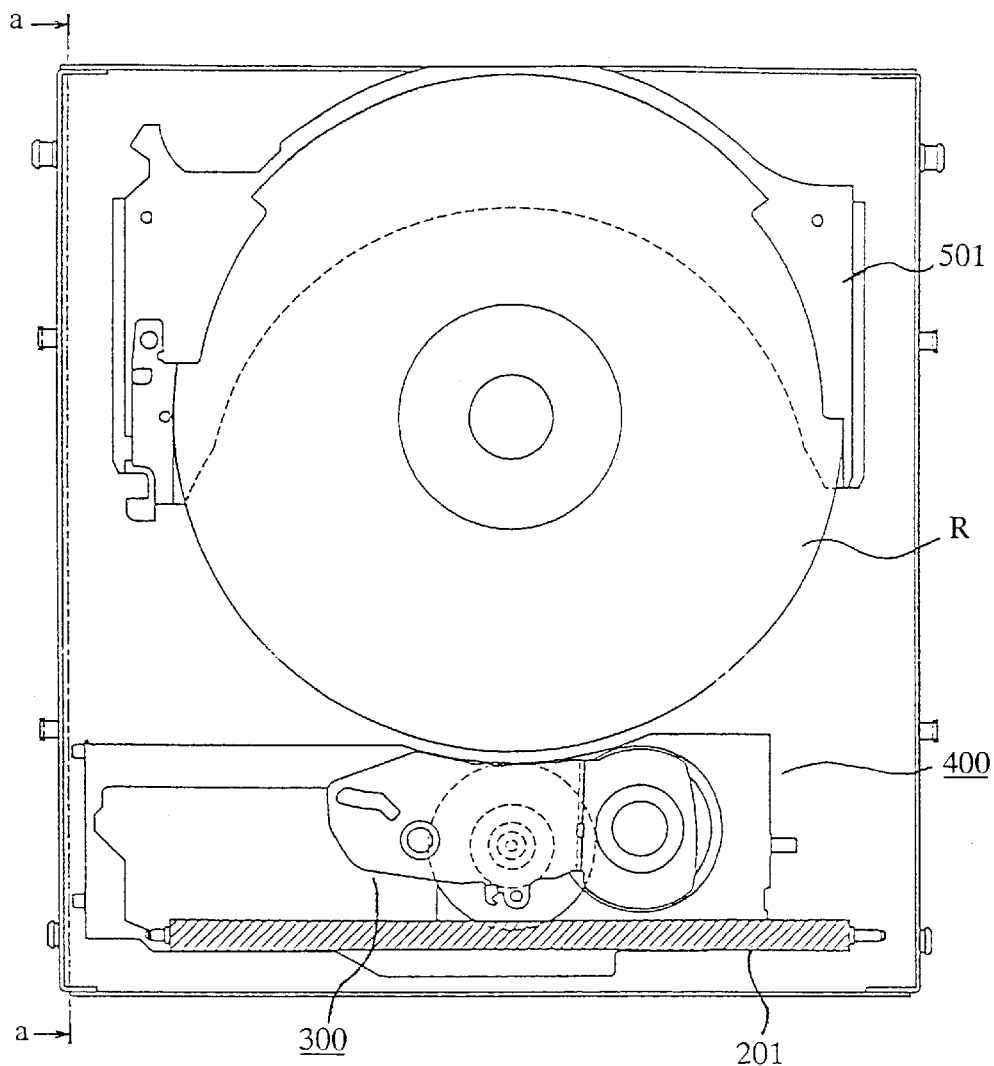
FIGS. 76a and 76b are a top view and a sectional side view respectively, showing a basic operation of the entire disk system shown in FIG. 1.
Figure 76B:
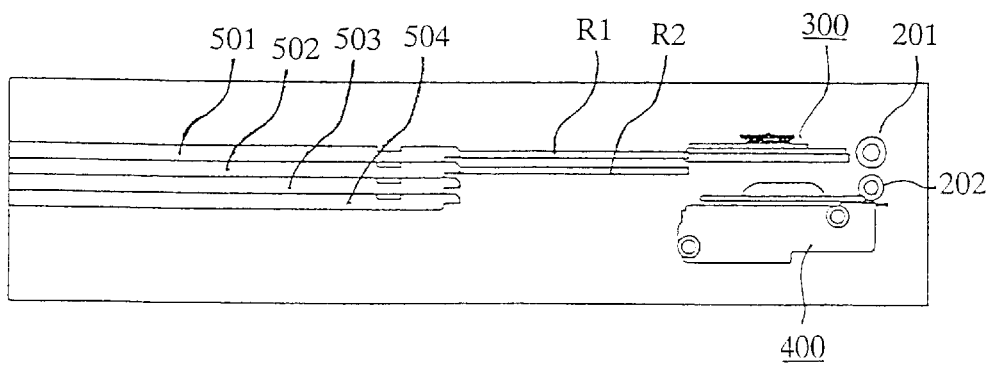

FIGS. 72*a* and 72*b* are views showing a state in which the stockers are entirely lifted a height corresponding to one stocker stage; FIGS. 73*a* and 73*b* are views showing a state in which a command allowing a disk R2 to be inserted into the second stocker 502 is supplied from the operating portion (not shown) or the like and the second stocker is moved toward the insertion port; FIGS. 74*a* and 74*b* are views showing a state in which the disk R2 is inserted from the insertion port 101; FIGS. 75*a* and 75*b* are views showing a state in which the disk R2 is contained in the disk containing portion of the first stocker 502; and FIGS. 76*a* and 76*b* are views showing a state in which the second stocker 502 containing the disk R2 is moved to the original position, that is, the position shown in FIGS. 67*a* and 67*b*.

Figure 77A:
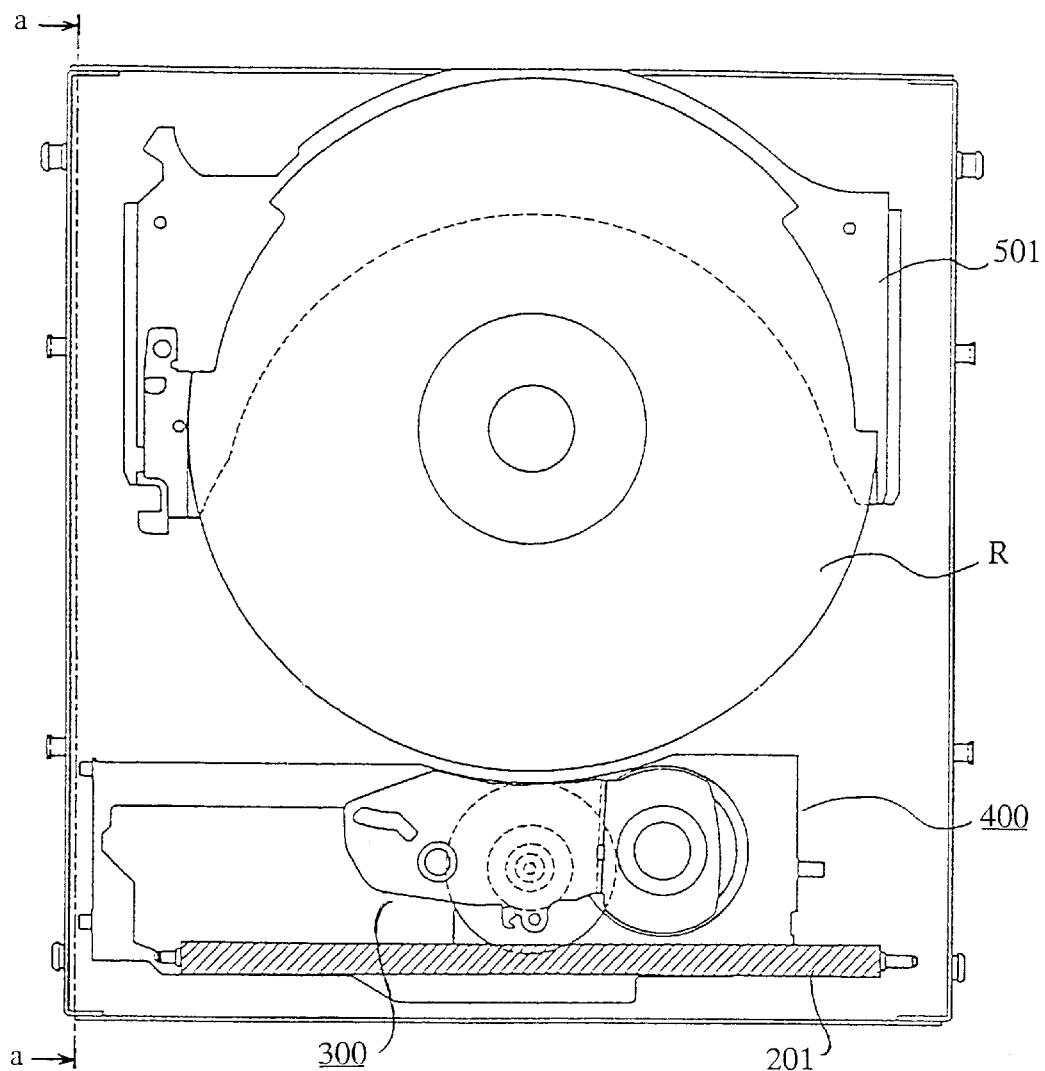
FIGS. 77a and 77b are a top view and a sectional side view respectively, showing a basic operation of the entire disk system shown in FIG. 1.
Figure 77B:
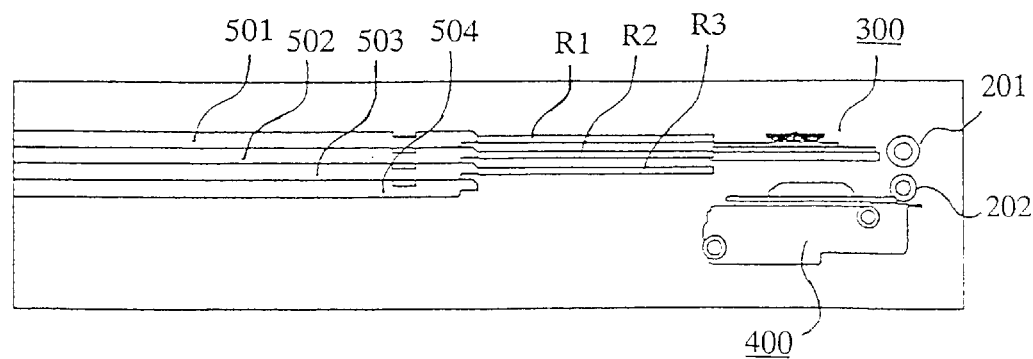
Figure 78A:
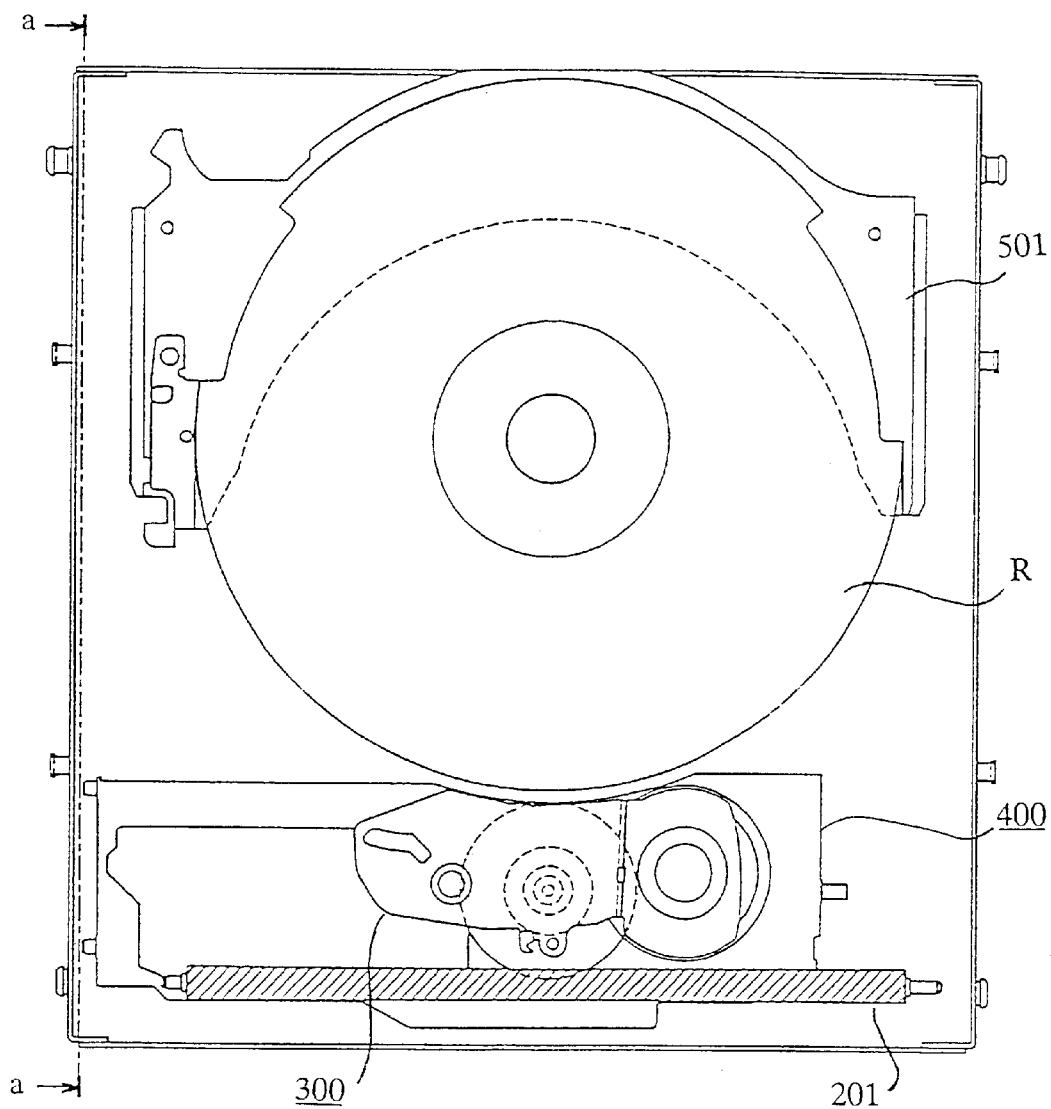
FIGS. 78a and 78b are a top view and a sectional side view respectively, showing a basic operation of the entire disk system shown in FIG. 1.
Figure 78B:
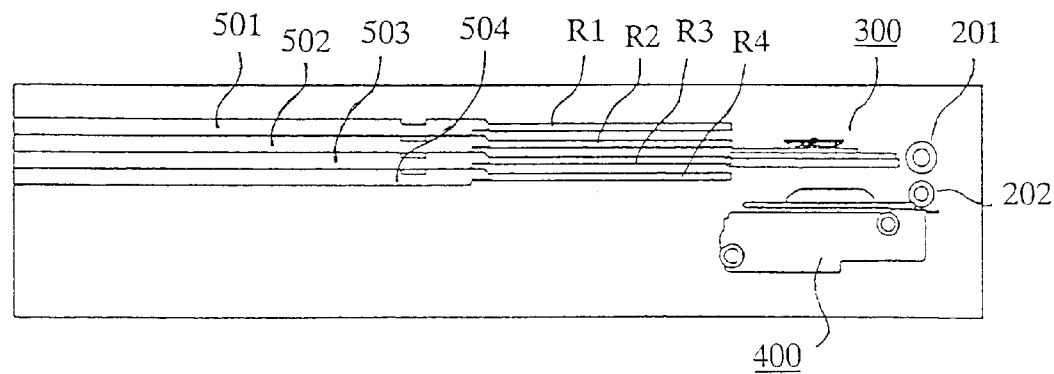

FIGS. 77*a* and 77*b* are views showing a state in which a disk R3 is contained in the third stocker 503 and the third stocker 503 is returned to the original position, that is, the position shown in FIGS. 67*a* and 67*b*; and FIGS. 78*a* and 78*b* are views showing a state in which a disk R4 is contained in the fourth stocker 504 and the fourth stocker 504 is returned to the original position, that is, the position shown in FIGS. 67*a* and 67*b*.

Figure 79A:
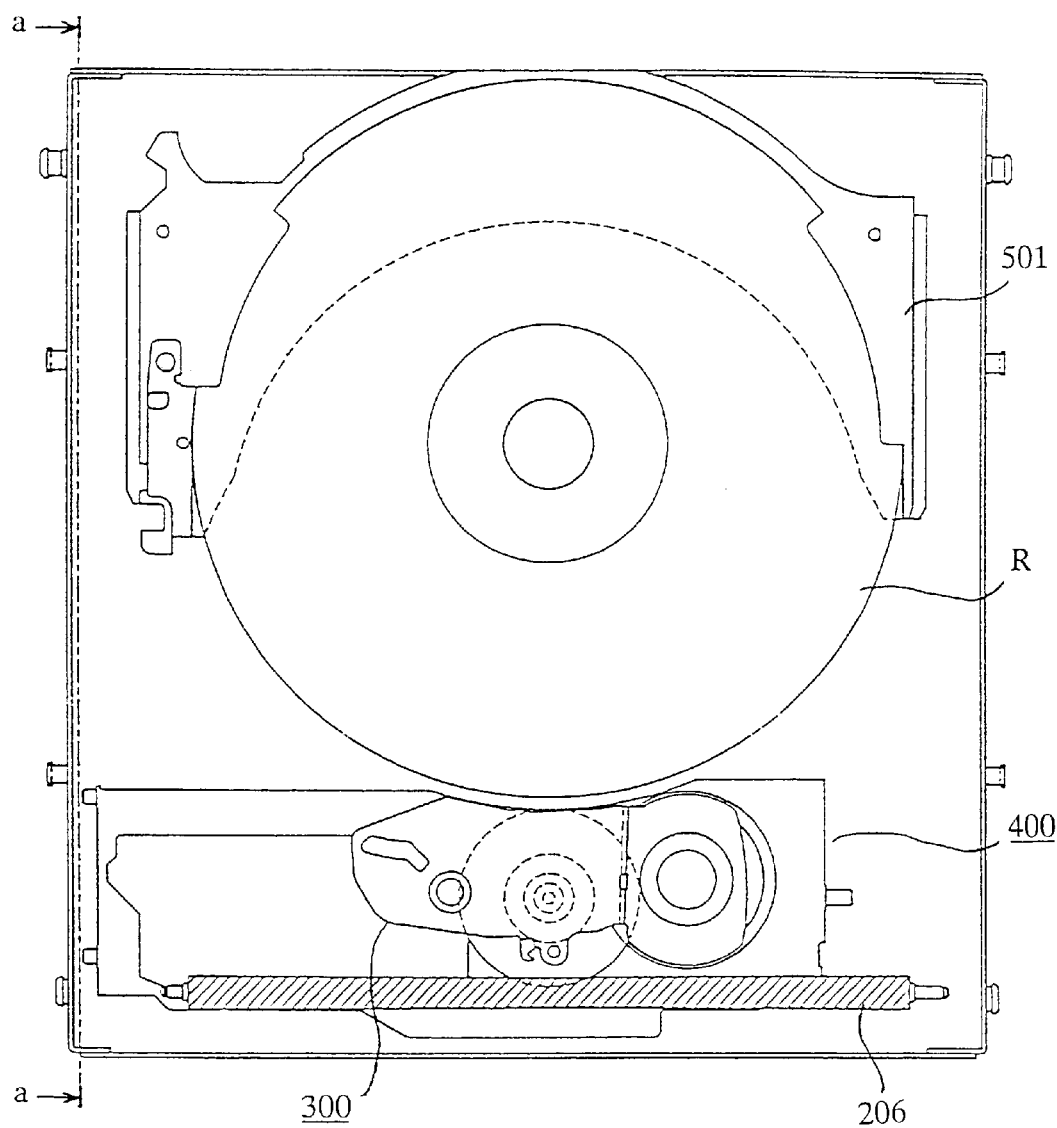
FIGS. 79a and 79b are a top view and a sectional side view respectively, showing a basic operation of the entire disk system shown in FIG. 1.
Figure 79B:
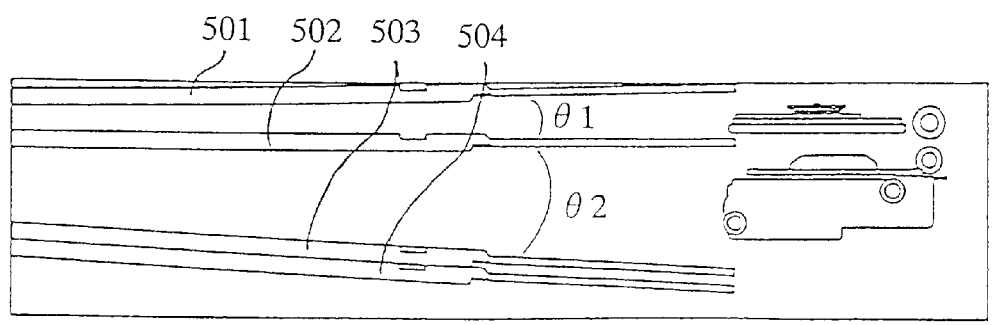
Figure 80A:
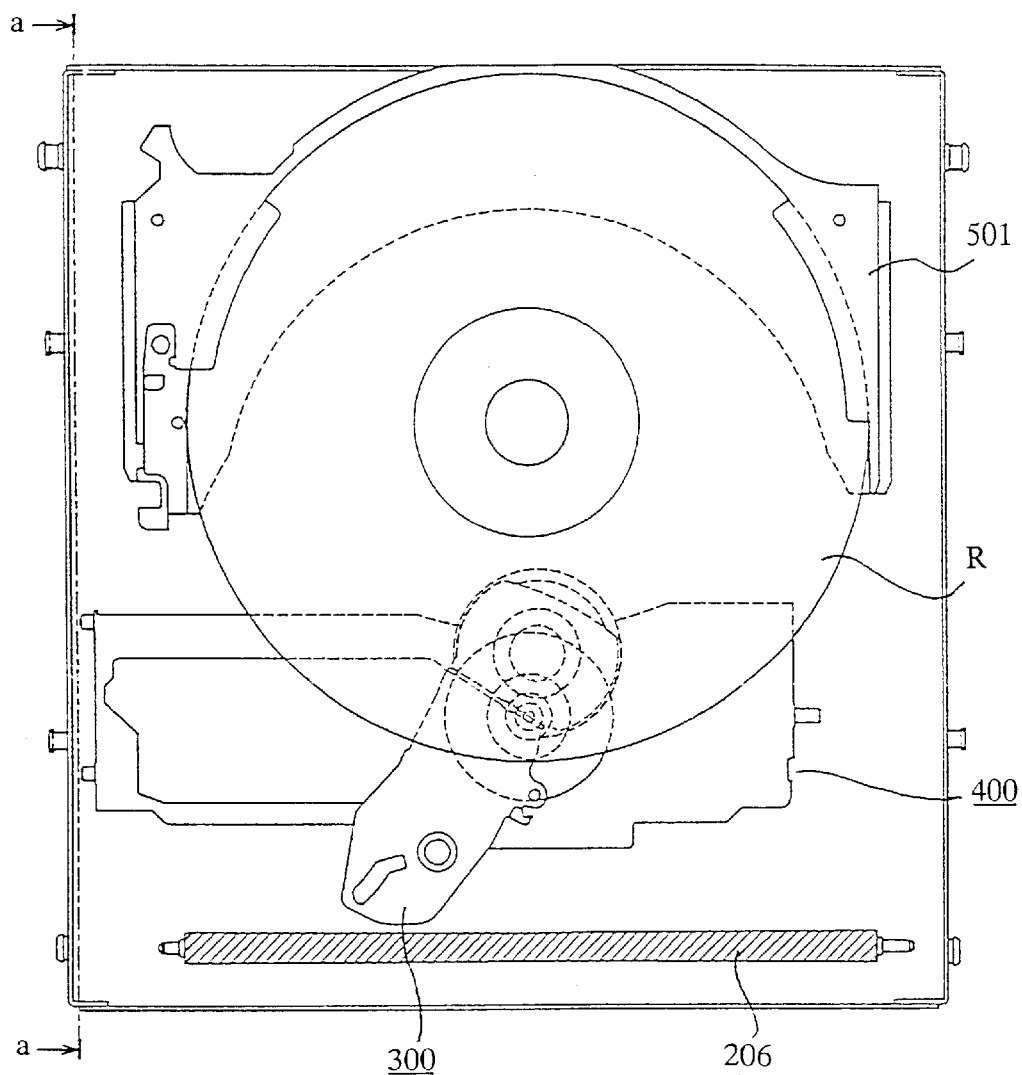
FIGS. 80a and 80b are a top view and a sectional side view respectively, showing a basic operation of the entire disk system shown in FIG. 1.
Figure 80B:
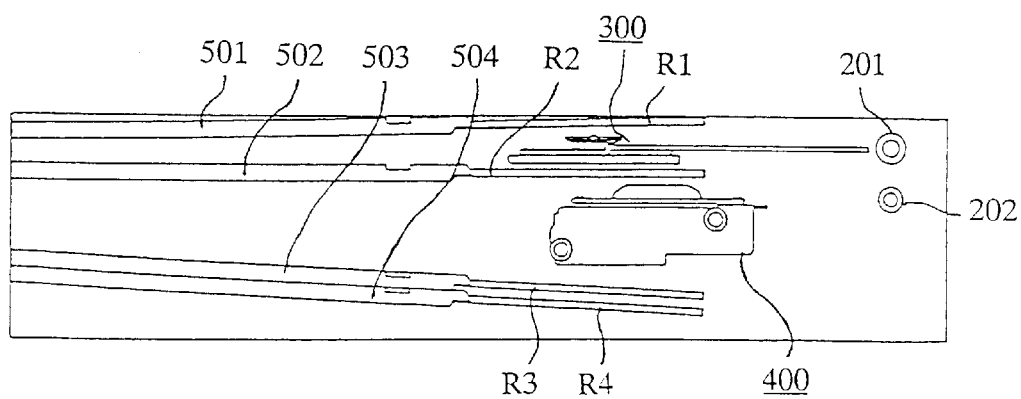

FIGS. 79*a* and 79*b* are views showing a state in which a command allowing reproducing of the disk R2 is supplied from the operating portion (not shown) and the second stocker 502 containing the disk R2 is separated from the other stockers, that is, the first stocker 501, third stocker 503 and fourth stocker 504; and FIGS. 80*a* and 80*b* are views showing a state in which the disk clamper portion 300 and the disk reproducing portion 400 are moved for reproducing the disk R2.

Figure 81A:
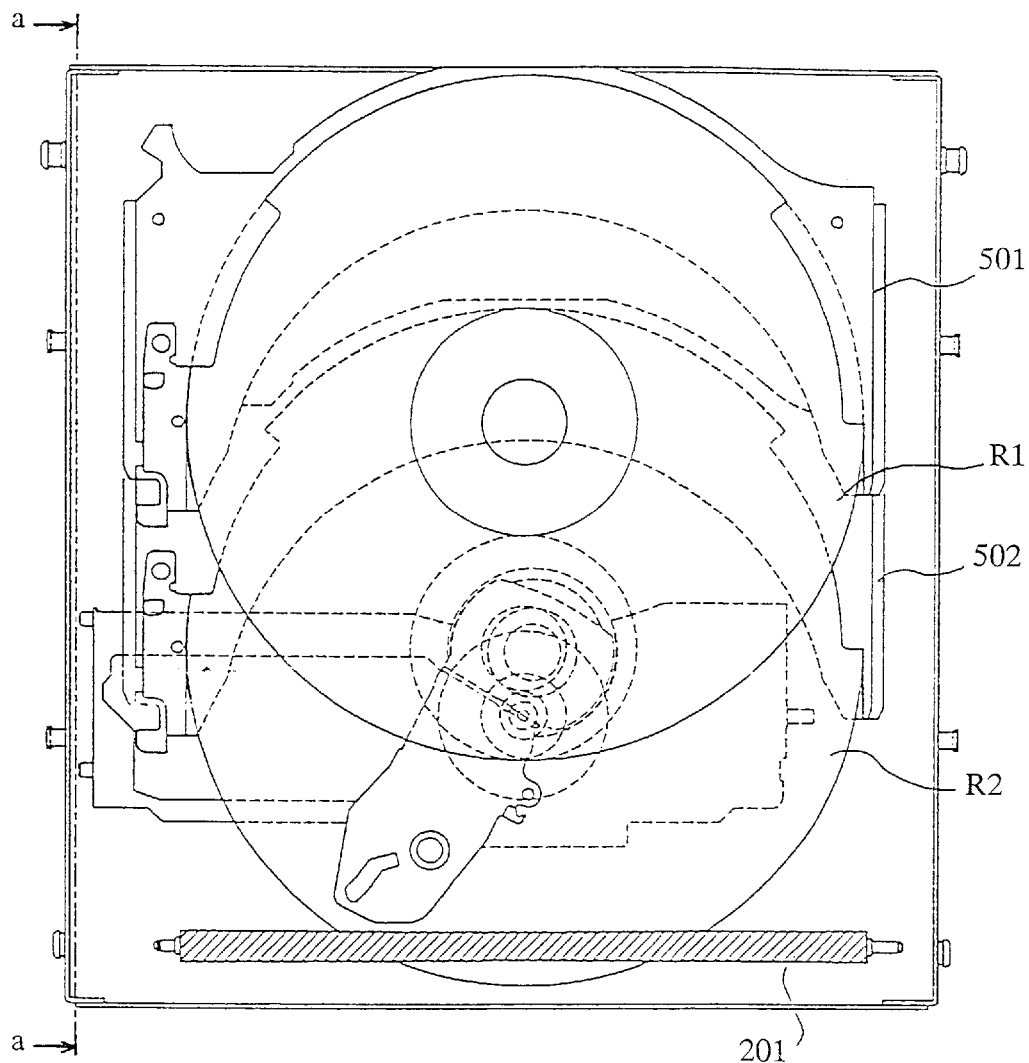
FIGS. 81a and 81b are a top view and a sectional side view respectively, showing a basic operation of the entire disk system shown in FIG. 1.
Figure 81B:
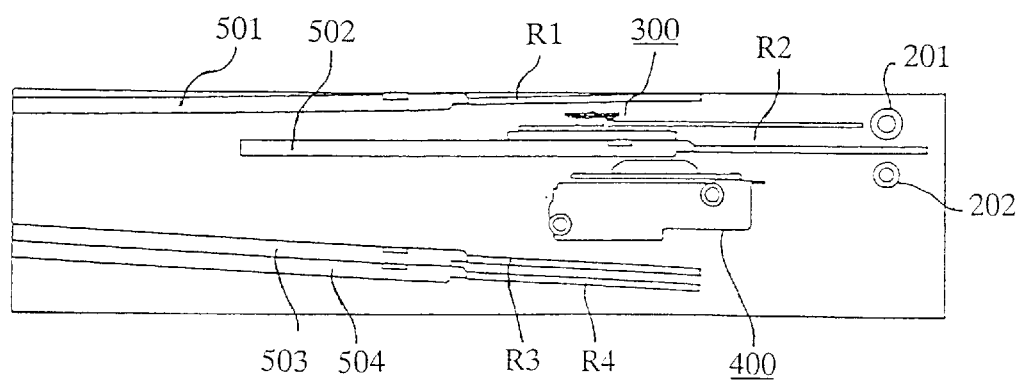
Figure 82A:
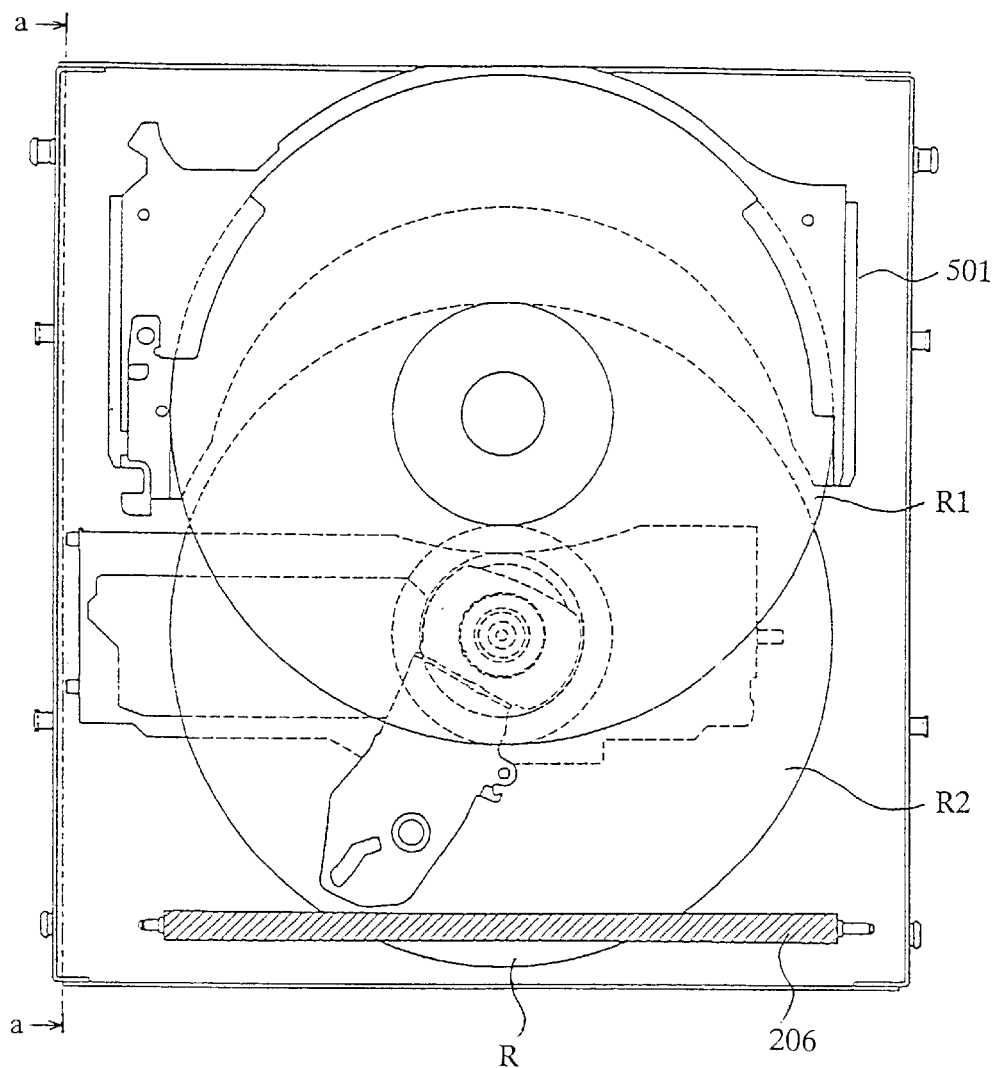
FIGS. 82a and 82b are a top view and a sectional side view respectively, showing a basic operation of the entire disk system shown in FIG. 1.
Figure 82B:
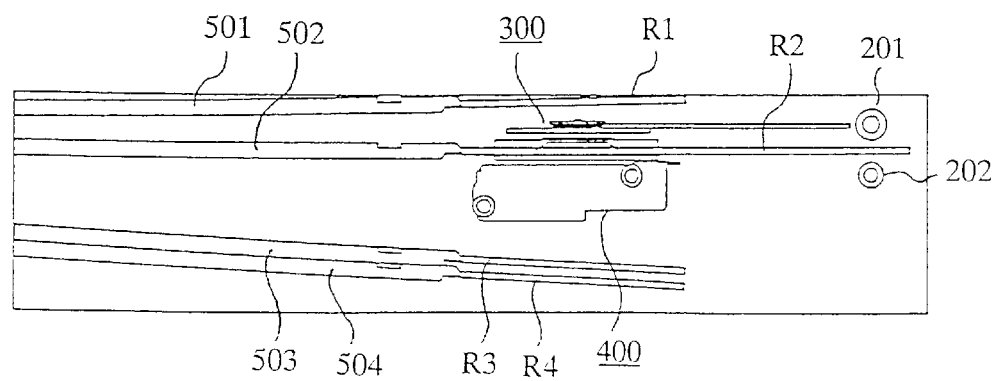

FIGS. 81*a* and 81*b* are views showing a state in which the second stocker 502 is moved toward the insertion port; and FIGS. 82*a* and 82*b* are views showing a state in which the disk R2 is held between the disk clamper portion 300 and the disk reproducing portion 400 and the second stocker 502 is returned to the original position, followed by reproducing of the disk R2.

In addition, each of FIGS. 67*a*, . . . , 82*a* is a sectional top view, and each of FIGS. 67*b*, . . . , 82*b* is a sectional side view taken on line a—a.

First, as shown in FIG. 67, in the state in which no disk is contained in the disk system, that is, in the initial state, the first stocker 501 to the fourth stocker 504 are disposed closely to a peripheral edge portion of the housing 100 on the opposed side of the insertion port 101 and further upper and lower gaps are little provided between the stockers.

Further, the disk reproducing portion 400 and the disk clamper portion 300 are disposed closely to the upper disk roller 201 and the lower disk roller 202 disposed near the insertion port 101, and the disk system is ready for reception of a command allowing insertion of a disk from the operating portion (not shown) in a state in which a gap between both the disk rollers is kept at minimum.

Then, a specific command allowing the disk R1 to be contained in the first stocker 501 is supplied from the operating portion.

Next, the first stocker 501 is moved, by the above-described moving mechanism portion 520 for moving each stocker, from the position shown in FIGS. 67*a* and 67*b* in the direction B and is set at a specific position shown in FIGS. 68*a* and 68*b*, that is, a position at which the stocker 501 can contain the disk R; and the first stocker 501 is ready for insertion of the disk.

When the disk R1 is inserted from the insertion port 101 as shown in FIGS. 69*a* and 69*b*, it is contained in the first stocker 501 by the disk loading mechanism 200 (FIGS. 70*a* and 70*b*), and the fist stocker 501 is moved in the direction A to be returned to the original position shown in FIGS. 67*a* and 67*b* (see FIGS. 71*a* and 71*b*).

Before insertion of the next disk R2, to adjust a height of the stocker 502 for containing the disk R2 to a height of the insertion port 101, the stockers are entirely lifted a height corresponding to one stocker stage by the above moving mechanism portion 520 (FIGS. 72*a* and 72*b*), and then the stocker 502 for containing the disk R2 is moved in the direction B and is set at a specific position (FIGS. 73*a* and 73*b*). And, the disk R2 inserted from the insertion port 101 is carried in the disk system by the disk loading portion 200 (FIGS. 74*a* and 74*b*) and is contained and held in the second stocker 502 (FIGS. 75*a* and 75*b*). The, as shown in FIGS. 76*a* and 76*b*, the second stocker 502 is moved in the direction A to be returned to the original position.

Similarly, as shown in FIGS. 78*a* and 78*b*, the disk R3 is contained in the third stocker 503, and as shown in FIGS. 79*a* and 79*b*, the disk R4 is contained in the fourth stocker 504.

In this case, as shown in FIG. 79*b*, the stockers are separated from each other. To be more specific, the second stocker 502 is separated from the first, third, and fourth stockers 501, 503 and 504 in such a manner that the gap between the first stocker 501 and the second stocker 502 is tilted at a first angle θ1 and the gap between the second stocker 502 and the third and fourth stockers 503 and 504 is tilted at a second angle θ2.

Next, when a command allowing reproducing of the disk R2 is supplied from the operating portion (not shown), as shown in FIGS. 79*a* and 79*b*, the above moving mechanism portion 520 sets the second stocker 502 containing the target disk R2 at a specific height at which the disk R2 can be reproduced, and tilts the other stockers for separating the second stocker 502 therefrom.

Then, the disk clamper portion 300 is inserted in the gap between the disks R1 and R2, and the disk reproducing portion 400 is moved in the direction A and is inserted in the gap between the disks R2 and R3, with the gap between the upper disk roller 201 and the lower disk roller 202 being enlarged (FIGS. 80*a* and 80*b*).

Further, to reproduce the disk R2 as shown FIGS. 81*a* and 81*b*, the second stocker 502 containing the disk R2 is moved in the direction B up to a specific position.

Next, as shown in FIGS. 82*a* and 82*b*, the disk clamper portion 300 is further moved in the direction A to be inserted in the gap between the first stocker 501 and the second stocker 502. Similarly, the disk reproducing portion 400 is further moved in the direction A to be inserted in the gap between the second stocker 502 and the third stocker 502. At this time, the gap between the upper disk roller 201 and the lower disk roller 202 is enlarged at maximum. Thus, the disk R2 is held between the disk clamper portion 300 and the disk reproducing portion 400, and then the second stocker 502 is moved to the original position and releases the holding of the disk R2, followed by reproducing of the disk R2.

Next, there will be described the operation (2), that is, the operational step of the entire disk system in which reproducing of the disk R2 is stopped and the disk R2 is contained in the second stocker 502 again, and the disk R3 contained in the third stocker 503 is reproduced, with reference to FIGS. 83*a* to 90*b*.

Figure 83A:
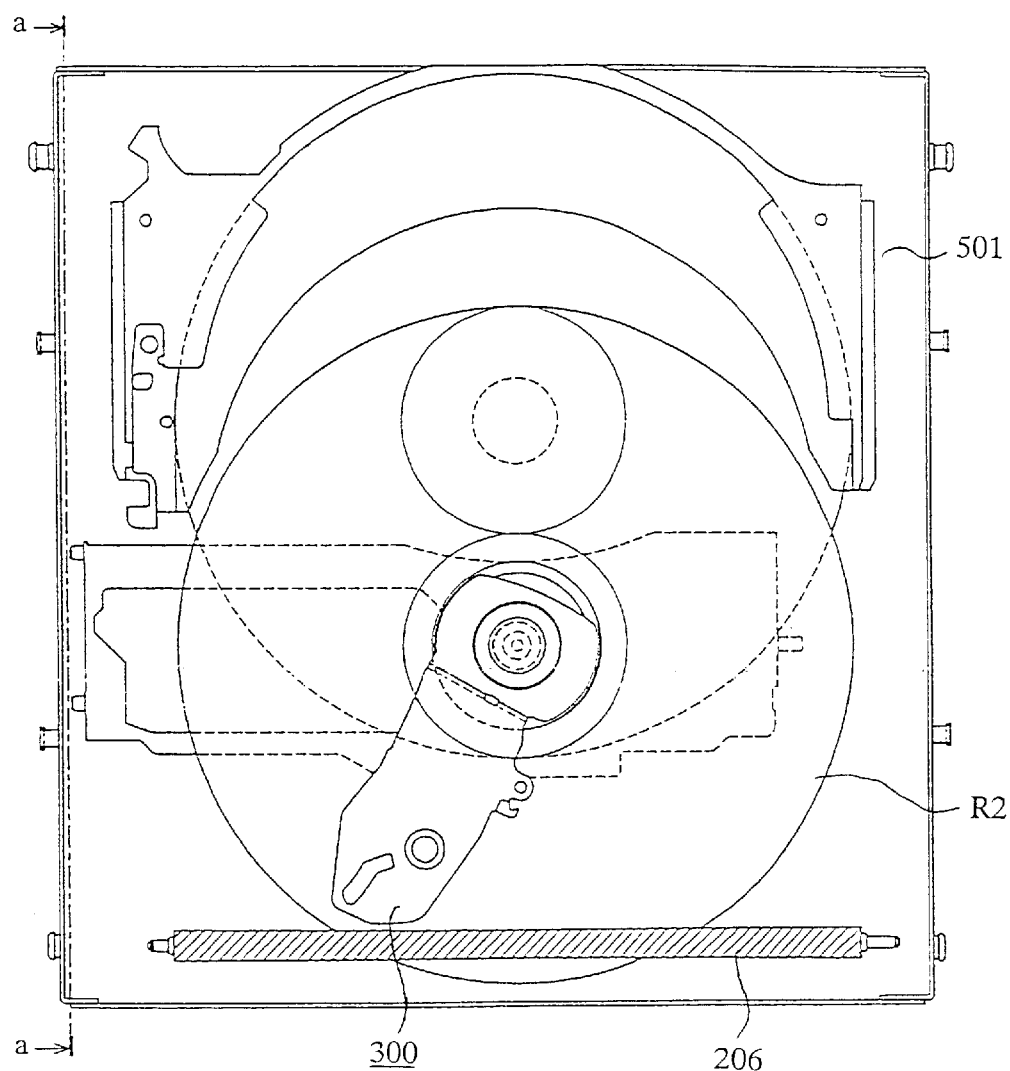
FIGS. 83a and 83b are a top view and a sectional side view respectively, showing a basic operation of the entire disk system shown in FIG. 1.
Figure 83B:
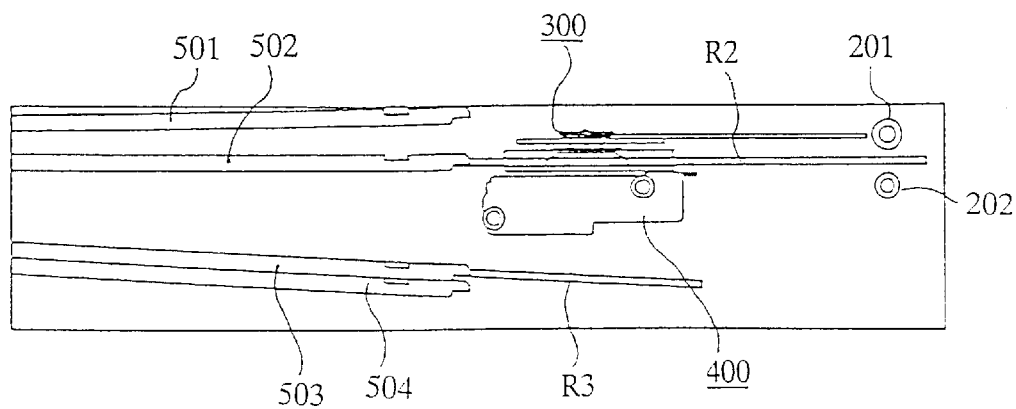
Figure 84A:
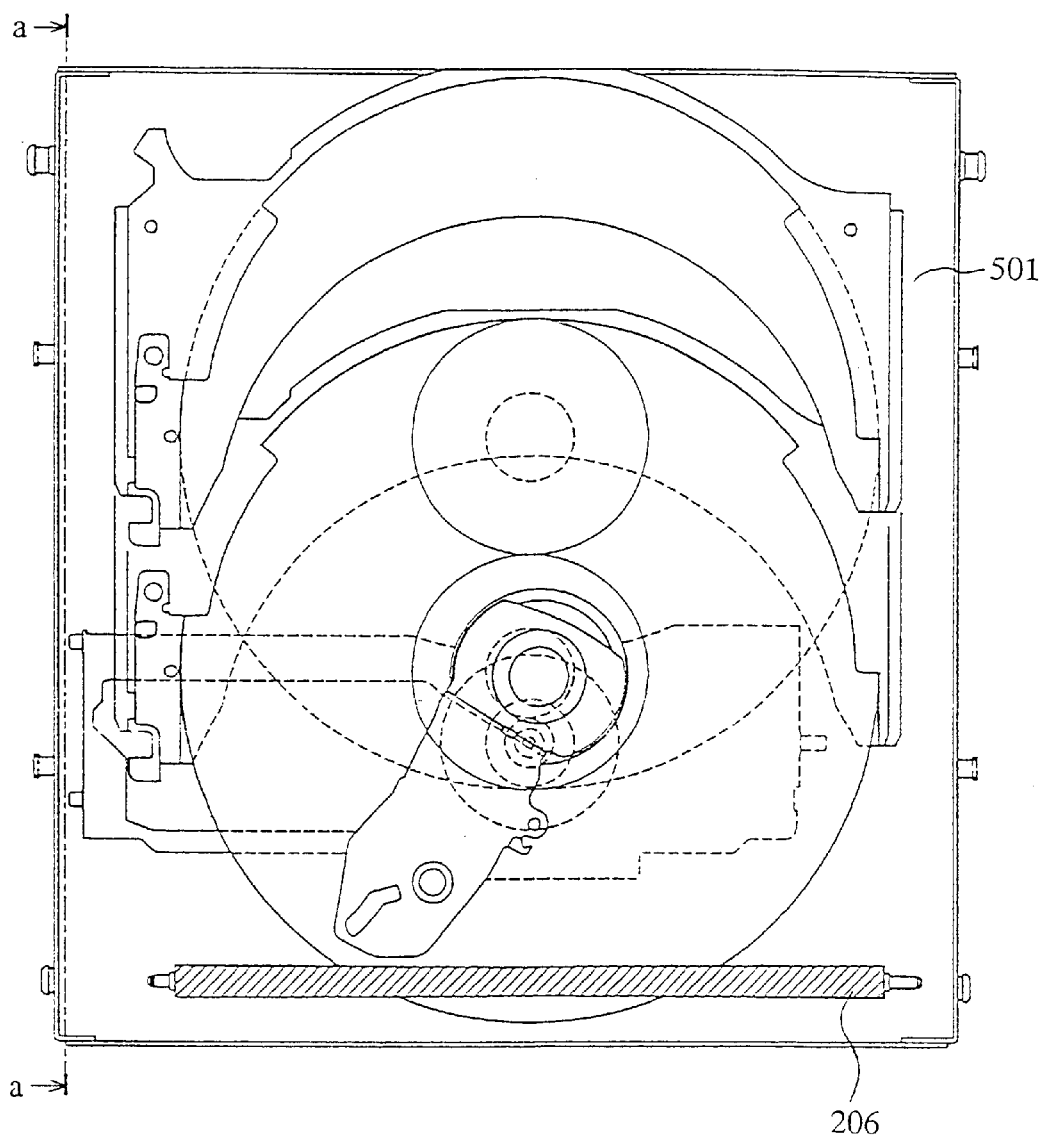
FIGS. 84a and 84b are a top view and a sectional side view respectively, showing a basic operation of the entire disk system shown in FIG. 1.
Figure 84B:
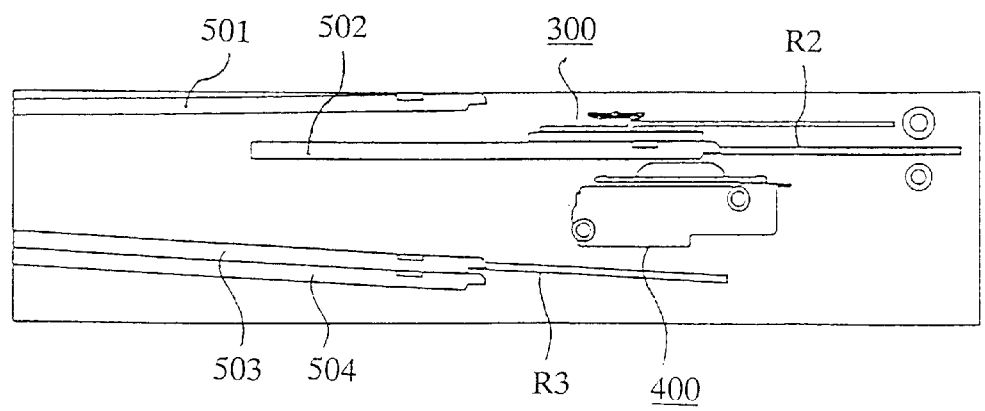
Figure 85A:
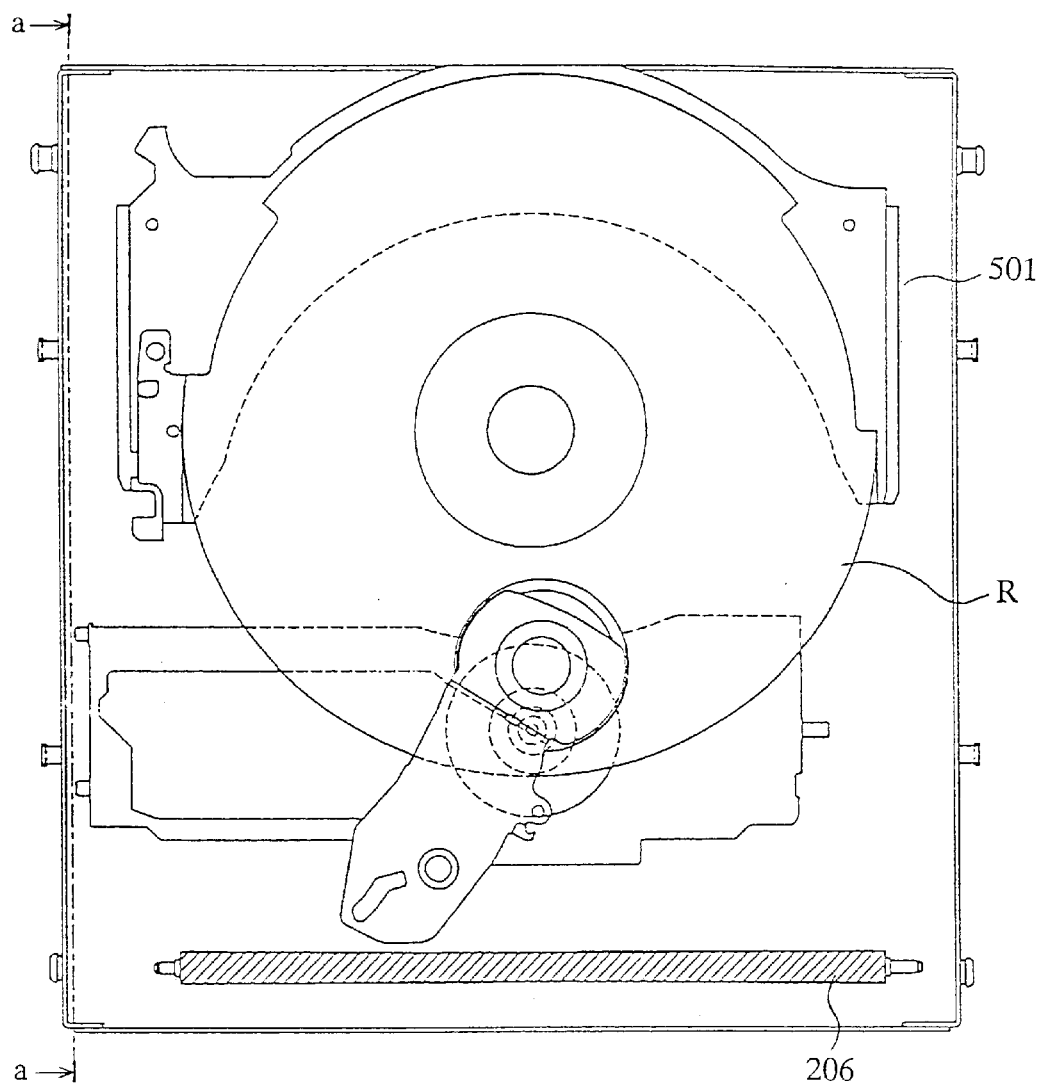
FIGS. 85a and 85b are a top view and a sectional side view respectively, showing a basic operation of the entire disk system shown in FIG. 1.
Figure 85B:
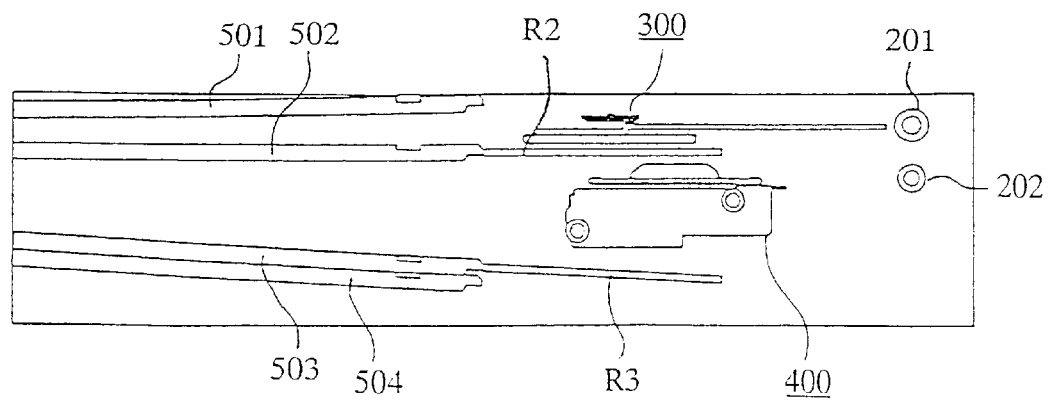
Figure 86A:
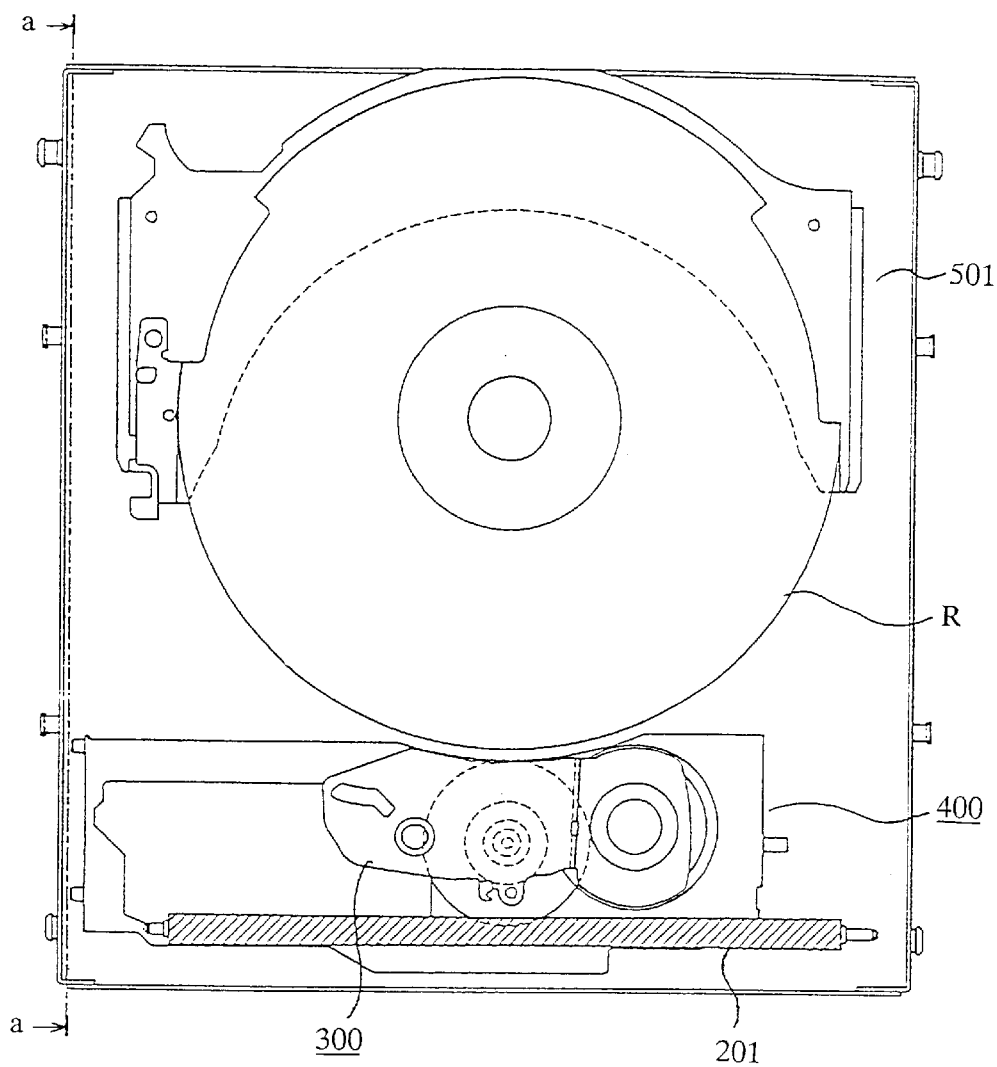
FIGS. 86a and 86b are a top view and a sectional side view respectively, showing a basic operation of the entire disk system shown in FIG. 1.
Figure 86B:
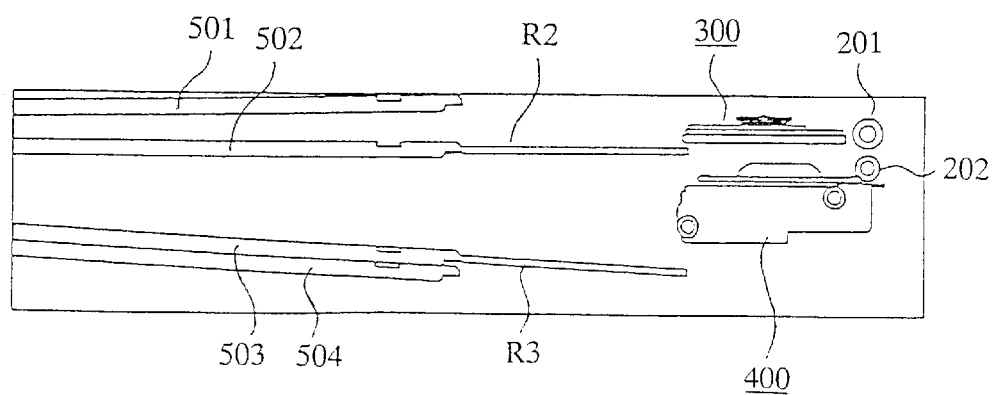

FIGS. 83*a* and 83*b* are views showing a state in which the disk R3 is contained in the third stocker 503 and the disk R2 is reproduced; FIGS. 84*a* and 84*b* are views showing a state in which the second stocker 502 is moved to a position at which the second stocker 502 can contain the disk R2 while holding the disk R2 and the disk reproducing portion 400 is slightly returned to the original position as shown in FIGS. 67*a* and 67*b*; FIGS. 85*a* and 85*b* are views showing a state in which the second stocker 502 contains the disk R2 and is returned to the original position; and FIGS. 86*a* and 86*b* are views showing a state in which movement of the disk clamper portion 300 and the disk reproducing portion 400 to the original positions is completed.

Figure 87A:
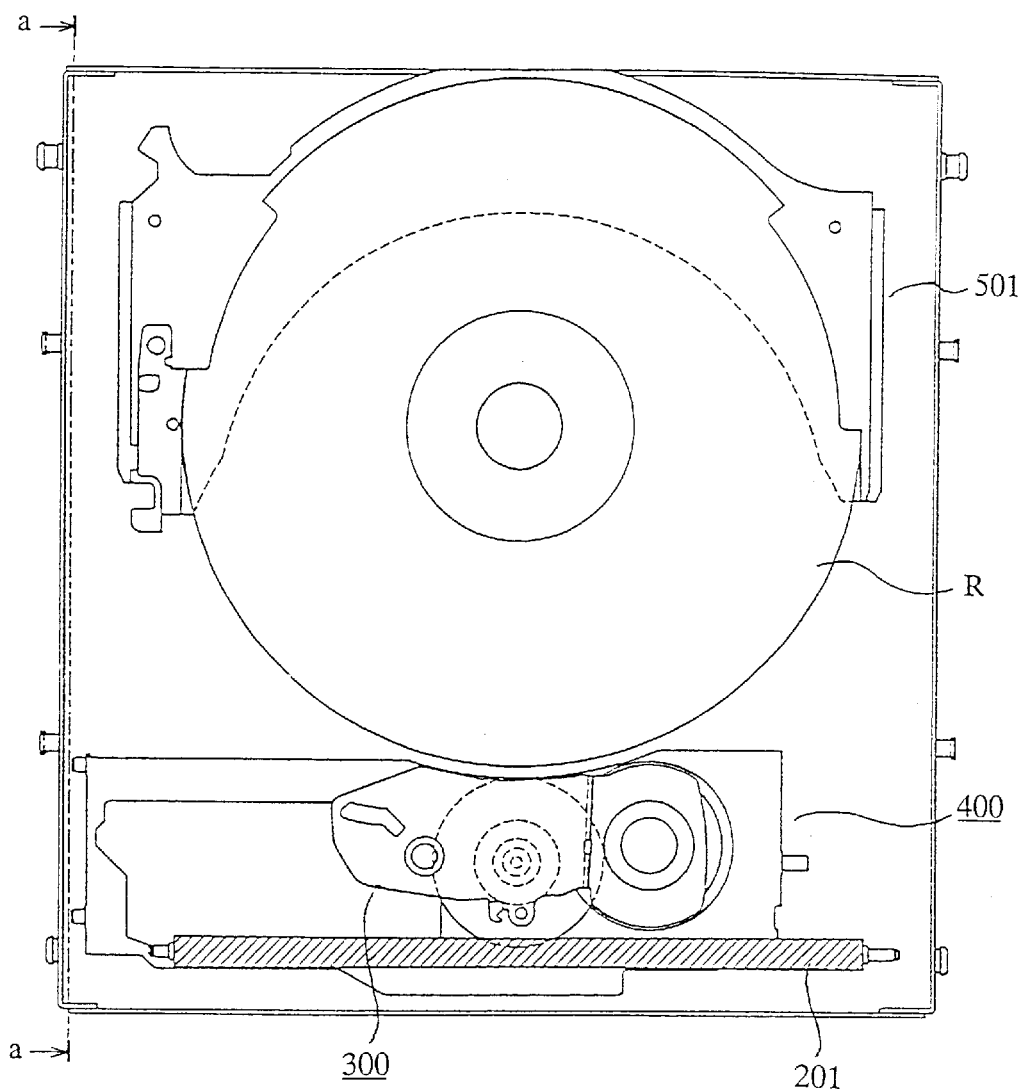
FIGS. 87a and 87b are a top view and a sectional side view respectively, showing a basic operation of the entire disk system shown in FIG. 1.
Figure 87B:
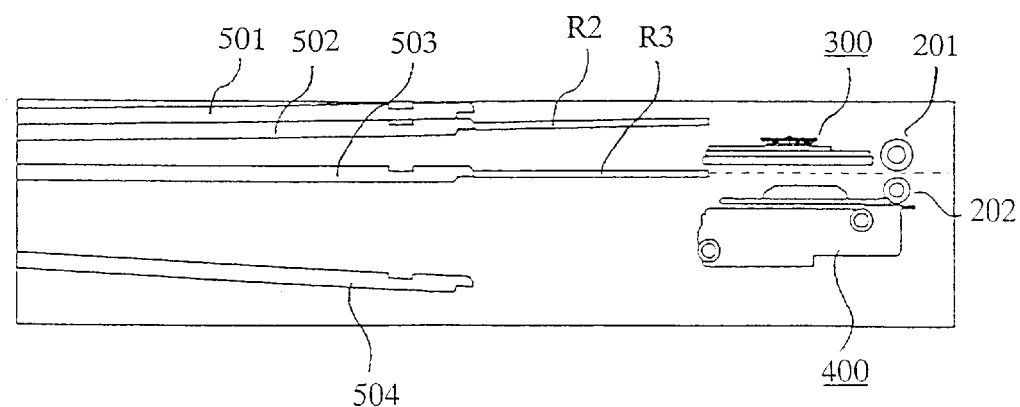
Figure 88A:
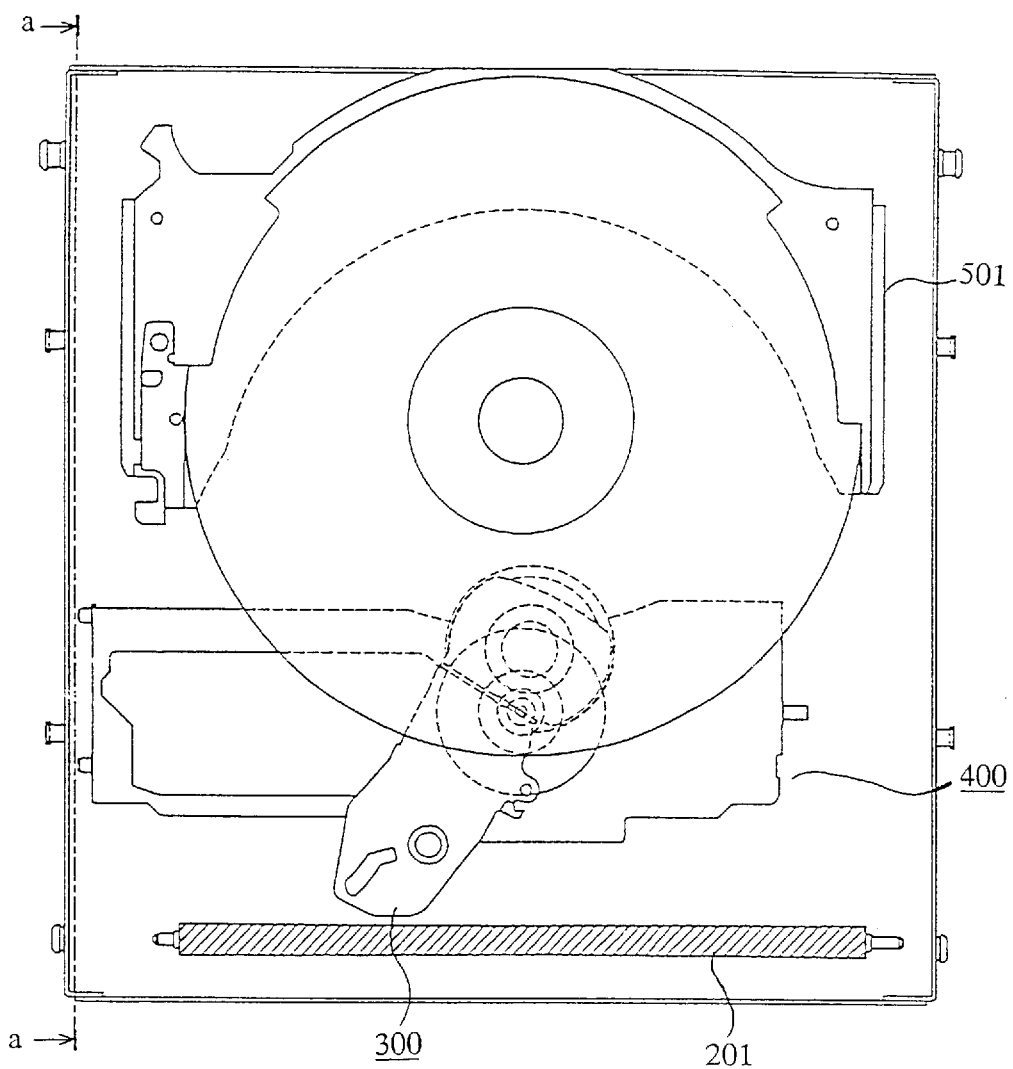
FIGS. 88a and 88b are a top view and a sectional side view respectively, showing a basic operation of the entire disk system shown in FIG. 1.
Figure 88B:
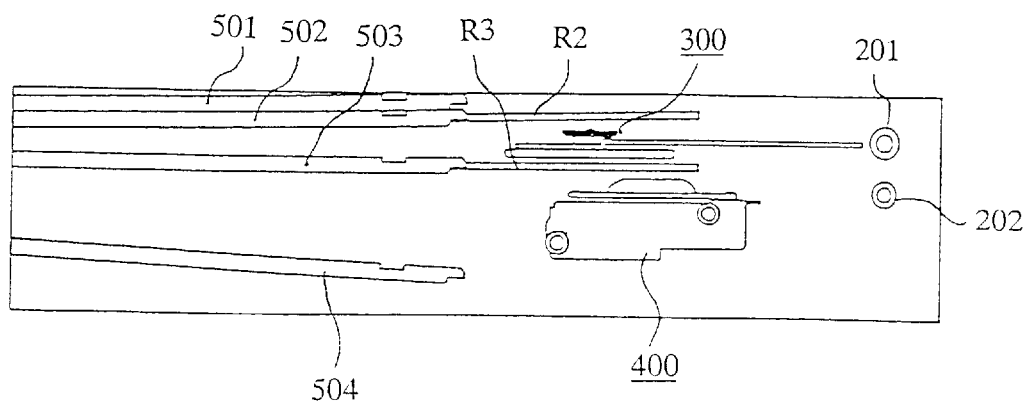
Figure 89A:
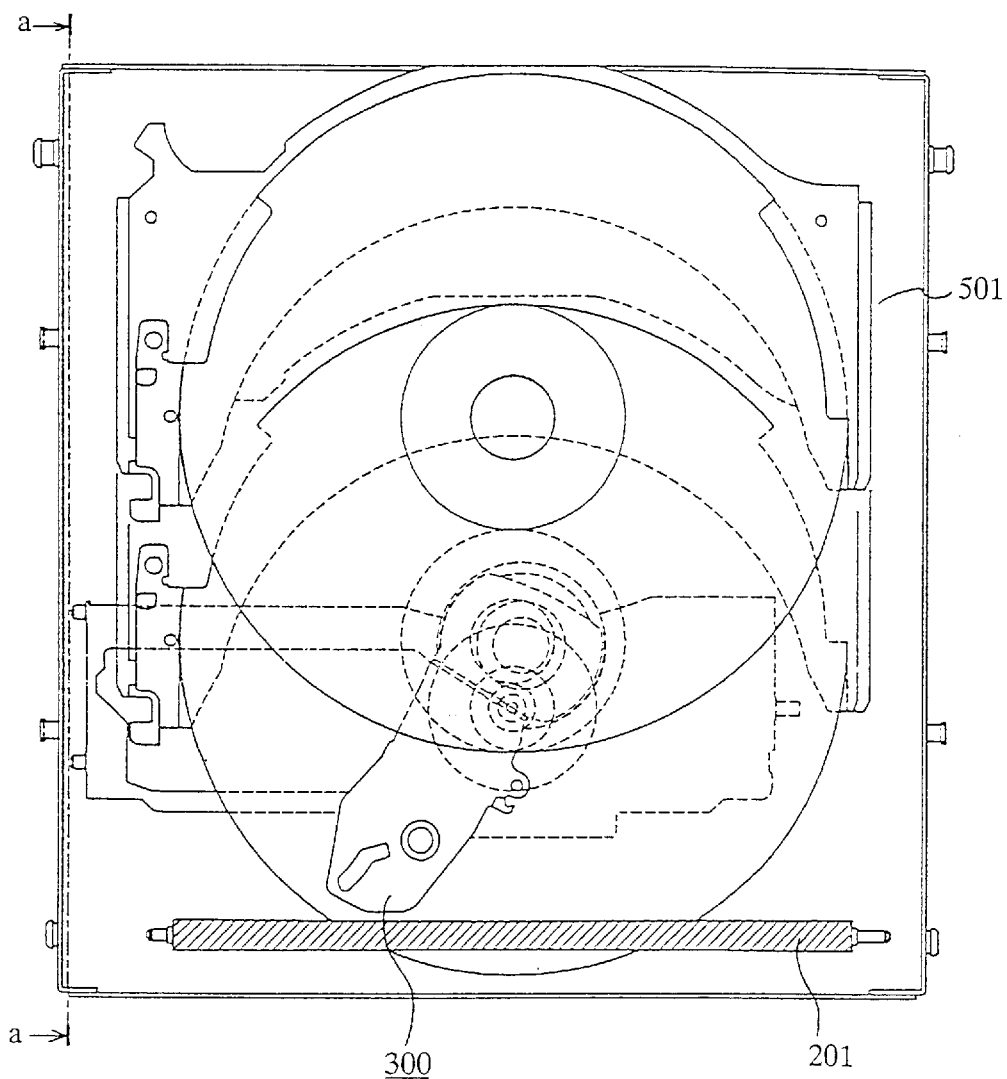
FIGS. 89a and 89b are a top view and a sectional side view respectively, showing a basic operation of the entire disk system shown in FIG. 1.
Figure 89B:
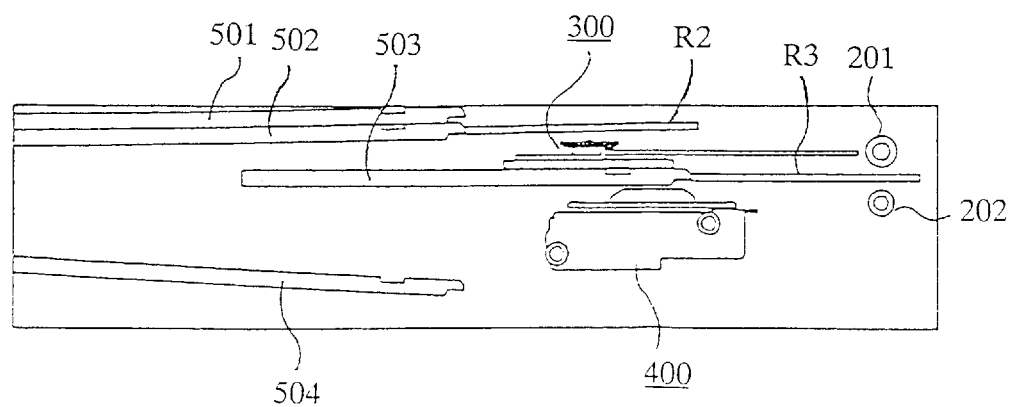
Figure 90A:
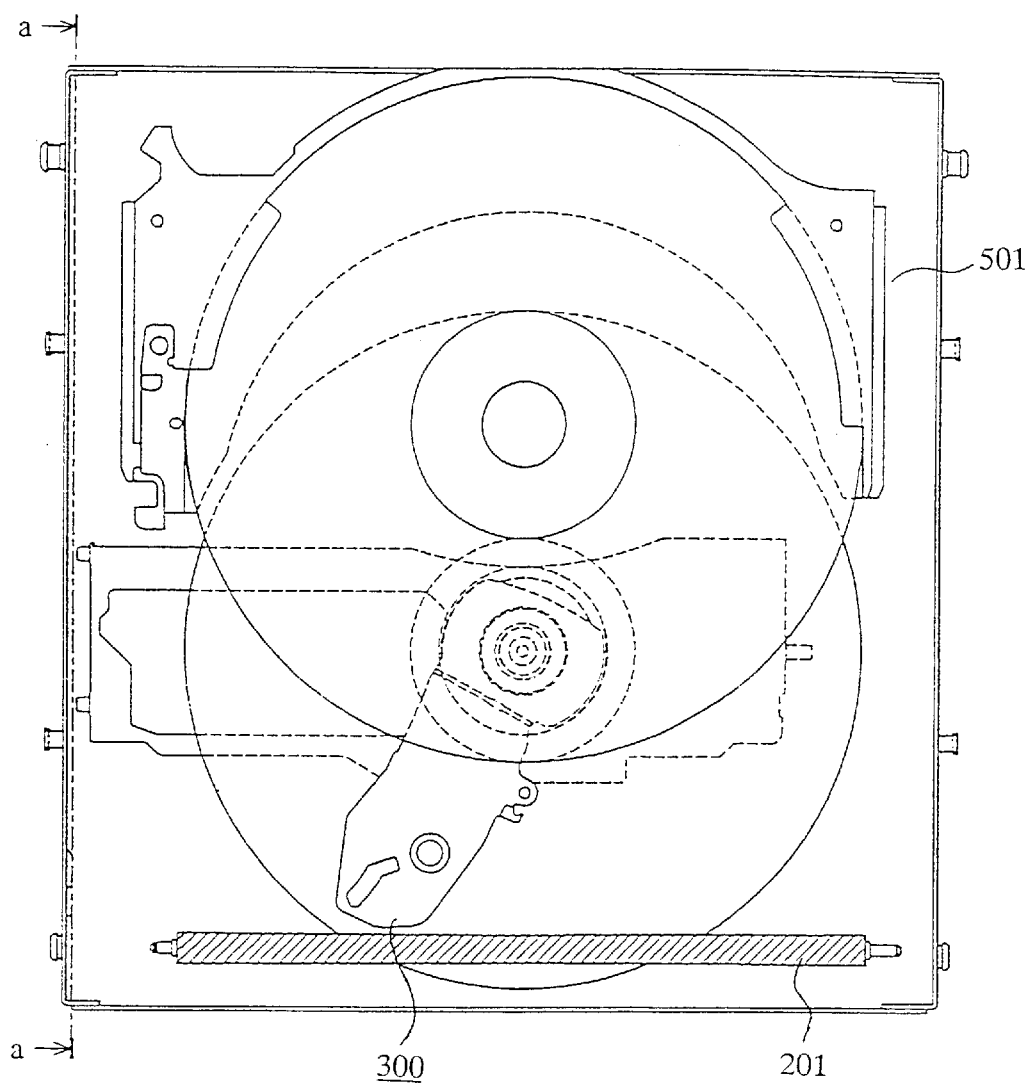
FIGS. 90a and 90b are a top view and a sectional side view respectively, showing a basic operation of the entire disk system shown in FIG. 1.
Figure 90B:
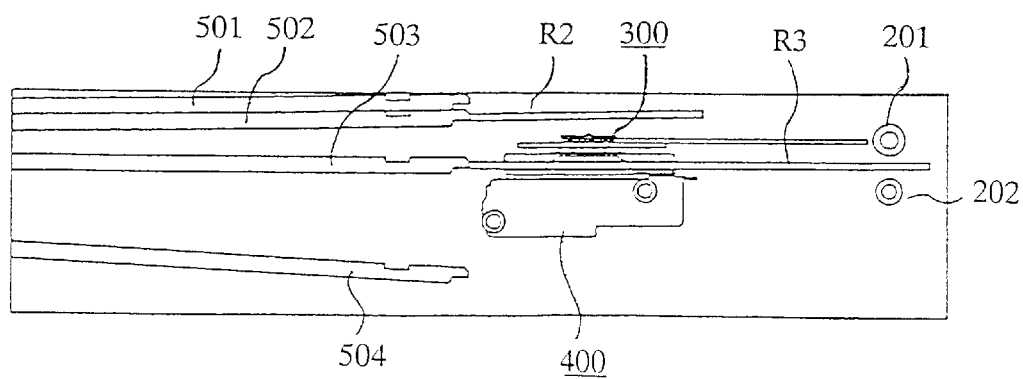

FIGS. 87*a* and 87*b* are views showing a state in which the stockers are lifted while being separated from each other; FIGS. 88*a* and 88*b* are views showing a state in which the disk clamper portion 300 and the disk reproducing portion 400 are moved on the third stocker 503 side; FIGS. 89*a* and 89*b* are views showing a state in which the third stocker 503 is moved on the insertion port 101 side; and FIGS. 90*a* and 90*b* are views showing a state in which the disk R3 is held between the disk clamper portion 300 and the disk reproducing portion 400, and the third stocker 503 is moved to the original position and releases the holding of the disk R3, followed by reducing of the disk R3.

In addition, each of FIGS. 83*a*, . . . , 90*a* is a sectional top view, and each of FIGS. 83*b*, . . . , 90*b* is a sectional side view taken on line a—a.

First, when a command allowing reproducing of the disk R3 is supplied from the operating portion (not shown) in the state in which the disk R2 is held between the disk clamper portion 300 and the disk reproducing portion 400 as shown in FIGS. 83*a* and 83*b* for reproducing the disk R2, the second stocker 502 is first moved in the direction B to hold and contain the disk R2 located at the reproducing position.

Next, the disk reproducing portion 400 releases the disk R2 and is slightly returned in the direction A (FIGS. 84a and 84b).

The second stocker 502, which contains the disk R2 with its holding by the disk clamper portion 300 and the disk reproducing portion 400 being released, is moved in the direction A to be returned to the original position (FIGS. 85a and 85b), and as shown in FIGS. 86a and 86b, not only the disk reproducing portion 400 but also the disk clamper portion 300 is returned to the original position, and the gap between the upper disk roller 201 and the lower disk roller 202 is reduced at minimum.

Next, to adjust the height of the third stocker 503 to the height of the insertion port 101, the second stocker 502 and the fourth stocker 503 are lifted while being separated from each other (FIGS. 87a and 87b), and the disk clamper portion 300 and the disk reproducing portion 400 are moved in the direction A and also the gap between the upper disk roller 201 and the lower disk roller 202 is enlarged. Then, the disk clamper portion 300 is inserted in the gap between the disks R2 and R3, and the disk reproducing portion 400 is disposed substantially under the disk R3 (FIGS. 88a and 88b).

Further, the third stocker 503 containing the disk R3 is moved in the direction B up to a position at which the disk R3 can be reproduced (FIGS. 89a and 89b), and as shown in FIGS. 90a and 90b, the disk reproducing portion 400 is further moved in the direction A so that the disk R3 is held between the disk clamper portion 300 and the disk reproducing portion 400.

After holding the disk R, the gap between the upper disk roller 201 and the lower disk roller 202 is enlarged at maximum, and the third stocker 503 is moved in the direction A to be returned to the original position and releases the holding of the disk R3, to start reproducing of the disk R3.

Finally, there will be described the operation (3), that is, the operating in which the disk R2 is ejected during reproducing of the disk R3, with reference to FIGS. 90a to 96b.

Figure 91A:
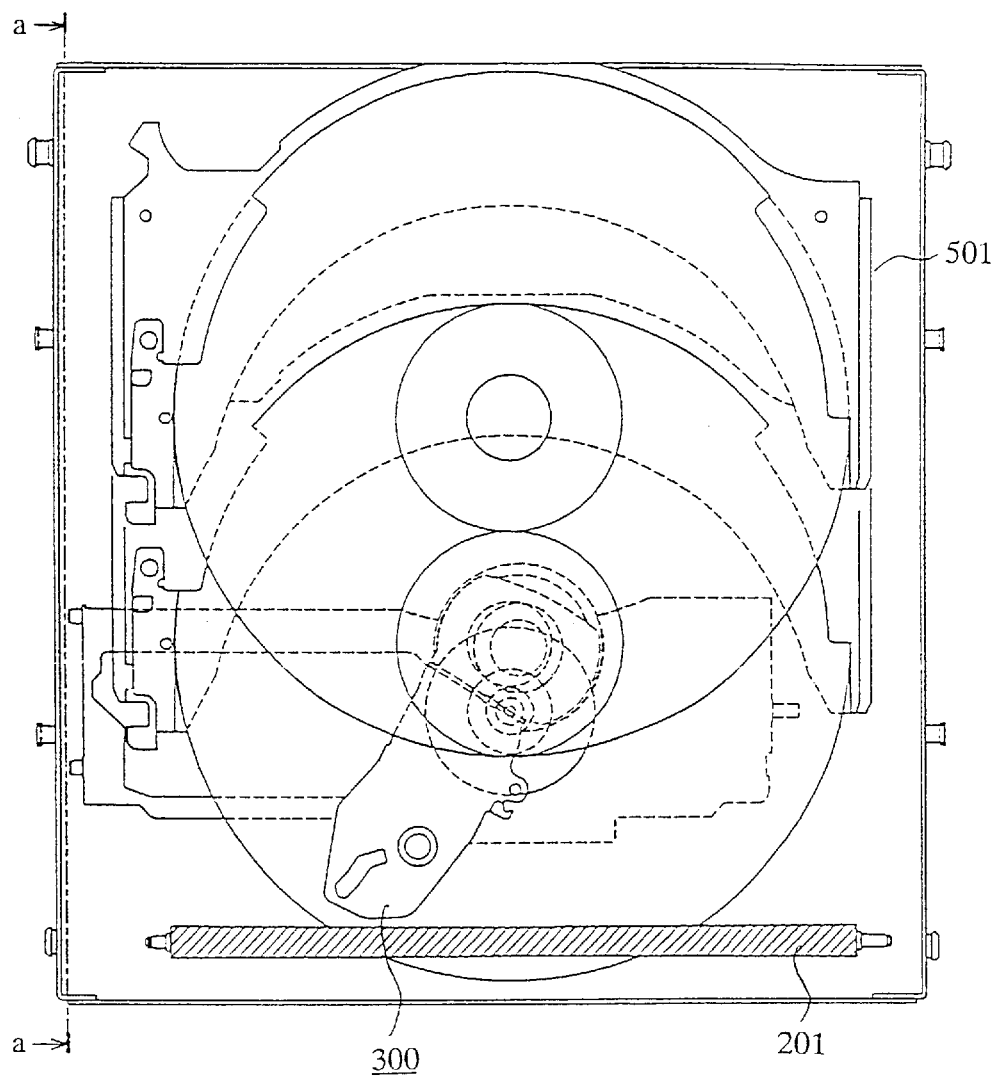
FIGS. 91a and 91b are a top view and a sectional side view respectively, showing a basic operation of the entire disk system shown in FIG. 1.
Figure 91B:
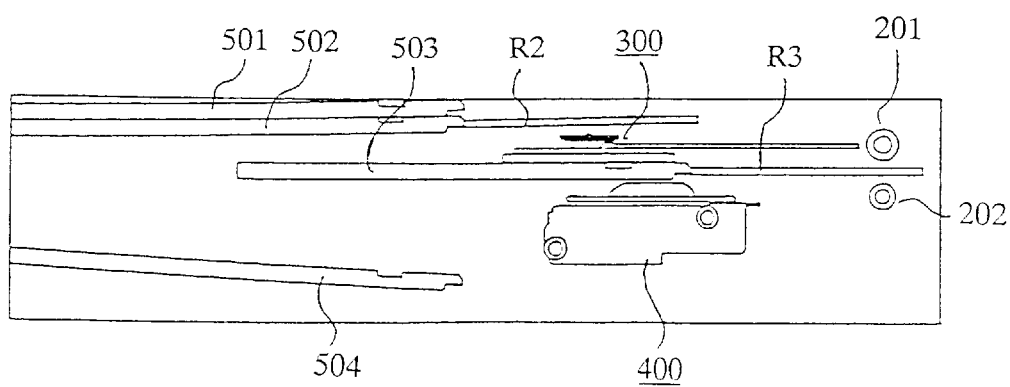
Figure 92A:
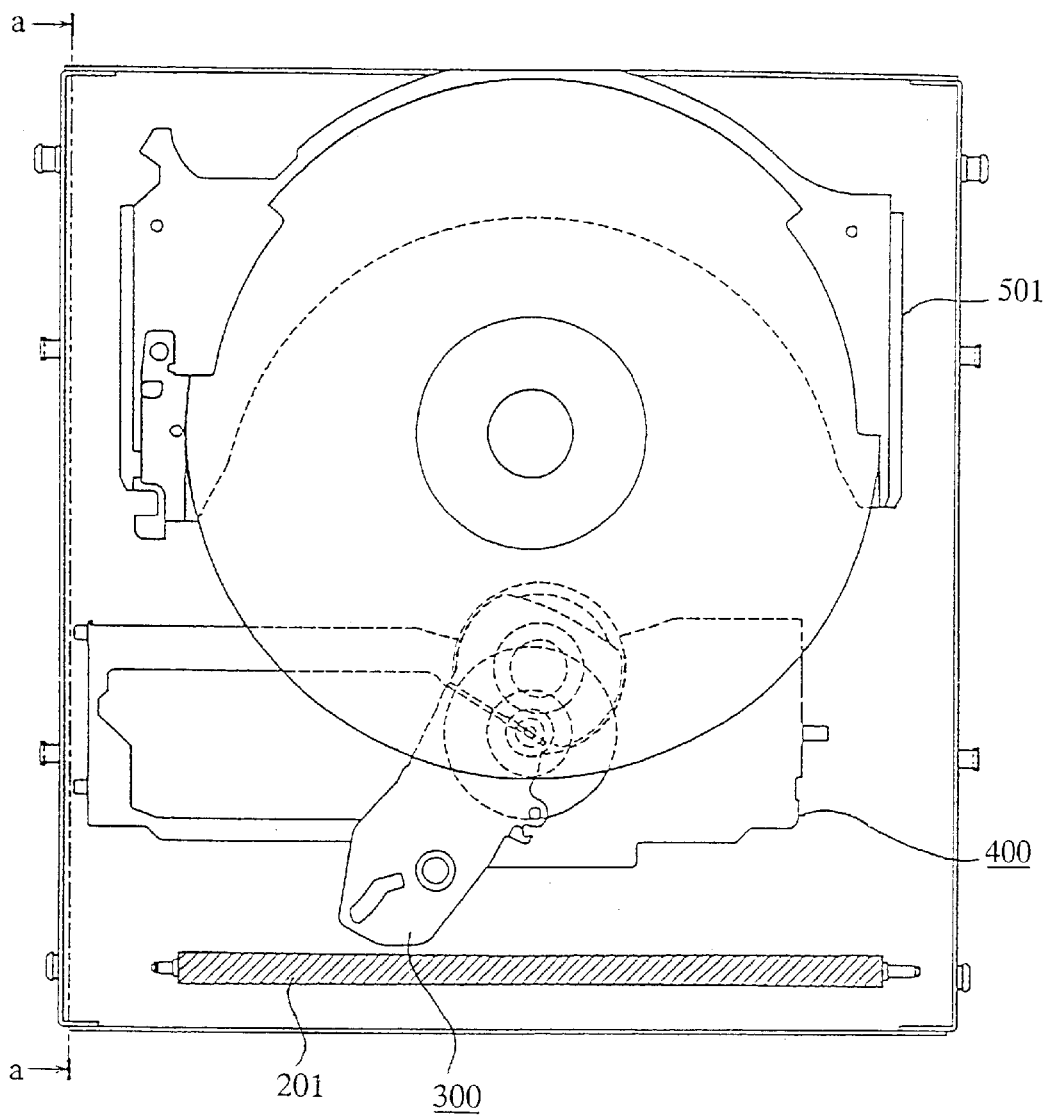
FIGS. 92a and 92b are a top view and a sectional side view respectively, showing a basic operation of the entire disk system shown in FIG. 1.
Figure 92B:
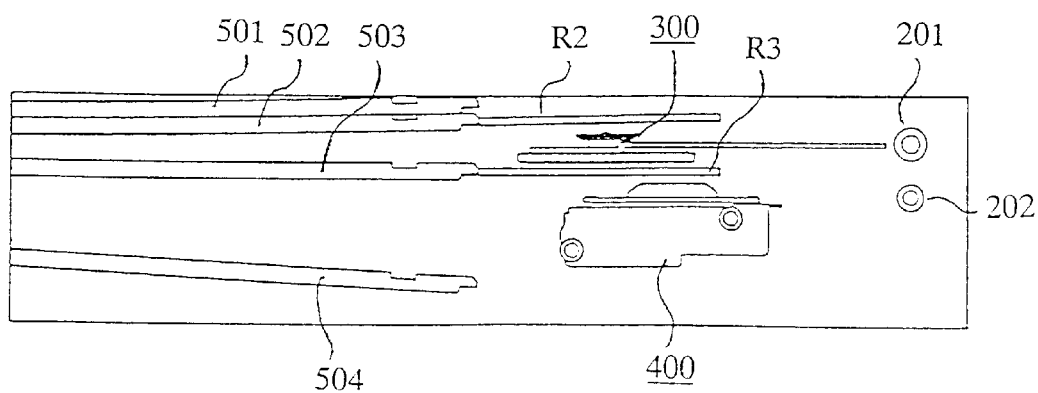
Figure 93A:
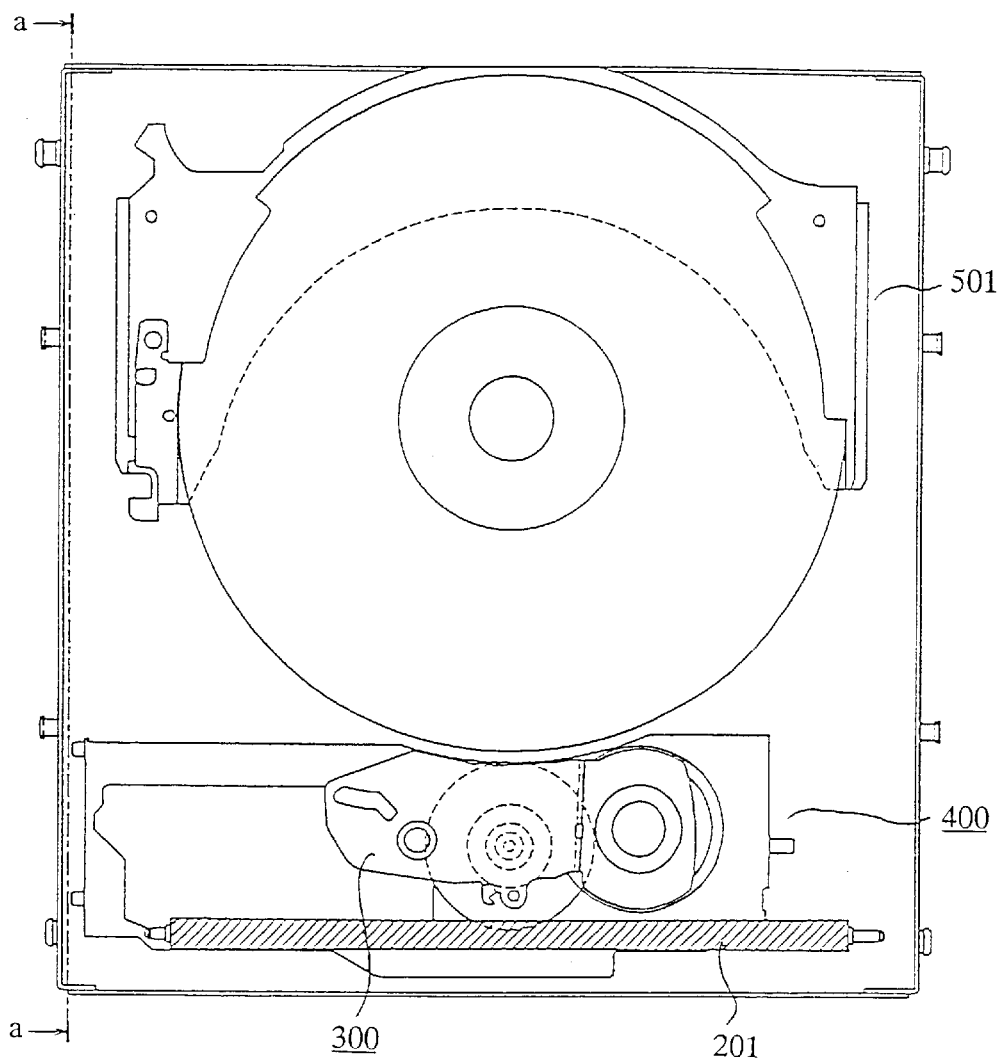
FIGS. 93a and 93b are a top view and a sectional side view respectively, showing a basic operation of the entire disk system shown in FIG. 1.
Figure 93B:
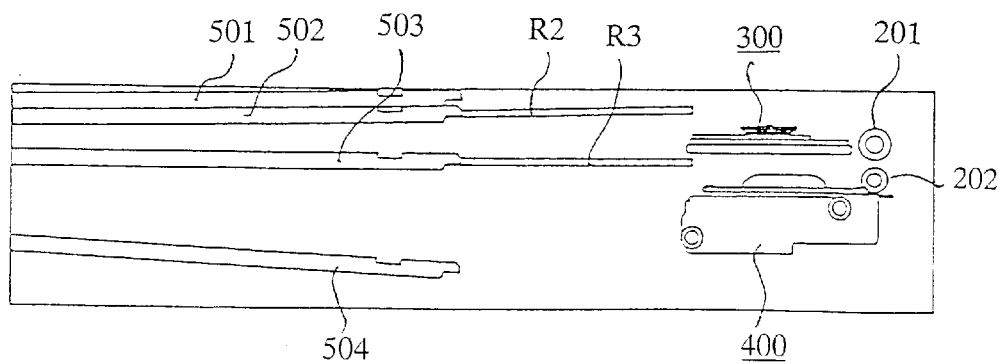
Figure 94A:
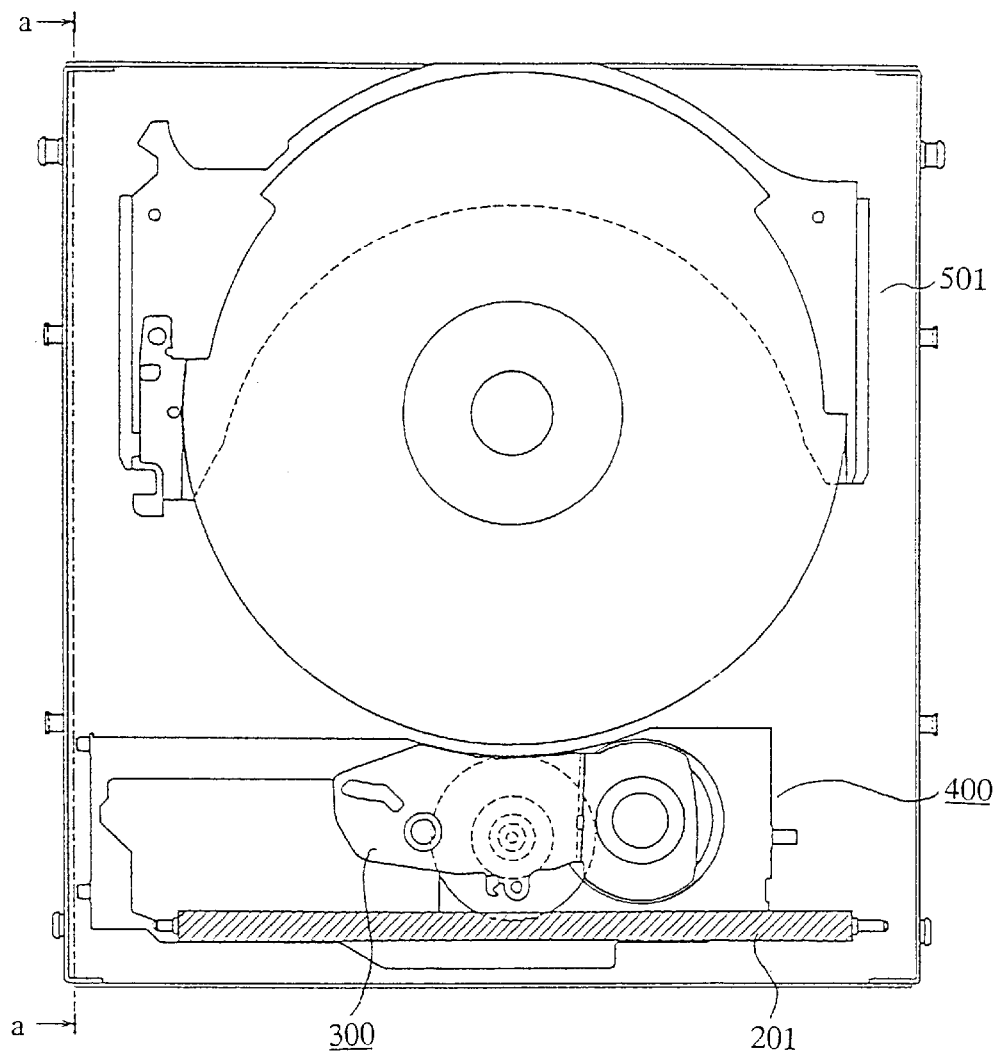
FIGS. 94a and 94b are a top view and a sectional side view respectively, showing a basic operation of the entire disk system shown in FIG. 1.
Figure 94B:
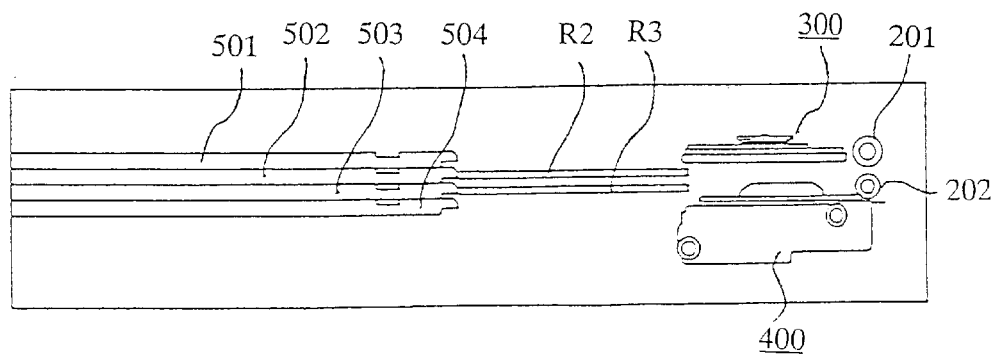
Figure 95A:
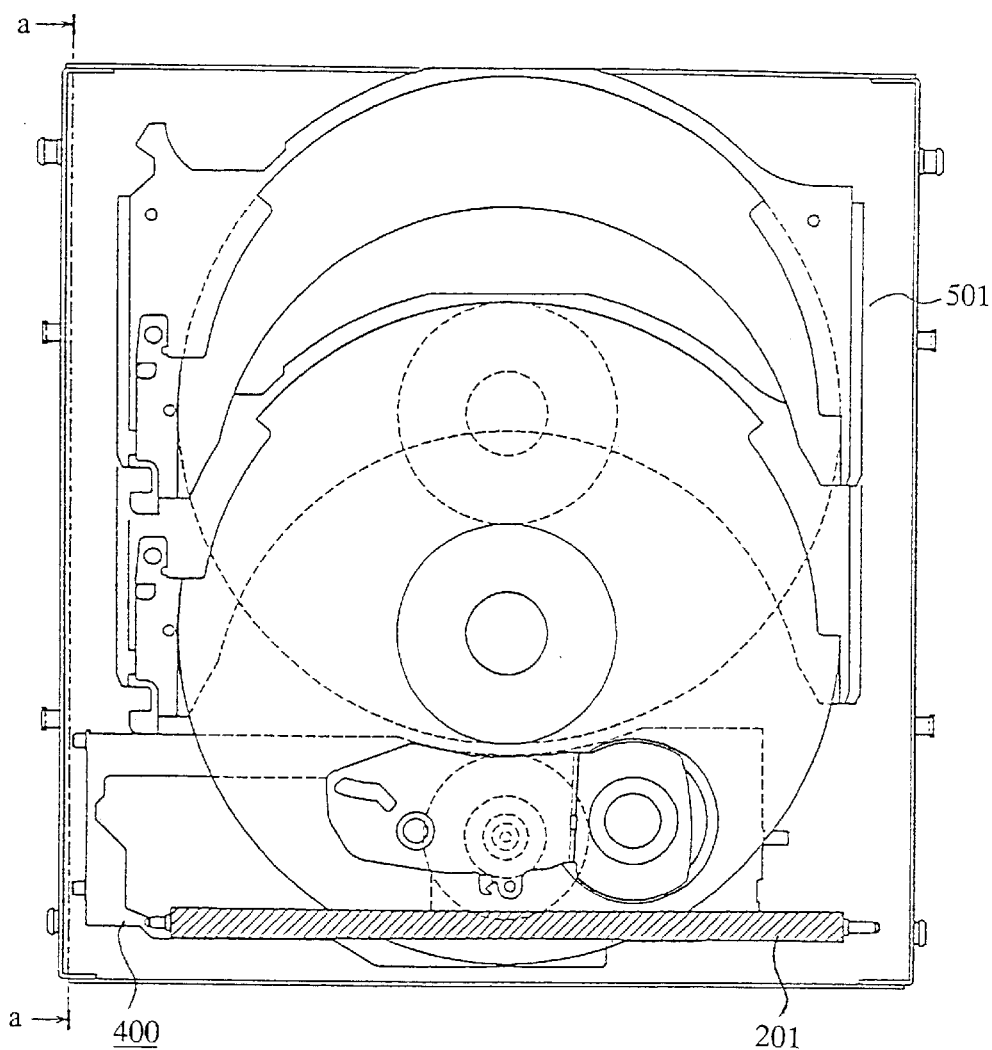
FIGS. 95a and 95b are a top view and a sectional side view respectively, showing a basic operation of the entire disk system shown in FIG. 1.
Figure 95B:
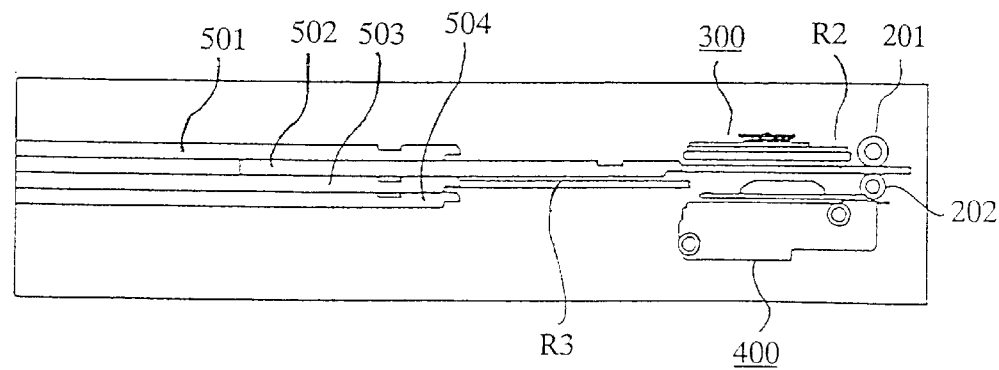
Figure 96A:
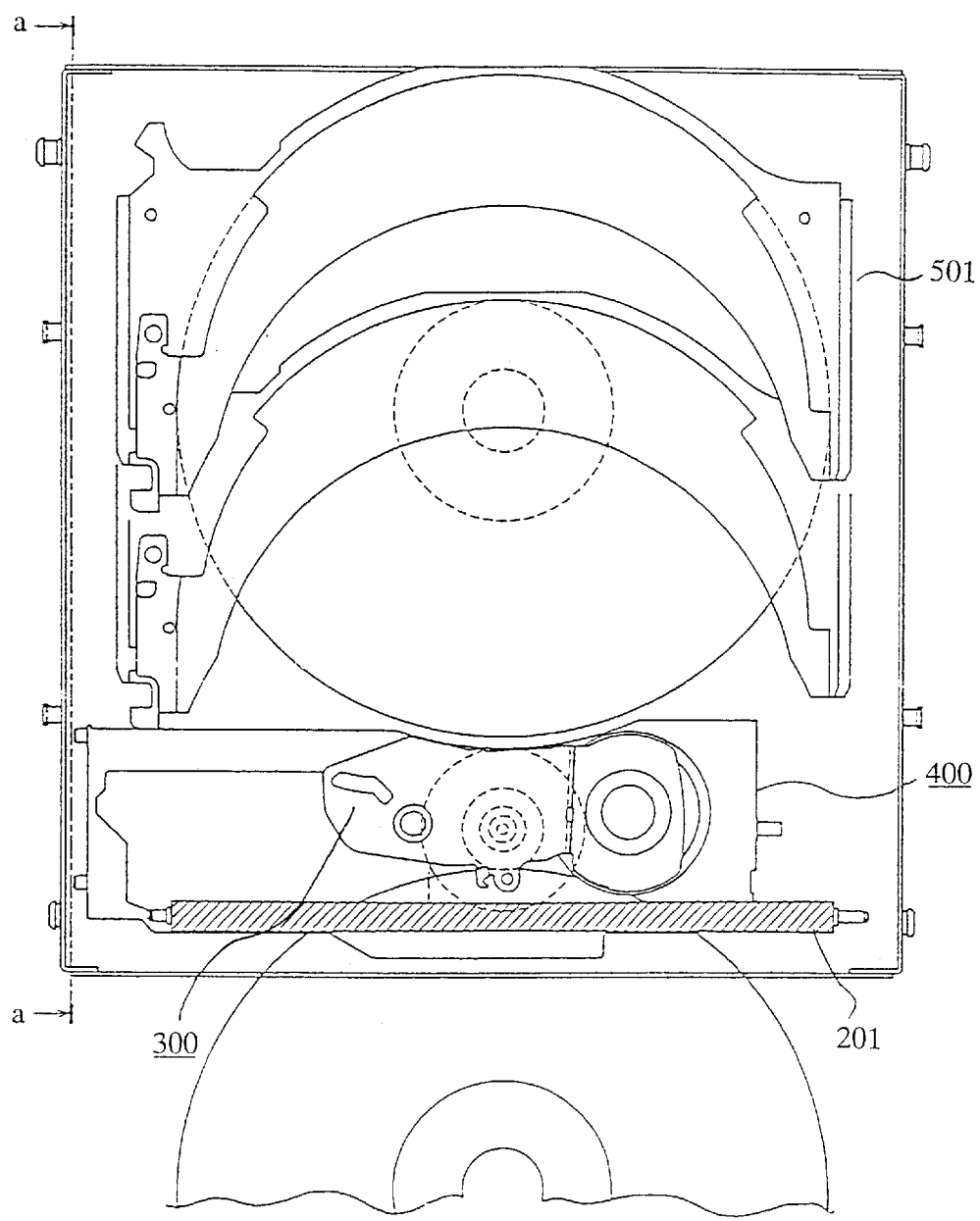
FIGS. 96a and 96b are a top view and a sectional side view respectively, showing a basic operation of the entire disk system shown in FIG. 1.
Figure 96B:
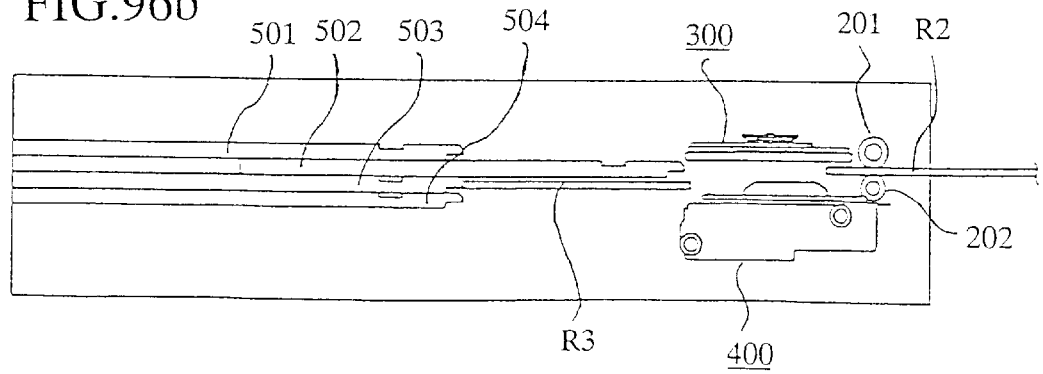

FIGS. 91a and 91b are views showing a state being in the course of returning the disk reproducing portion 400 to the original position from the state shown in FIGS. 90a and 90b; FIGS. 92a and 92b are views showing a state in which the third stocker 503 and the disk R3 are returned to the original positions; FIGS. 93a and 93b are views showing a state in which movement of the disk clamper portion 300 and the disk reproducing portion 400 to the original positions is completed; FIGS. 94a and 94b are views showing a state in which the stockers are entirely lowered; FIGS. 95a and 95b are views showing a state in which the second stocker 502 is moved on the insertion port 101 side and the disk R2 is held by the disk loading mechanism 200; and FIGS. 96a and 96b are views showing a state in which the disk R2 is ejected.

In addition, each of FIG. 90a, . . . , 96a is a sectional top view, and each of FIGS. 90b, . . . , 96b is a sectional side view taken on line a—a.

First, when a command allowing ejection of the disk R2 is supplied from the operating portion (not shown) in the state in which the disk R3 is held between the disk clamper portion 300 and the disk reproducing portion 400 as shown in FIGS. 90a and 90b, the third stocker 503 is moved to a position at which it can contain the disk R3, and holds and contains the disk R3.

Then, the disk clamper portion 300 and the disk reproducing portion 400 are moved in the direction B and the gap between the upper disk roller 201 and the lower disk roller 202 is enlarged (FIGS. 91a and 91b).

After the operating state shown in FIGS. 91a and 91b, as shown in FIGS. 92a and 92b, the third stocker 503 is moved in the direction A in the state in which it contains the disk R3, to be returned to the original position.

Next, as shown in FIGS. 93a and 93b, the disk clamper portion 300 is further moved in the direction B to be returned to the original position and the gap between the upper disk roller 201 and the lower disk roller 202 is reduced at minimum. Also, to adjust the height of the second stocker 502 to the height of the insertion port 101, the entire stockers are brought in close-contact with each other and are moved (FIGS. 94a and 94b).

Thus, as shown in FIGS. 96a and 96b, the second stocker 502 containing the disk R2 is moved in the direction B, and the disk R2 is ejected by the disk loading portion 200.

According to the disk system configured as described above, spaces in which a base plate of the driving mechanism portion 510 of the disk containing mechanism 500 and the like can be provided can be ensured in the housing at both a portion over the first stocker and a portion under the fourth stocker, it is possible to eliminate an unnecessary space and minimize the length of the disk carrying path as seen from top, and hence to miniaturize the disk system.

Further, it is possible to freely insert or eject disks one by one, and hence to improve usability of an operator.

Since the upper disk roller and the lower disk roller can be moved downward and upward respectively, a disk space necessary for reproducing a disk can be ensured in a gap between the upper disk roller and the lower disk roller. This makes it possible to reduce a space due to the disk space, and hence to miniaturize the disk system.

While the first embodiment has been described regarding reproducing of disks, the operational mode of disks to which the present invention is applicable is not limited thereto. For example, the same effect can be obtained even when the present invention is applied to other operational modes of disks such as recording of disks, and erasing of disks for erasing information recorded in disks.

Embodiment 2

Next, a disk system according to a second embodiment of the present invention will be described with reference to FIGS. 97a to 102b.

Although in Embodiment 1 the disk loading mechanism 200 is so configured as shown in FIG. 6a to 9d, it may be so configured as shown in FIGS. 97a to 102b with the same effect.

Figure 97A:
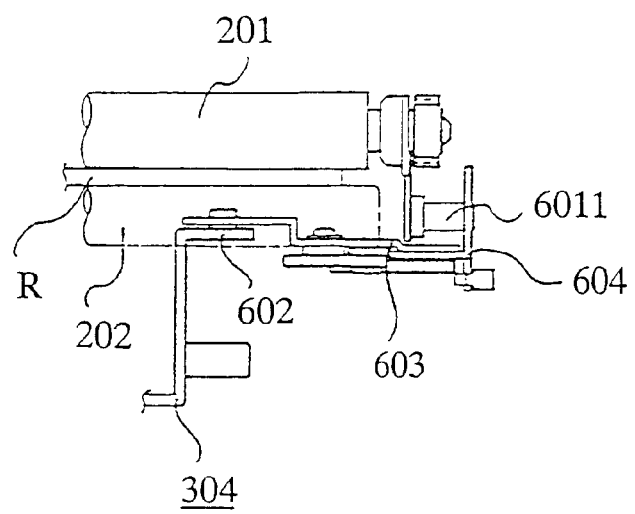
FIGS. 97a and 97b are front views showing a configuration of an essential portion of a disk loading mechanism of a disk system in Embodiment 2, showing an operational state thereof.
Figure 97B:
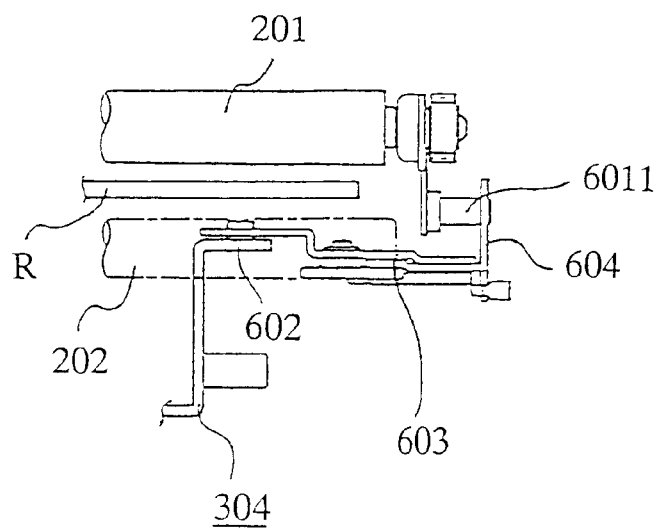
Figure 98A:
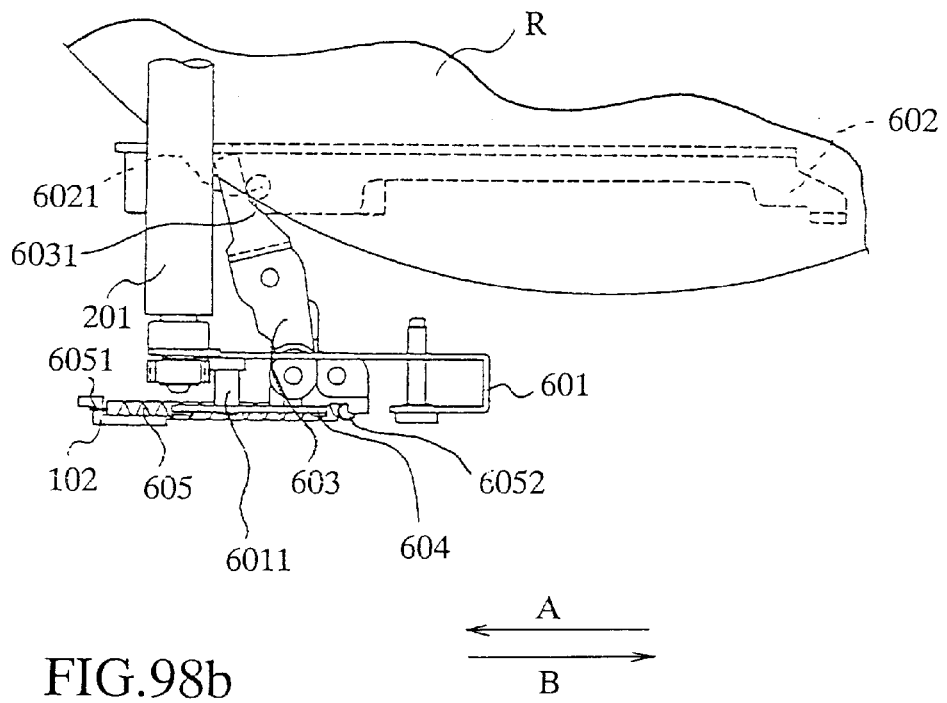
FIGS. 98a and 98b are top views showing a configuration of the essential portion of the disk loading mechanism of the disk system shown in FIGS. 97a and 97b, showing the operational state thereof.
Figure 98B:
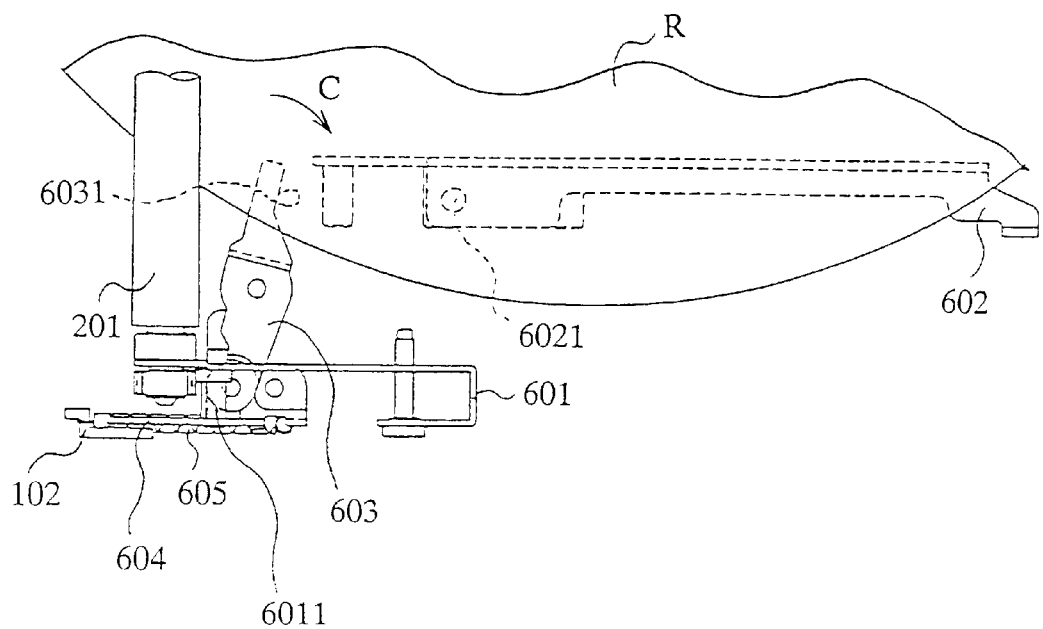
Figure 99A:
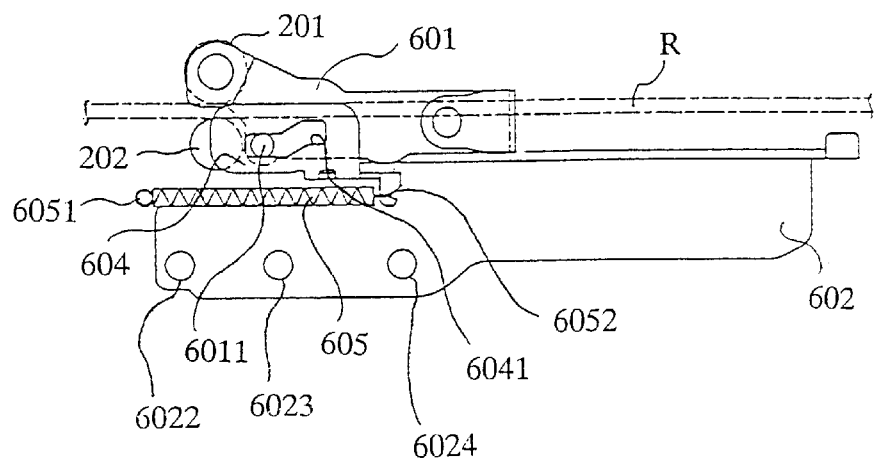
FIGS. 99a and 99b are upper side views showing a configuration of the essential portion of the disk loading mechanism of the disk system shown in FIGS. 97a and 97b, showing the operational state thereof.
Figure 99B:
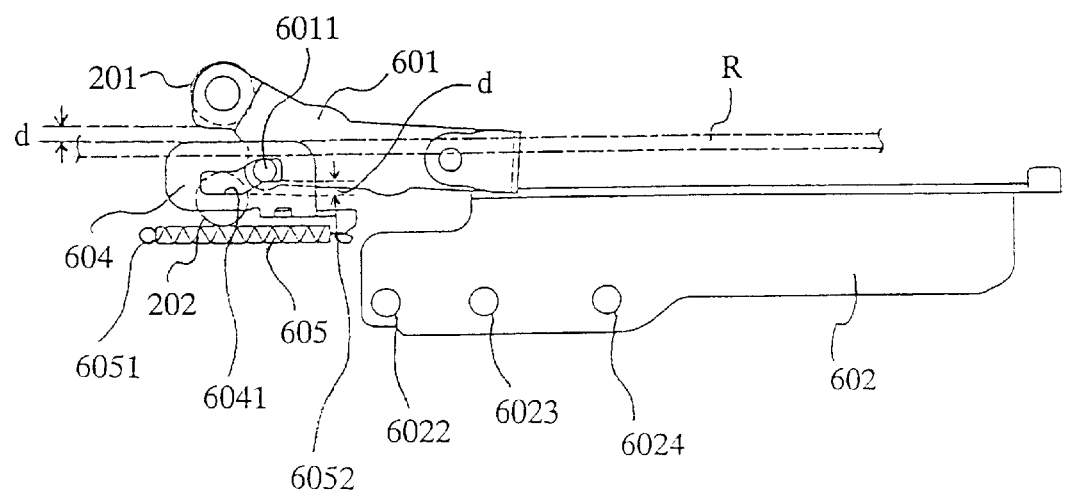

FIGS. 97a to 99b show an essential portion of a disk carrying mechanism 200 on an upper disk roller 201 side; wherein FIGS. 97a and 97b are front views of the essential portion; FIGS. 98a and 98b are top views of the essential portion; and FIGS. 99a and 99b are sectional side views of the essential portion. In addition, each of FIGS. 97a, 98a and 99a shows a state in which a disk R is held, and each of FIGS. 97b, 98b and 99b shows a state in which the disk R is released.

Figure 100A:
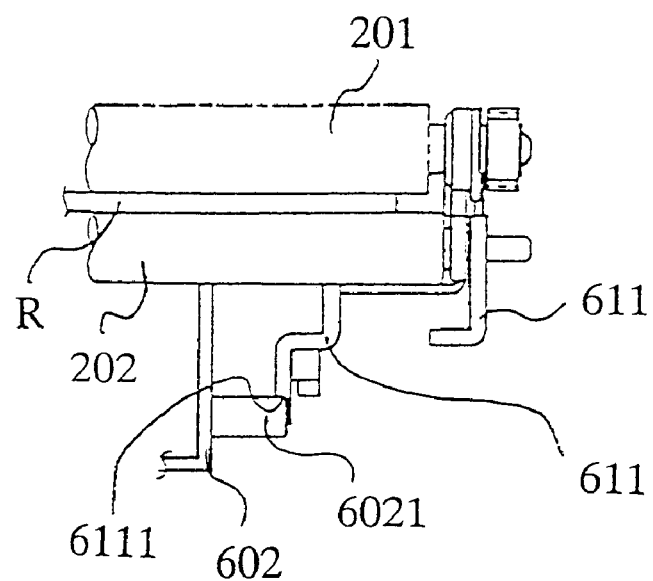
FIGS. 100a and 100b are front views showing a configuration of an essential portion of the disk loading mechanism of the disk system in Embodiment 2, showing an operational state thereof.
Figure 100B:
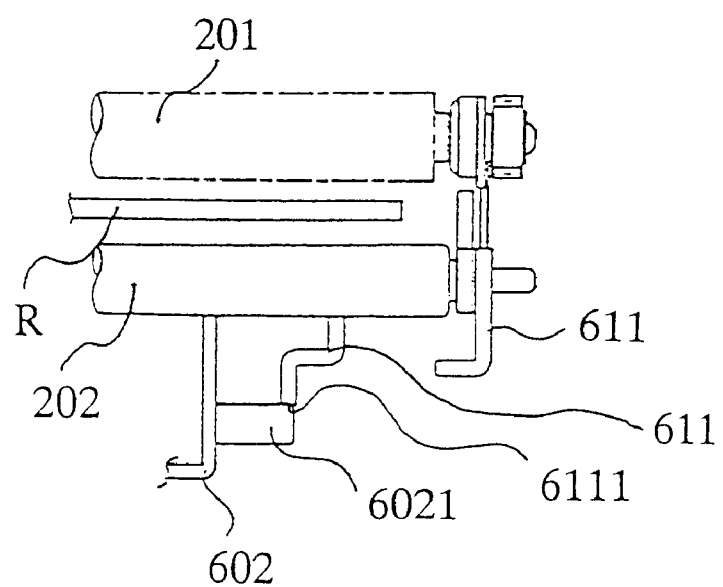
Figure 101A:
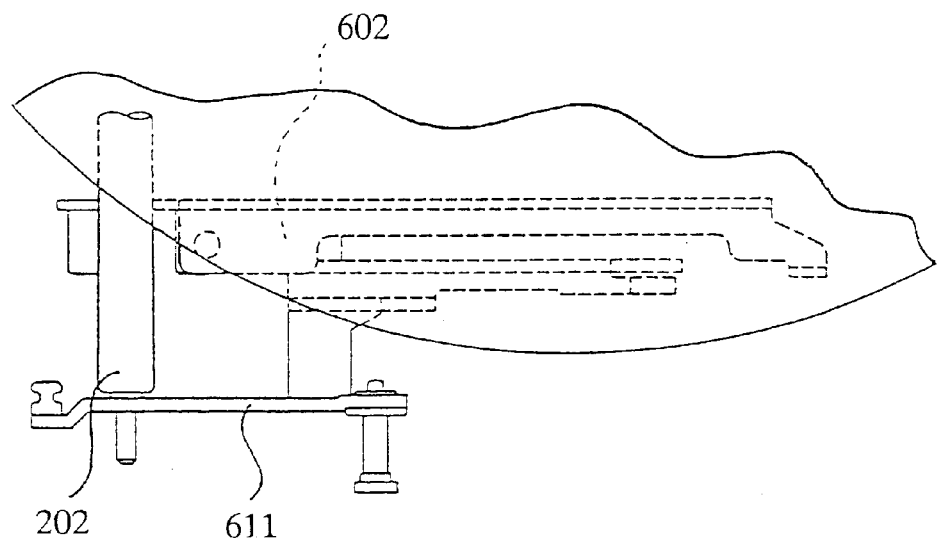
FIGS. 101a and 101b are top views showing a configuration of the essential portion of the disk loading mechanism of the disk system shown in FIGS. 100a and 100b, showing the operational state thereof.
Figure 101B:
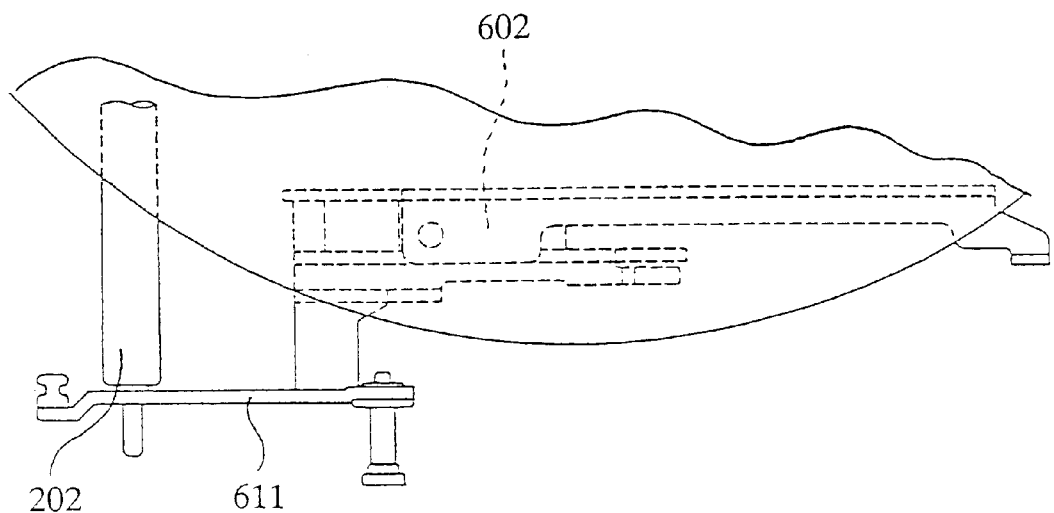
Figure 102A:
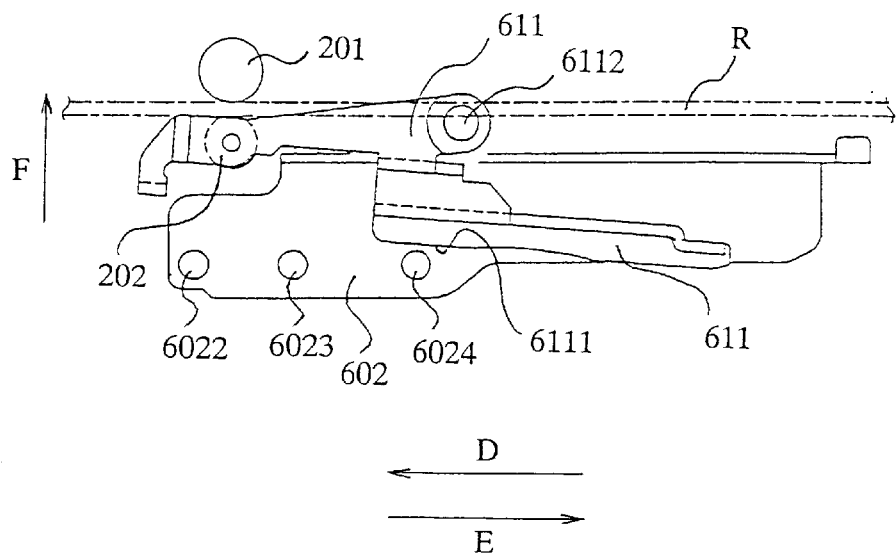
FIGS. 102a and 102b are lower side views showing a configuration of the essential portion of the disk loading mechanism of the disk system shown in FIGS. 100a and 100b, showing the operational state thereof.
Figure 102B:
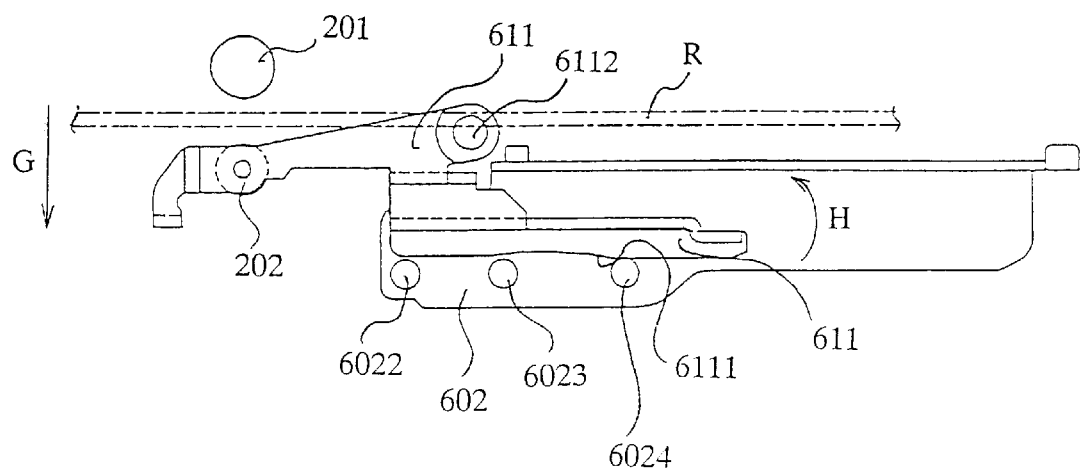

FIGS. 100a to 102b show an essential portion of the disk carrying mechanism 200 on a lower disk roller 202 side, wherein FIGS. 100a and 100b are front views of the essential portion; FIGS. 101a and 101b are top views of the essential portion; and FIGS. 102a and 102b are sectional side views of the essential portion. In addition, each of FIGS. 100a, 101a and 102a shows a state in which a disk R is held, and each of FIGS. 100b, 101b and 102b shows a state in which the disk R is released.

First, a configuration and an operation of the upper disk roller portion will be described.

In FIGS. 97a to 99b, reference numeral 601 indicates an upper roller arm having one end for supporting the upper disk roller 201 and also having at a portion a pin 6011; 602 is an end portion of a slider 304 having at a portion a pin 6021; and 603 is an open link having at one end a contact portion 6031 which is brought in contact with the pin 6021 formed at the end portion 602 of the slider 304.

As shown in FIGS. 99a and 99b, projecting portions 6022 to 6024 are formed on a side surface of the end portion 602 of the slider 304.

Reference numeral 604 indicates a roller open cam plate having in a portion a sliding hole 6041 in which the pin 6011 formed on the upper roller arm 601 is slidably moved; and 605 is a spring having one end 6051 engaged with a portion 102 of a housing 100 and the other end 6052 engaged with the roller open cam plate 604, wherein the one end 6051 and the other end 6052 are compressed to each other.

The operation of the upper disk roller will be described below.

First, in the case other than reproducing the disk R, that is, in the case where the disk R is held between the upper disk roller 201 and the lower disk roller 202, the end portion 602 of the slider 304 presses the roller open cam plate 604 by the pin 6021 in the direction B shown in FIGS. 98a and 98b.

Accordingly, the spring 605 is elongated longer than a usual length, and the open link 603 is in contact with the pin 6021 by a biasing force of the spring 605 exerted in the direction where the spring 605 is returned to the original length.

Next, in the case of reproducing the disk R, since the slider 304 is moved in the direction A shown in FIGS. 98a and 98b, the end portion 602 of the slider 304 is also moved in the direction A.

As a result, the open link 603 locked in contact with the pin 6021 formed on the end portion 602 is made rotatable in the direction C, so that the roller open cam plate 604, which is connected and locked to the open link 603 and is biased by the spring 605 in the direction B, can be pulled in the direction B.

By pulling of the roller open cam plate 604 in the direction B, the pin 6011 formed on the upper roller am 601 is slid in the sliding hole 6041 formed in the roller open cam plate 604 up to a position shown in FIG. 99b, and is thus lifted a height "d", and correspondingly the upper disk roller 201 is lifted approximately the height "d".

Further, a configuration and an operation of the lower disk roller will be described.

In FIGS. 100a to 102b, reference numeral 611 indicates a lower roller arm having at a portion a contact portion 6111 with which part of the projecting portions 6022 to 6024 formed on the end portion 602 of the slider 304 are brought in contact.

Next, the operation of the lower disk roller will be described.

First, in the case other than reproducing of the disk R, that is, in the case where the disk R is held between the upper disk roller 201 and the lower disk roller 202, since the slider 304 is moved in the direction D, the contact portion 6111 of the lower roller arm 611 is not brought in contact with the projecting portions 6022 to 6024 formed on the end portion 602 of the slider 304 and the lower roller arm 611 is biased in the direction F by a biasing force of a biasing portion (not shown) for usually biasing it in the direction F.

Next, in the case of reproducing the disk R, since the slider 304 is moved in the direction E shown in FIGS. 102a and 102b, the end portion 602 of the slider 304 is also moved in the direction E.

Accordingly, the projecting portions 6022 to 6024 formed on the end portion 602 of the slider 304 are brought in contact with the contact portion 6111 of the lower roller arm 611, so that the contact portion 6111 is turned in the direction H around a turning shaft 6112.

Accordingly, the lower disk roller connected to the lower roller arm is moved in the direction G.

With this configuration, the disk roller portion can be accurately operated with a simple structure, so that it is possible to further improve the reliability of the disk system.

In the disk roller portion 200 in Embodiment 2, the upper disk roller is shown in FIG. 97a to 99b and the lower disk roller is shown in FIGS. 100a to 102b. FIGS. 103 to 105b show arrangements in which the combination of the upper disk roller 201 and the lower disk roller 202 is disposed on each of the left and right sides.

Figure 103A:
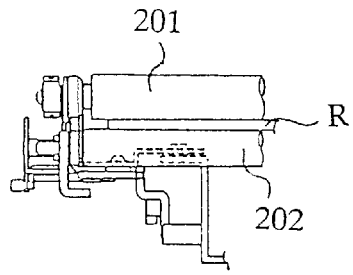
FIGS. 103a and 103b are front views showing a configuration of an essential portion of a disk loading mechanism of a disk system in Embodiment 3, showing an operational state thereof.
Figure 103B:
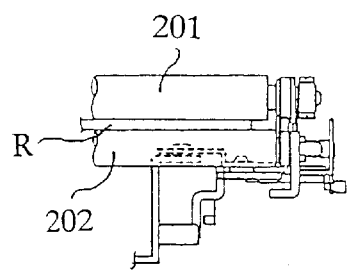

FIGS. 103a and 103b are front views of an essential portion of the combination of the upper and lower disk rollers, wherein FIG. 103a shows a left side portion as seen from the insertion port, and FIG. 103b shows a right side portion as seen from the insertion port.

Figure 104A:
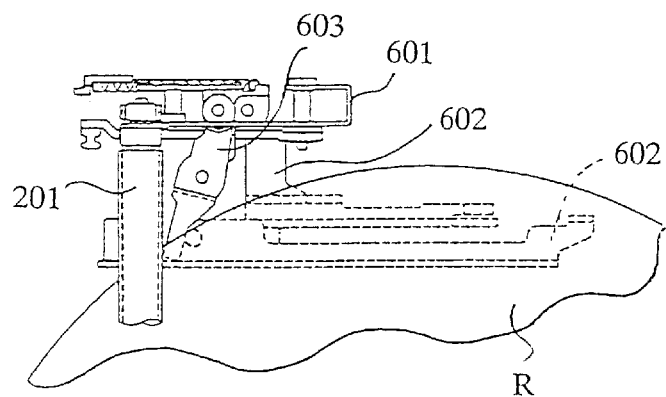
FIGS. 104a and 104b are lower side views showing a configuration of the essential portion of the disk loading mechanism of the disk system shown in FIGS. 103a and 103b, showing the operational state thereof.
Figure 104B:
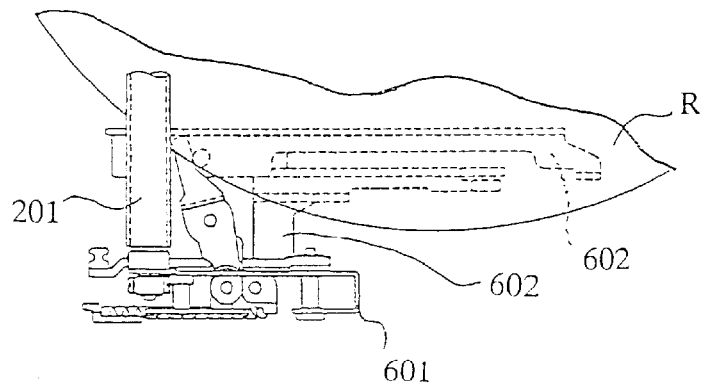

FIGS. 104a and 104b are top views of the essential portion, wherein FIG. 104a shows the left side portion as seen from the insertion port, and FIG. 104b shows the right side portion as seen from the insertion port.

Figure 105A:
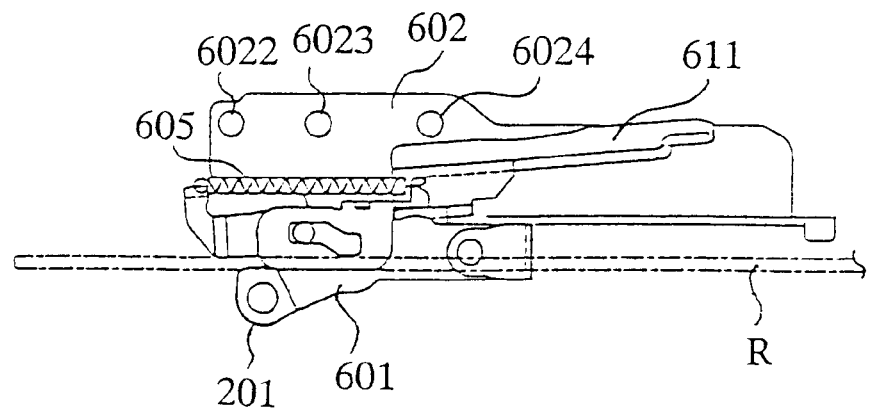
FIGS. 105a and 105b are side views showing a configuration of the essential portion of the disk loading mechanism of the disk system shown in FIGS. 103a and 103b, showing the operational state thereof.
Figure 105B:
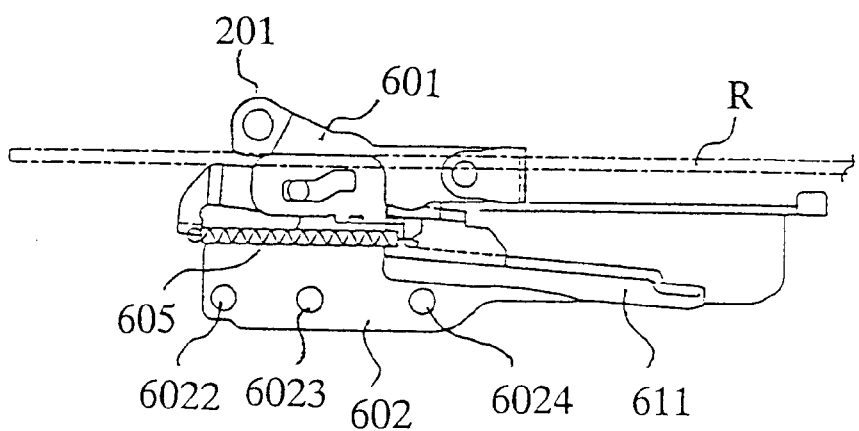
Figure 106:
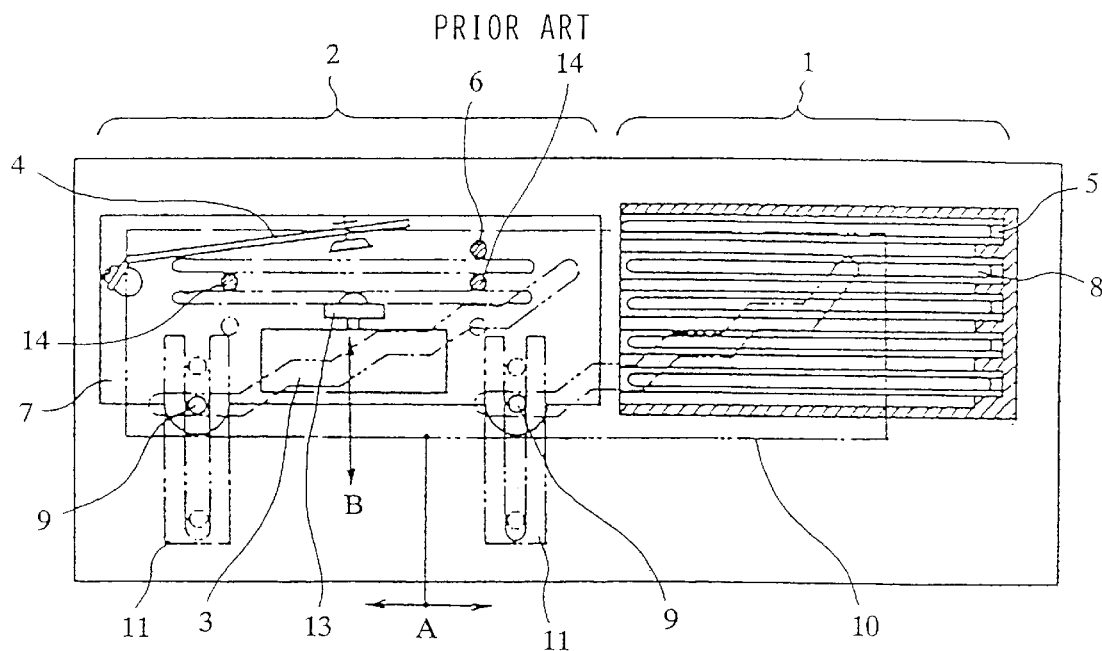
FIG. 106 is a view showing a schematic configuration of a related art disk system.
Figure 107:
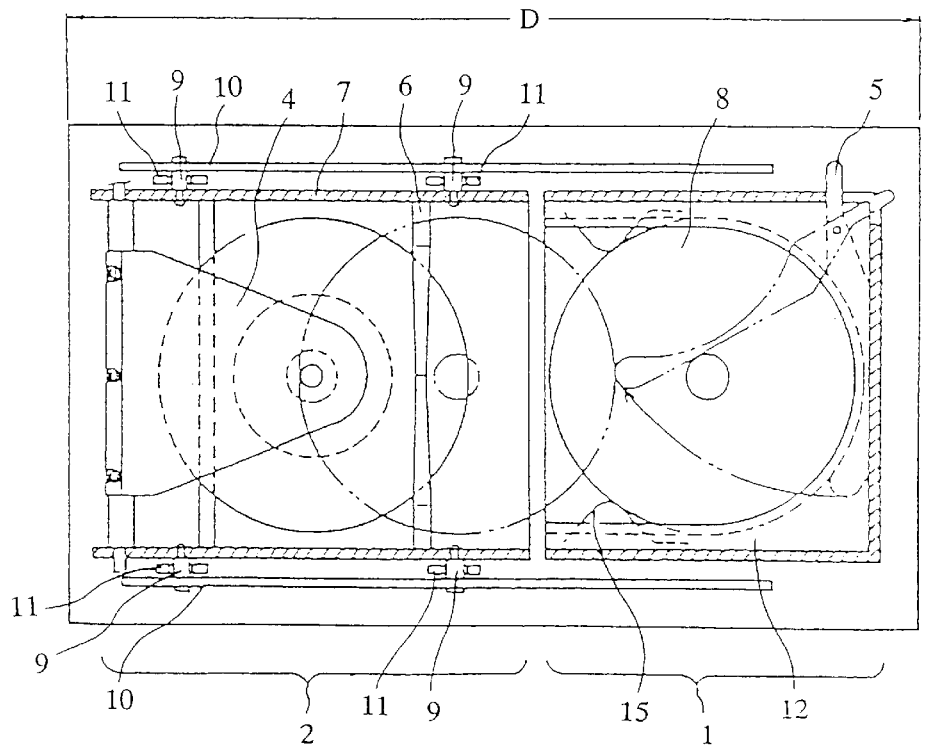
FIG. 107 is a sectional side view of the related art disk system.
Figure 108A:
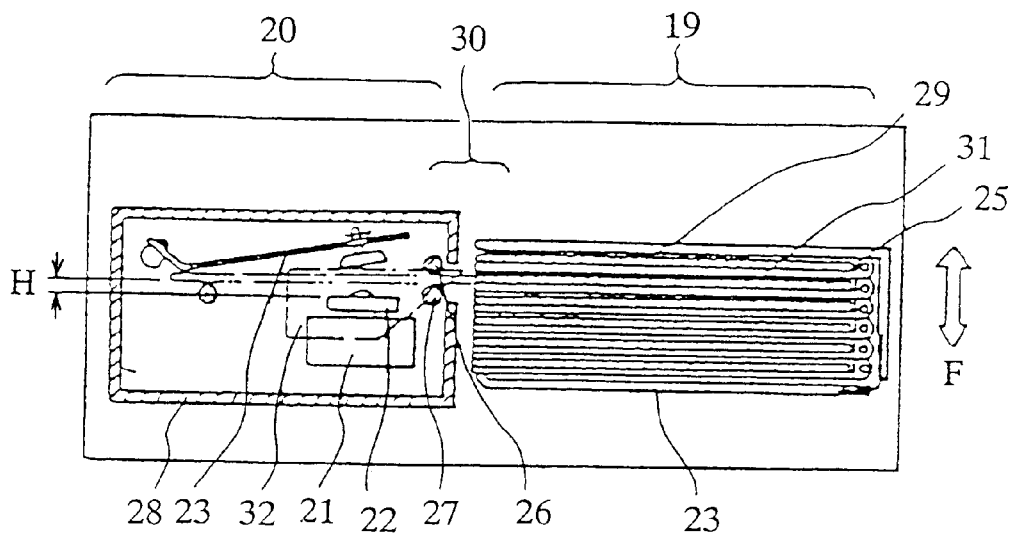
FIG. 108 is a sectional top view of a related art disk system.
Figure 108B:
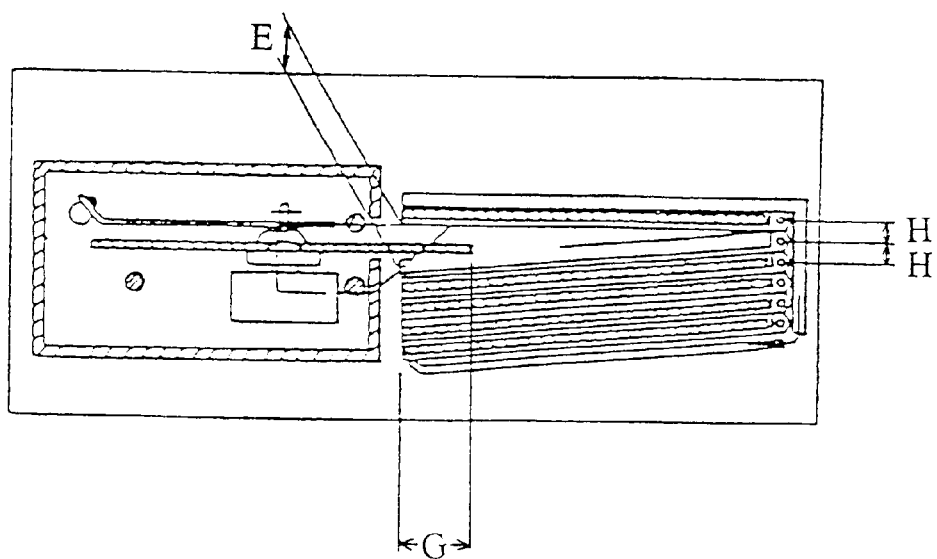
Figure 109:
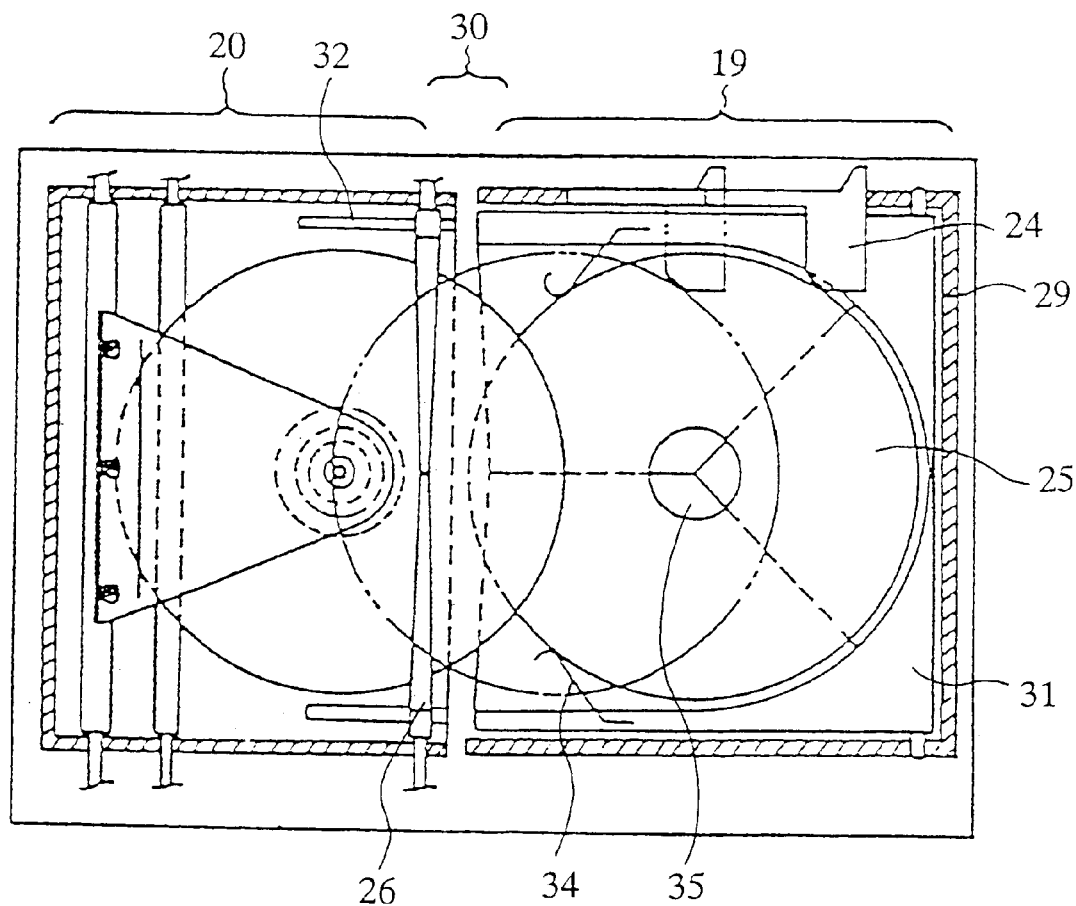
FIG. 109 is a sectional side view of the related art disk system.

FIGS. 105a and 105b are sectional side views of the essential portion, wherein FIG. 105a shows the left side portion as seen from the insertion port, and FIG. 105b shows the right side portion as seen from the insertion port, like FIGS. 104a and 104b.

Embodiment 3

Next, a disk system according to a third embodiment of the present invention will be described.

Although in Embodiment 2 the upper disk roller is so configured as shown in FIGS. 97a to 99b and the lower disk roller is so configured as shown in FIGS. 100a to 102b, the upper and lower disk rollers may be reversely configured, that is, the lower disk roller may be so configured as shown in FIGS. 97a to 99b and the upper disk roller may be so configured as shown in FIGS. 100a to 102b, with the same effect.

Embodiment 4

Next, a disk system according to a fourth embodiment of the present invention will be described.

In this embodiment, the disk loading mechanism 200 in Embodiment 1 is disposed on either of the right and left sides and the disk loading mechanism 200 in Embodiment 2 is disposed on the other side. Even in this embodiment, an effect similar to that in each of the previous embodiments can be obtained.

Embodiment 5

Next, a disk system according to a fifth embodiment of the present invention will be described.

In Embodiment 1, in order to move at least one of a desired stocker and another stocker for forming a gap (θ1) between the desired stocker and another stocker, the stocker moving means, that is, the driving mechanism portion 510 and the moving mechanism portion 520 move another stocker; and in order to move at least one of the desired stocker and a stocker facing to a specific surface of the desired stocker for further enlarging only the gap provided between the desired stocker and the stocker facing to the specific surface of the desired stocker up to a gap (θ2), the stocker moving means, that is, the driving mechanism portion 510 and the moving mechanism portion 520 move the stocker facing to the specific surface of the desired stocker. However, upon provision of the gap θ1, the desired stocker may be moved; and upon formation of the gap θ2, the desired stocker may be moved. Even with the disk system thus configured, an effect similar to that in Embodiment 1 can be obtained.

Embodiment 6

Next, a disk system according to a sixth embodiment of the present invention will be described.

Although interlocking between the stocker moving means, that is, the driving mechanism portion 510 and the moving mechanism portion 520 and the disk driving means, that is, the disk reproducing portion 400 has not been described in Embodiment 1, there may be provided an interlocking control means for interlocking both the portions to each other. With the disk system thus configured, an effect similar to that in Embodiment 1 can be obtained.

Embodiment 7

Next, a disk system according to a seventh embodiment of the present invention will be described.

Although having been not described in Embodiment 1, in a state in which there exists a stocker not containing a disk and the disk driving means, that is, the disk reproducing portion 400 is not driven, the stocker moving means, that is, the driving mechanism 510 and the moving mechanism portion 520 may previously dispose the stocker in the vicinity of the disk insertion port. With the disk system thus configured, an effect similar to that in Embodiment 1 can be obtained.

Embodiment 8

Next, a disk system according to an eighth embodiment of the present invention will be described.

Although having been not described in Embodiment 1, the stocker moving means, that is, the driving mechanism portion 510 and the moving mechanism portion 520 may previously dispose a desired stocker in the vicinity of the disk insertion port on the basis of a command. With the disk system thus configured, an effect similar to that in Embodiment 1 can be obtained.

Embodiment 9

A disk system according to a ninth embodiment of the present invention will be described.

Although having been not described in Embodiment 1, the stocker moving means, that is, the driving mechanism portion 510 and the moving mechanism portion 520 may integrally move a plurality of the stockers 501, 502, 503 and 504 in the height direction upon carrying of a disk R. With the disk system thus configured, an effect similar to that in Embodiment 1 can be obtained.

Industrial Applicability

As described above, the disk system according to the present invention is configured as a miniaturized disk system in which a plurality of disks are contained without the need of provision of any removable magazine and are each operated, that is, each disk is selectively inserted, ejected, and operated, for example, reproduced, and therefore, such a disk system is suitable to be used in a location with a small space.

What is claimed is:

1. A disk system comprising:

a plurality of stockers for containing disks in such a manner as to substantially align rotational axial lines of the disks to each other;

a stocker mover for moving said stockers to specific positions; and a disk driver for rotating a desired disk selected from the disks contained in said stockers;

wherein said stocker mover moves a desired stocker containing said desired disk to locate the desired disk at a disk communication position to enable rotation by said disk driver, said stocker mover moving remaining stockers to provide a gap between the disks contained by the stockers adjacent the desired stocker, said gap being sufficient to allow at least a portion of said disk driver to be located therebetween;

a disk driver shifter, shifting said disk driver relative to said stockers so that the axis of rotation of said desired disk driven by said disk driver is parallel to and spaced apart from the rotational axial lines and within the periphery of the remaining disks contained in said stockers.

2. A disk system comprising:

plurality of stockers for containing disks in such a manner as to substantially align rotational axial lines of the disks to each other;

stocker moving means for moving said stockers to specific positions; and disk driving means for rotating the disks contained in said stockers;

wherein said stocker moving means moves, on the basis of a command, at least one of a desired stocker and another stocker for providing a first gap between the desired stocker and another stocker, and also moves, on the basis of the command, at least one of said desired stocker and a stocker facing to a specific surface of said desired stocker for further enlarging only the gap provided between said desired stocker and the stocker facing to the specific surface of said desired stocker up to a second gap; and wherein said stocker moving means is provided with a first adjusting means for adjusting heights of said stockers, and a second adjusting means for adjusting motions of said stockers in the direction substantially parallel to a carrying path of the disk;

said disk driving means, when driving a disk, being located at least partially within the periphery of the remaining disks contained within said stockers.

3. A disk system comprising:

a plurality of stockers for containing disks in such a manner as to substantially align rotational axial lines of the disks to each other;

stocker moving means for moving said stockers to specific positions; and disk driving means for rotating the disks contained in said stockers;

wherein said stocker moving means moves, on the basis of a command, at least one of a desired stocker and another stocker for providing a gap tilted at a first angle ($\theta_1$) between the desired stocker and another stocker, and also moves, on the basis of the command, at least one of said desired stocker and a stocker facing to a specific surface of said desired stocker for providing a gap ($\theta_2$) between said desired stocker and the stocker facing to the specific surface of said desired stocker; and wherein said stocker moving means is provided with a first adjusting means for adjusting heights of said stockers and a second adjusting means for adjusting motions of said stockers in the direction substantially parallel to a carrying path of the disk;

wherein projecting portions are provided on side portions of said stockers, and said first adjusting means is formed with a plurality of recessed portions which are engaged with said projecting portions provided on said stockers; and when said heights of said stockers are adjusted, one of said plurality of recessed portions corresponding to a desired height of one stocker is selected and said projecting portion of said stocker is locked in said recessed portion thus selected.

4. A disk system comprising:

a plurality of stockers for containing disks in such a manner as to substantially align rotational axial lines of the disks to each other;

stocker moving means for moving said stockers to specific positions; and disk driving means for rotating the disks contained in said stockers;

wherein said stocker moving means moves, on the basis of a command, at least one of a desired stocker and another stocker for providing a gap tilted at a first angle ($\theta_1$) between the desired stocker and another stocker, and also moves, on the basis of the command, at least one of said desired stocker and a stocker facing to a specific surface of said desired stocker for providing a gap ($\theta_2$) between said desired stocker and the stocker facing to the specific surface of said desired stocker; and wherein said stocker moving means is provided with a first adjusting means for adjusting heights of said stockers and a second adjusting means for adjusting motions of said stockers in the direction substantially parallel to a carrying path of the disk;

wherein projecting portions are provided on side portions of said stockers, and said first adjusting means is formed with a plurality of recessed portions which are engaged with said projecting portions provided on said stockers and also formed with a separating portion for separating only one stocker not engaged with said recessed portion from others of said desired stockers; and when the heights of said stockers are adjusted, said projecting portion provided on a desired stocker is engaged with the corresponding one of said plurality of recessed portions and said separating portion separates a different stocker not engaged with said recessed portion from said desired stocker.

5. A disk system comprising:

a plurality of stockers for containing disks in such a manner as to substantially align rotational axial lines of the disks to each other;

stocker moving means for moving said stockers to specific positions; and disk driving means for rotating the disks contained in said stockers;

wherein said stocker moving means moves, on the basis of a command, at least one of a desired stocker and another stocker for providing a first gap tilted at a first angle ($\theta_1$) between the desired stocker and another stocker, and also moves, on the basis of the command, at least one of said desired stocker and a stocker facing to a specific surface of said desired stocker providing a gap tilted at a second angle ($\theta_2$) between said desired stocker and the stocker facing to the specific surface of said desired stocker;

said disk driving means being shifted, relative to said stockers and in a direction substantially perpendicularly to the axis of rotation of a desired disk within said desired stocker; and wherein in a state in which there exists a stocker not containing a disk and said disk driving means is not driven, said stocker moving means previously disposes said stocker in the vicinity of a disk insertion port.

6. A disk system comprising:

a plurality of stockers for containing disks in such a manner as to substantially align rotational axial lines of the disks to each other;

stocker moving means for moving said stockers to specific positions;

a disk operating portion for rotating the disk, said disk operating portion being provided in such a manner as to be movable from one end to the other end of a carrying path of the disk substantially parallel to said disk carrying path;

disk clamper portion for holding the disk, said disk clamper portion being provided in such a manner as to be movable from one end to the other end of said disk carrying path substantially parallel to said disk carrying path;

first and second disk rollers, provided opposite to each other with said disk carrying path put therebetween, for carrying the disk carried within said disk carrying path while holding both surfaces of the disk;

first roller moving means for moving, upon operation of said disk operating portion, said first disk roller in the direction substantially perpendicular to a plane of the disk facing to said first disk roller so as to provide a gap between said first disk roller and the plane of the disk; and second roller moving means for moving, upon operation of said disk operating portion, said second disk roller in the direction substantially perpendicular to a plane of the disk facing to said second disk roller so as to provide a gap between said second disk roller and the plane of the disk.

7. A disk system according to claim 6, wherein said stocker moving means moves at least one of a desired stocker and another stocker for providing a gap between said desired stocker and another stocker on the basis of a command.

8. A disk system according to claim 6, wherein when said first and second disk rollers are operated, said stocker moving means, said disk clamper portion, and said disk operating portion are interlocked with each other.

9. A disk system comprising:

plurality of stockers for containing disks in such a manner as to substantially align rotational axial lines of the disks to each other;

stocker moving means for moving said stockers to specific positions; and disk driving means for rotating the disks contained in said stockers;

wherein said stocker moving means moves, on the basis of a command, at least one of a desired stocker and another stocker for providing a first gap tilted at a first angle ($\theta_1$) between the desired stocker and another stocker, and also moves, on the basis of the command, at least one of said desired stocker and a stocker facing to a specific surface of said desired stocker providing a gap tilted at a second angle ($\theta_2$) between said desired stocker and the stocker facing to the specific surface of said desired stocker; and wherein each of said stockers is provided with a locking means for locking the disk, and said locking means adjusts a magnitude of a force for locking the disk in accordance with a position of each of said stockers.

10. A disk system comprising:

a plurality of stockers arranged to contain disks in such a manner as to substantially align the rotational axial lines of the disks to each other;

a stocker mover arranged to move said stockers to specific positions, wherein said stocker mover comprises a first adjuster that adjusts heights of said stockers, and a second adjuster that adjusts the position of each of said stockers in a direction substantially parallel to a carrying path of the disk; and a disk driver arranged to rotate a desired disk contained in a selected one of said stockers;

wherein said stocker mover, responsive to a command, moves at least one of a desired stocker and another stocker adjacent to a first surface of said desired stocker for providing a first gap between the first surface of the desired stocker and said another stocker, and also moves, responsive to the command, at least one of said desired stocker and another stocker adjacent a second surface of said desired stocker for further enlarging only a second gap provided between said desired stocker and the another stocker adjacent the second surface of said desired stocker up to a second gap;

said first and second gaps being sufficiently large to allow positioning of said disk driver, when driving a disk, at least partially within the periphery of the remaining disks contained within said stockers.

11. The disk system of claim 10 wherein said first gap is tilted at a first angle ($\theta_1$) and the second gap is tilted at a second angle ($\theta_2$).

12. A disk system according to claim 10 wherein, responsive to said disk driver not being driven, said stocker mover presents a stocker not containing a disk to the vicinity of a disk insertion port.

13. A disk system comprising:

a plurality of stockers arranged to contain disks in such a manner as to substantially align the rotational axial lines of the disks to each other;

a stocker mover arranged to move said stockers to specific positions, wherein said stocker mover comprises a first adjuster that adjusts heights of said stockers, and a second adjuster that adjusts the position of each of said stockers in a direction substantially parallel to a carrying path of the disk; and a disk driver arranged to rotate a desired disk contained in a selected one of said stockers;

wherein said stocker mover, responsive to a command, moves at least one of the desired stocker and another stocker adjacent to the first surface of said desired stocker for providing a first gap between a first surface of the desired stocker and said another stocker, and also moves, responsive to the command, at least one of said desired stocker and another stocker adjacent a second surface of said desired stocker for further enlarging only a second gap provided between said desired stocker and the another stocker adjacent the second surface of said desired stocker up to a second gap;

wherein projecting portions are provided on side portions of said stockers, and said first adjuster is formed with a plurality of recessed portions which are engaged with said projecting portions provided on said stockers, the engagement of said recessed portions with said projecting portions operable to adjust the height of said stockers; and when the heights of said stockers are adjusted, one of said plurality of recessed portions corresponding to a desired height of one stocker is selected and said projecting portion of said stocker is locked in said recessed portion thus selected.

14. A disk system comprising:

a plurality of stockers arranged to contain disks in such a manner as to substantially align the rotational axial lines of the disks to each other;

a stocker mover arranged to move said stockers to specific positions, wherein said stocker mover comprises a first adjuster that adjusts heights of said stockers, and a second adjuster that adjusts the position of each of said stockers in a direction substantially parallel to a carrying path of the disk; and a disk driver arranged to rotate a desired disk contained in a selected one of said stockers;

wherein said stocker mover, responsive to a command, moves at least one of the desired stocker and another stocker adjacent to the first surface of said desired stocker for providing a first gap between a first surface of the desired stocker and said another stocker, and also moves, responsive to the command, at least one of said desired stocker and another stocker adjacent a second surface of said desired stocker for further enlarging only a second gap provided between said desired stocker and the another stocker adjacent the second surface of said desired stocker up to a second gap;

wherein projecting portions are provided on side portions of said stockers, and said first adjuster is formed with recessed portions to be engaged with said projecting portions provided on said stockers, and said first adjuster also formed with a separating portion operable to separate only one stocker, not engaged with said recessed portion, from others of said stockers; and when the heights of said stockers are adjusted, said projecting portion provided on a desired stocker is engaged with the corresponding one of said recessed portions and said separating portion separates a different, stocker not engaged with said recessed portion, from said desired stocker.

15. A disk system comprising:

a plurality of stockers each having first and second opposed surfaces and containing disks in such a manner as to substantially align rotational axial lines of the disks to each other;

a stocker mover for moving said stockers to specific positions; and a disk driver for rotating a desired disk selected from the disks contained in said stockers;

wherein said stocker mover moves, on the basis of a command, at least one of a desired stocker and a first another stocker facing the first surface of the desired stocker for providing a gap tilted at a first angle ($\theta_1$) between the desired stocker and the first another stocker, and also moves, on the basis of the command, at least one of said desired stocker and a second another stocker facing the second surface of said desired stocker to provide a gap tilted at a second angle ($\theta_2$) between said desired stocker and the second another stocker.

16. The disk system of claim 15 wherein said first and second angles ($\theta_1$, $\theta_2$) are different.

17. The disk system of claim 15 wherein said disk driver is at least partially inserted between said first another stocker and said second another stocker during rotation of a disk within said desired stocker.

18. A disk system comprising:
   a plurality of stockers each having first and second opposed surfaces and containing disks in such a manner as to substantially align rotational axial lines of the disks to each other;
   stocker moving means for moving said stockers to specific positions; and
   disk driving means for rotating the disks contained in said stockers;
   wherein said stocker moving means moves, on the basis of a command, at least one of a desired stocker and a first another stocker facing the first surface of the desired stocker for providing a gap tilted at a first angle ($\theta_1$) between the desired stocker and the first another stocker, and also moves, on the basis of the command, at least one of said desired stocker and a second another stocker facing the second surface of said desired stocker to provide a gap ($\theta_2$) between said desired stocker and the second another stocker; and
   wherein said stocker moving means is provided with a first adjusting means for adjusting heights of said stockers and a second adjusting means for adjusting motions of said stockers in the direction substantially parallel to a carrying path of the disk.

19. A disk system according to claim 18, further comprising a disk drive shifter shifting the disk driving means in a direction generally transverse to the rotational axial lines of said disks; and an interlock interlocking movement of said stocker moving means to said disk drive shifter.

20. A disk system according to claim 18, wherein said stocker moving means integrally moves said plurality of stockers in the height direction upon carrying of a disk.

21. The disk system of claim 18 wherein said first and second angles ($\theta_1$, $\theta_2$) are different.

22. The disk system of claim 18 wherein said disk driving means is at least partially inserted between said first another stocker and said second another stocker during rotation of a disk within said desired stocker.

23. The disk system of claim 22 further comprising a disk drive shifter shifting said disk drive means relative to said stocker to at least partially locate said disk driving means between said first another stocker and said second another stocker during rotation of said disk within said desired stocker.

* * * * *